INVENTORS
ARTHUR F. COLLINS
JACK E. GREENE
HOLGER R. JENSEN
MARTIN J. KELLY
ELLIOTT R. MARSH
FLAVIUS M. POWELL

BY Ronald J. Clark
ATTORNEY

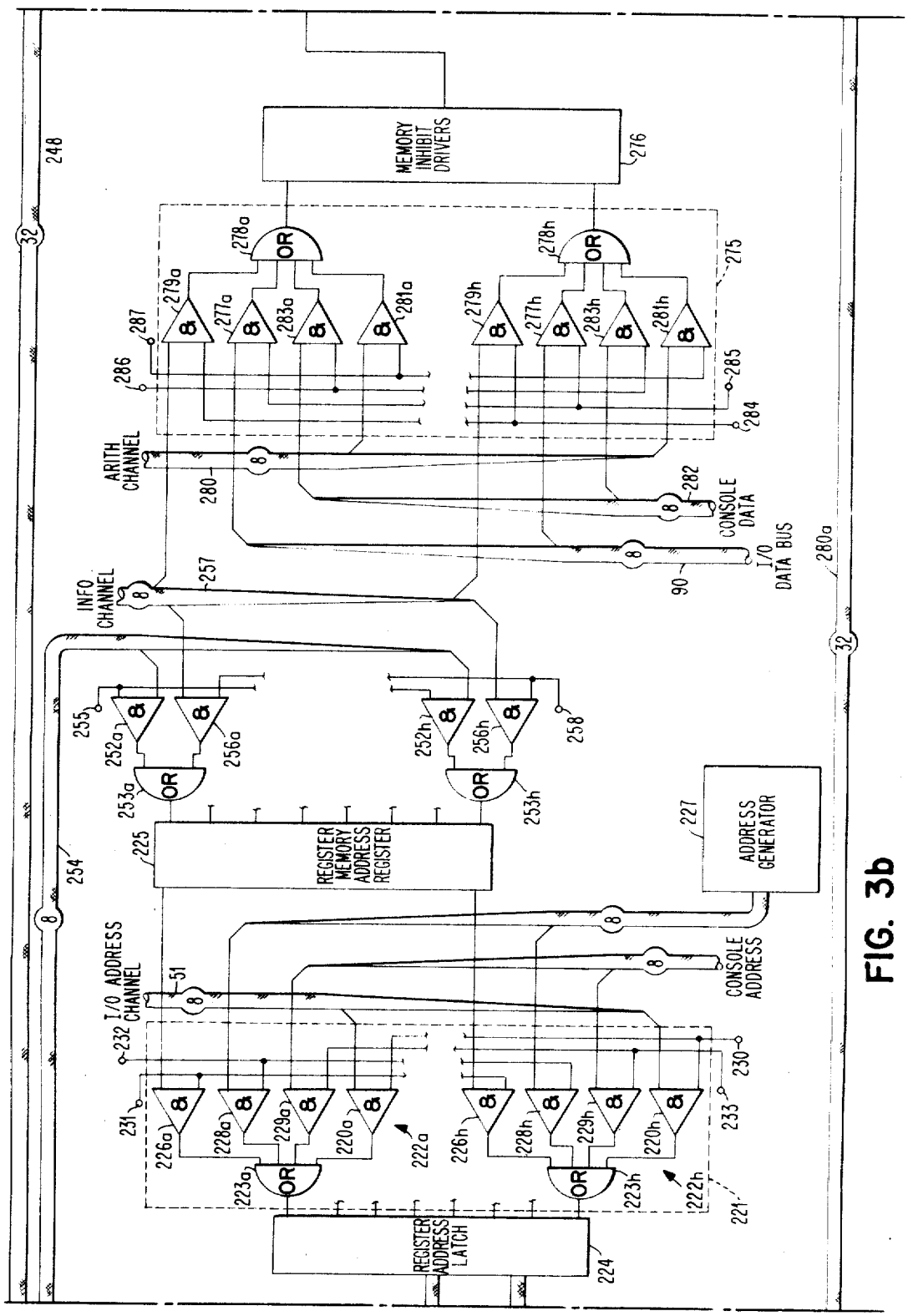

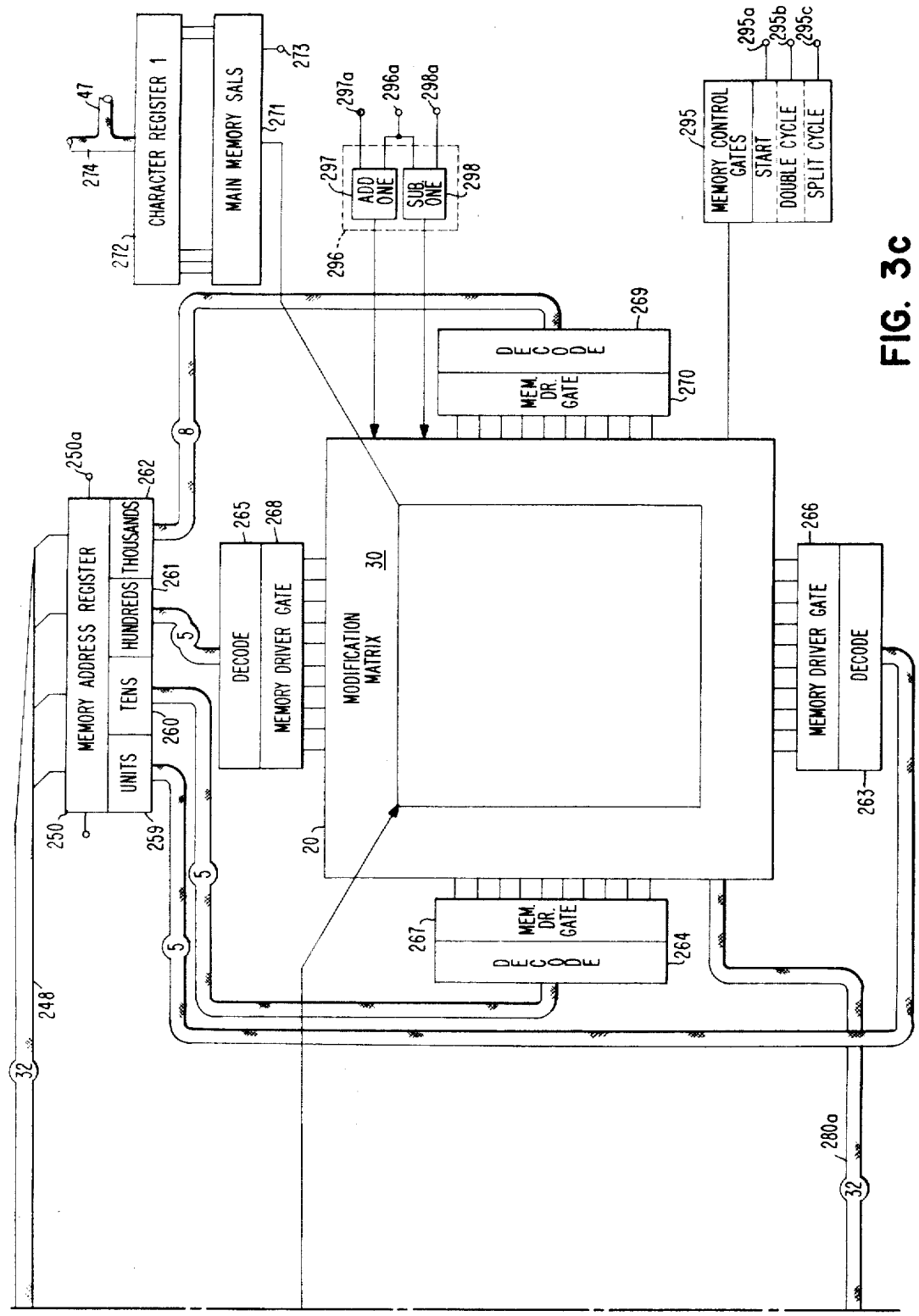

Sept. 26, 1967    A. F. COLLINS ETAL    3,344,410
DATA HANDLING SYSTEM
Filed April 28, 1965    67 Sheets-Sheet 15

Sept. 26, 1967  A. F. COLLINS ETAL  3,344,410
DATA HANDLING SYSTEM
Filed April 28, 1965  67 Sheets-Sheet 19
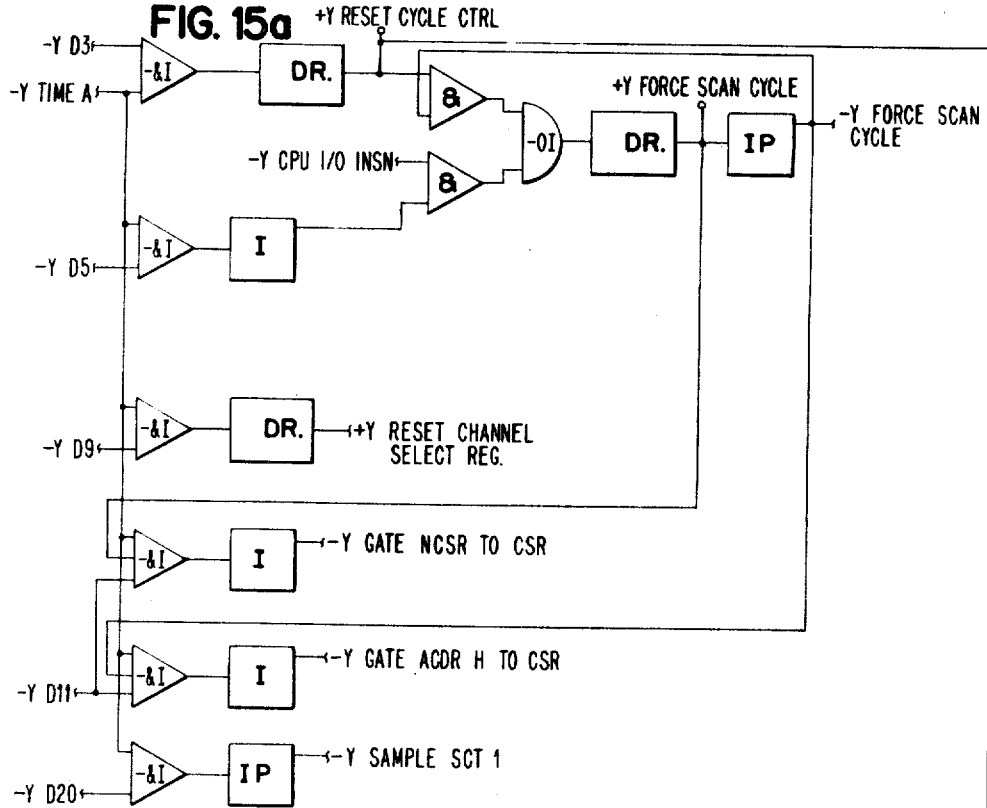
FIG. 15a
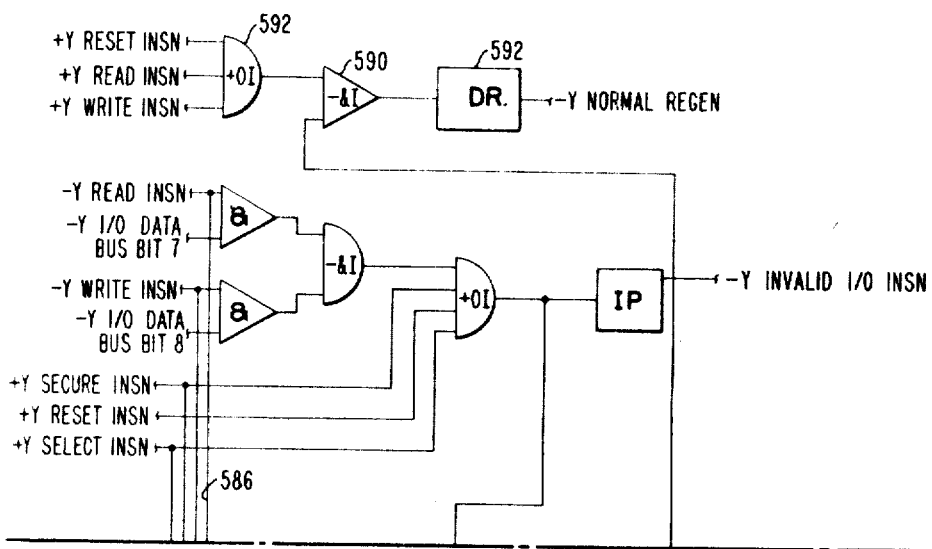

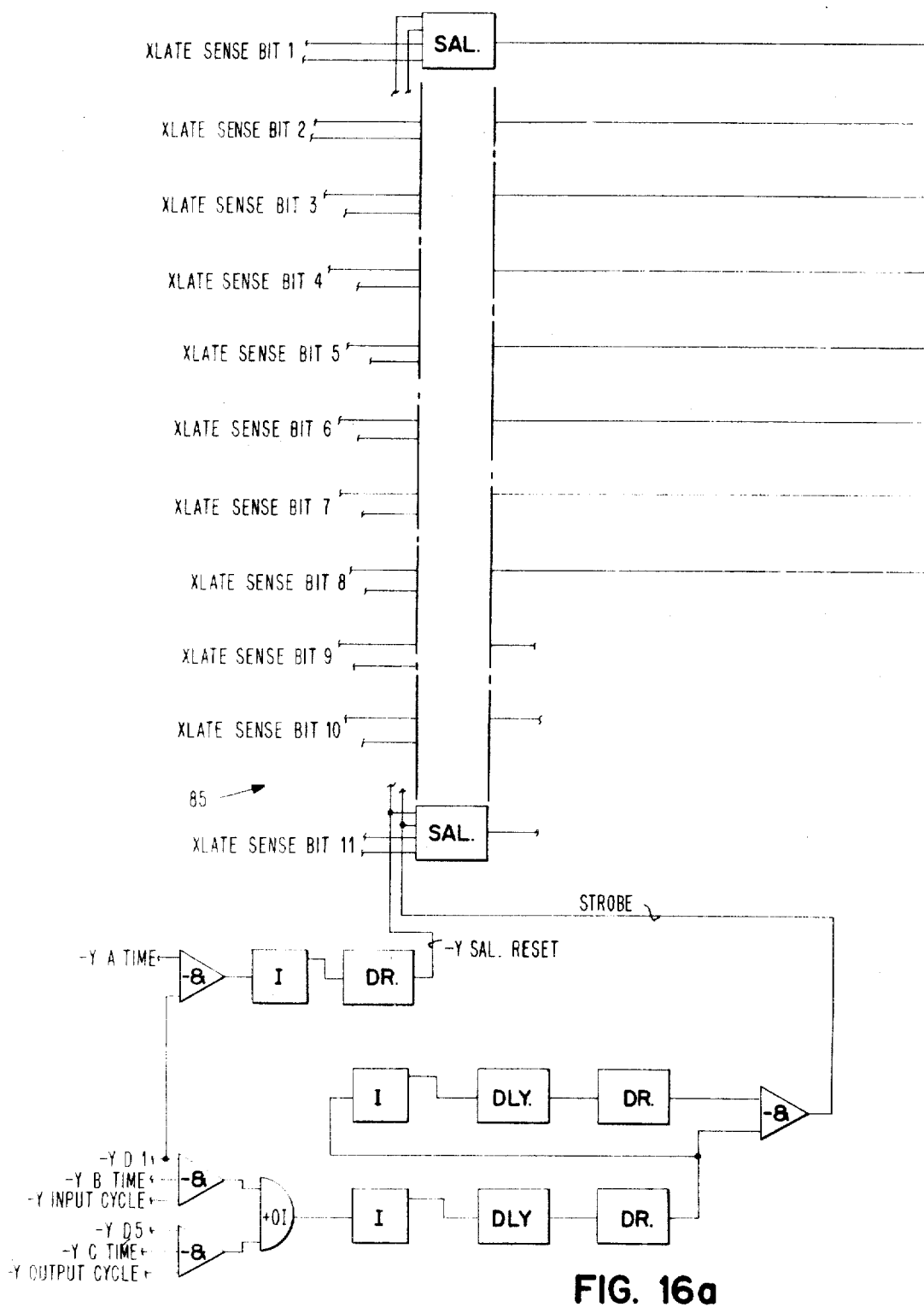

FORCE SCAN CYCLE
WRITE INSTRUCTION

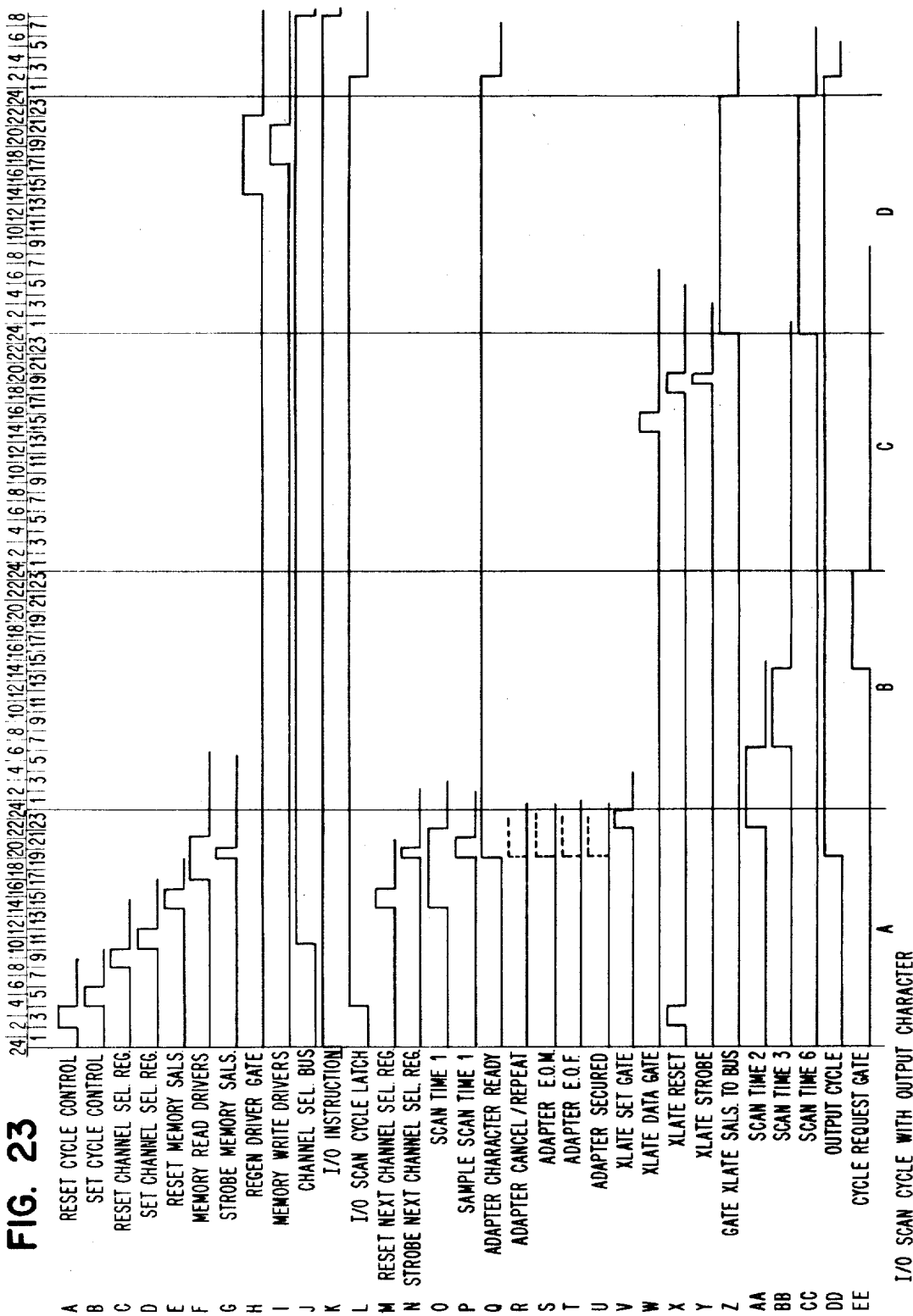

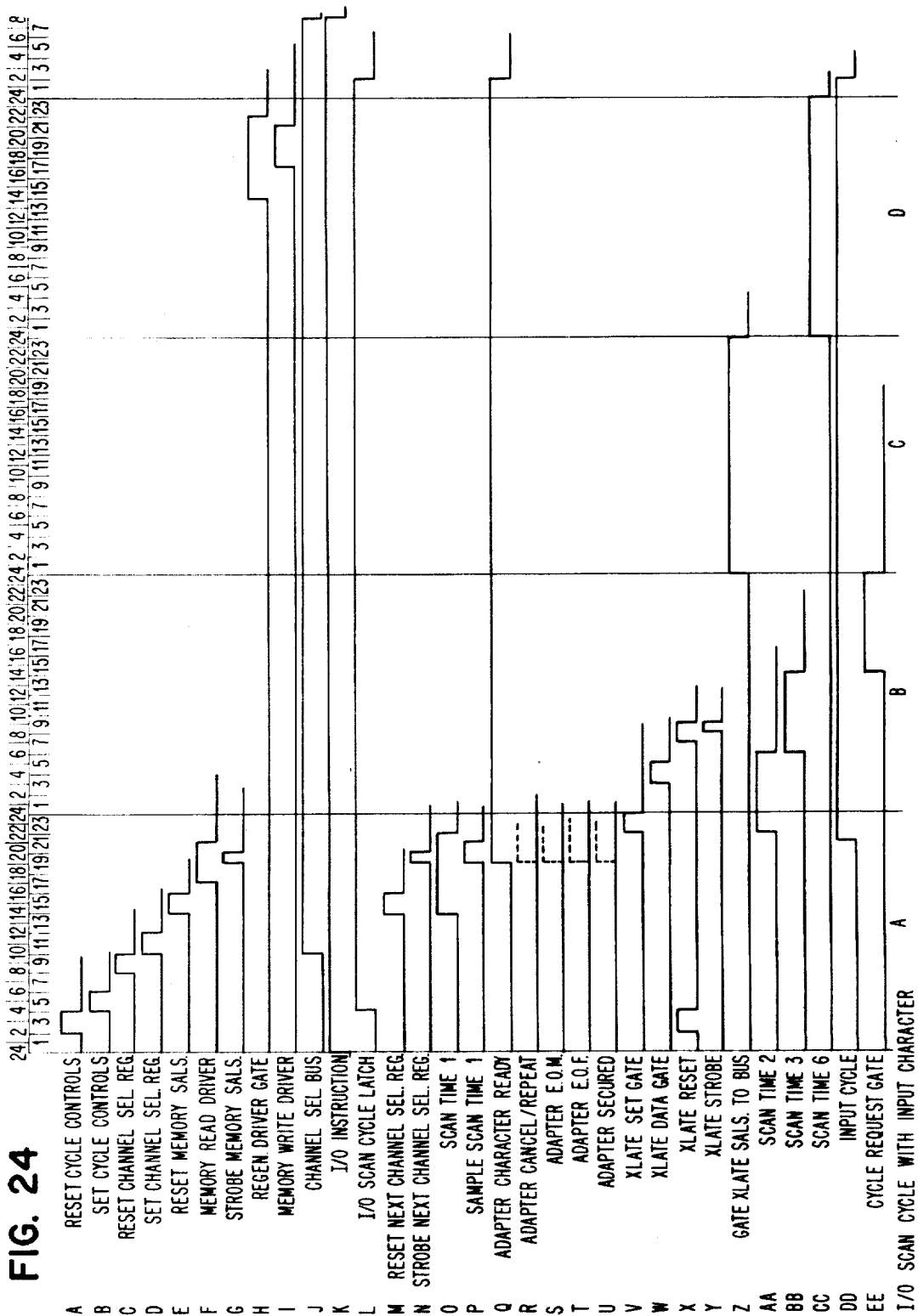

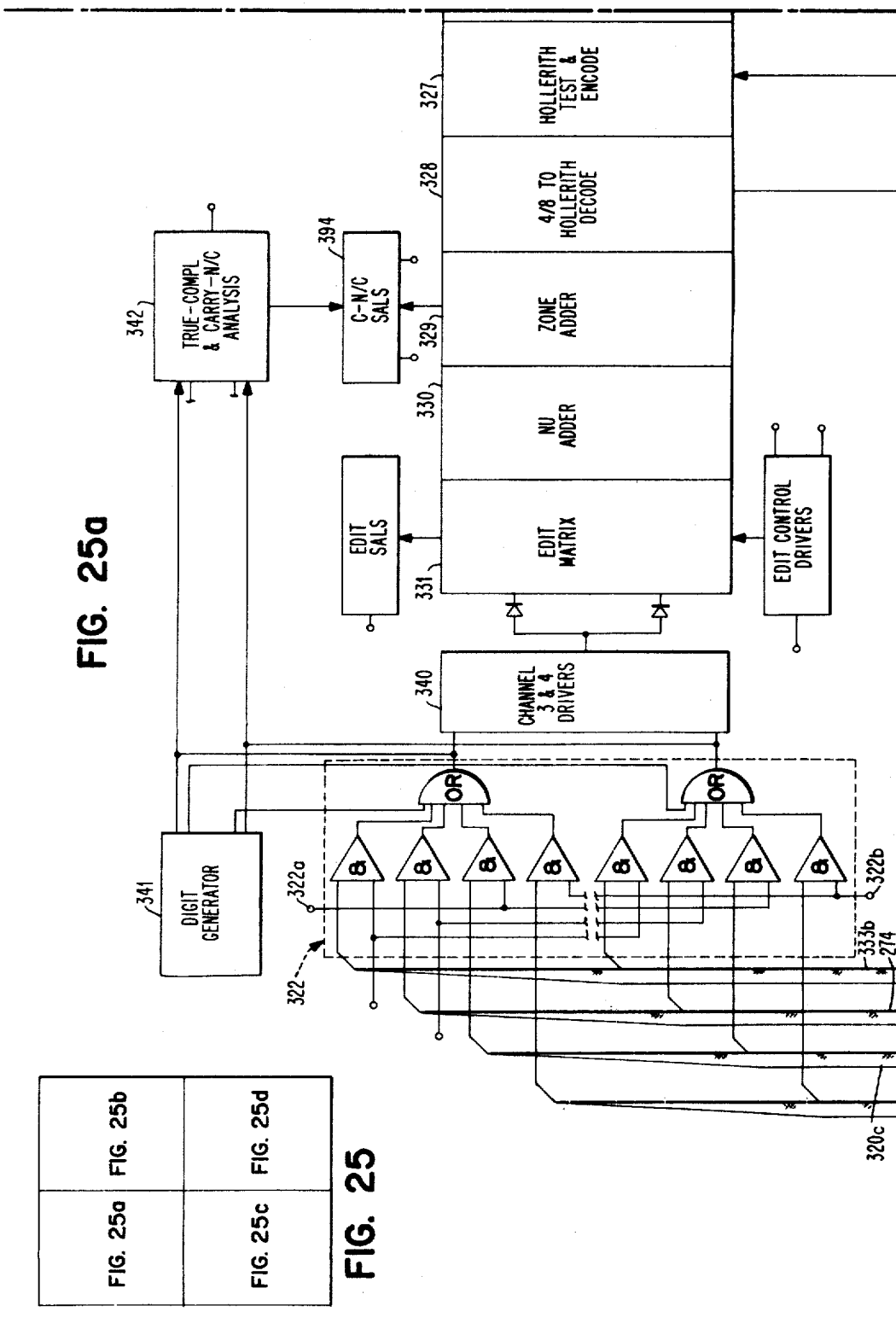

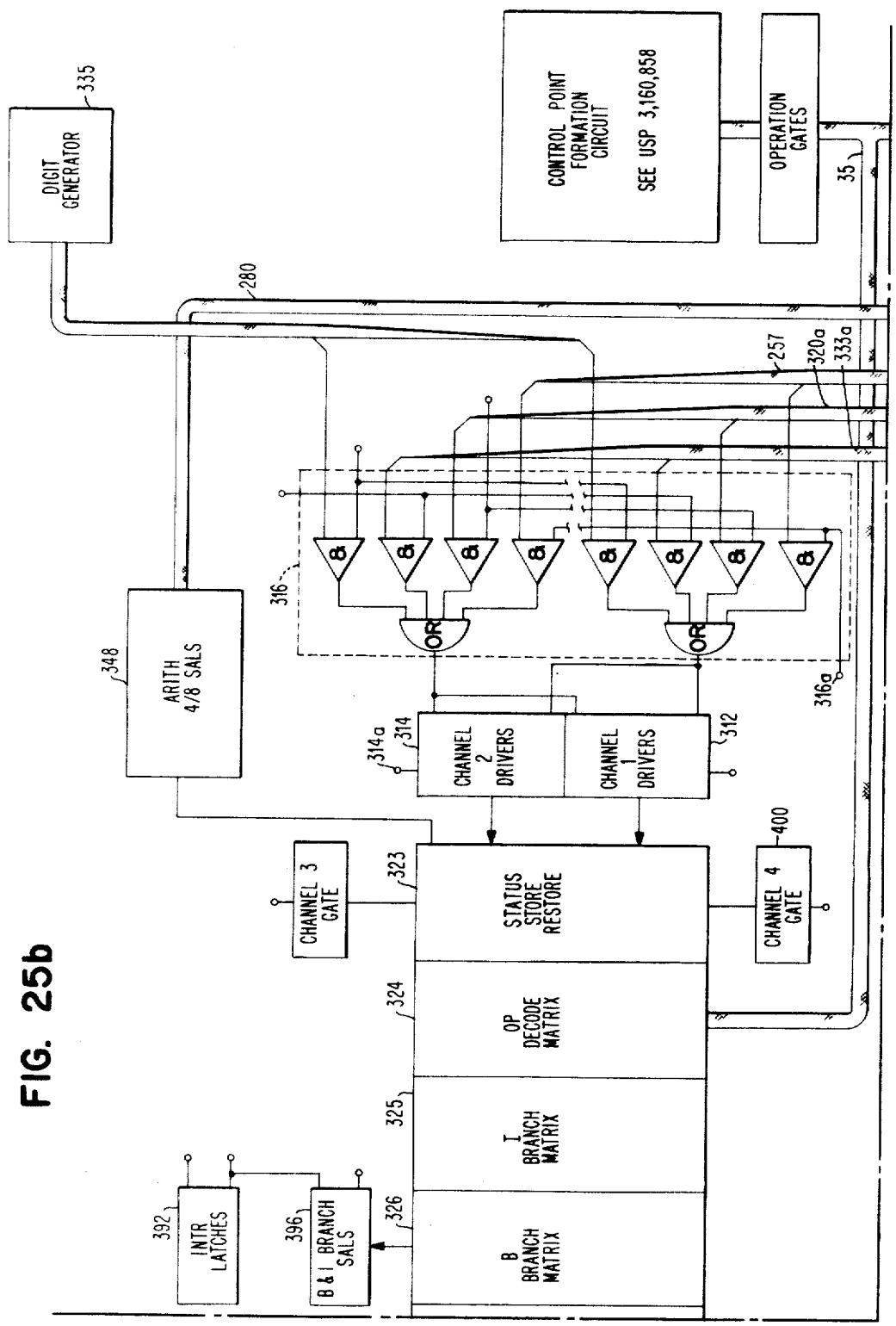

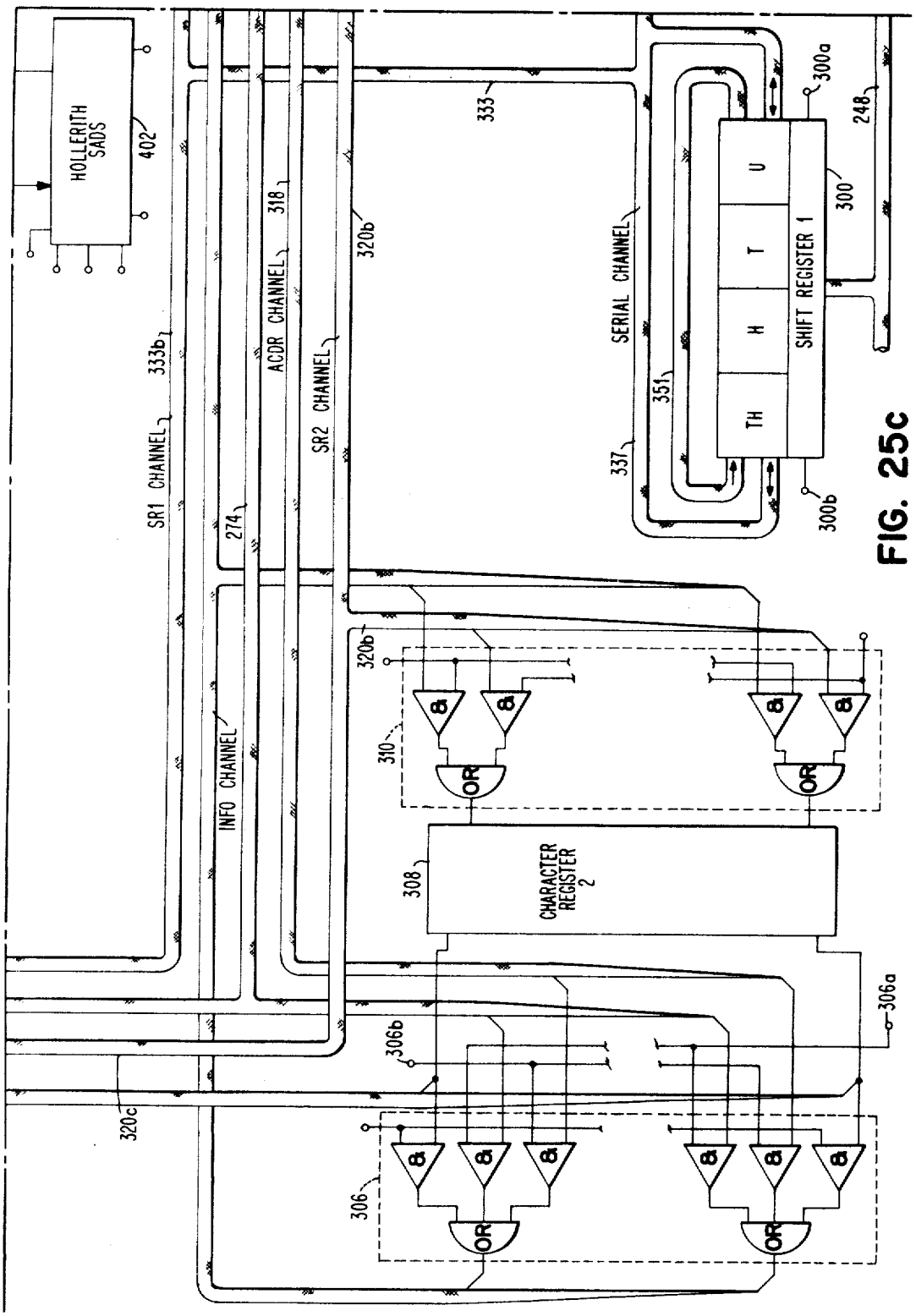

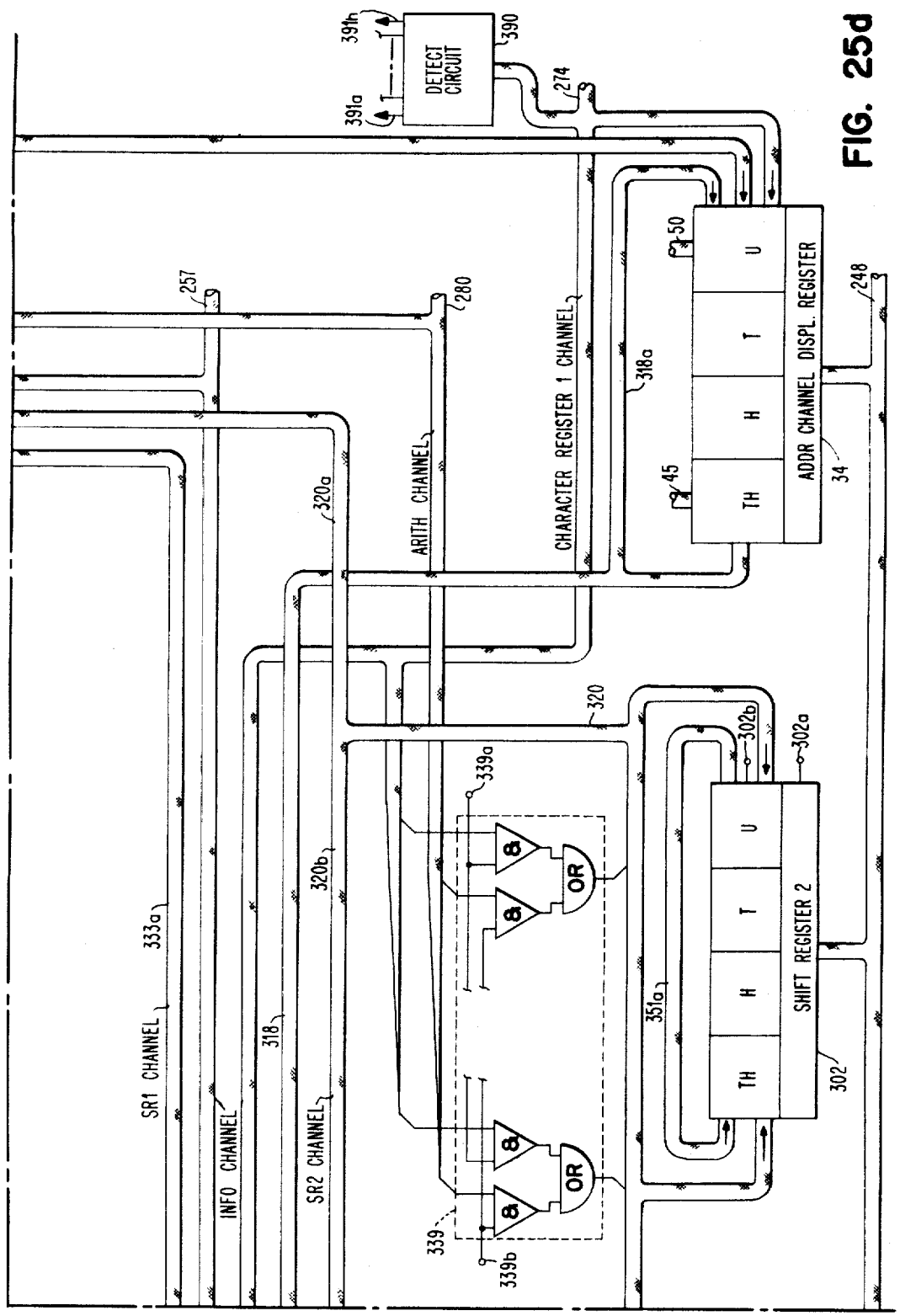

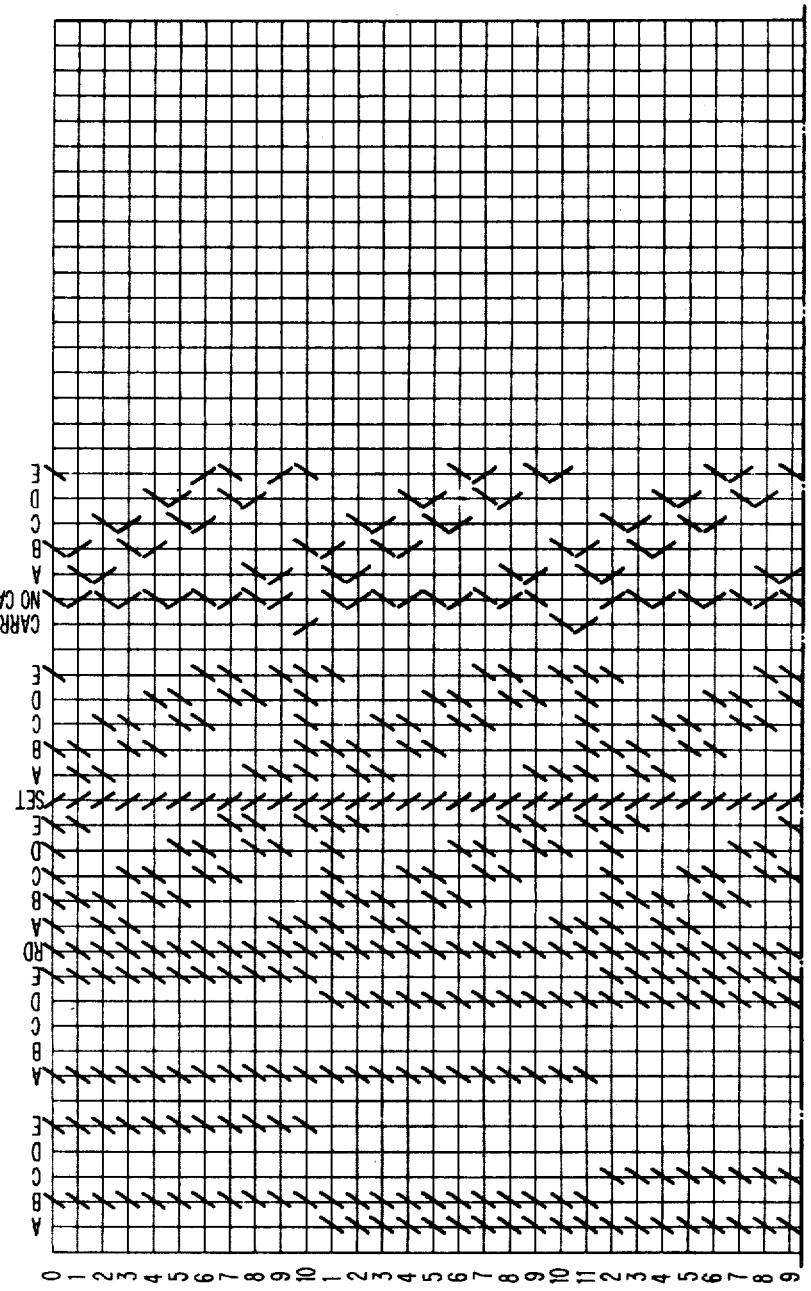

INTERRUPT BRANCH MATRIX

B BRANCH CONTROL MATRIX

ERROR 6 SENSE
ERROR 5 SENSE
ERROR 4 SENSE
ERROR # 6
ERROR # 5
ERROR # 4

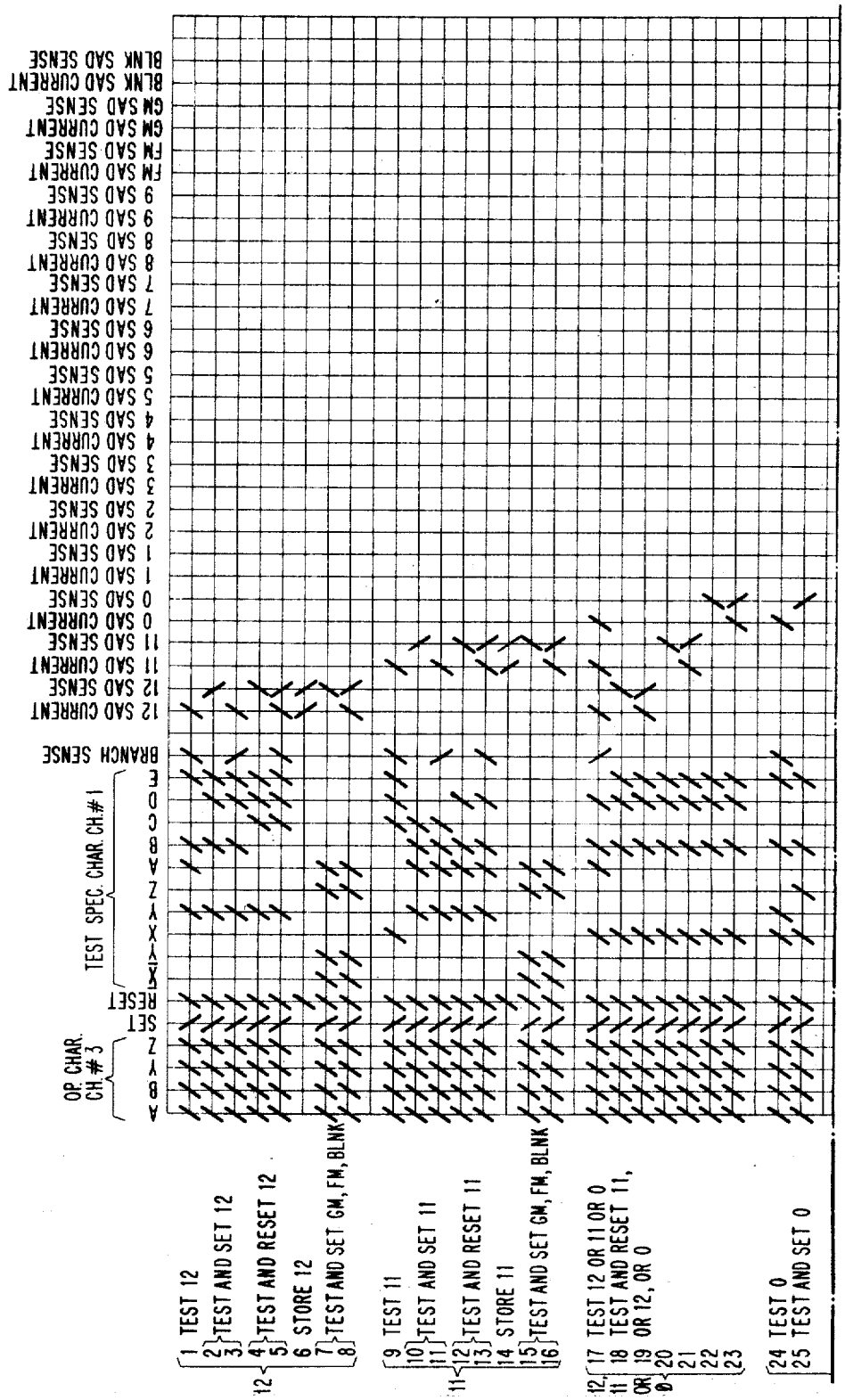

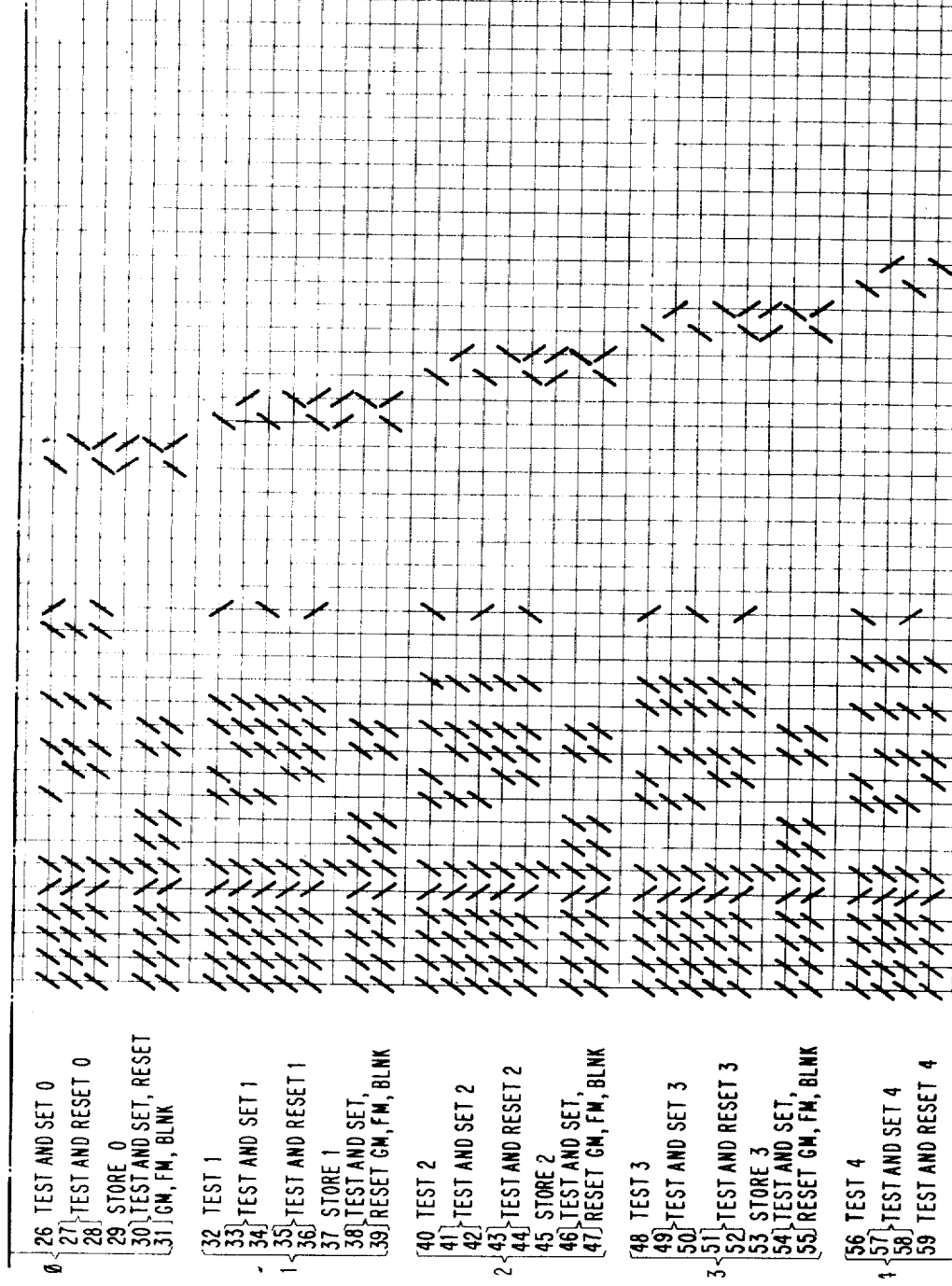

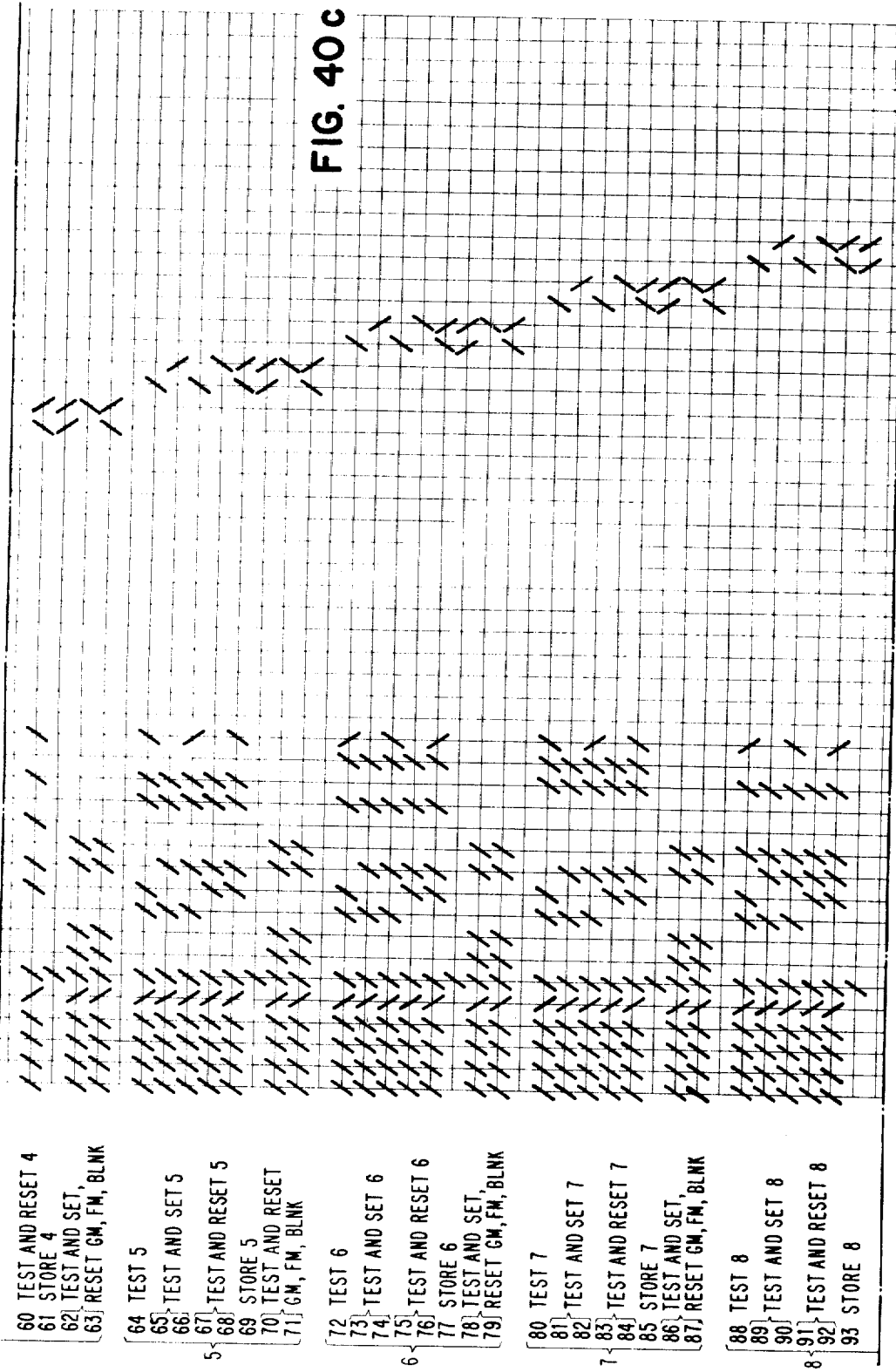

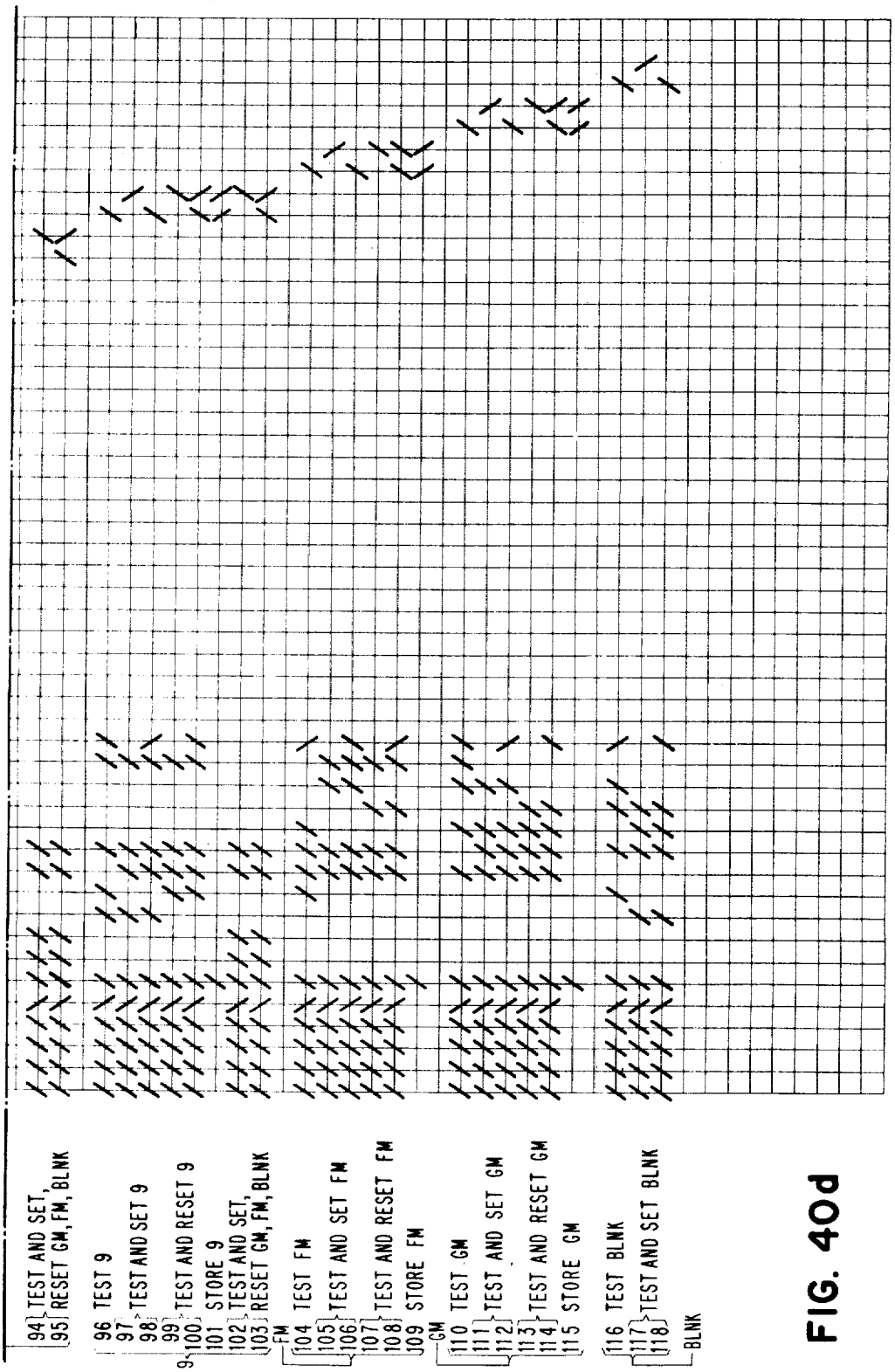

INDICATORS CONTROL & STORE MATRIX

United States Patent Office 3,344,410
Patented Sept. 26, 1967

3,344,410
DATA HANDLING SYSTEM
Arthur F. Collins and Jack E. Greene, Vestal, and Holger R. Jensen, Endwell, N.Y., Martin J. Kelly, Los Gatos, Calif., and Elliott R. Marsh, Endicott, and Flavius M. Powell, Endwell, N.Y., assignors to International Business Machines Corporation, Armonk, N.Y., a corporation of New York
Filed Apr. 28, 1965, Ser. No. 451,582
24 Claims. (Cl. 340—172.5)

ABSTRACT OF THE DISCLOSURE

This data handling system employs an electronic scanner for controlling the direct data transfer between a plurality of data originating terminals and an associated main storage device. The controlling operation includes the sequential and repetitive testing of the data originating terminals for ready characters and the translation of the ready character into a form suitable for processor handling. The scanner also controls the selection of a corresponding location in an associated register memory for furnishing the current main memory position address into which the data character is to be assimilated.

---

This invention relates to digital data handling systems and, more particularly, to a data handling system capable of simultaneously accepting data from a plurality of sources, categorizing the data into records and processing the records as they are assembled.

Normally, a data processor receives data from a plurality of input units and assembles the data into records in fixed memory locations. However, in the present invention, the processor automatically locates areas in main memory into which random length messages can be assembled. Thereafter, the processor operates on the assembled messages and uses the data according to its program. Throughout this processing activity, current areas are always maintained in main memory into which messages can be assembled. In the midst of a processing operation, the processor is always available to store a character or characters from any of its associated input devices without substantially disrupting its normal processing operation. This is accomplished by organizing the processor to execute one complete processor step prior to interrupting one of its input devices.

It is an object of the instant invention to provide a digital data handling system which is capable of operating with a plurality of input terminals having independent character formats.

It is an object of the instant invention to provide a digital data handling system including an electronic scanner for serializing the records from a plurality of data originating terminals and for connecting these terminals directly to a central processor.

It is an object of the instant invention to provide an electronic scanner which directs the transfer of data between its associated data originating terminals and the central processor by maintaining a directory describing the current operating condition of each of its associated data originating terminals.

It is a further object of the instant invention to provide a digital data handling system which is able to inspect any part of the scanner directory at any time through the action of the associated processor.

It is a further object of the instant invention to provide a digital data handling system which transfers a command signal and/or a record between the processor to one of the associated data originating terminals.

It is a further object of the instant invention to provide a digital data handling system employing a scanner which automatically selects successive ones of said data originating terminals for operation with the central processor.

It is a further object of the instant invention to provide a data handling system employing an electronic scanner which automatically selects a translator for converting the data characters transferred between its associated data originating terminal and the central processor.

It is a further object of the instant invention to provide a digital data handling system employing an electronic scanner which operates essentially independent of timing from the central processor other than a general requirement of operating at a rate less than a maximum input frequency rate.

It is a further object of the instant invention to provide a digital data handling system employing an electronic scanner for controlling the simultaneous transfer of a plurality of records and the sequential translation of these records into concurrently selected positions in the main memory of the associated processor.

It is a further object of the instant invention to provide a digital data handling system employing a main memory addressing technique capable of assimilating a plurality of data characters in diverse areas of the main memory and categorizing these data characters into records.

It is a further object of the instant invention to provide a digital data handling system which is capable of processing the records as they are categorized from the data characters.

It is a further object of the instant invention to provide a digital data handling system employing an independent register memory having a plurality of separately addressable locations for maintaining the current address position in the processor main memory into which corresponding data characters are assimilated.

It is a further object of the instant invention to provide a digital data handling system employing a register memory location addressing technique whereby each register memory location is associated with a corresponding data originating terminal.

It is a further object of the present invention to provide a digital data handling system employing an information channel whereby the address of the final character in a complete record is available to the processor.

It is a further object of the instant invention to provide a digital data handling system employing multiplexing means for transmitting data characters from a plurality of data originating terminals, which characters are transmitted serial by character and parallel by bit.

It is a further object of the instant invention to provide a digital data handling system employing a multiplexing means responsive to a plurality of single character buffer circuits for transferring data characters between a plurality of corresponding data originating terminals and an associated processor main memory.

It is a further object of the instant invention to provide a digital data handling system employing a single character adapter which signals an associated electronic scanner as soon as the buffer is ready to receive or has assembled a character from or to an associated data originating terminal.

It is a further object of the instant invention to provide a digital data handling system employing a record multiplexing means and an adapter connected to each multiplexer position, which multiplexing means sequentially inspects each adapter for determining if the adapter has assembled a complete character for transfer into the processor main memory.

It is a further object of the present invention to provide a digital data handling system employing an electronic scanner for controlling the direct data transfer between plurality of data originating terminals and an associated processor main memory wherein the controlling operation includes the sequential and repetitive testing of the data originating terminals for ready characters, the translation of the ready character into a format suitable for processor handling, and the selection of a corresponding location in an associated register memory for furnishing the current main memory position address into which the data character is to be assimilated.

It is a further object of the instant invention to provide a digital data handling system wherein the assimilation of each data character into a preselected or concurrently selection main memory position is automatically controlled by an improved memory addressing technique.

It is a further object of the instant invention to provide a digital data handling system which employs a unique combination of elements for permitting an improved functional operation whereby all memory processing cycles can be momentarily interrupted to assimilate a data character into the processor main memory and the processing operation can be restarted without additional preparatory operations.

It is a further object of the instant invention to provide a digital data handling system wherein a record categorizing function and a record processing function can be favorably combined at a slight proportional reduction of processing speed.

It is a further object of the instant invention to provide a digital data handling system which employs an improved memory sharing technique to accomplish the expeditions performance of a record categorizing function and a record processing function.

It is a further object of the instant invention to provide a digital data handling system employing a functionally a segmented memory cycling technique whereby each memory cycle is principally assigned to perform a major function but which can be diverted to perform a secondary function whereby no memory cycles are left unused to perform either function.

It is a further object of the instant invention to provide a digital data handling system employing a unique combination of elements, permitting maximum uninterrupted rate of data flow.

It is a further object of the present invention to provide a digital data handling system which requires a single input-output operation code to start and to complete the transfer, the reception, or any other action on a segmented record between the processor main memory and one of the data originating terminals.

It is a further object of the present invention to provide a digital data handling system employing an input-output control circuit which immediately releases its associated processor upon the receipt of a command signal and which thereafter automatically prepares for the orderly transfer of data between the processor and its data originating terminals.

It is a further object of the present invention to provide a digital data handling system employing a novel, flexible system for address allocations whereby program techniques are used for assigning addresses for the main memory positions into which messages are assimilated.

It is a further object of the instant invention to provide a digital data handling system employing a novel message assembling technique which makes it unnecessary to move a completely assembled message from an assembling area of main memory to a processing area of main memory.

It is a further object of the instant invention to provide a digital data handling system employing a novel message assembling technique which recognizes the completion of a message assembling operation in a specified area of main memory and automatically changes the identification of that specified area to a processing area.

It is a further object of the instant invention to provide a digital data handling system employing a novel message assembling technique which constantly monitors the current identification of each area in main memory and which controls the changing and rechanging of the current identification assigned to each area.

It is a further object of the instant invention to provide a digital data handling system employing a memory addressing technique that is decoded by minimum amount of circuitry and is mentally assigned by a programmer with the least amount of effort.

It is a further object of the instant invention to provide a digital data handling system employing a character oriented main memory addressing technique wherein each character is divided into two groups; the first of which is adapted for decimal mapping in a two out of five code, and the second is adapted for octagonal mapping in a two out of three code.

It is a further object of the instant invention to provide a digital data handling system employing a character oriented main memory addressing technique wherein the characters used to provide addressing indicia are divided into subgroups; at least one of which group is employed solely for addressing main memory positions, and another group is used for control purposes or for enlarging the addressing capability of a fixed size character address.

It is a further object of the instant invention to provide a digital data handling system operating with increased efficiency based on an improved circuit sharing technique wherein all character handling circuits associated with a plurality of data originating terminals are common to each terminal, while command signals associated with each terminal are stored in separate storage locations but inspected in common circuits and the main memory addressing circuits are common to its associated register memory to provide a more efficient address updating technique.

It is a further object of the instant invention to provide a digital data handling system employing a separately addressable storage unit for storing the current address position in the processor main memory into which a plurality of records are to be assembled, which storage unit is also accessible for addressing by the contents of the main memory.

It is a further object of the instant invention to provide a digital data handling system employing a separately addressable storage unit for storing current address indicia specifying the position in the processor main memory into which a plurality of records are to be assembled, which separate storage unit is linked to the processor main memory by a modification matrix to effect the automatic address updating of each position indicia after each character transfer operation.

It is a further object of the instant invention to provide a digital data handling system employing a multisectional and separately addressable storage unit, one section being employed to store the current address indicia specifying the position in the processor main memory into which a plurality of records are to be assembled, which section is also subdivided in a plurality of single address locations associated with a plurality of data originating terminals respectively, whereby each data originating terminal is always linked to the processor main memory by the address indicia stored in a corresponding subdivision of the storage unit.

It is a further object of the instant invention to provide a digital data handling system employing a multisectional and separately addressable register memory, wherein each section is subdivided into a plurality of single character locations for the storage of multipurpose addresses, one purpose being to obtain direct access to the contents of corresponding positions in the processor main memory and at least one other purpose being to provide indirect addendum indicia to obtain an effective main memory address, and an additional purpose being to provide sequential addresses automatically for use during loading and unloading operations giving a resultant savings in the total number of program steps required in these operations.

It is a further object of the instant invention to provide a digital data handling system employing functional matrices to handle machine coded and Hollerith coded characters and to provide an easy means for translating one character into the other.

It is a further object of the instant invention to provide a digital data handling system employing a plurality of functional matrices for decoding and encoding Hollerith punches without complicated program routines which would otherwise be necessary for this purpose.

It is a further object of the present invention to provide a digital data handling system organized to complete one individual operation prior to the next individual operation wherein the system may digress from a predetermined sequence of operations to perform an unrelated function at the end of each individual operation by providing a separately addressable register memory for storing branch positions of each interrupted sequence of operations.

BRIEF DESCRIPTION OF THE INVENTION

According to these objects, the instant invention is directed to digital data handling system which includes two main functional units. This data system handles a multiplicity of serial input-output lines which are connected directly to the processor unit by an input-output control unit. By multiplex techniques, the input-output control unit combines all the input lines into a single data channel for application to the processor. Additionally, the input-output control unit includes a control word memory for storing indicia representing the present operating condition and command requirements of each associated data terminal. The control unit also inspects these indicia and generates enabling signals to control the passage of data between the data terminals and the processor. The control word memory identifies each terminal by address indicia stored therein. An automatic address recycling loop controls the sequential interrogation of indicia corresponding to each data terminal. The address indicia is furnished to the processor to effect the automatic storage of a single date character generated by the identified data terminal. The input-output control circuit signals the processor that a memory cycle is required to insert this data character into the processor's main memory. All processing memory cycles are stopped to perform this data insertion cycle, providing a main memory sharing technique which allows direct buffering of an input data character from a data terminal into the processor's main memory without substantially reducing the processing speed of the processor. Output data characters are handled in a similar manner. Because of this memory sharing technique all memory cycles are used either for inserting data characters into the processor's main memory, or for processing the data after its insertion. However, a small percentage of memory cycles is required to store the data characters from even a large number of separate data originating terminals, e.g. 40, terminals and the processor continues to handle the stored data almost unimpeded. This is possible because of the novel organization of the control unit employed in the instant invention.

More specifically, command signals are supplied to the control unit by the processor only once for each record to be transmitted, received or in some way acted upon. The control unit stores this command word as part of its command indicia and immediately releases the processor to perform other tasks. Thereafter, the control unit automatically transmits each data character in the record without additional control signals from the processor. The control unit interrupts the processing function of the processor and takes only one memory cycle to store each data character.

The entry of data characters from a plurality of data originating terminals requires that associated groups of characters be assembled into complete records in separate areas in the processor's main memory so that the record from each terminal may be separated from the message coming in from any other data terminal. This has been accomplished in the prior art by assigning specific portions of main memory into which messages from each terminal can be buffered. These portions in main memory are fixed in length and addresses and, although this type of buffering will in fact work, it provides limitations on the length of messages received and the number of buffer areas which can be assigned to each data terminal. In the present device, this restriction is removed by allowing the program to assign buffer areas in memory to meet the changing demands for each data terminal. These buffer areas in the present device can now be both variable in length and in location. This ability to assign new buffer areas to meet the changing demands of any data terminal provides the maximum flexibility for the entry of information into the main memory of the instant device and it results in a more efficient handling of messages and a more efficient usage of existing memory storage capacity. Additionally, means have been incorporated in the instant device for the assembling of records whereby it is unnecessary to actually transfer a completely assembled record from its assembly area in the processor's main memory to a new area in main memory where it is processed. When a message has been assembled from a particular terminal in a main memory assigned for that purpose, the program takes note of this completed condition and assigns a new storage area to that terminal when the next record is to be stored. The area where the assembled record is located is then treated by the processor as a data processing area. The program attends to this input record and performs what processing is required. When the record contained in this last mentioned area is no longer useful, the processor returns the address of this area to a table of unused areas, thereby again making it available for other record entries from any of the data terminals.

The means employed in the instant invention to provide this flexibility is a multi-location, segmented register memory in the processor which is separate from the processor main memory. Each of the pertinent locations is addressable by both the data terminals and the processor main memory. Additionally, an access path to each location is available to the processor whereby, the processor furnishes main memory address information for storage in each addressed location in the register memory.

The automatic sequential loading of a record originating at a data terminal is achieved by a novel combination of circuits. The control unit addresses a specific data terminal and its corresponding location in one of the segments of the register memory. The addressed location in the register memory furnishes a main memory address to the main memory address circuitry for selecting a position wherein a single character from the addressed data terminal is to be stored. The address circuit includes drive windings which thread a modification matrix for automatically altering the main memory address furnished thereto by one. The altered address is either larger or smaller by one unit. The output windings of the modification matrix pass through all the locations in the register memory including the one addressed by the control unit. The altered main memory address is inserted into the register memory location corresponding to a particular data terminal. Therefore, the next time the control unit addresses the same data terminal and its corresponding location in the register memory, the register memory furnishes a new main memory address to store a new data character. Since the main memory address is altered by one unit, sequential data characters are stored in sequential positions in the processor main memory.

The processor portion of the instant device is organized specifically to complement the previously described address technique to furnish advantages heretofore unobtainable by data handling systems known in the prior art. It includes temporary storage devices and functional matrices interconnected together, interconnected with the register memory and interconnected with the processor main memory by a plurality of data channels.

The functional matrices provide useful instruments for handling the data characters in many standard processing operations which were heretofore handled by complicated programs. This improved capability saves main memory storage capacity of the complicated and space consuming programs and increases the effective processing speed of the processor.

Although the control of a processor by control sequence points is well-known, the control circuitry employed in the instant invention is organized to provide improved data handling capabilities over previous processors employing control sequence points. These advantages include the capability of the instant invention to immediately stop its processing function and service the demand of a data originating terminal requiring the storage of a data character.

Every operation performed by the instant invention can be subdivided into three categories. The largest of these is the entire operation itself specified by an operation code. The next is the micro-operations performed during a plurality of main memory cycles to complete an operation. And finally, the micro steps specified by a plurality of control sequence points which complete a micro-operation. Since the processor main memory is time shared with the data originating terminals to allow the assembly of records, the operations performed by the processor are divided into micro-operation units. Each of these micro-operation units is an entity in itself so that the conditions which exist as a result of a micro-operation and which includes an indication of the next micro-operation, can be maintained for a period during which a request for service by a terminal can be immediately answered. A means is also provided whereby continuity can be maintained between interrupting micro-operations. This means includes timing circuits for producing clocking pulses which repeat each memory cycle, a control matrix set up to perform one memory cycle micro-operation and addressable registers for maintaining linking addresses of the interrupted micro-operations.

The foregoing and other objects, features and advantages of the invention will be apparent from the following more particular description of a preferred embodiment of the invention, as illustrated in the accompanying drawings; wherein FIG. 1 is a generalized block diagram of a record input-output terminal constructed according to the instant invention;

FIGS. 2a and 2b comprise a more detailed block diagram of the input-output control circuit shown in FIG. 1;

FIGS. 3a, 3b, and 3c comprise a more detailed block diagram of the addressing circuitry employed to store a single record character;

FIGS. 4a and 4b are timing diagrams showing the sequence of signals required to transfer a character to and from the addressing circuits;

FIGS. 5a and 5b comprise a more detailed block diagram of a representative adapter shown in FIG. 1;

Figure 2A:
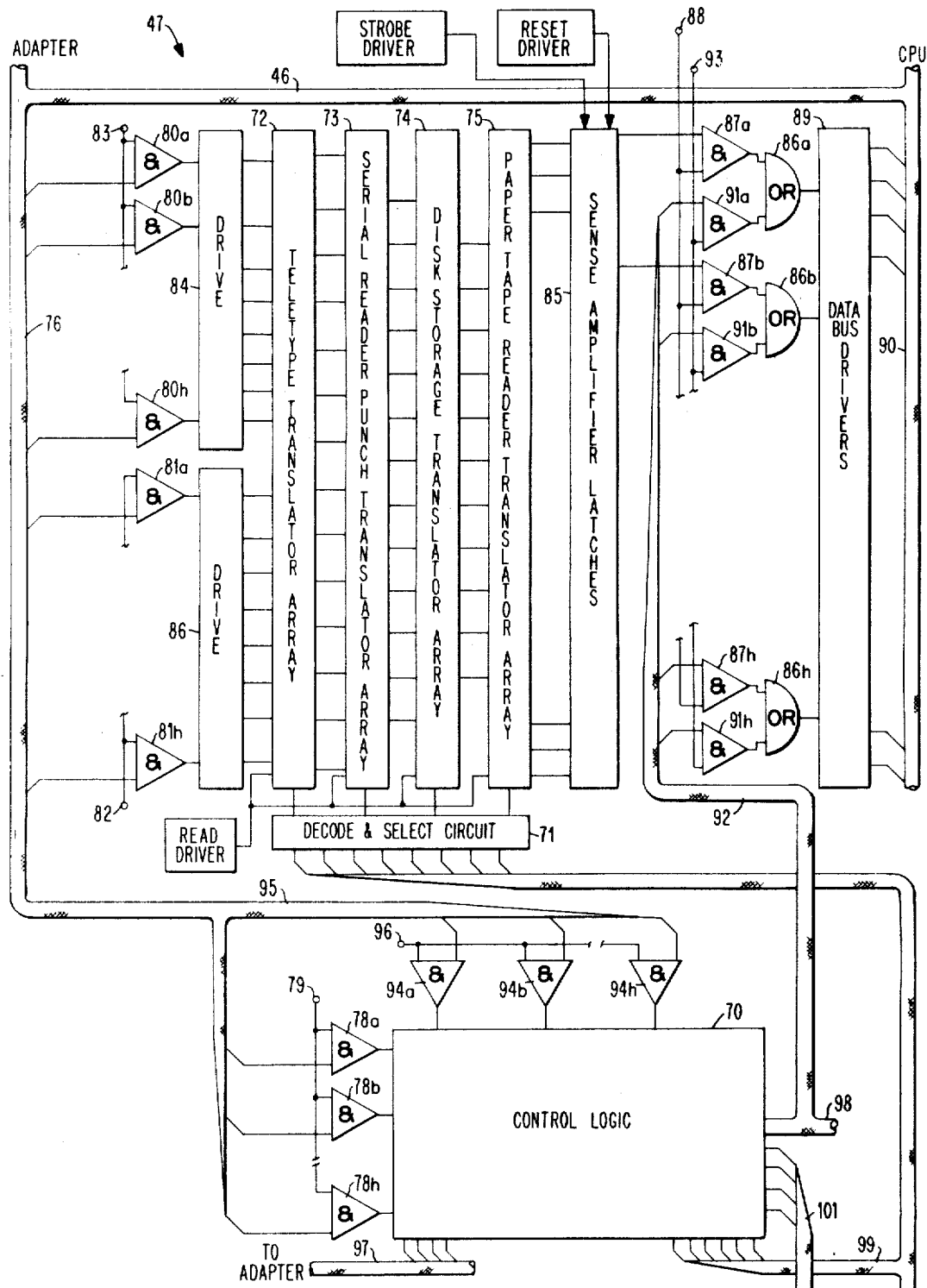
Figure 26:
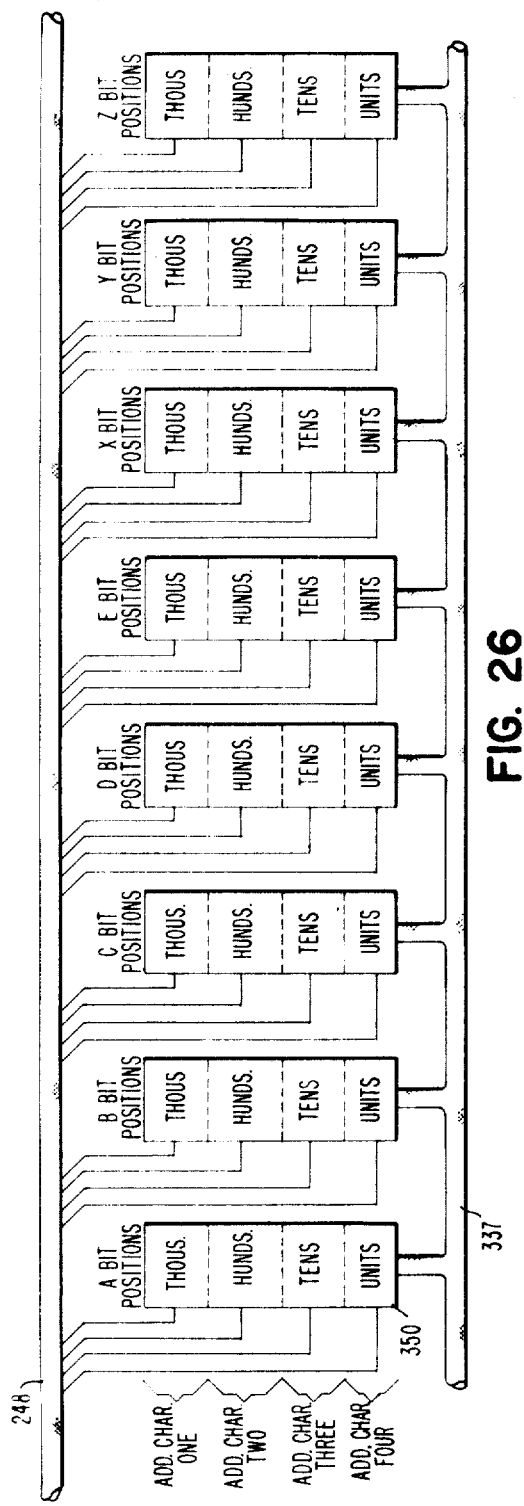
Figure 14:
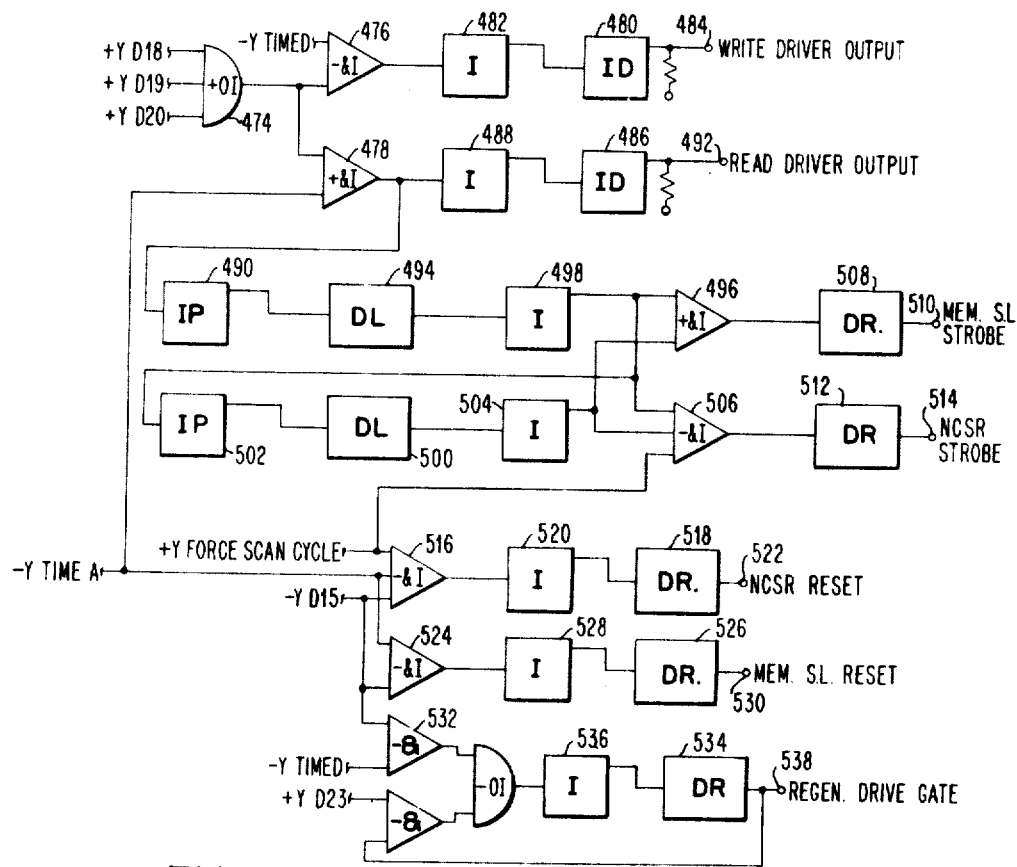
Figure 13A:
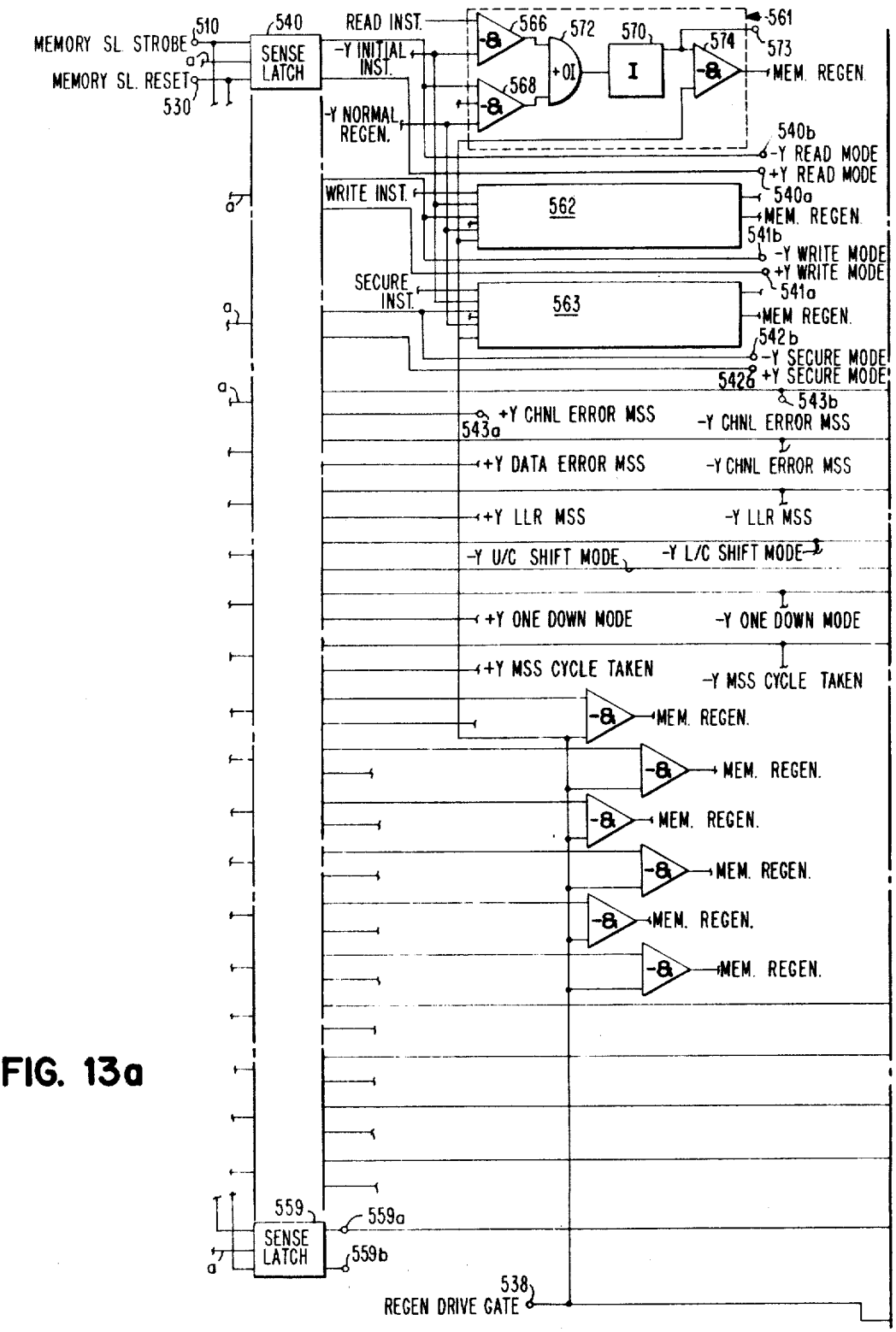
Figure 13B:
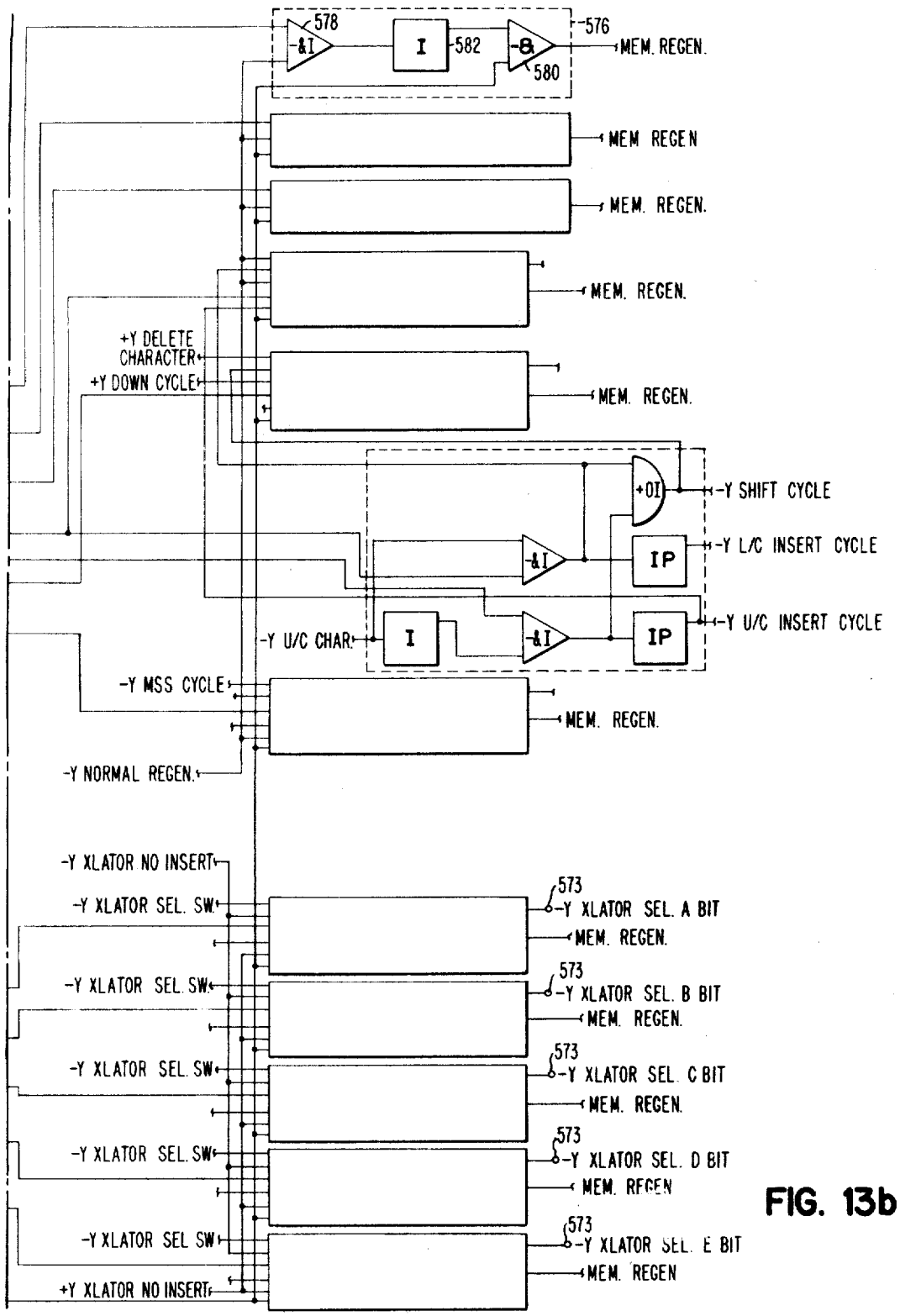
Figure 15B:
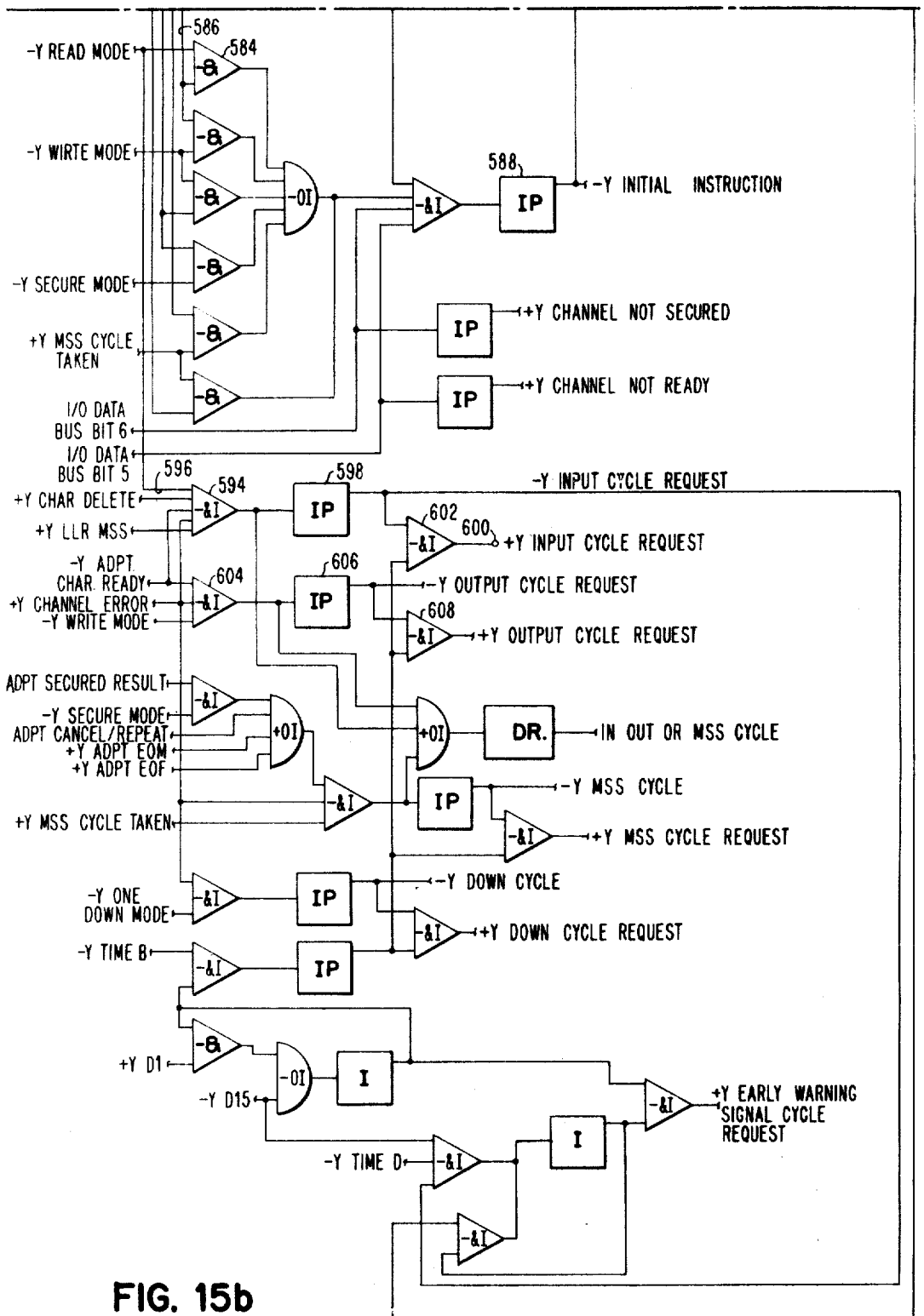
Figure 16B:
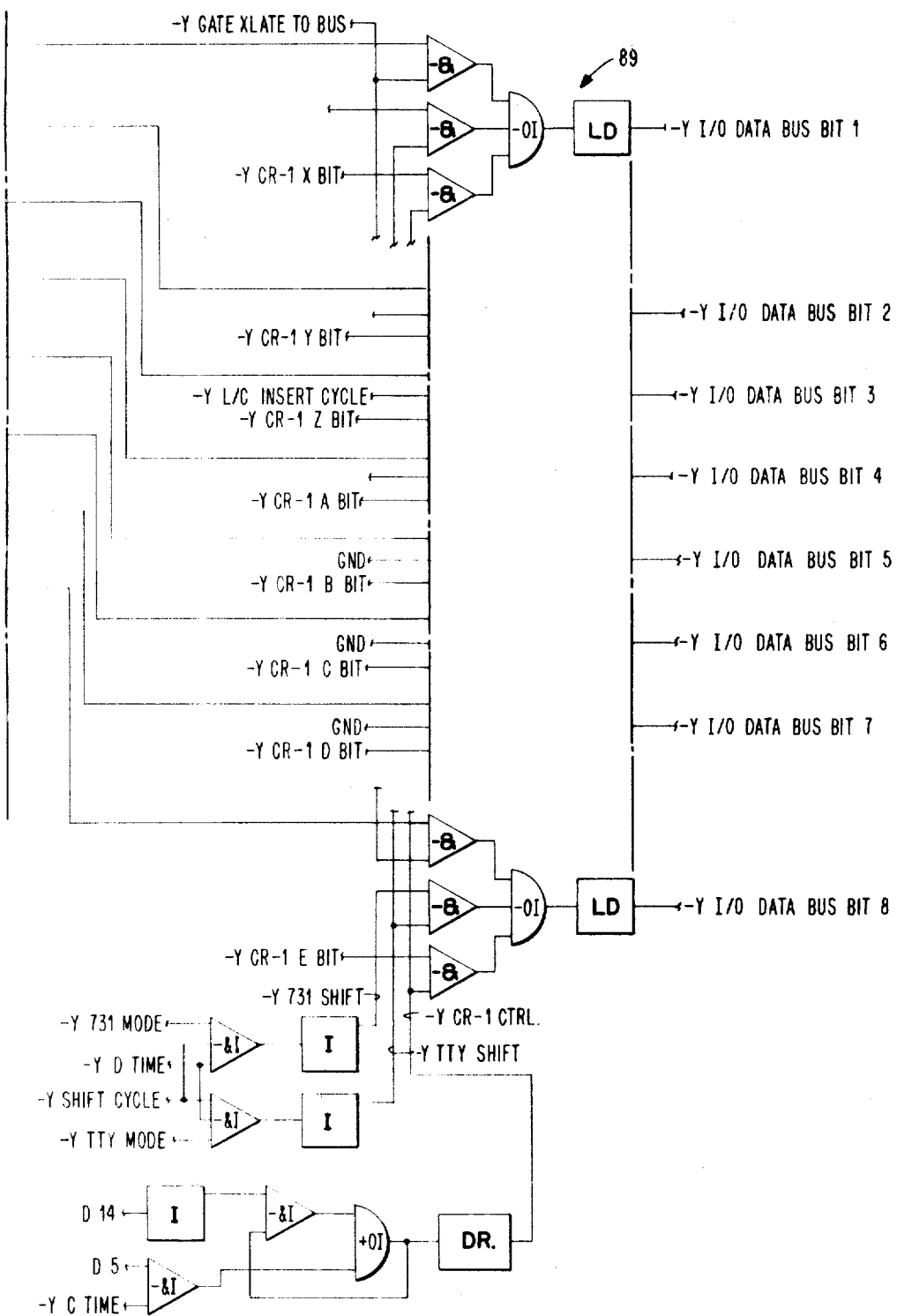
Figure 17A:
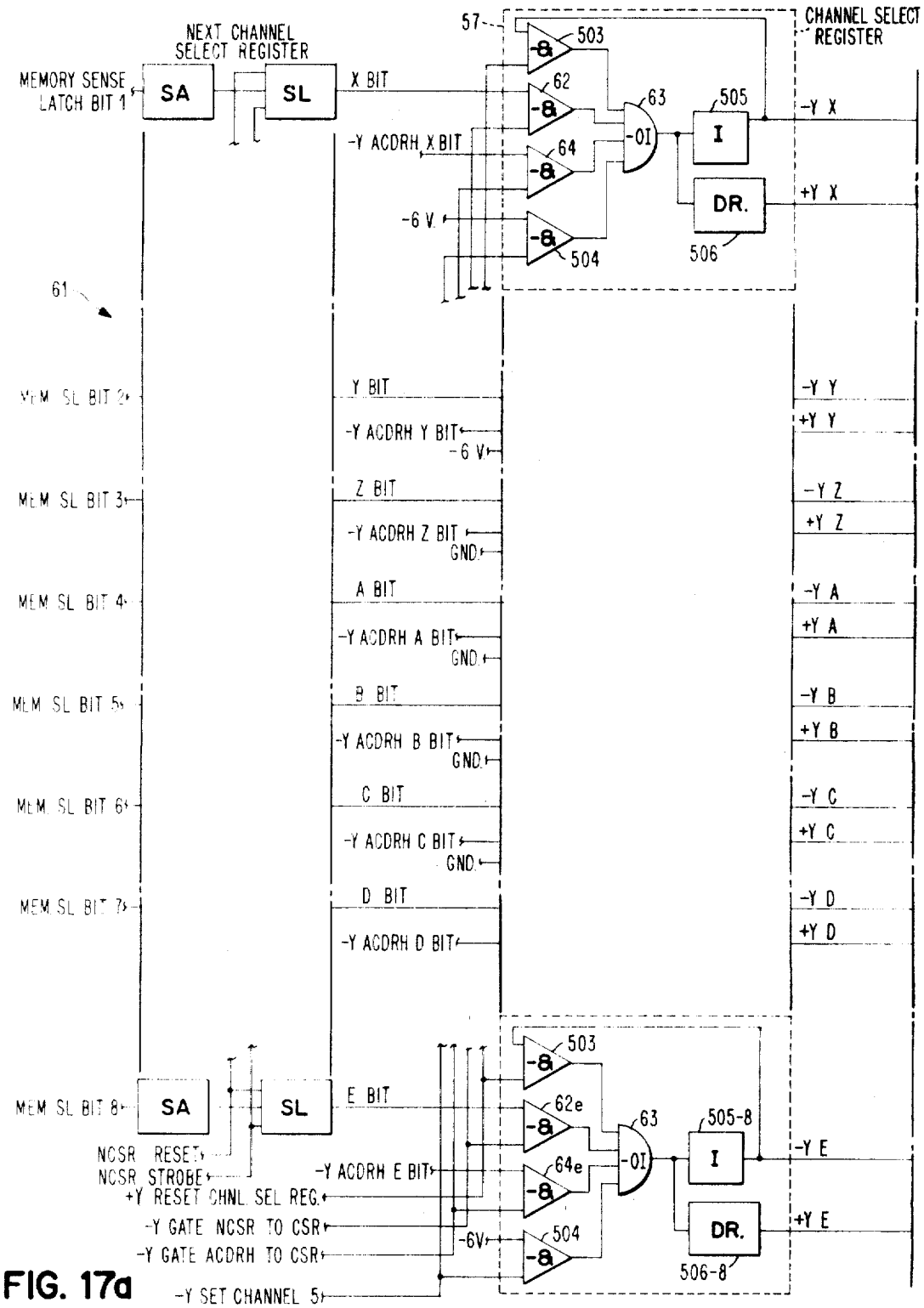
Figure 17B:
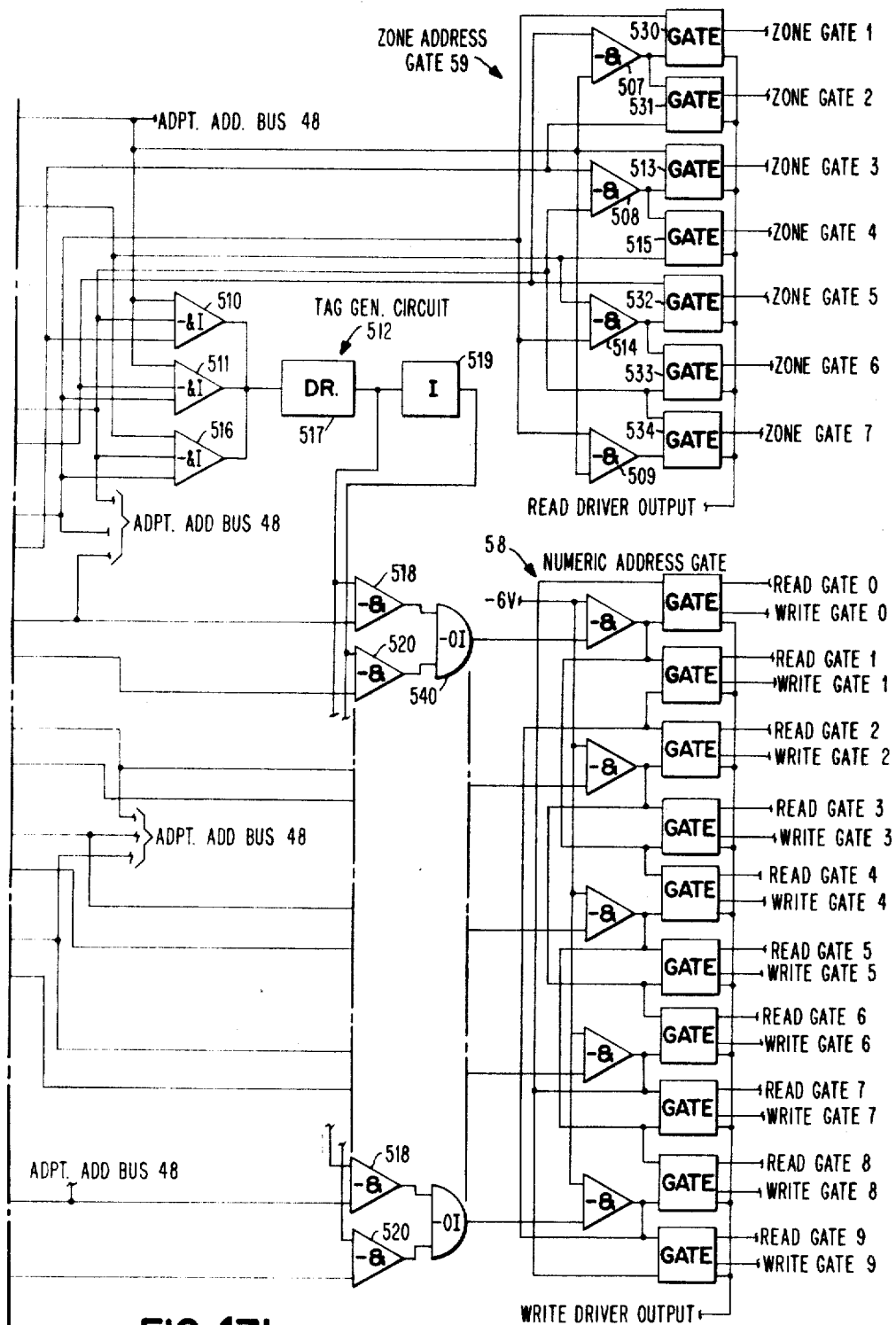
Figure 18:
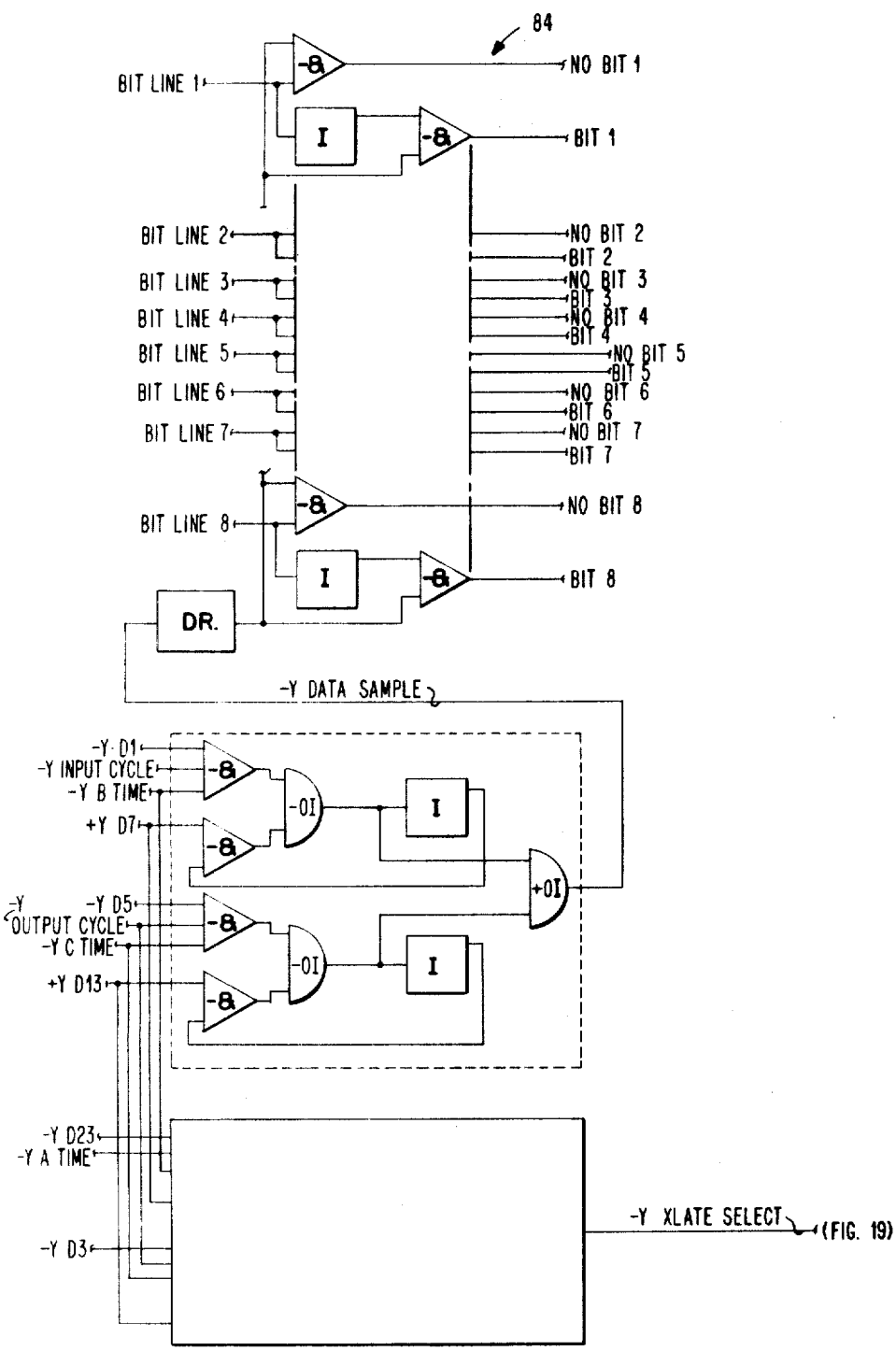
Figure 19:
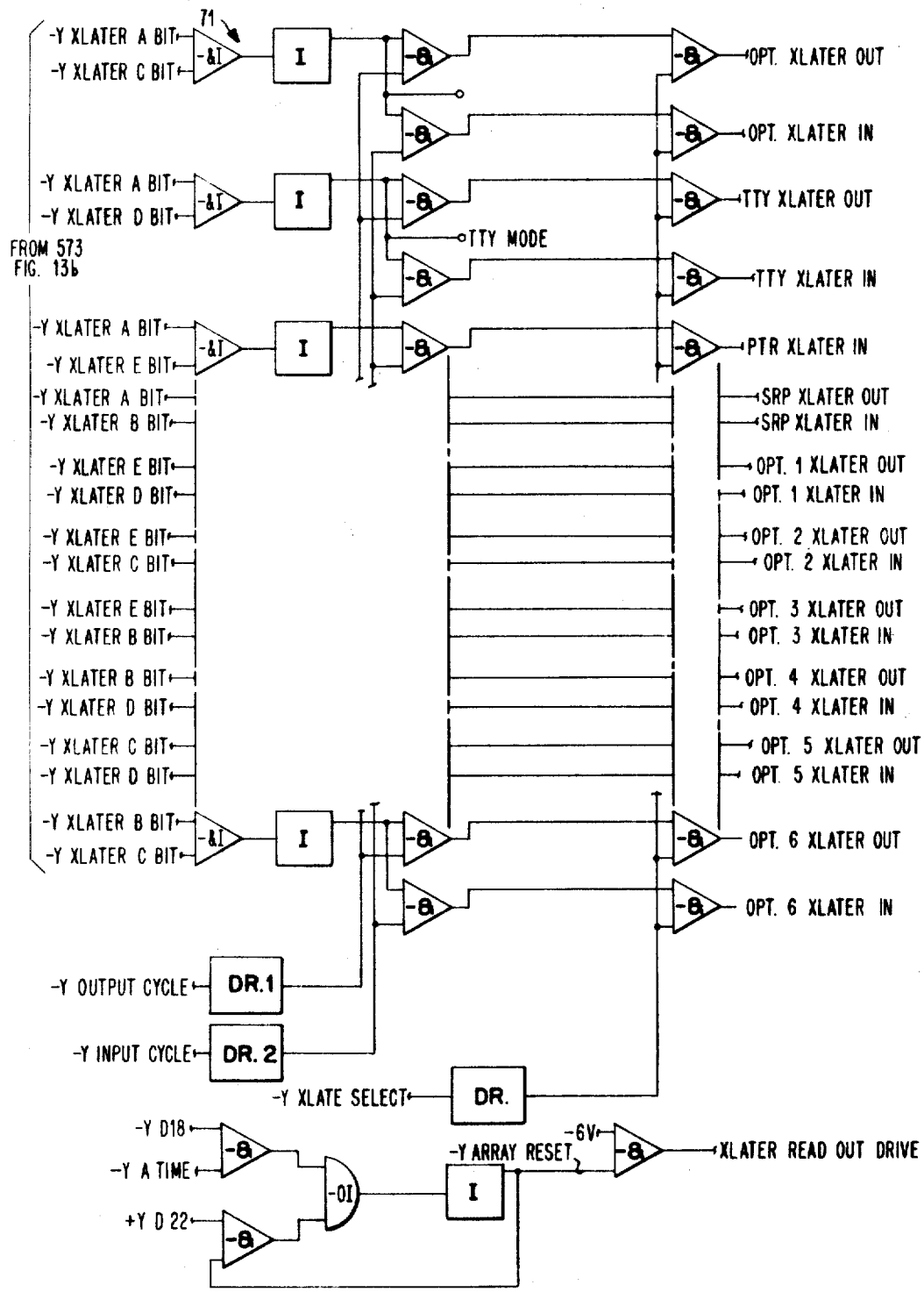
Figure 27A:
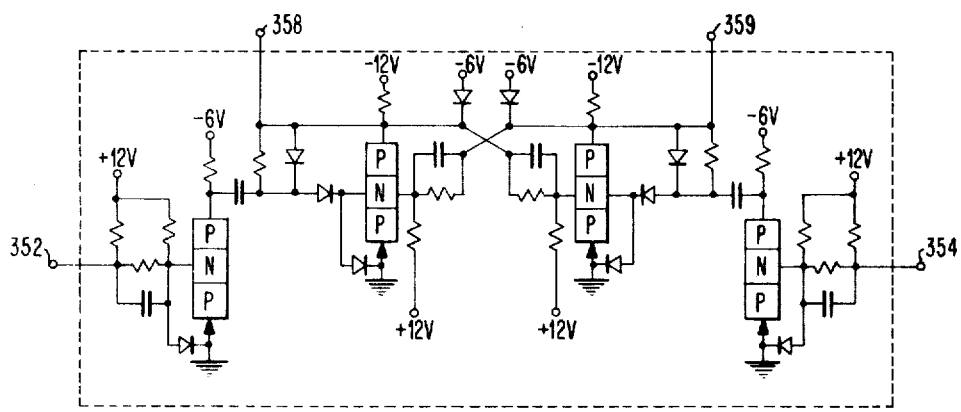
Figure 27B:
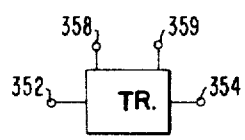
Figure 35A:
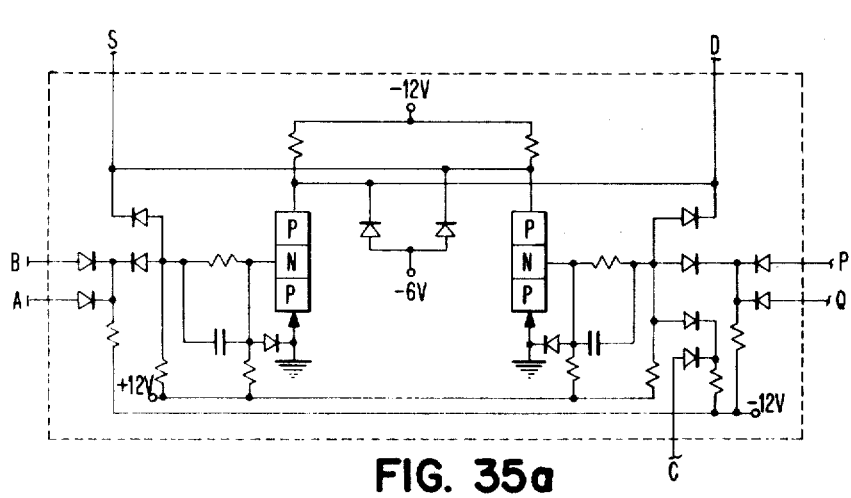
Figure 35B:
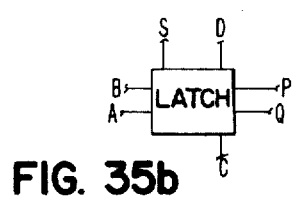
Figure 28:
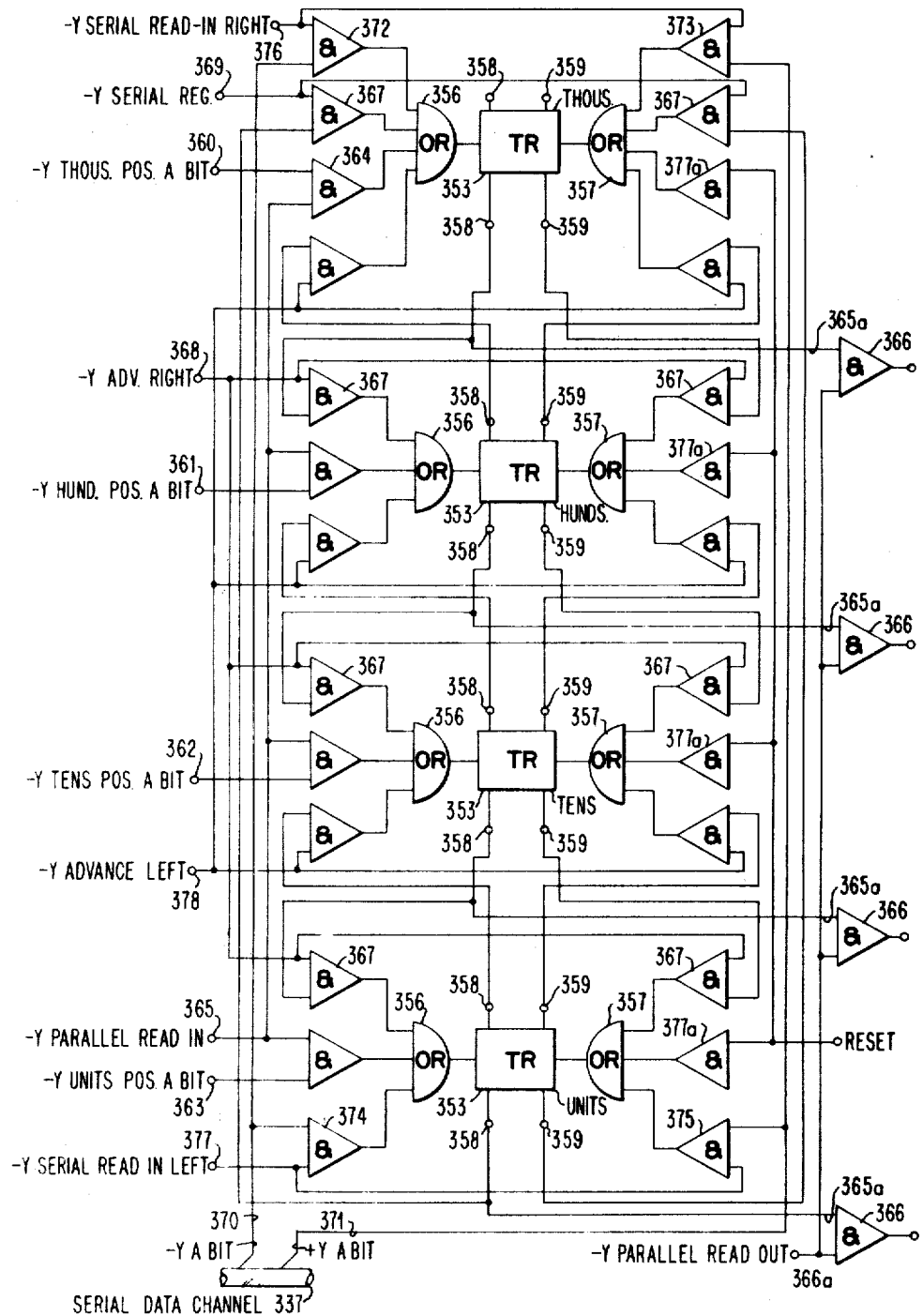
Figure 29A:
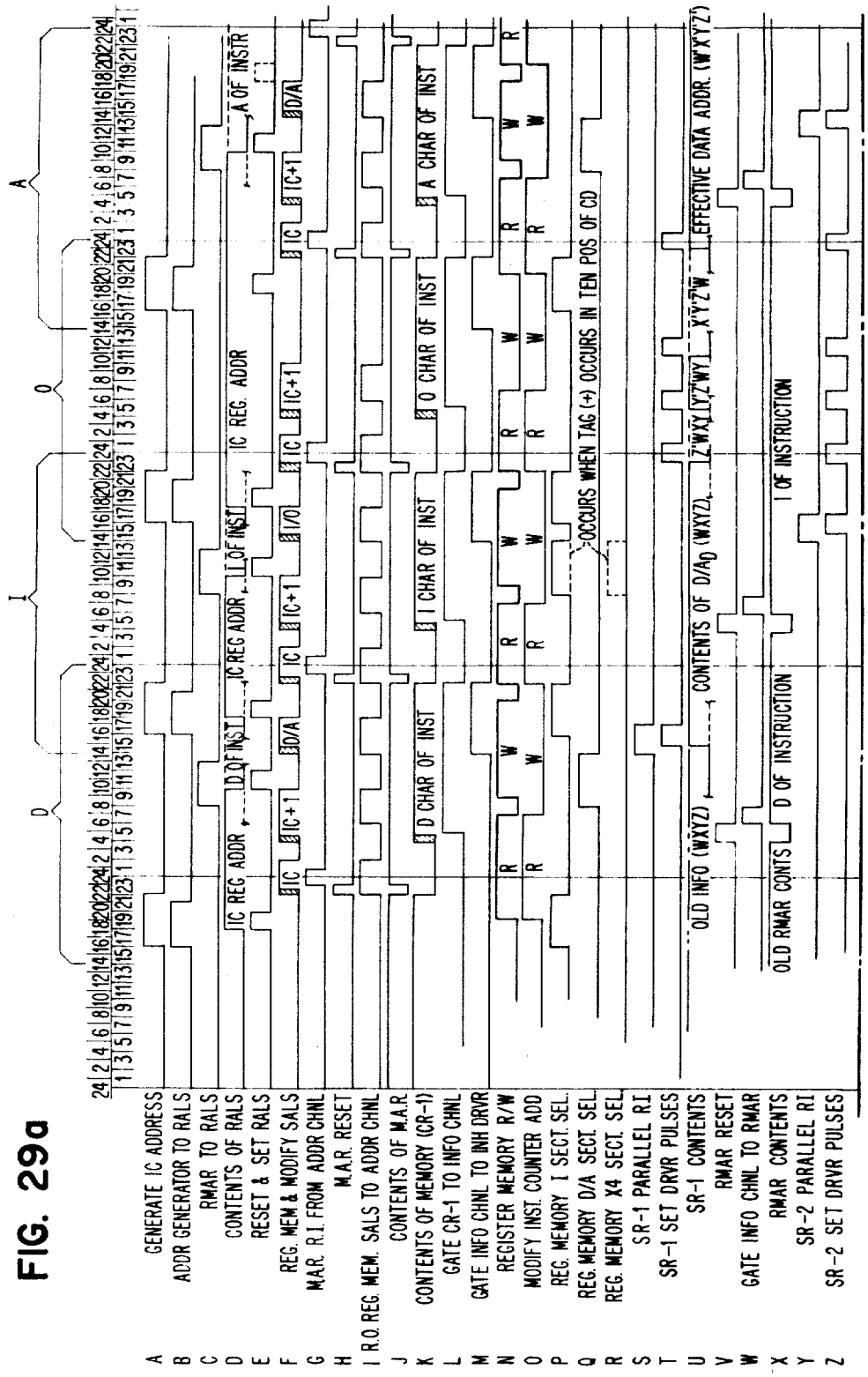
Figure 29B:
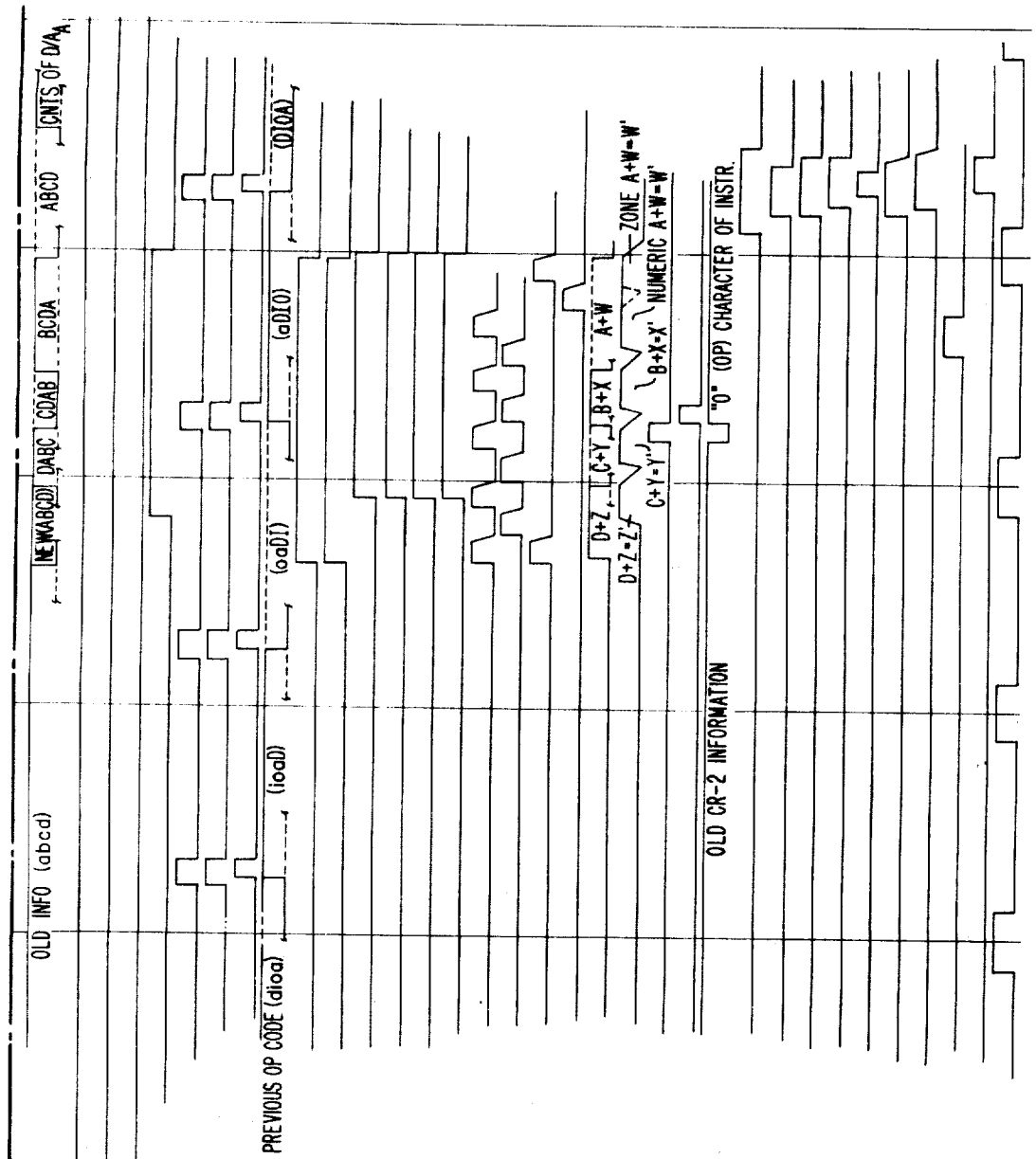
Figure 30:
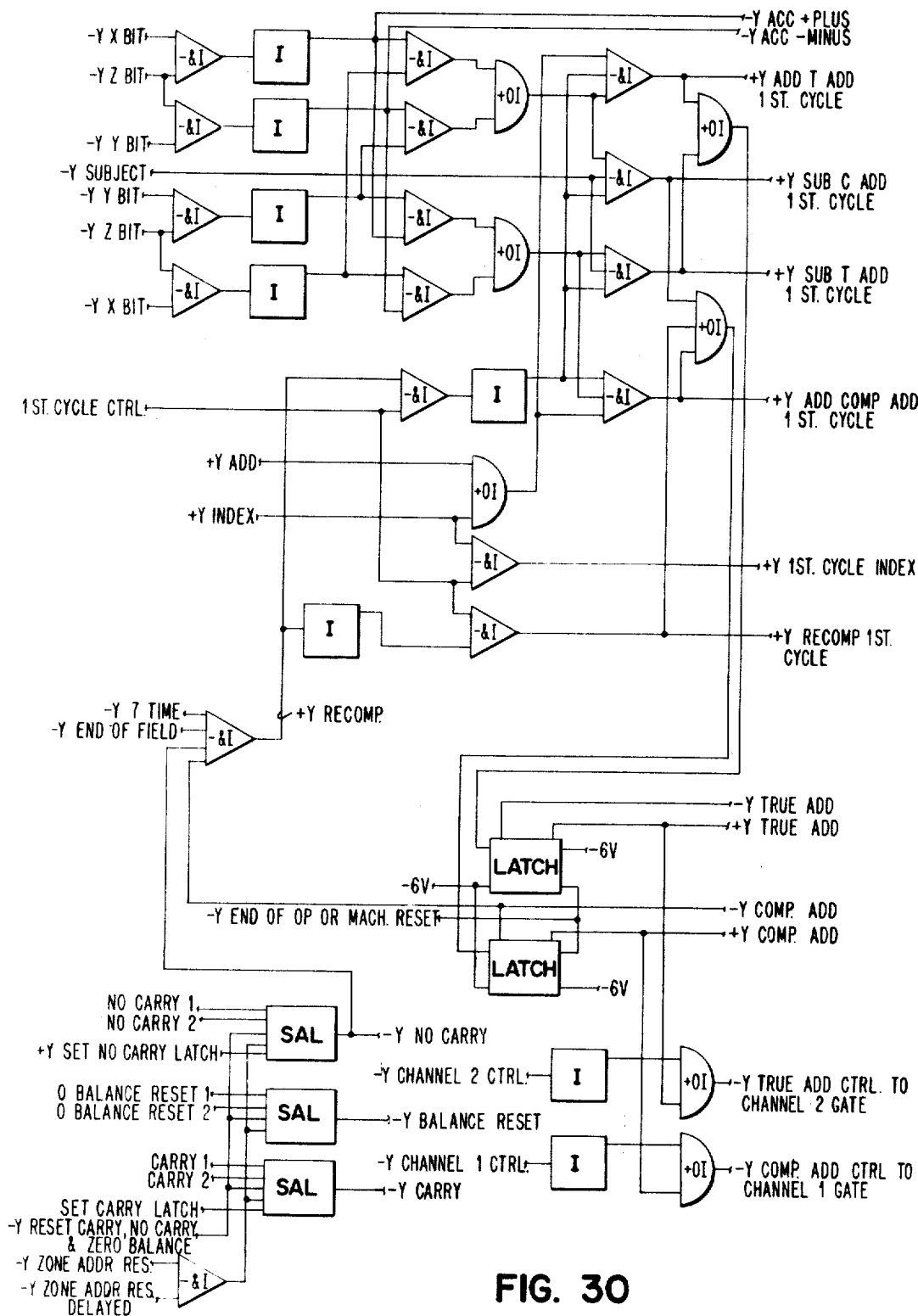
Figure 31B:
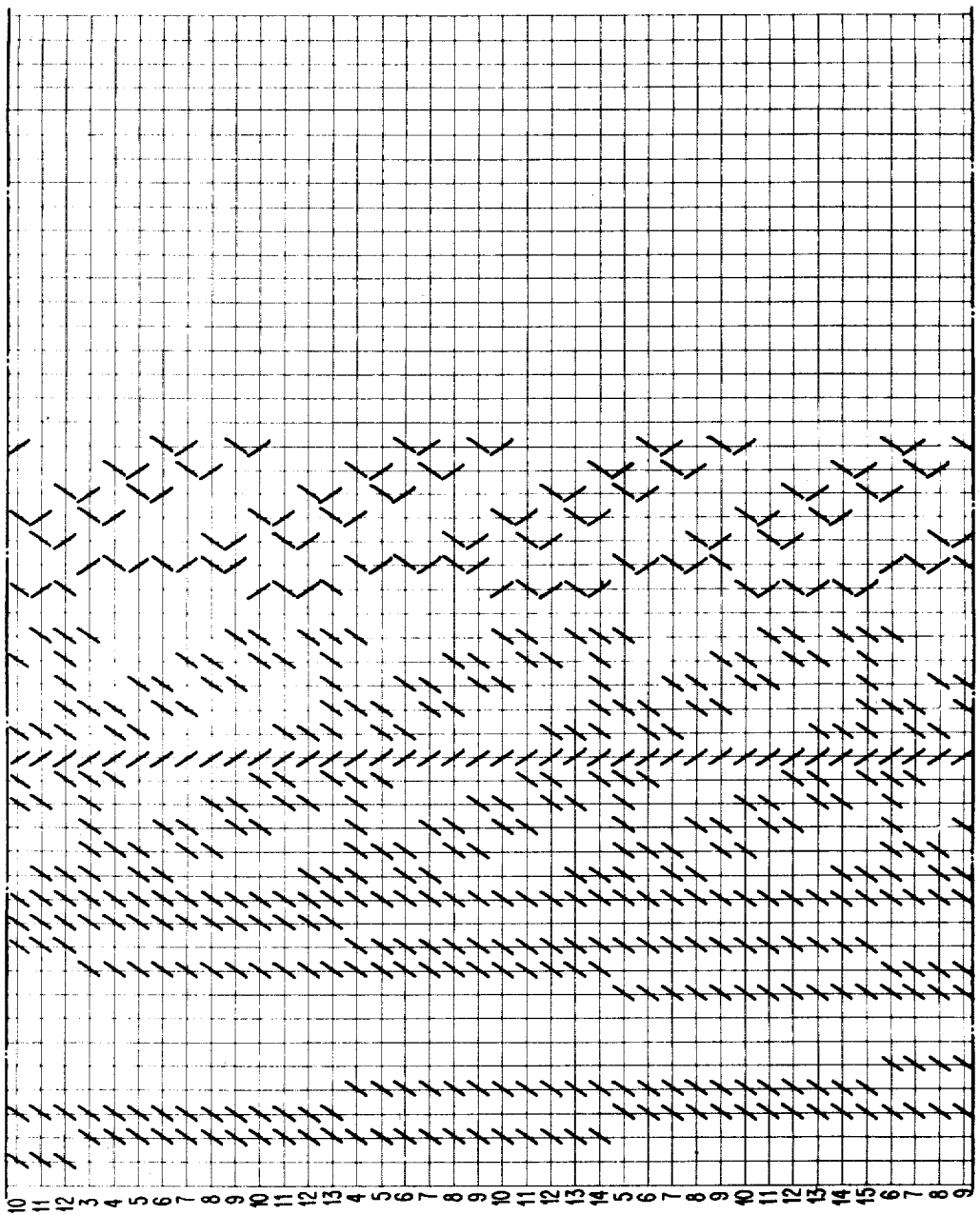
Figure 31C:
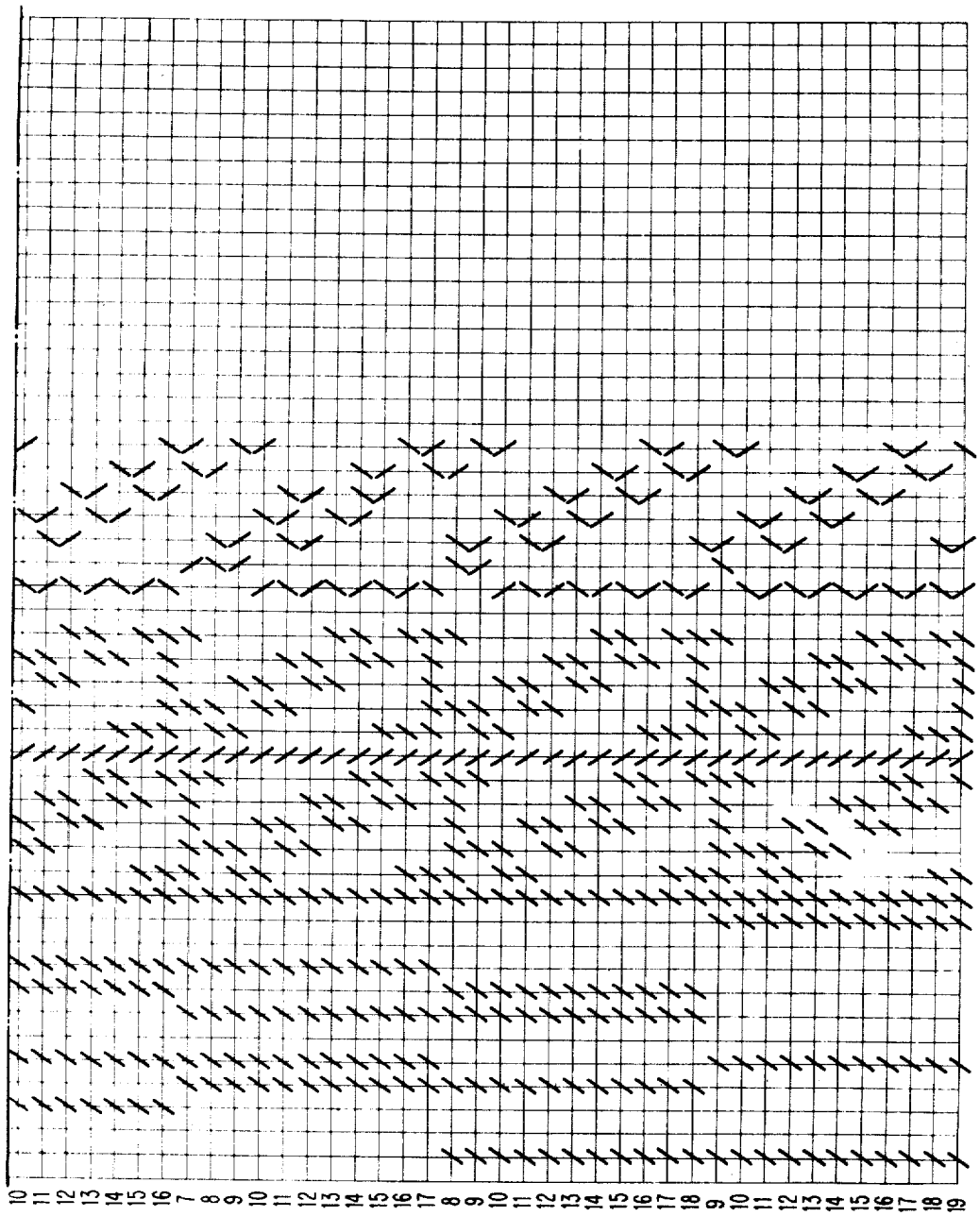
Figure 32A:
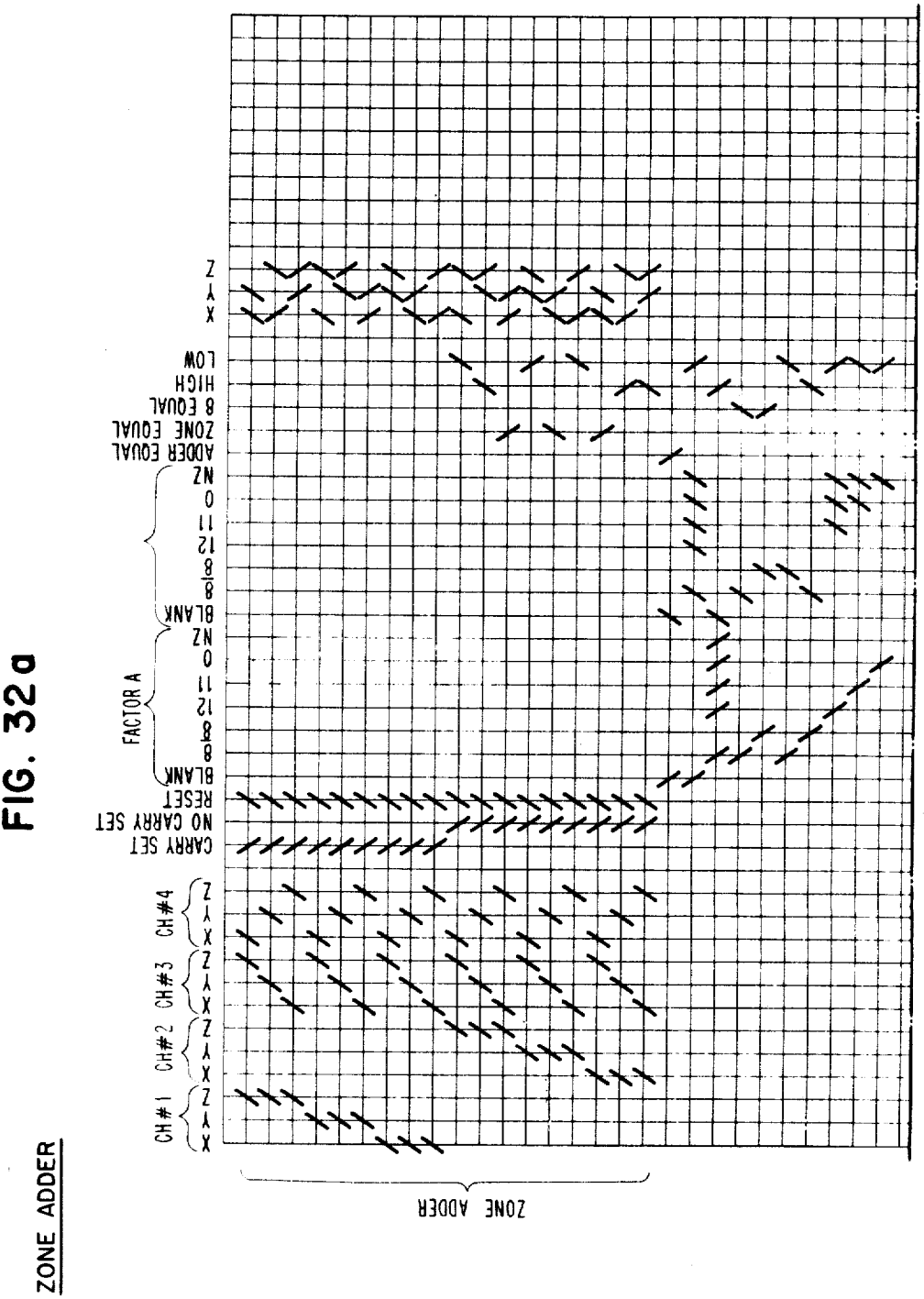
Figure 33A:
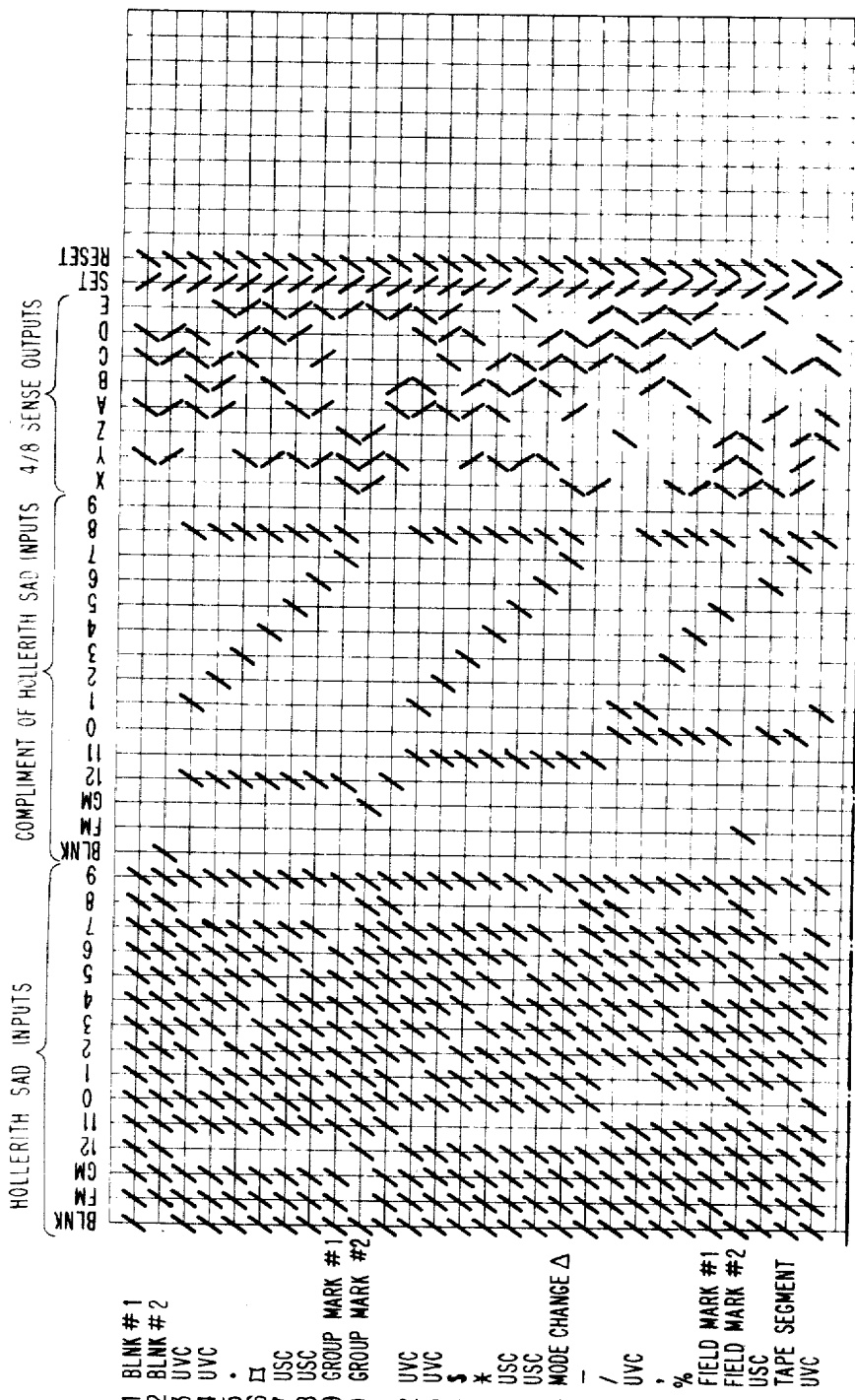
Figure 32B:
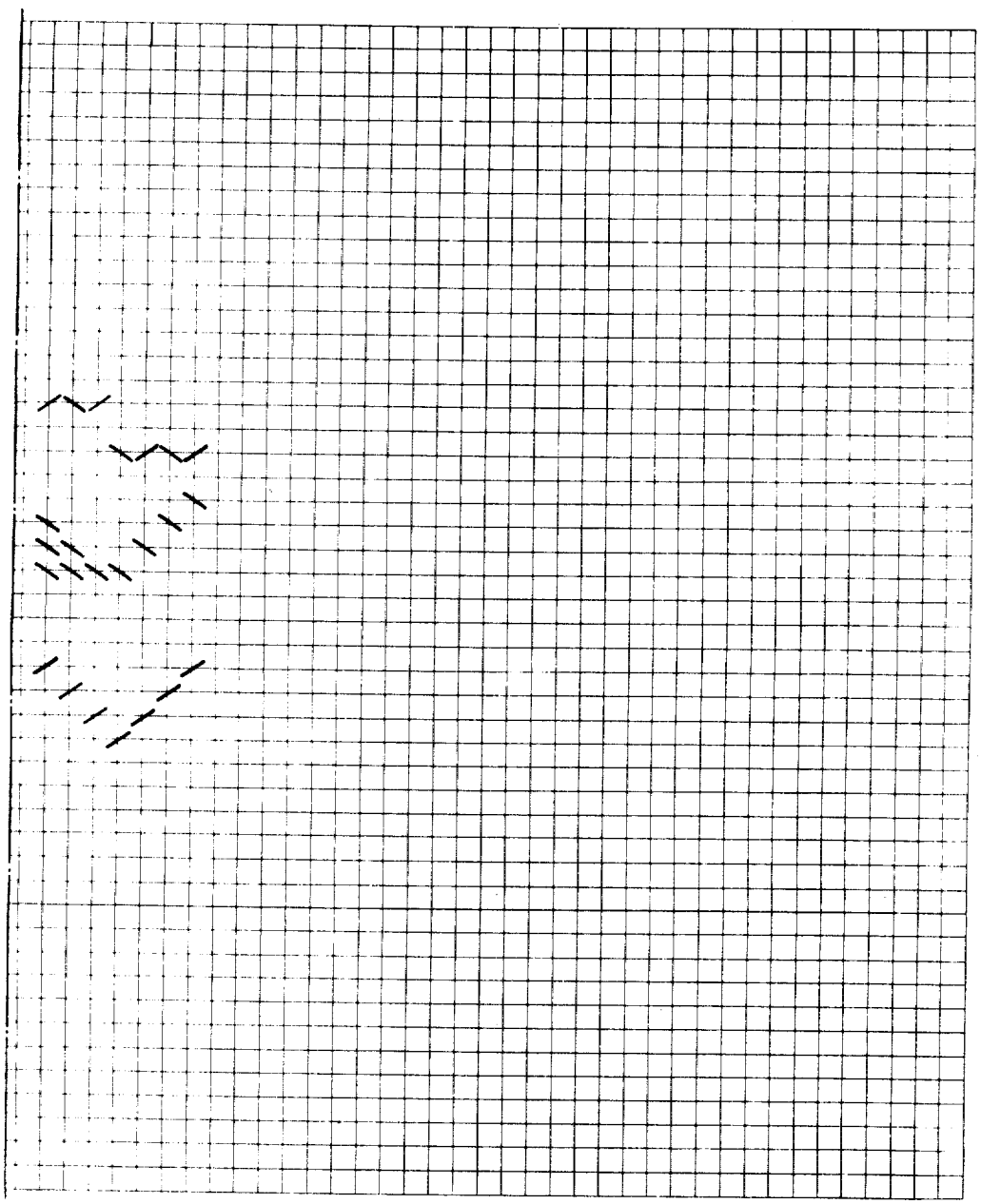
Figure 33B:
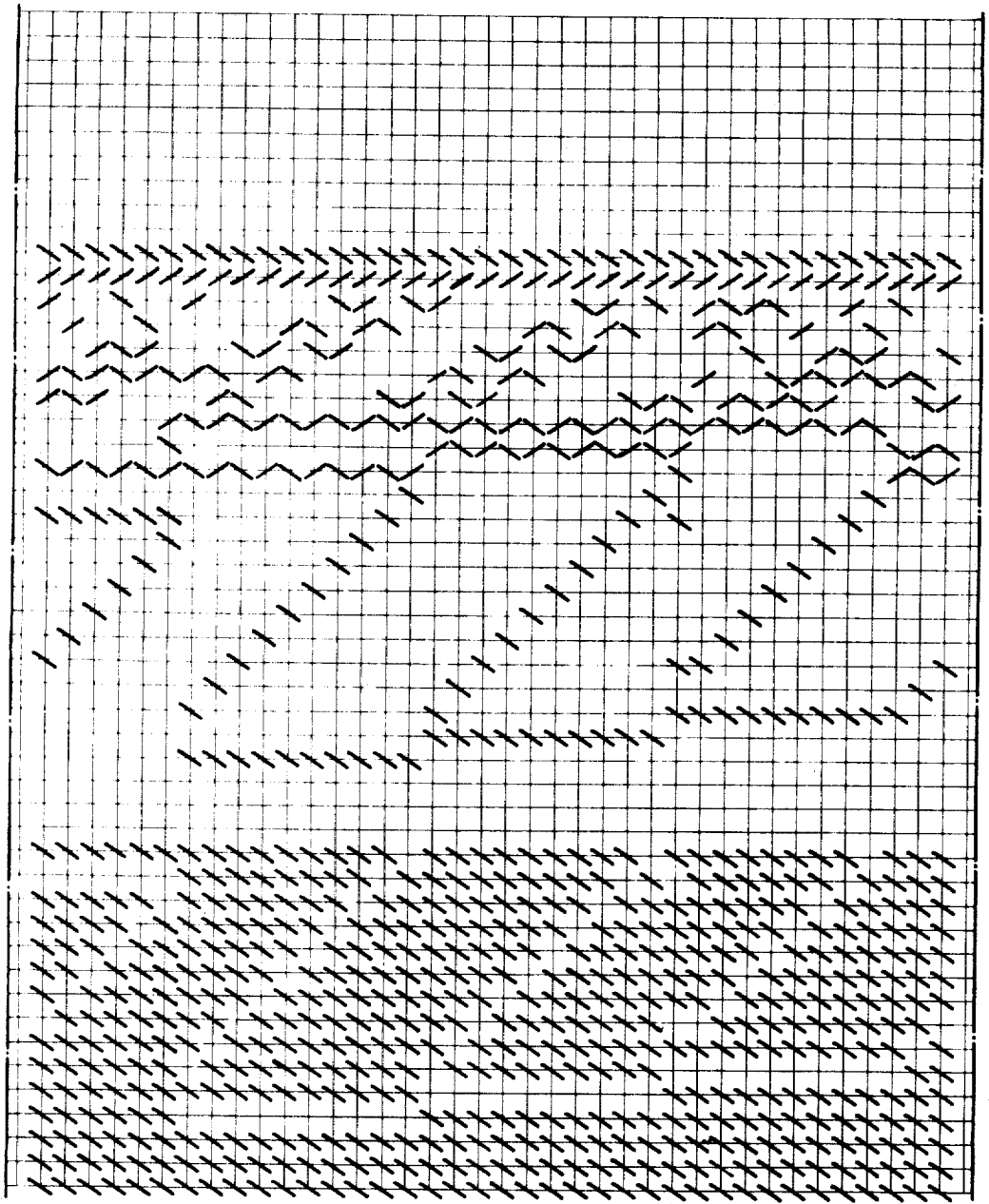
Figure 33C:
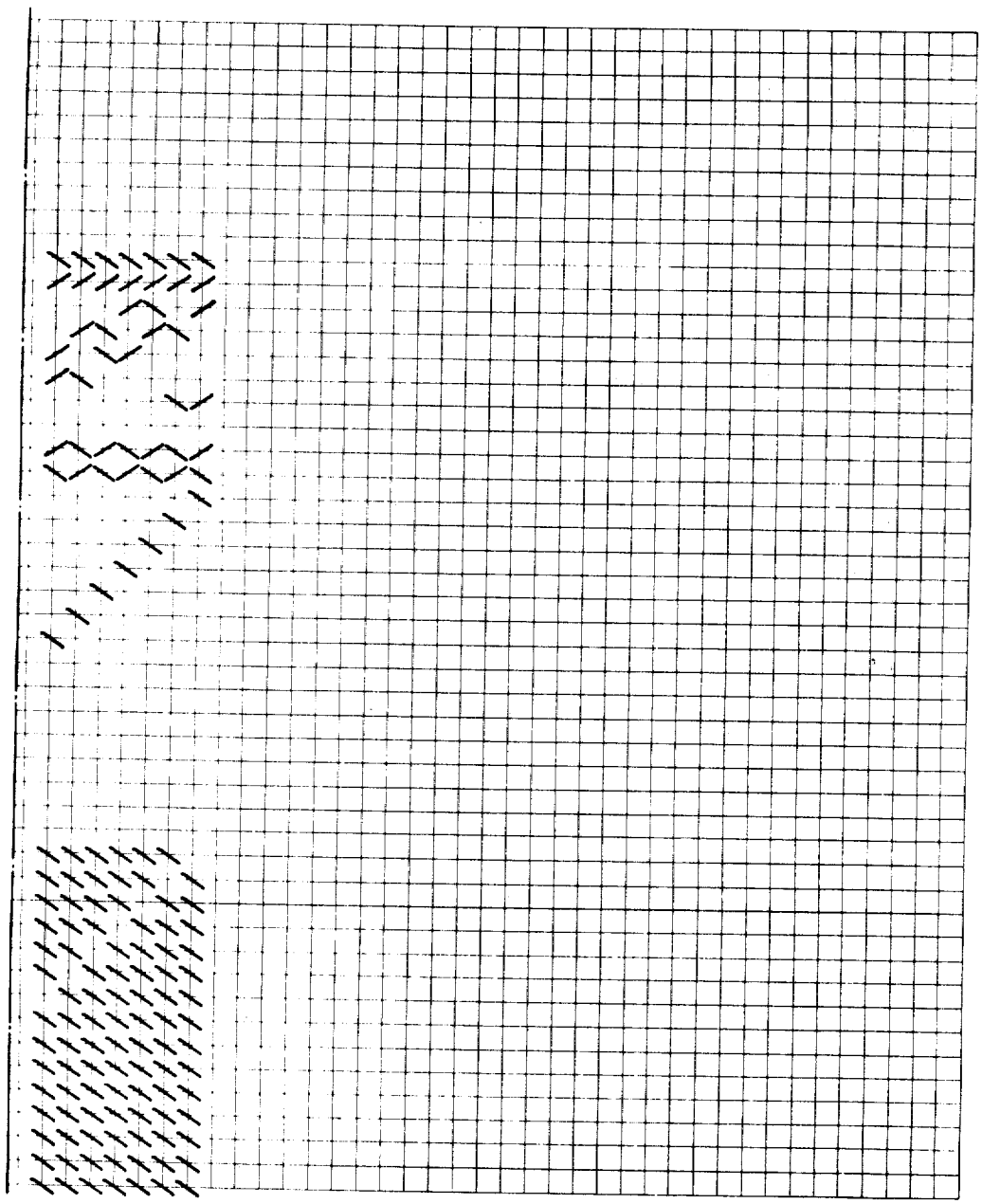
Figure 34A:
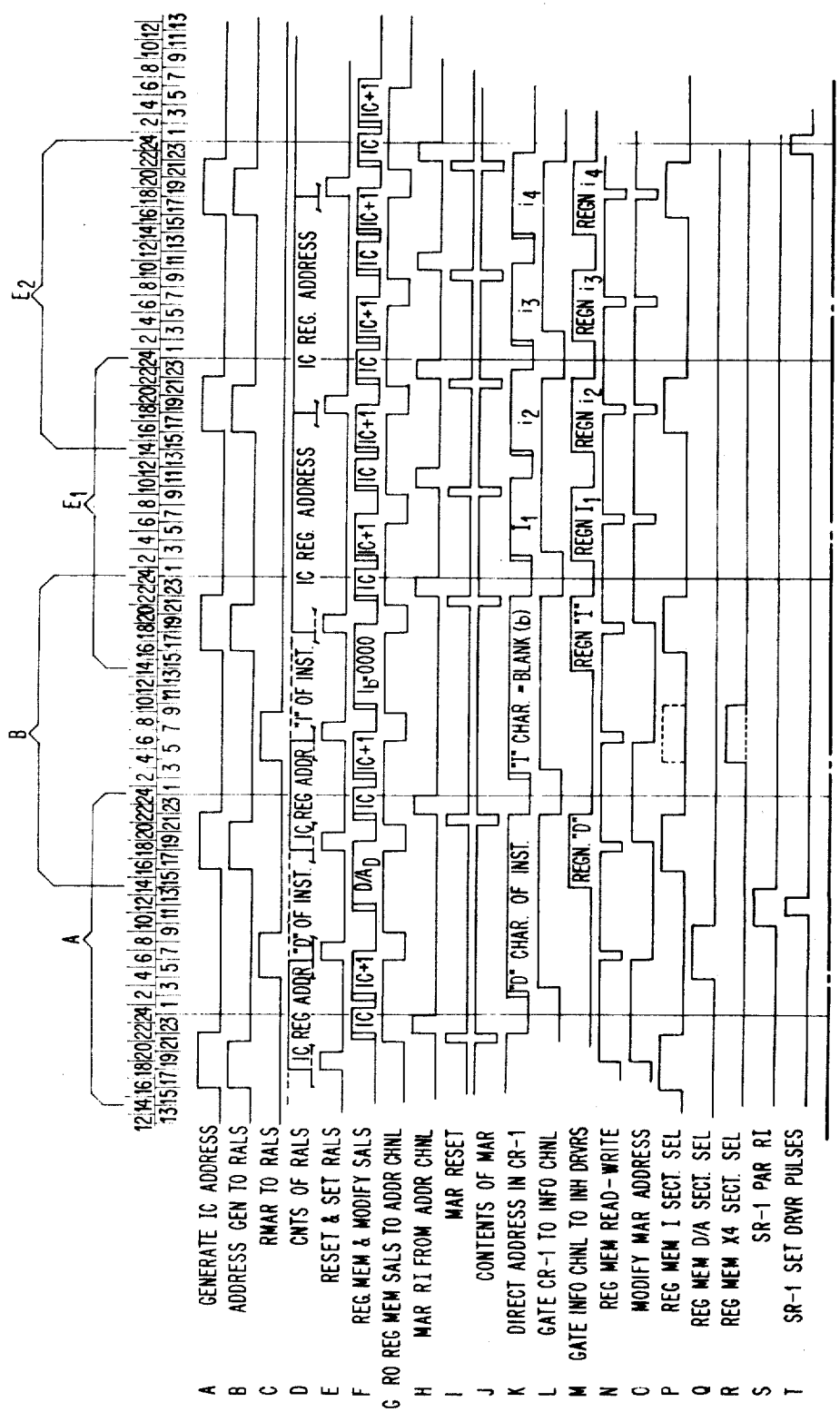
Figure 34B:
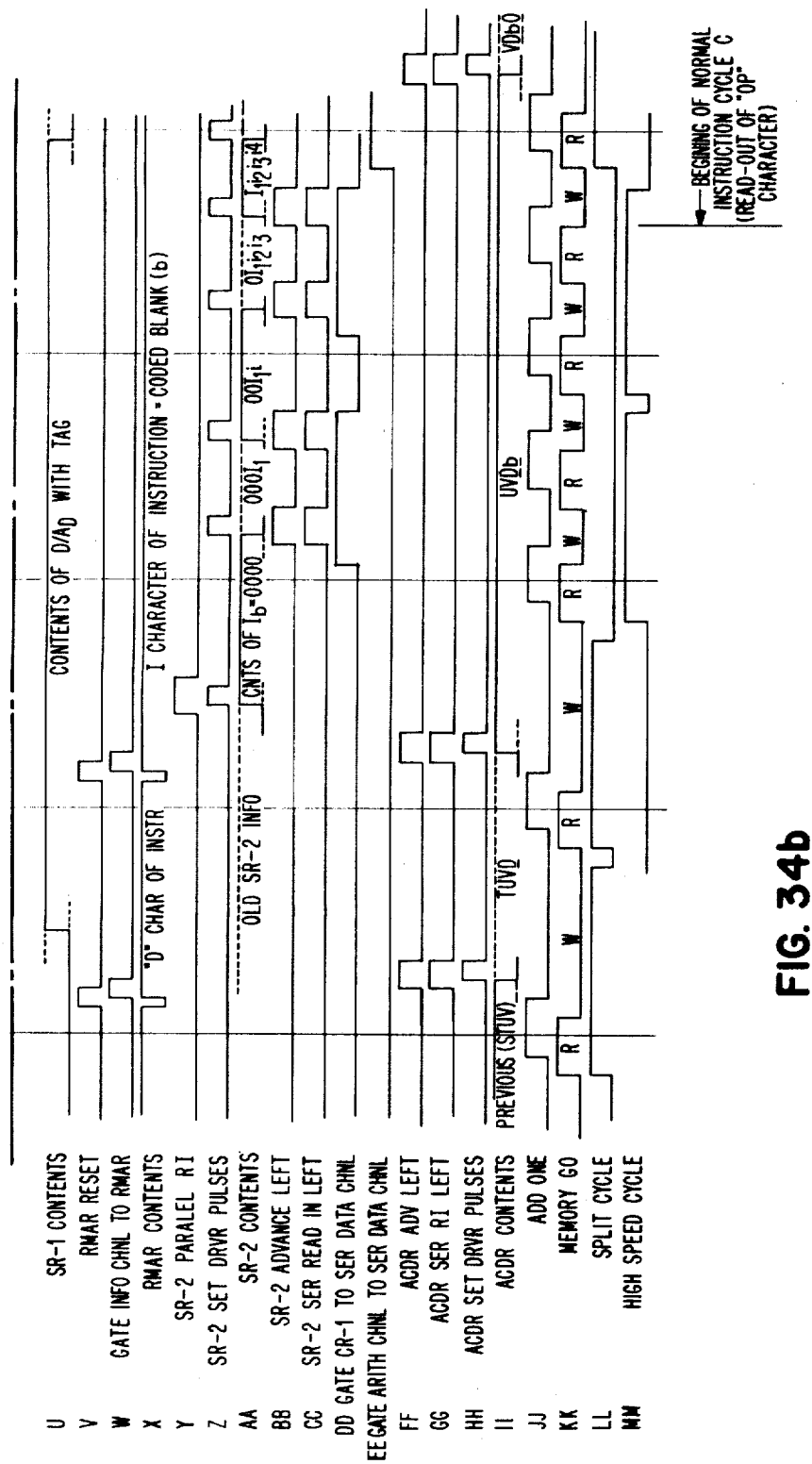
Figure 36A:
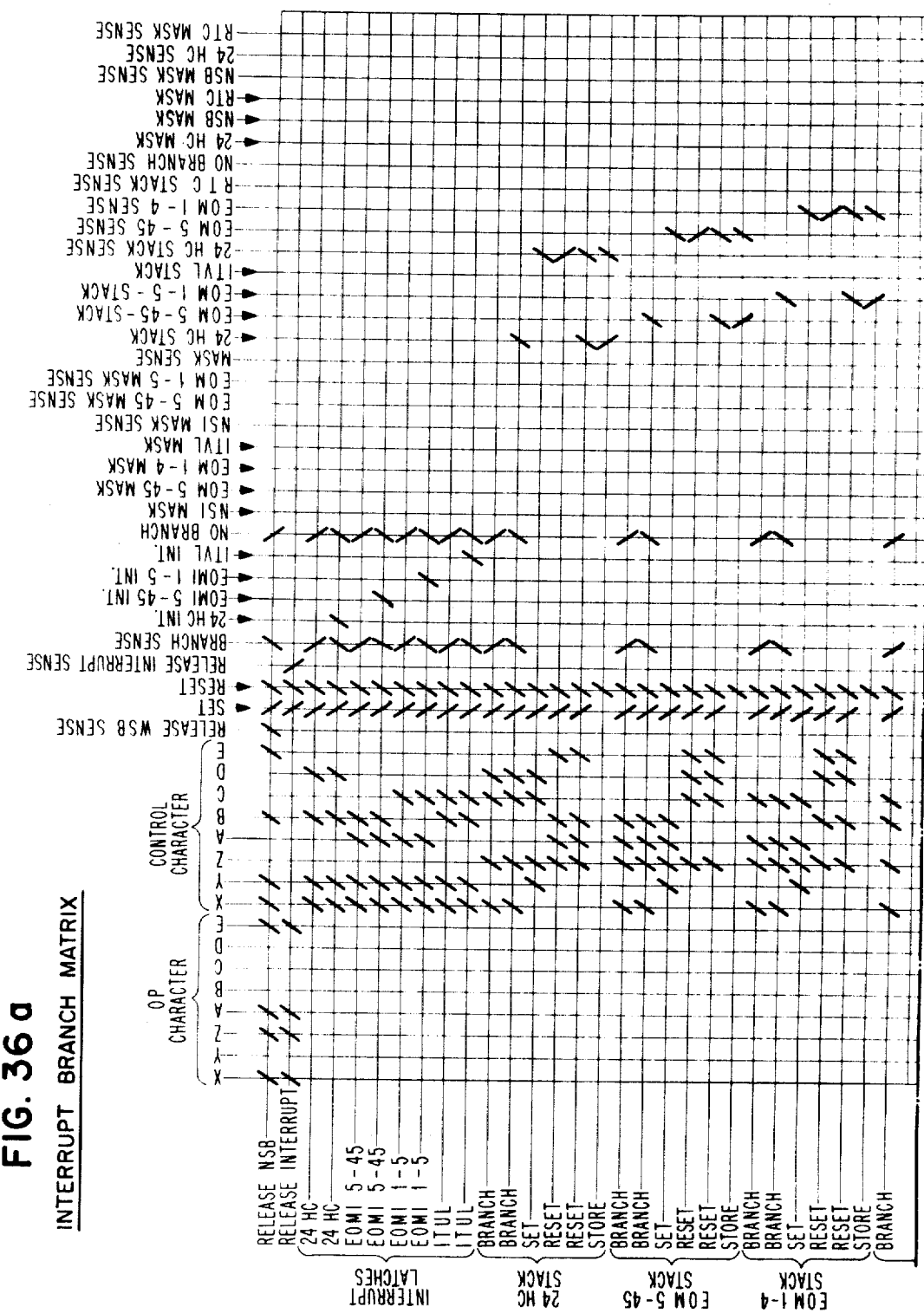
Figure 36B:
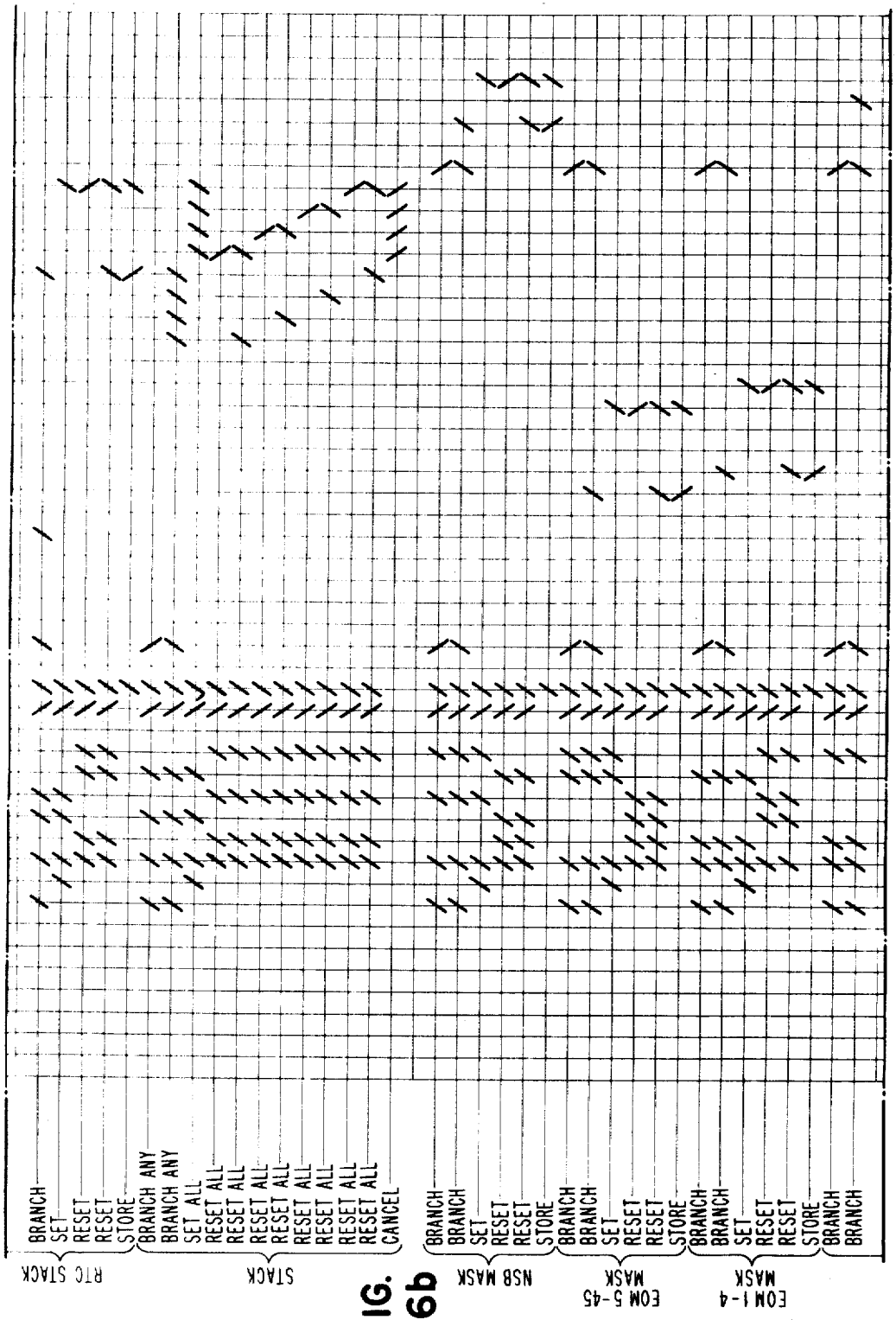
Figure 36C:
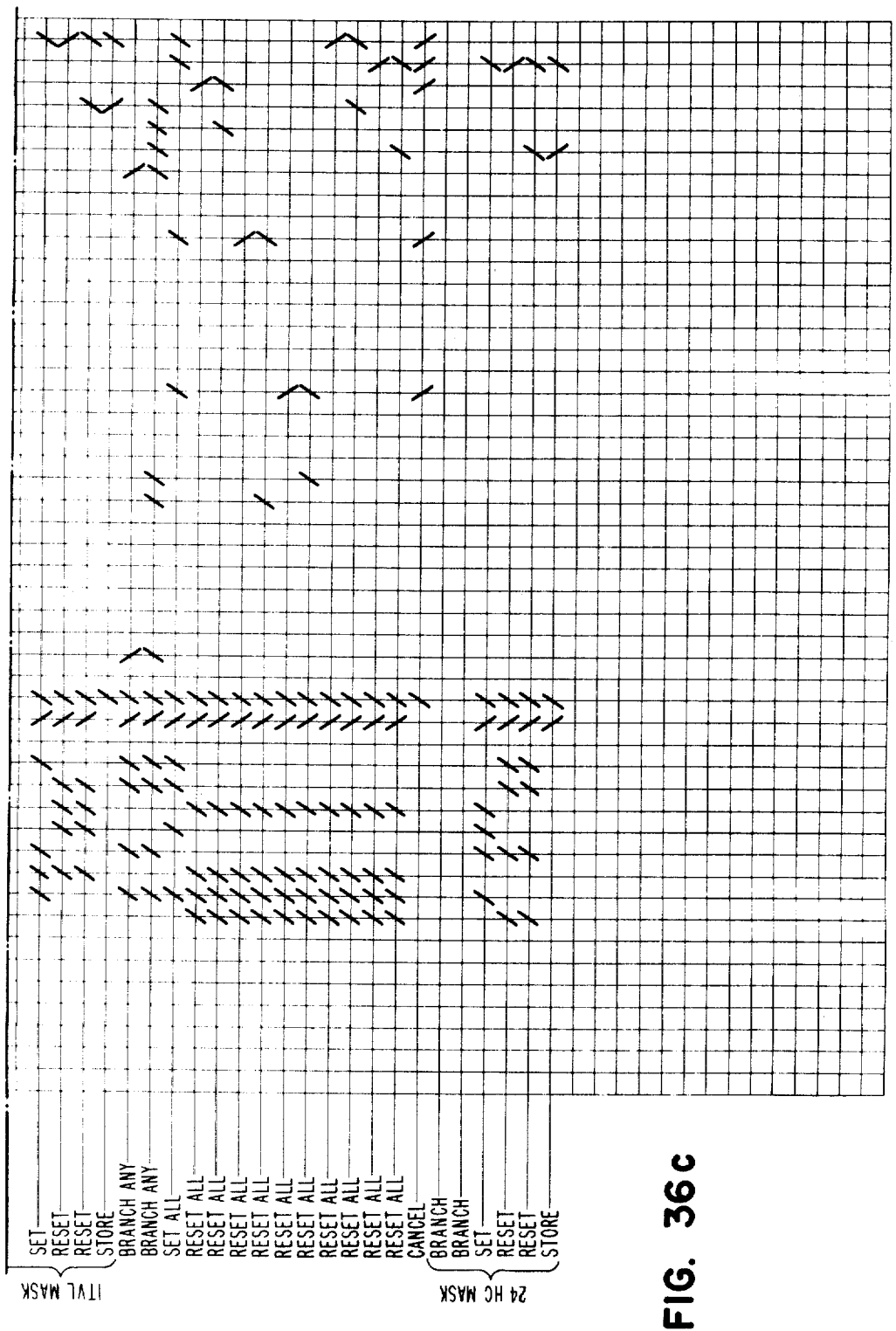
Figure 37A:
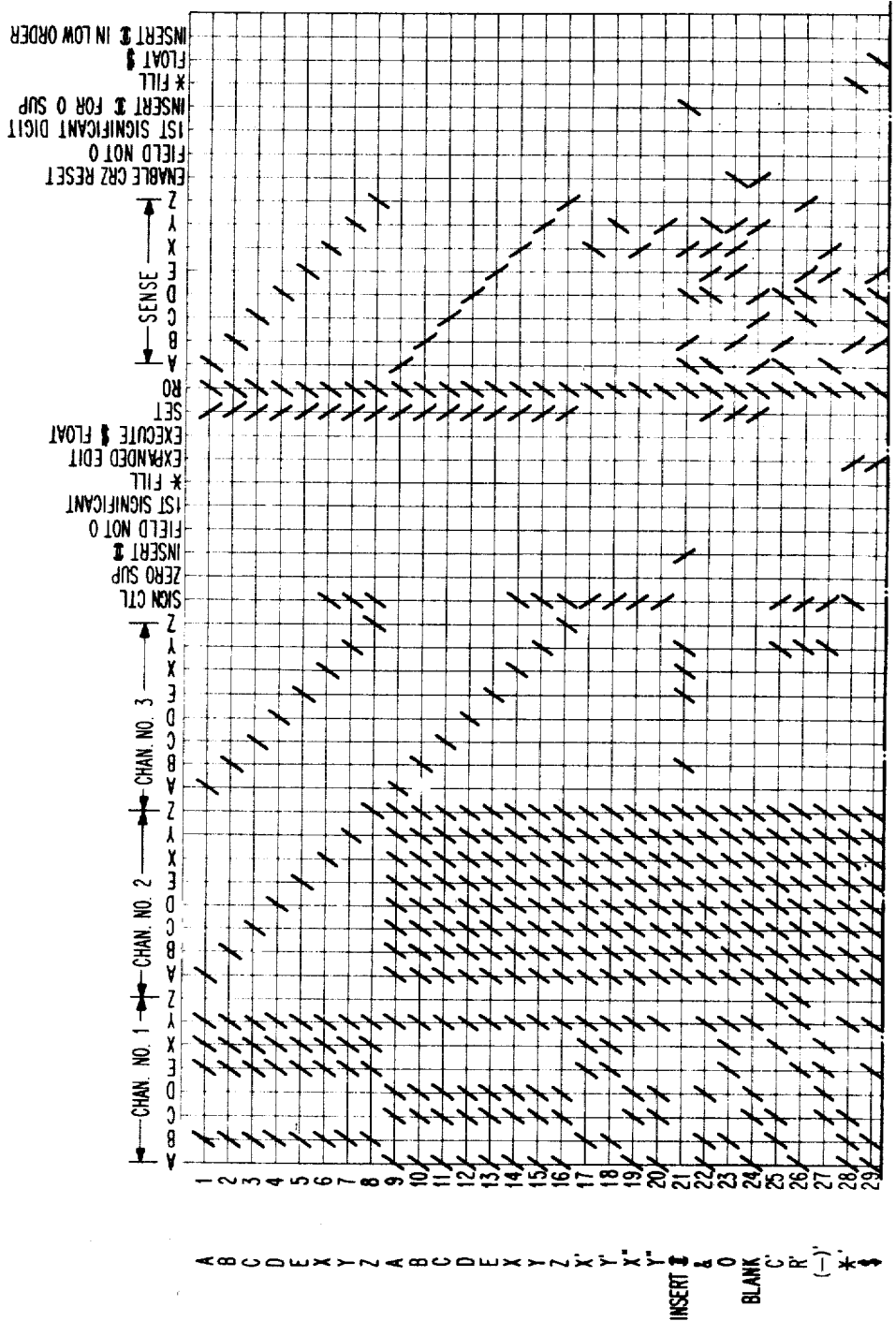
Figure 37B:
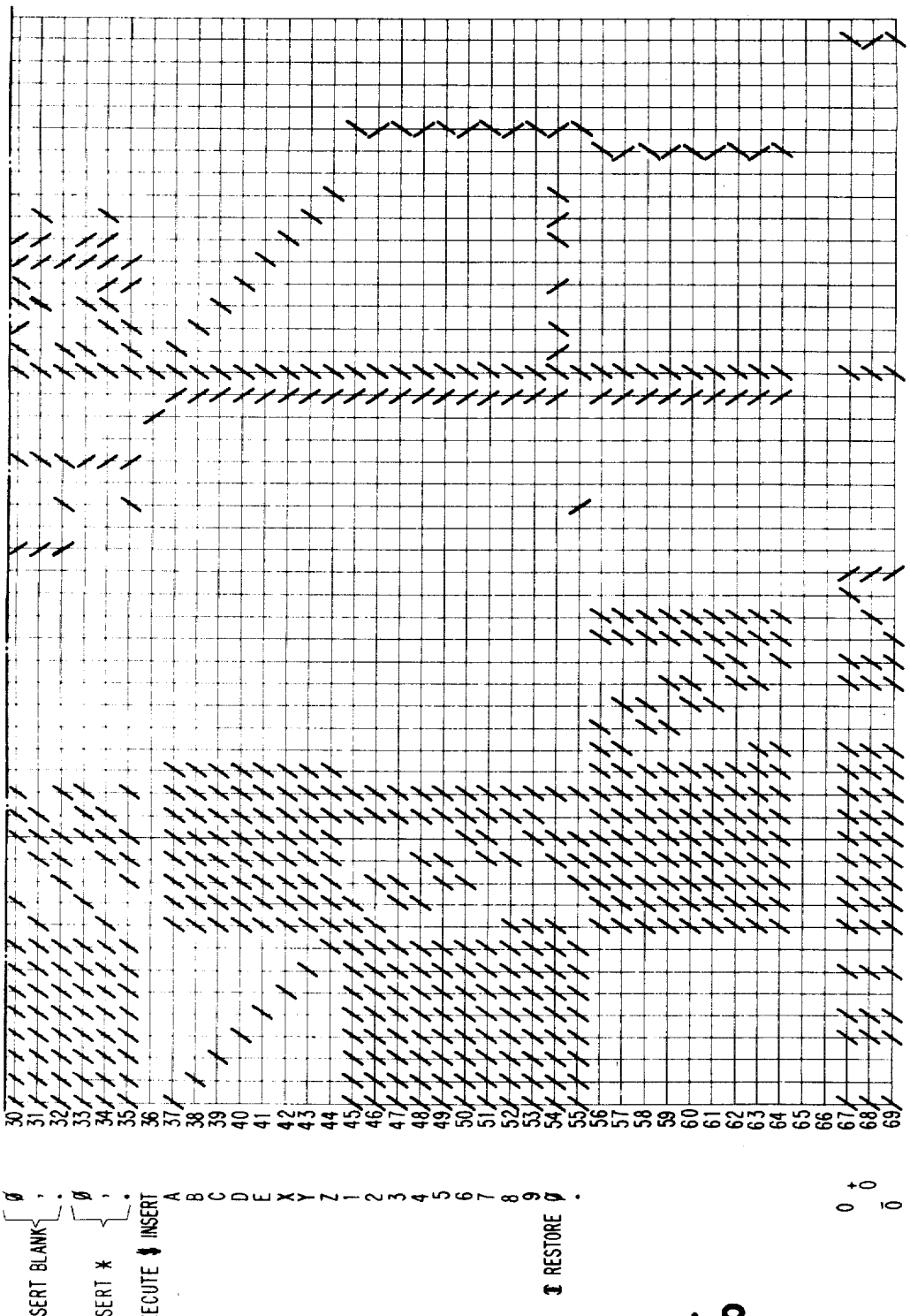
Figure 38A:
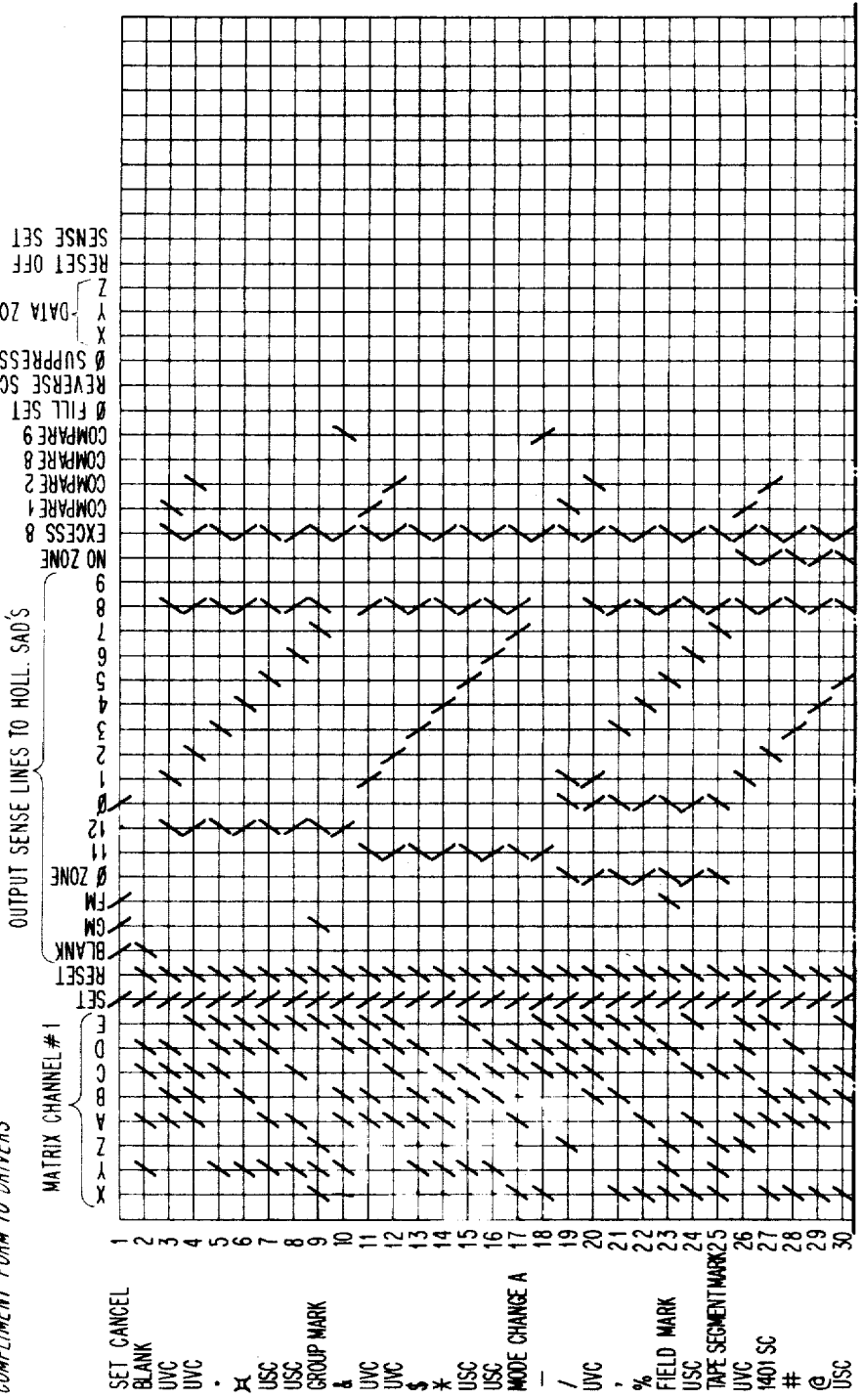
Figure 38B:
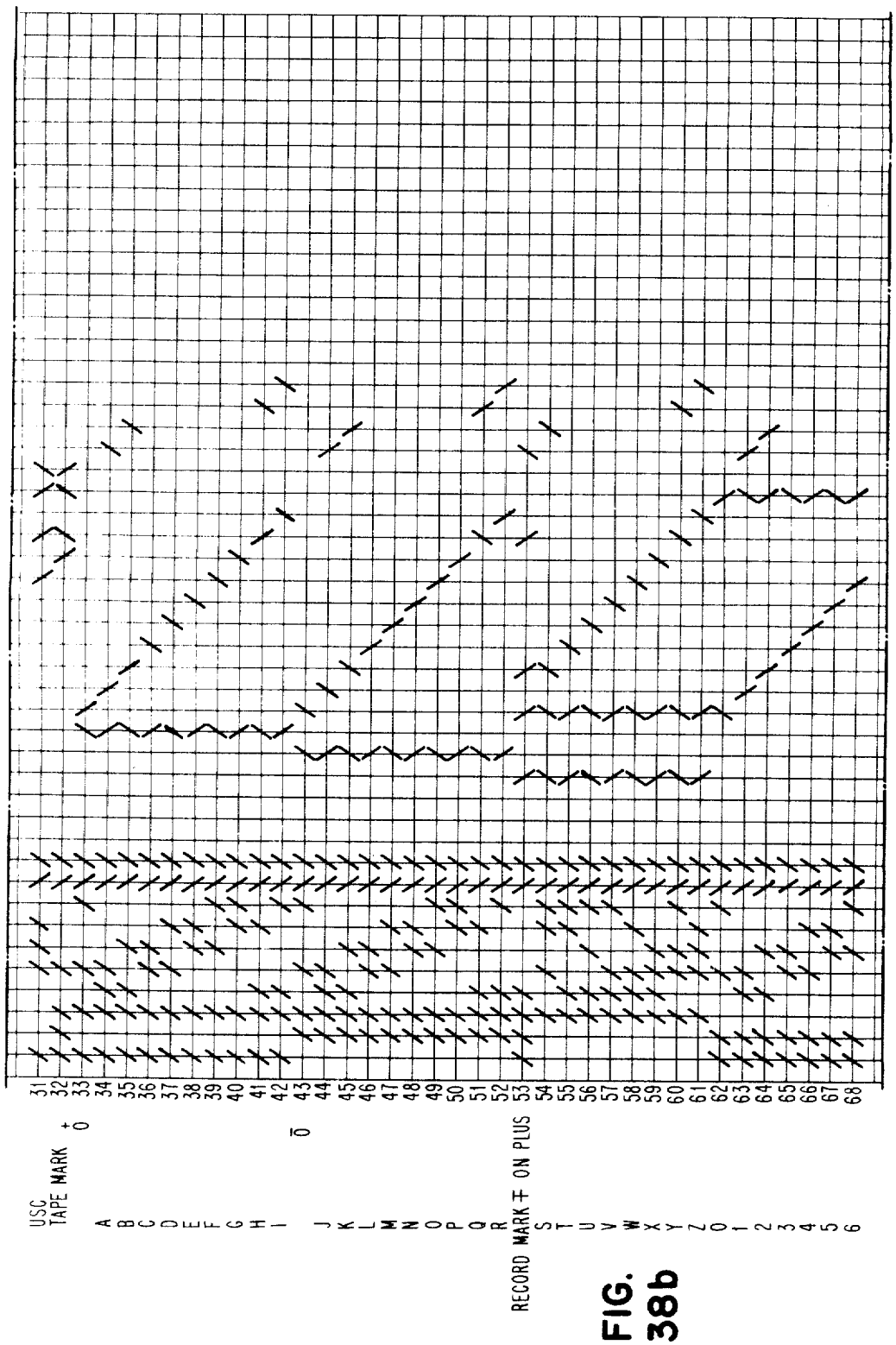
Figure 38C:
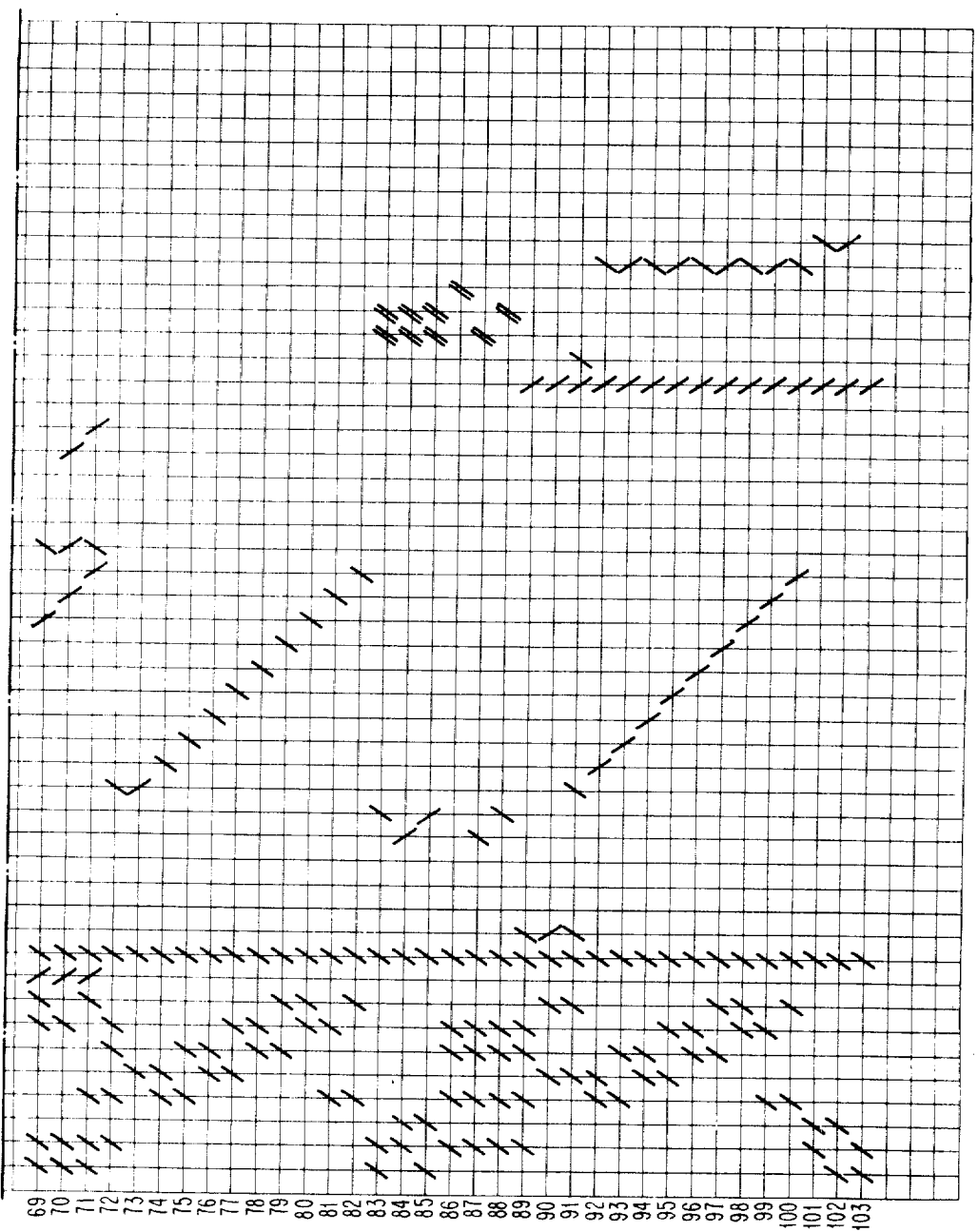
Figure 39A:
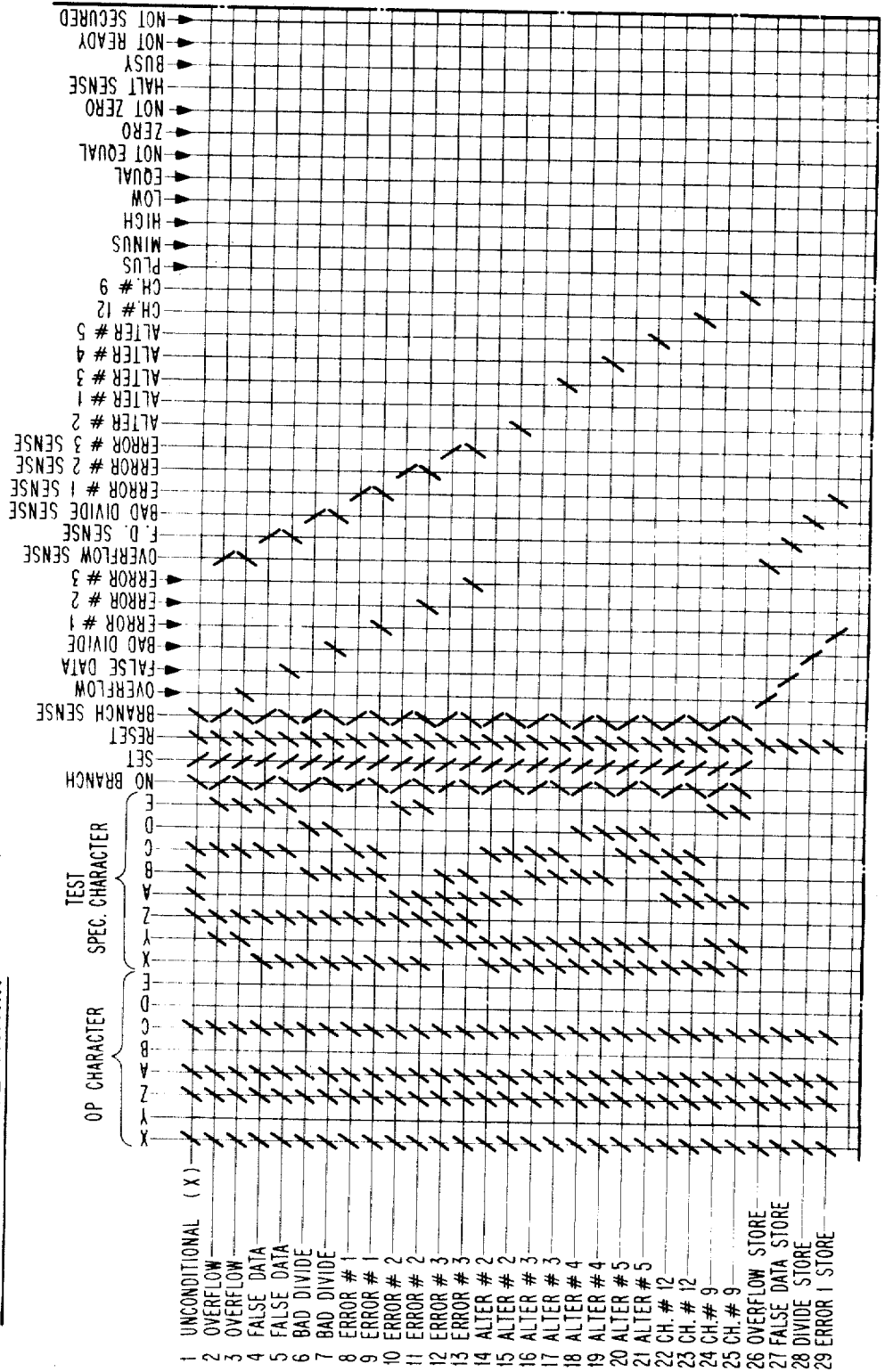
Figure 39C:
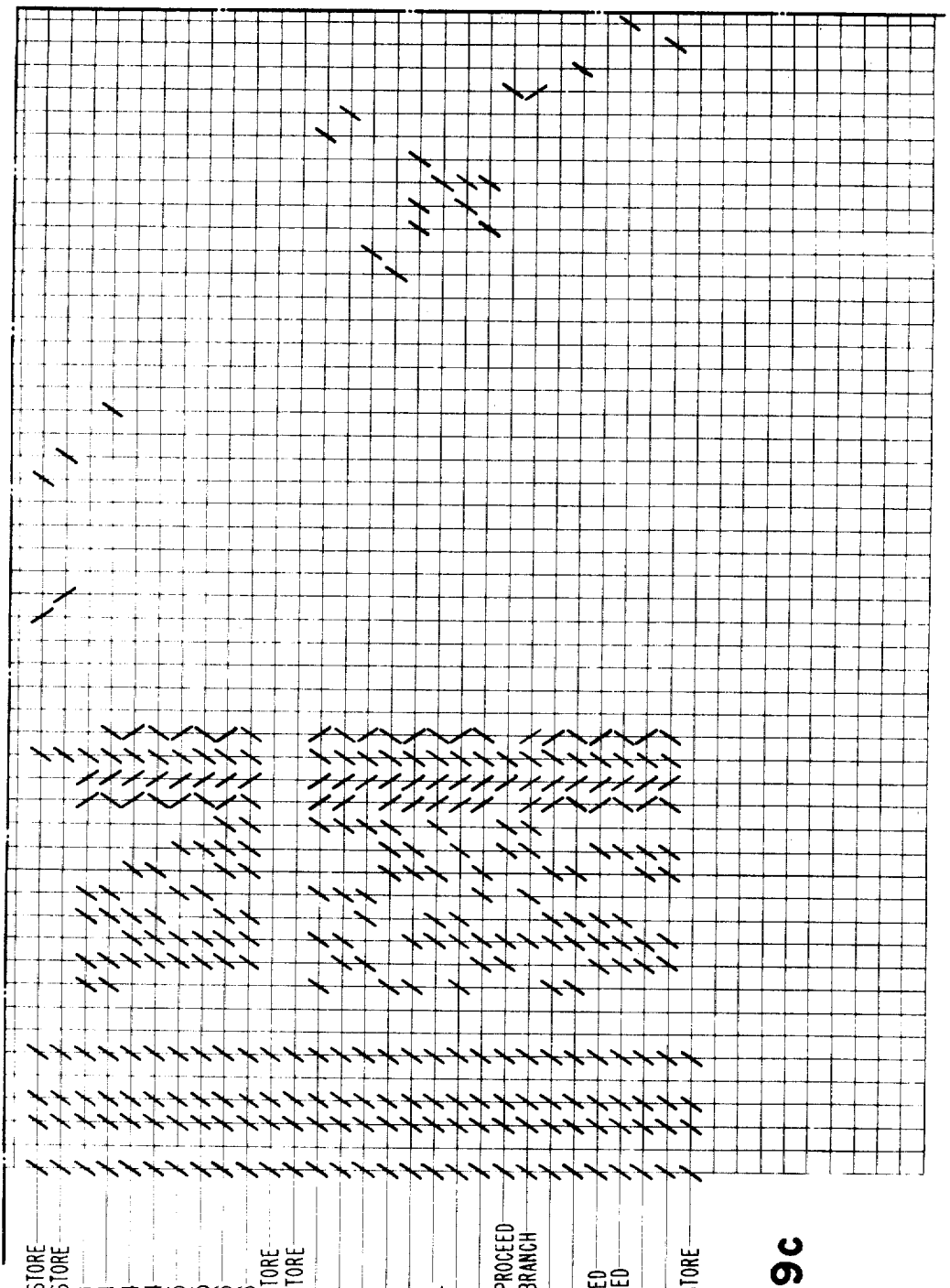
Figure 42:
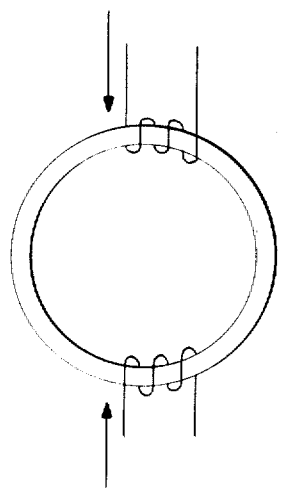
Figure 43:
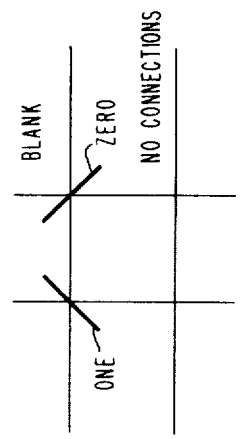
Figure 39D:
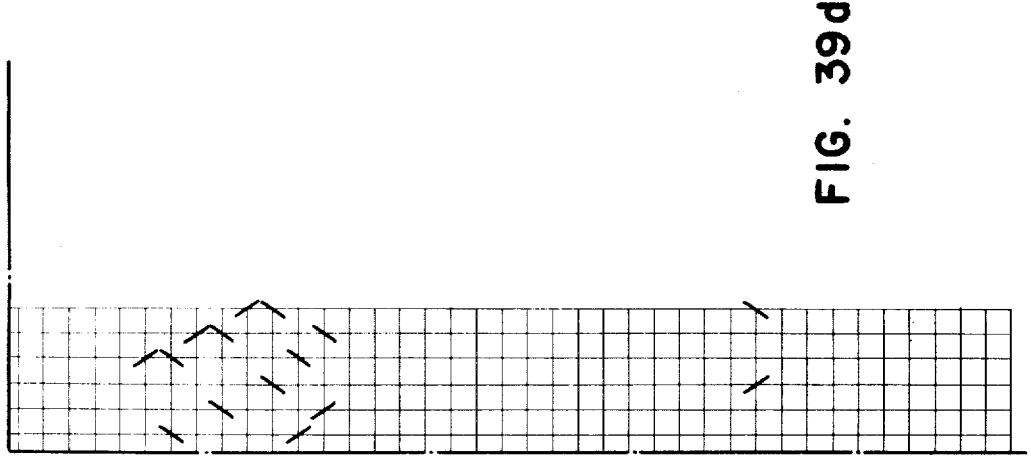
Figure 41:
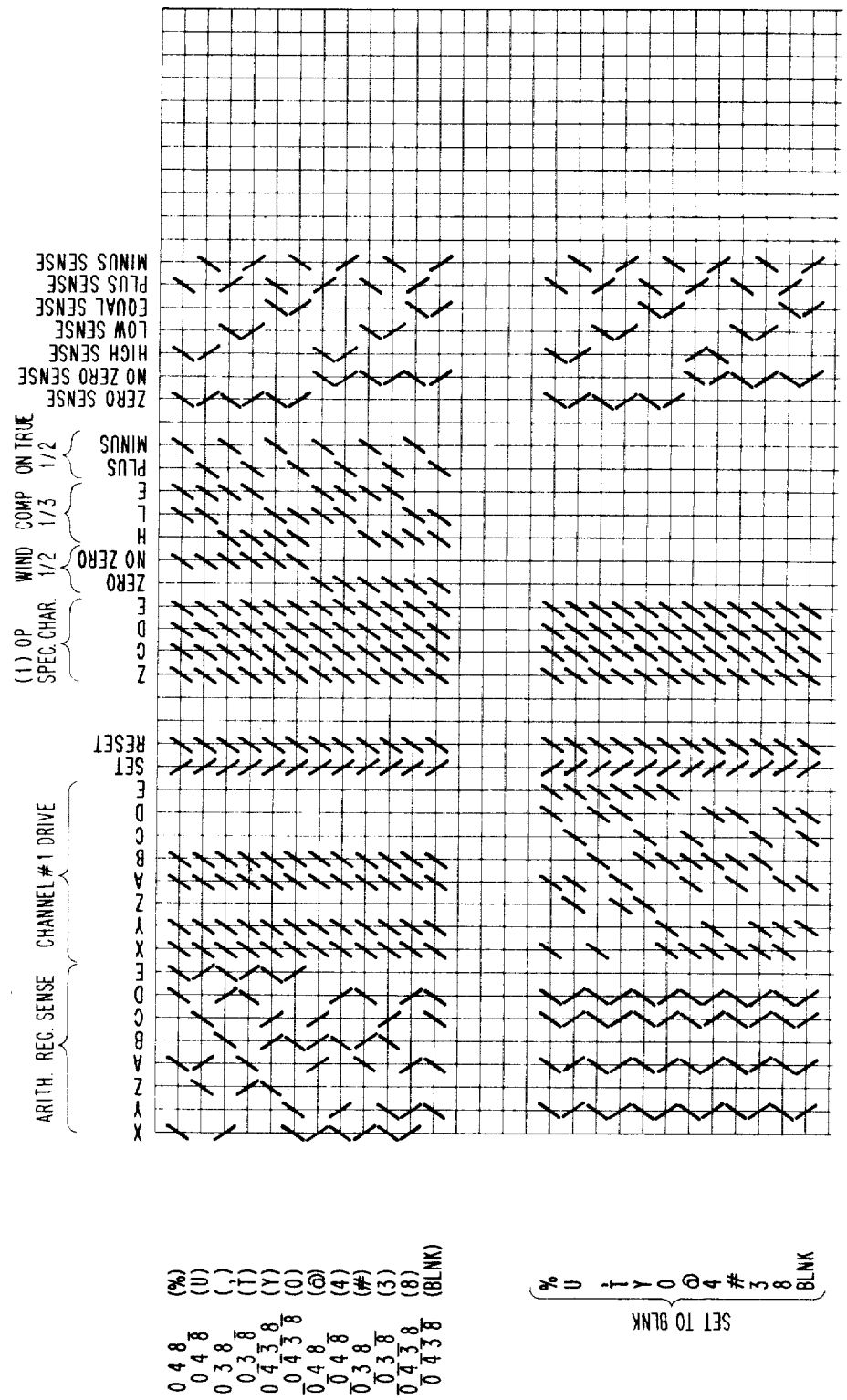

FIGS. 13a and 13b comprise a more detailed block diagram of a portion of the control logic circuit which is employed to update the contents of the control word memory;

FIG. 14 is a block diagram of a circuit for generating control signals;

FIGS. 15a and 15b comprise a more detailed block diagram of the remaining portion of the control logic circuit;

FIGS. 16a and 16b show the circuitry employed to gate the output signals from a selected translator to the data bus;

FIGS. 17a and 17b show the addressing circuitry employed with the control word memory;

FIG. 18 is a more detailed block diagram of the drive circuits employed with the translator arrays;

FIG. 19 is a more detailed block diagram of the decode and select circuit shown in FIG. 2a;

FIGS. 20, 21, 22, 23 and 24 are input/output timing diagrams;

FIG. 25 shows the arrangement of FIGS. 25a, 25b, 25c and 25d;

FIGS. 25a, 25b, 25c, and 25d show a more detailed block diagram of the processor employed in the instant invention;

FIG. 26 is a schematic view of one type of register employed in the processor;

FIG. 27a is a schematic diagram of a gated trigger circuit;

FIG. 27b is a shorthand representation of the trigger circuit shown in FIG. 27a;

FIG. 28 is a more detailed block diagram of one type of register employed in the instant invention;

FIGS. 29a and 29b comprise a timing diagram of a processor;

FIG. 30 is a block diagram of the true-complement, carry-no carry analysis circuit employed in the instant invention;

FIGS. 31a, 31b and 31c show the decimal adder circuit;

FIGS. 32a and 32b show the zone adder circuit;

FIGS. 33a, 33b and 33c show the Hollerith decode matrix;

FIGS. 34a and 34b show a processor timing diagram;

FIG. 35a is a schematic diagram of a latch circuit;

FIG. 35b is a shorthand representation of the latch circuit shown in FIG. 35a;

FIGS. 36a, 36b and 36c show the Interrupt Branch Matrix;

FIGS. 37a and 37b show the Edit Matrix;

FIGS. 38a, 38b and 38c show the Hollerith encode, zero fill and zero suppress matrix;

FIG. 39 shows the arrangement of FIGS. 39a, 39b, 39c and 39d;

FIGS. 39a, 39b, 39c and 39d show the B Branch Control Matrix;

FIG. 40 shows the arrangement of FIGS. 40a, 40b, 40c and 40d;

FIGS. 40a, 40b, 40c and 40d show the Hollerith test, test and set, and test and reset matrix;

FIG. 41 shows the indicators control and store matrix;

FIG. 42 is a schematic view of a magnetic core;

FIG. 43 is a table explaining the relationship of the windings on a magnetic core and their shorthand equivalent.

Figure 1:
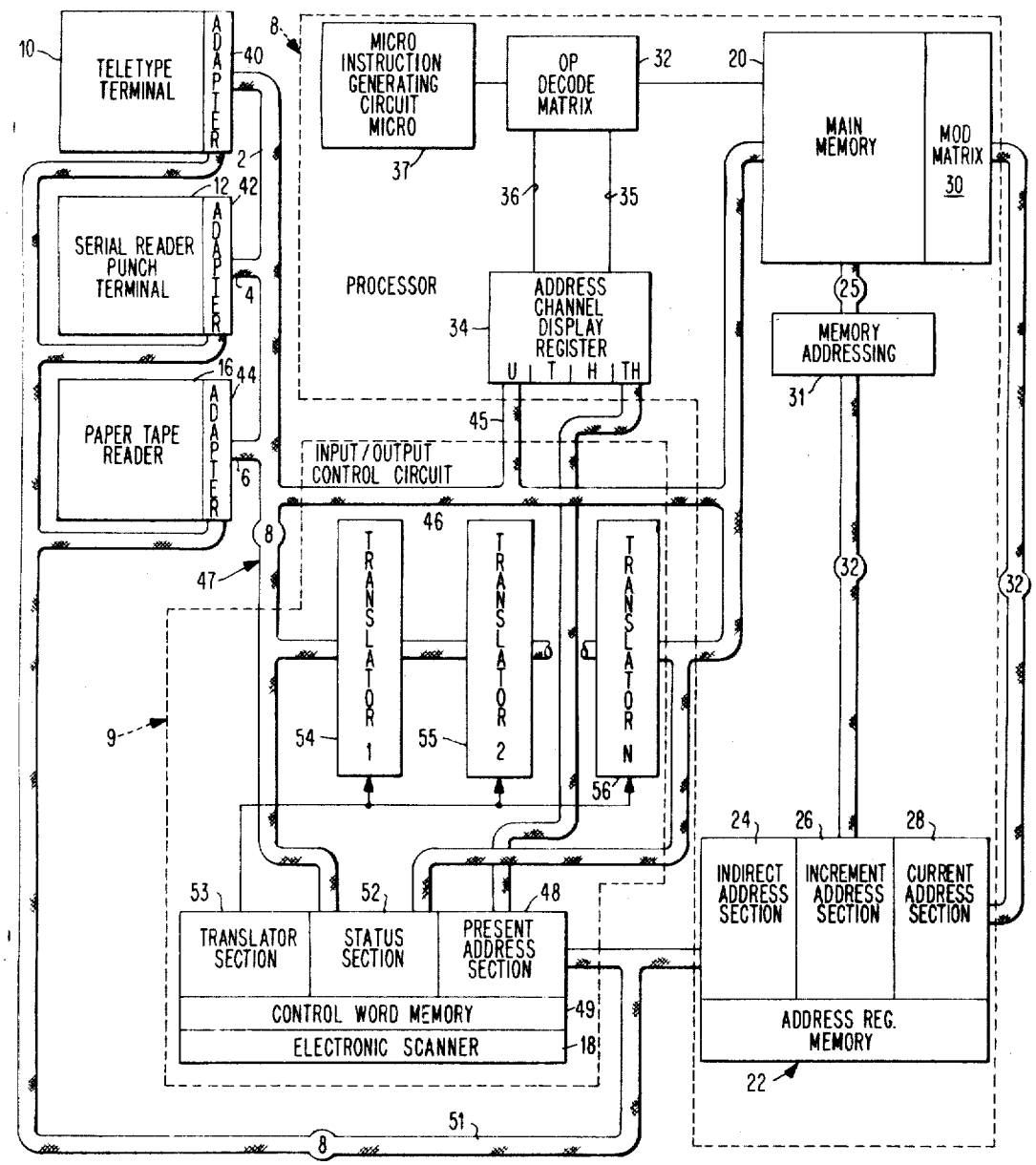

Referring to FIG. 1, there can be seen a block diagram of the record input-output terminal (RIOT) designed to handle a plurality of serial input-output lines 2, 4 and 6, which lines are connected to a processor 8 by an Input-Output Control (IOC) circuit 9. The lines 2, 4 and 6 may be connected to various types of data originating equipments. For example, a typical RIOT system includes a plurality of teletype data originating terminals, one of which is shown at 10, a number of card to card transmission devices, not shown, and other types of serial devices such as a paper tape reader 16 and a serial reader punch 12.

The serial input channels to the RIOT are essentially independent of timing. No restriction other than a maximum input rate of the serial information coming in on the lines 2, 4 and 6 is levied on these channels. The system is also designed in such a way that all of the data originating terminals may be operating simultaneously. Each channel is designed to carry five hundred characters per second. The processor 8 can handle the assembling of mesage characters directly into its memory regardless of the different in character transmission rates being presented to the serial input channels from the data originating terminals 10, 12 and 16. This is done through the use of an electronic scanner 18 for multiplexing the plurality of input lines 2, 4 and 6.

The RIOT system acts to assimilate this data coming from the terminals 10, 12 and 16, categorize the data into records in specific areas in a processor main memory 20, and process the messages as they are assembled from the input terminals in the system memory. The RIOT system, by programming option has the ability to process the data as it comes into the system, or to collect the input information so that some of this data may be processed as a batch processing job at different periods of time during the day. In general, the system is able to process the data as it is applied to the processor memory 20, store part of the results in the memory 20, and return required pertinent data to any of the data originating terminals 10, 12 and 16 or to other stations connected in the system.

The central processor 8 has design features specially fitted to accommodate the electronic scanner 18 and its serial input devices 10, 12 and 16. This accommodation takes a form of an address register memory 22 comprising a plurality of individual register sections 24, 26 and 28. The register section 28 comprises a plurality of individual registers each associated with a corresponding data originating terminal such as 10 and each containing the address location in main memory 20 into which a current data character from the terminal 10 is to be assembled. That is, the address register in the current address register section 28 can be filled with address signals under programming techniques. Thereafter, they are automatically updated by means of a modification matrix 30 connected between the main memory 20 and the current address section 28 as each successive data character is stored in the main memory 20. The central processing system itself by program is able to use these addresses whenever it needs to do so. This provides a central processing system with an easy access to the address of any particular incoming message after it has been assembled in the processor memory 20. Additionally, if an area in the memory assigned by program control to assemble records from a particular I/O unit becomes filled, a new area can be assigned under program control.

An input-output (IO) operation is begun with an interrogation of the main memory 20 by a memory addressing circuit 31 under program control. An instruction word is read from the main memory containing a character indicating the type of I/O operation which is to be performed, and also containing the address of the data originating terminal which is to receive or transmit the data. The character describing the type of operation is transferred to an operation decode matrix 32. The operation decode matrix is of standard design wherein a four out of eight machine code can designate one of seventy operations. Additional windings on the matrix drive lines are reserved for connection to an address channel display register 34. These windings, for example, indicate when a read, write, or other command operation is to be performed. During an operation decode portion of a command word access, the matrix windings transfer the address of an I/O unit to the thousands positions of the register 34 by a multi-wire address channel 35 and transfer a command signal, e.g. read, write, to a single predetermined position in the units area of the register 34 by a single wire in a command bus 36. Still other windings within the operation decode matrix 32 are connected to a microinstruction generating circuit 37 for generating a plurality of successive control point signals arranged to direct the operation indicated by the operation code character.

The units positions of the address channel display register 34 are connected to a plurality of adapters 40, 42 and 44 associated with the data originating terminals 10, 12 and 16 respectively by a command channel 45 and a by-pass section 46 of a data bus 47 and the signal lines 2, 4 and 6 respectively. The units position transfers command signals to the adapters. Simultaneously, the thousands position of the address channel display register 34 is connected to a present address section 48 of a control word memory 49 by an I/O address channel 50 pre-empting the normal operation of the scanner 18. Normally, the present address section is used to address the control word associated with the next successive I/O data originating terminal to be scanned. This address interrogation and recycling operation is momentarily stopped while the address from the thousands position of the register 34 is used to address a control word. This pre-emptying of the address interrogation and recycling operation is called a force scan operation.

With the interrogation of the addressed control word, the I/O unit address is furnished to the adapters 40, 42 and 44 by an adapter address bus 51. The adapter associated with each terminal recognizes its own address and gates the command signals from the units position of the register 34 to the addressed adapter. Status information from the addressed adapter is transmitted back to a status section 52 of the electronic scanner 18 wherein signals are generated for transmission to the RIOT processor indicating the present operating condition of the addressed terminal adapter. Either the terminal adapter is in a condition to receive data or it is busy. If it is ready to receive data from the processor, a signal indicating this condition is stored in the scanner 18. When this data terminal is again addressed in turn under the recycling control of the electronic scanner 18, the scanner inspects the control word and requests a single RIOT main memory cycle to provide a single data character. Each time a control word is interrogated by the recycling of the scanner 18, a translator section 53 of the control word memory is read out and is employed to select one of a plurality of translators 54, 55 and 56. Each of the translators is associated with a corresponding data originating terminal 10, 12 and 16, respectively. Each of the terminals handles data having a format specially suited for the optimum operation of its terminal. Normally, the data formats in data originating terminals differ. Therefore, the scanner selects a translator suited to transform the processor 8 format into a format suitable for handling by the terminals 10, 12, and 16. Conversely, when data is transmitted to the processor memory 20 from a data originating terminal 10, 12, and 16, a suitable translator is selected which changes the terminal data format into processor data format.

Figure 2B:
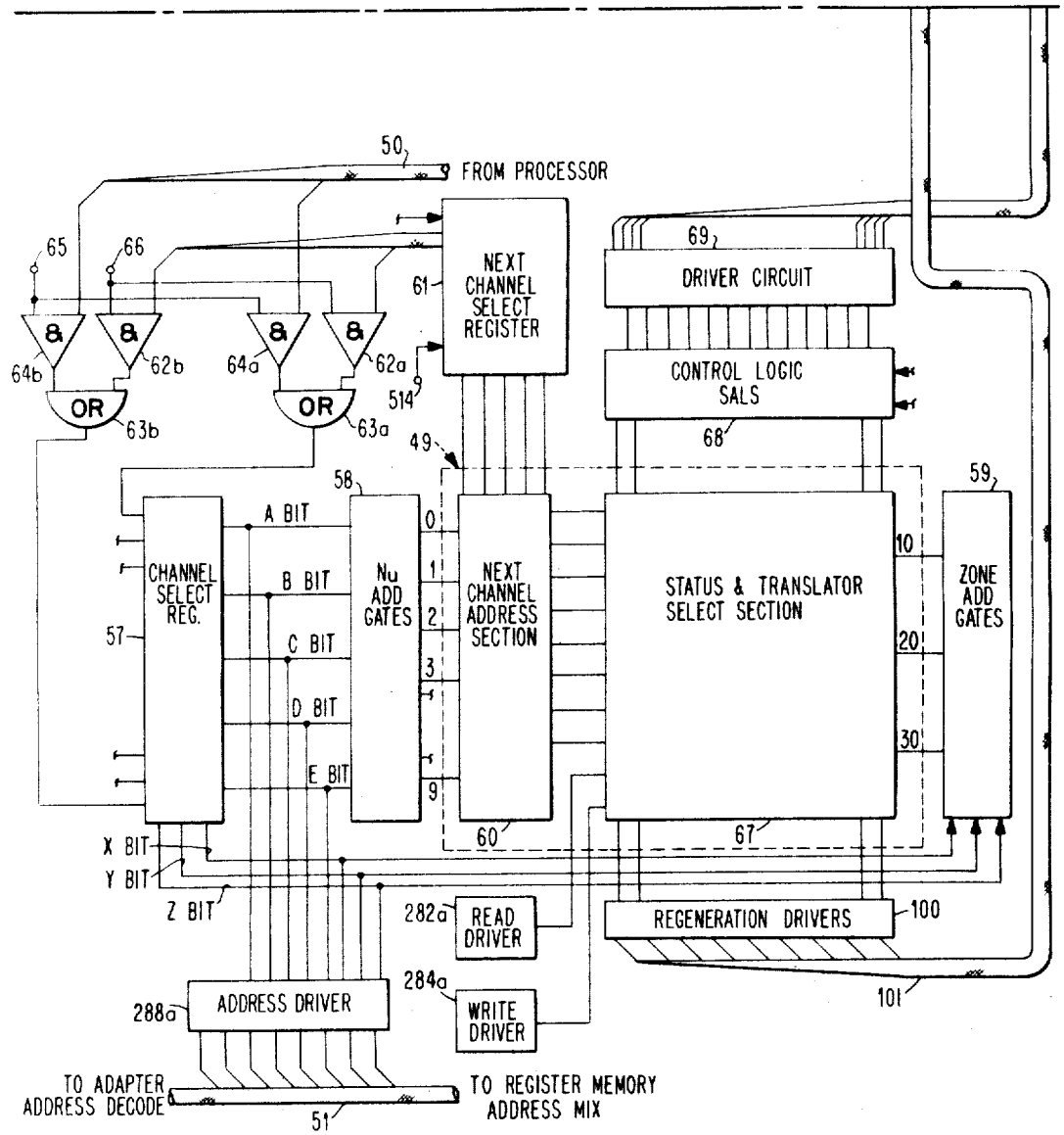

FIGS. 2a and 2b show a more detailed block diagram of the input-output control circuit 9 shown in FIG. 1. FIG. 2b includes a recycling address generating circuit comprising a channel select register 57, a pair of address gates 58 and 59, a next channel address section 60, and a next channel select register 61. The output of the next channel select register 61 is connected to the channel select register 57 by means of plurality of AND gates 62a through 62h, and OR gates 63a through 63h. Only AND gates 62a and 62b and OR gates 63a and 63b are shown for purposes of clarity. Actually, there are as many AND gates 62 and OR gates 63 as there are bits in a control word address. For the purpose of this description there are eight bits to a control word address. The output of each AND gate 62a through 62h is applied to the corresponding OR gate 63a through 63h. Each of the OR gates 63a through 63h is furnished an additional input signal from a plurality of AND gates 64a through 64h, respectively, only 64a and 64b are shown. The OR gates 63 connect the control word address from the next channel select register 61 or the control word address furnished by the RIOT processor over the I/O address channel 50 into the channel select register 57. Selection of one or the other is made by the activation of a processor control signal at a terminal 65 and a sense amplifier latch control signal at a terminal 66.

The address of a control word is designated in the normal four out of eight processor machine code format. The eight bits are divided into two sections, the first of which is a numeric section which is identified by a capital A through E bits, the second of which is the zone section which is identified as the X through Z bits. Additionally, the numeric bits are represented by a two out of five format while the zone bits are represented by a two out of three format. The numeric bits from the channel select register 57 are decoded in the numerical address gate circuit 58 to represent one out of 10 possible output signals identified as zero through nine. The zone bits from the channel select register 57 are applied to the zone address gate circuit 59 where they are decoded to represent three output signals identified as ten, twenty and thirty. Obviously, eight output signals can be generated from the two out of three zone bit format, but for the purpose of the description only the three enumerated signals are used. FIGS. 17a and 17b show a more detailed block diagram of the register 57 and 61 and the address gates 58 and 59.

The numeric and zone address gate circuits 58 and 59 are employed to interrogate successive horizontal control words stored in the control word memory 49. The control word selection operation is of standard design wherein the numeric address gates 58 are used to select the first ten control words. Thereafter successive signals from the numeric address gates are used with each enabling signal from the zone address gate circuit 59 to select the next 30 control words in the control word memory 49.

The scanning operation of the address generating loop is begun by the channel select register 57 containing the address of any control word stored in the memory 49. The numeric and the zone portion of an address are applied to the numeric and zone gates 58 and 59 respectively where they are decoded and used to energize a single horizontal control word stored in the memory 49. The selected control word is interrogated and the entire word is read out. The output signals from the next channel address section 60 are stored in a next channel select register 61. The signal contained in the section 60 identifies the next successive control word address. These signals are permanently wired into the section 60 and are associated with a corresponding data originating terminal. The signals from the status and translator select section 67 of the control memory 49 are read out into a control logic sense amplifier latch (SAL) circuit 68. The SAL circuit 68 momentarily stores the data readout of the section 67 and transfers the information to a control logic and translate decode driver circuit 69. The driver circuit 69 furnishes the power for transferring the status signals in the memory 49 to a control logic circuit 70 and for transferring the translator select signals in the memory 49 to a decode and select circuit 71. The signals applied to the control logic circuit 70 are employed to determine whether or not the addressed control unit is ready to perform an input-output operation and to determine the status of several other control signals which are completely described hereinafter. The signals applied to the circuit 71 are employed to select one of a plurality of translator arrays 72 through 75. FIG. 19 shows a more detailed block diagram of the select circuit 71. Each translator array is associated with the corresponding data originating terminal whereby the different format of the data originating terminal and processor can be appropriately translated so that transmission of data can occur between them.

Figure 8:
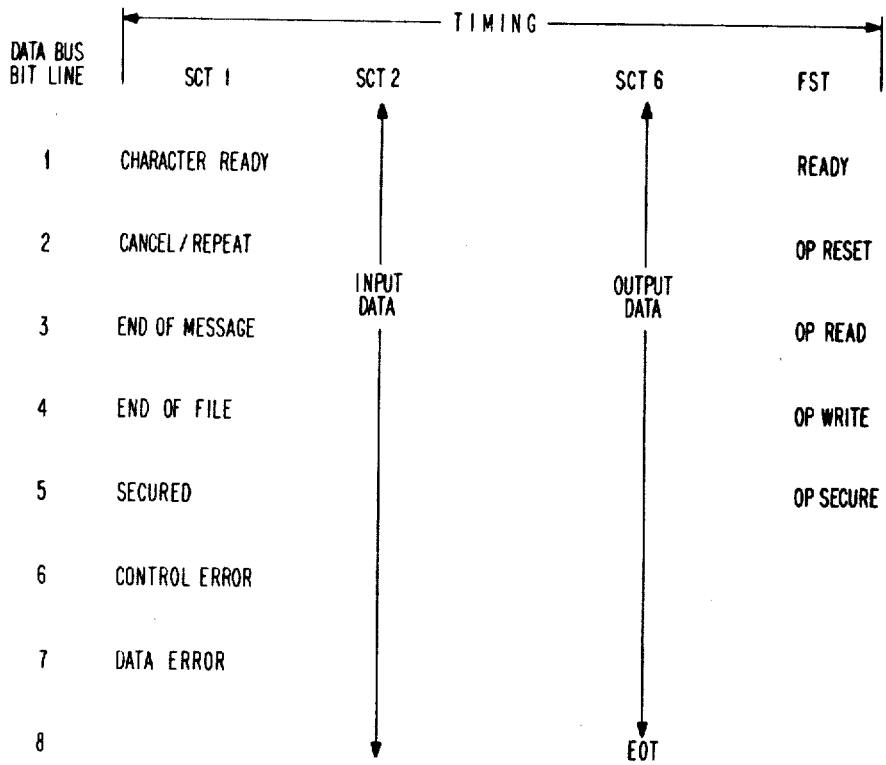
FIG. 8 is a schematic view of the contents of the data bus shown in FIG. 1.

For the purpose of this description, the teletype data originating terminal 10, FIG. 1 is selected as the terminal which is tested by the RIOT processor and which handles a transfer of a plurality of data characters with the RIOT processor main memory 20. Message status information from the terminal 10 is first applied to its associated adapter 40, described in greater detail with reference to FIGS. 5a and 5b. Thereafter, the message status signals pass over the input line 2 and the input portion 76 of the data bus 47. Each message status signal is carried on a separate line of the data bus 76. A table is shown in FIG. 8 giving the data bus line number assigned to carry each message status signal. The data bus bit line numbers are shown in the leftmost column and the command status signals are shown in the rightmost column labeled FST and the message status signals are shown in the column labeled SCT1. The graph indicates that the data bus is employed to carry a variety of signals. At Scan Time (SCT1) the data bus carries message status signals including a character ready signal and an End of Message (EOM) signal. These message status signals are concerned with the transmission of a complete message. At SCT two (SCT2) the data bus carries data and at SCT six (SCT6) the data bus carries output data. Additionally, at Force Scan Time (FST), the data bus carries command status signals including a read signal and a write signal and an I/O terminal ready signal. The command status signals are concerned with a functional change in the operation of a terminal unit.

Referring back to FIG. 2a, each of the message status signals is connected to the control circuit 70 by a plurality of AND gates 78a through 78h by the data bus bit lines one through eight respectively. Each of the AND gates 78a through 78h is connected in common to a single terminal 79 carrying the SCT one signal for gating the status signals into the control circuit 70.

The input data from the terminal unit 10 is applied by the adapter 40 over the line 2 and the input portion 76 of the data bus 47, directly to a first plurality of AND gates 80a through 80h respectively. An output character from the main memory 20 is transferred from the CPU main memory over the by-pass section 46 of the data bus 47 to a second plurality of AND gates 81a through 81h respectively. The AND gates 81a through 81h are furnished a common enabling signal from a terminal 82 for gating the machine coded output character to the translator 72.

Each of the AND gates 80a through 80h is furnished a second enabling input signal from a terminal 83 which carries the SCT two signal for gating an input character to the translator 72.

The output signal from each of the AND gates 80a through 80h is applied to a first driver circuit 84. The driver circuit 84 comprises a plurality of individual current drivers of standard design. Each of these current drivers is connected to a corresponding AND gate from the group of AND gates 80a through 80h and is also connected to a drive winding which threads all the translator arrays 72 through 75 and which terminates in a sense amplifier latch circuit 85. The output of each of the AND gates 81a through 81h is connected to a second drive circuit 86. The drive circuit 86 comprises a plurality of individual current drivers of standard design. FIG. 18 is a more detailed block diagram of the driver circuits 84 and 86. Each of these current drivers is connected to a corresponding AND gate from the group of AND gates 81a through 81h and is also connected to a drive winding which threads all the translator arrays 72 through 75 and which terminates in a sense amplifier latch circuit 85. FIG. 16a is a more detailed block diagram of the latch circuit 85. The latch circuit 85 comprises a plurality of individual current latches equal to the number of bits which make up the machine format. The output signal from each of the individual latches comprising the latch circuit 85 is connected to a plurality of OR gates 86a through 86h respectively by a plurality of AND gates 87a through 87h. Each of the AND gates 87a through 87h are connected in common to a terninal 88 carrying an enabling signal from the control logic circuit 70 and indicating when the contents of the latch circuit 85 is to be gated to a data bus driver circuit 89. The driver circuit 89 comprises a plurality of individual current drivers of standard design, and is shown in greater detail in FIG. 16b.

Successive ones of these current drivers receive a signal from the OR gate 86a through 86h respectively and furnish drive signals to lines one through eight of the output portion 90 of the data bus 47. The OR gate 86a through 86h receive a second enabling signal from a plurality of AND gates 91a through 91h respectively. Each of the AND gates has two input enabling signals; the first of which is an input signal from a corresponding line of a control bus 92, and the second of which is an enabling signal furnished at the terminal 93 by the control logic circuit 70. The control bus 92 transfers a message status symbol (MSS) character from the control logic circuit 70 to the RIOT processor main memory bus storage. As hereinafter described in greater detail, the MSS character describes message error conditions. The MSS character is stored in a fixed main memory position addressed by the resistor memory section 24. During a standard processor interrupt operation, the MSS character is inspected thereby providing the processor with a description of the type of message errors occurring during the transmission of the last message.

The control logic circuit 70 receives the same plurality of command status signals applied to the adapter 40. A plurality of AND gates 94a through 94h are connected to corresponding lines in a command section 95 of the data bus 47. Each of the AND gates 94a through 94h received a second enabling clocking signal from a terminal 96 for gating the command status signals into the control logic circuit for updating the contents of the status section of the contorl word memory as completely described hereinafter wtih reference to FIGS. 13a and 13b.

The control circuit 70 furnishes a variety of signals to all parts of the RIOT system. First, scan time (SCT) signals are furnished each adapter by a clock bus 97. Second, an updated MSS character is furnished to the RIOT processor 8 by a control bus 92. Third, newly received command signals received over the command section 95 are compared with the existing status signals received from the drive circuit 69 over a current status bus 99 and the updated status signals are transferred to a regeneration circuit 100 by a status return bus 101 for storage in corresponding positions of the control word memory 49.

Figure 5A:
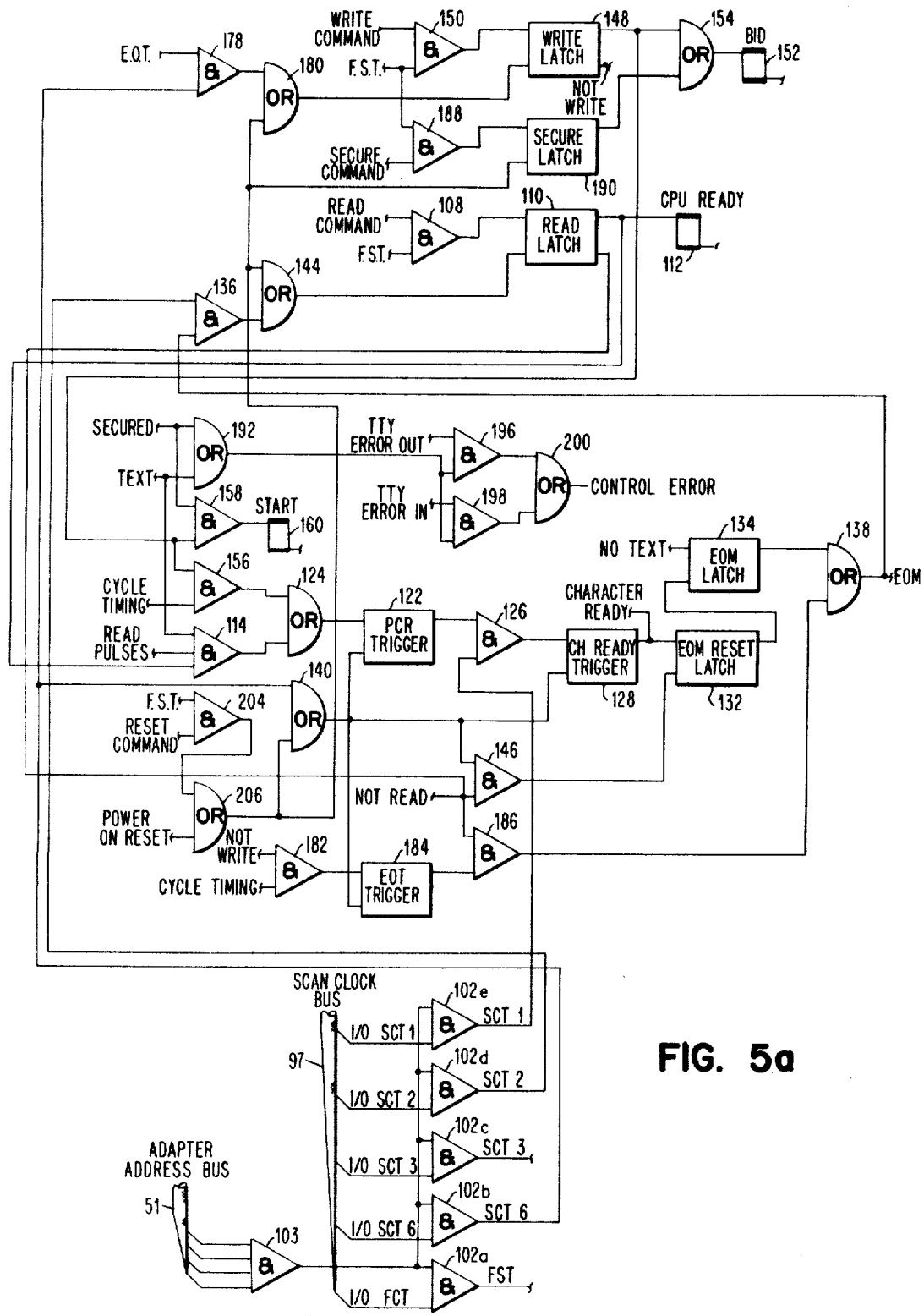
Figure 5B:
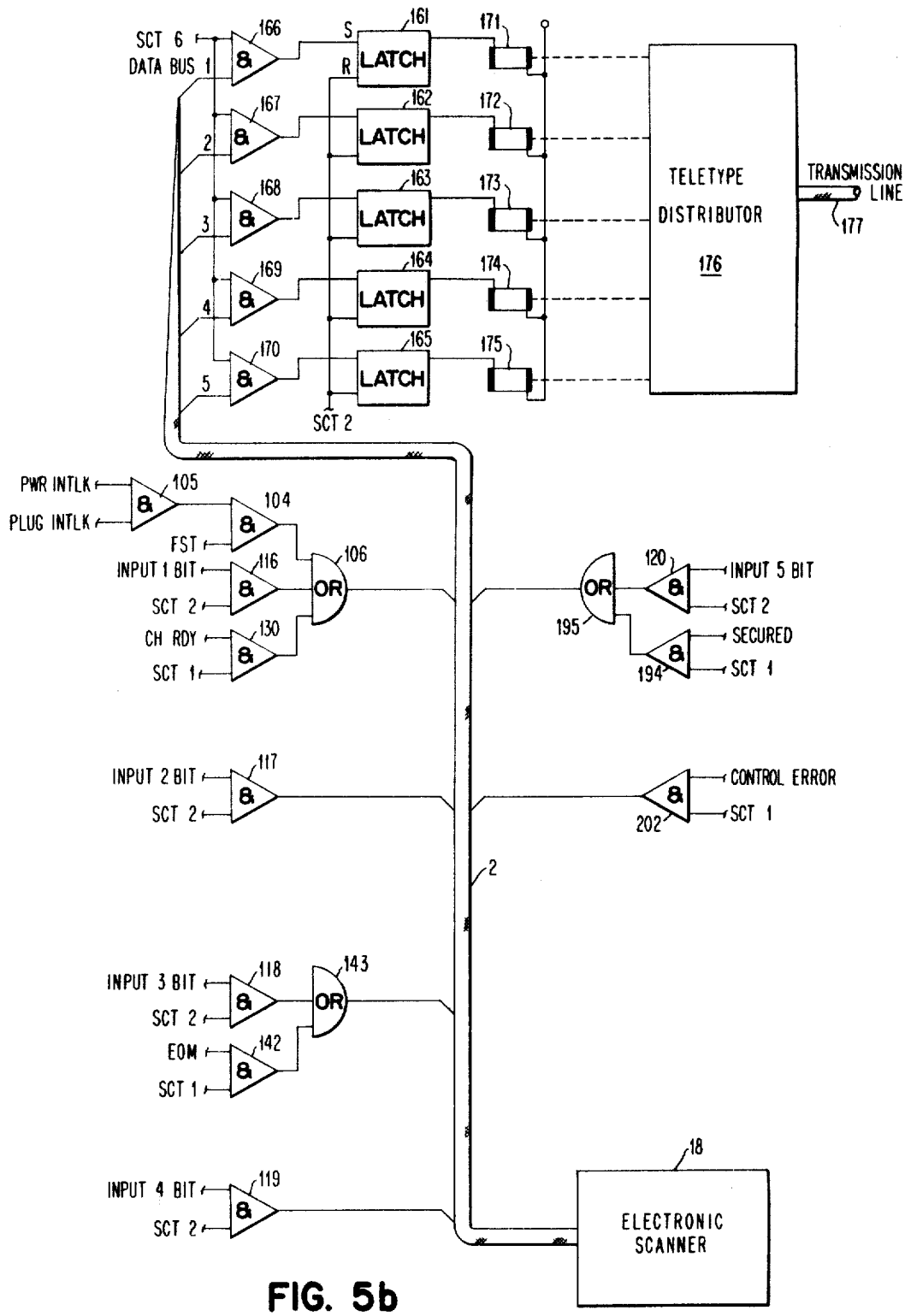

FIGS. 5a and 5b show block diagrams of the adapter portion 40 associated with a representative data originating terminal 10 shown in FIG. 1. The electronic scanner 18 is shown in FIG. 5b as the source of all enabling signals for controlling the selection of a particular data originating terminal for testing its present operating condition and for gating information out of or to a source unit. A teletype unit has been selected as a typical source unit. The teletype operating signals hereinafter enumerated are the standard operating signals generated by the usual teletype unit. The means for generating these operating signals will not be described in detail.

A teletype operation is initiated by the scanner 18 when it applies both the correct address to the desired adapter by the adapter address bus 51, FIG. 5a, and a force scan time (FST) signal to an AND gate 102a by one line in the scane clock bus 97. The remaining scan time signals are applied to AND gates 102b through 102e from corresponding lines of the scan clock bus 97. The means for generating all the timing signals on the scan clock bus is completely described in the section pertaining to the control logic circuit 70 of the electronic scanner with reference to FIG. 12. It is sufficient at this time to describe the scan clock bus 97 as comprising five individual lines, each carrying a timing pulse. The adapter address bus 51 is connected to a standard decode AND gate 103. Since the adapter addresses are in 4/8 binary code, the decode circuit 103 is connected to those four lines in the address bus which carry the enabling signals for identifying that particular adapter.

Each time intelligence signals pass between a particular adapter and the scanner 18, the signals on the address bus identify the desired adapter for gating the timing signals on the scan clock bus 97 to other circuits located in the adapter. For example, during the teletype initiating operation, the output signal from the AND gate 102a is connected to an AND gate 104, FIG. 5b. The AND gate 104 has a second enabling input signal from an AND gate 105 which has a pair of input signals applied thereto; one of which is a power interlock signal generated by the teletype unit where it is connected to a source of A.C. power, and the other of which is a plug interlock signal which is generated by the teletype unit when it is properly interlocked and is operationally ready. The AND gate 104 is connected to line one of the data bus 2 by an OR gate 106. An output signal from the OR gate 106 at FCT indicates that the source unit connected to this adapter is ready and is capable of originating or receiving data.

The electronic scanner accepts this source ready signal and stores it in a corresponding area of the associated MSS where it is inspected by the RIOT processor in a manner described hereinafter. When the RIOT processor determines that the source unit is ready by examining the source ready signal, the electronic scanner 18 transmits a read command signal to an AND gate 108, FIG. 5a, during the same FST cycle. The AND gate 108 has a second enabling signal applied thereto from the AND gate 102a. The output from the AND gate 108 sets a Read latch 110 to its first stable state whereby the latch 110 generates an enabling output signal for energizing a CPU Ready relay 112 and for furnishing an enabling signal to an AND gate 114. The relay 112 is a standard teletype relay which is energized each time the teletype unit is ready to accept data from a transmission line for forwarding to the RIOT processor.

The AND gate 114 has two additional input signals which are both generated by the selected teletype unit. The first of which is a TEXT signal, shown on line E of FIG. 6, and the second of which is a READ PULSE signal, shown on line F of FIG. 6. The TEXT signal indicates that the teletype unit has data ready for forwarding to the RIOT processor, and the READ PULSE signal indicates the activation of the read phase of teletype operation, wherein the teletype unit is actually generating the gating read pulses necessary to gate the data signals from the transmission line to the adapter output circuits comprising a plurality of AND gates 116 to 120 respectively.

Data is sent to the processor by requesting a memory cycle from the processor as required without direct processor activation. In this manner, a RIOT processor memory cycle is only required when a data character is actually ready to be received. The actual manner by which the RIOT processor determines when a character is waiting for transmission is completely described hereinafter with reference to FIGS. 15a and 15b. It is sufficient at this time to show that the adapter generates a CHARACTER READY signal and the control logic circuit 70, in response thereto, returns a plurality of signals to the adapter.

Figure 6:
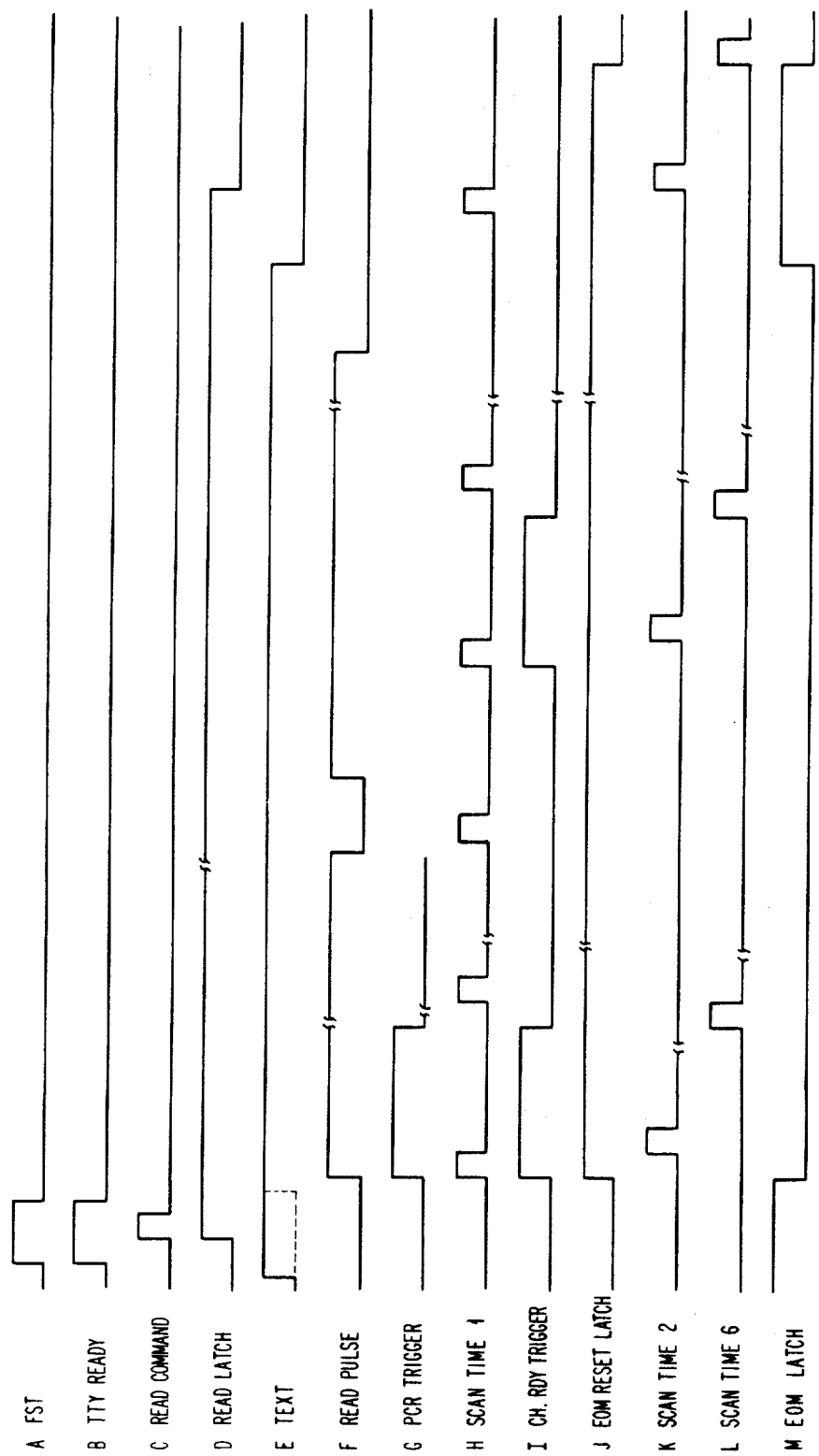
FIG. 6 is a timing diagram showing the sequence of signals occurring in an adapter in response to a read command.

The output of the AND gate 114 is applied to a pre-character ready (PCR) trigger 122 by an OR gate 124, setting the trigger 122 to its first stable state, line G, FIG. 6, whereby the trigger 122 generates an enabling signal for application to an AND gate 126. The next scan time (SCT) one signal is also applied to the AND gate 126, from the AND gate 102e, gating the PCR trigger signal to set a character ready trigger 128 to its first stable state, line I, FIG. 6, whereby it generates an enabling signal for application to an AND gate 130 on FIG. 5b, and for application to an End Of Message (EOM) reset latch 132. The EOM reset latch is set to its first stable state, line J, FIG. 6, whereby it generates an enabling signal for application to an EOM latch 134, resetting the EOM latch to its second stable state, line M, FIG. 6, whereby a disabling signal is applied to a reset AND gate 136 by an OR gate 138.

The CHARACTER READY signal generated by the trigger 128 is gated in the AND gate 130 by the same SCT one signal which set the character ready trigger. The CHARACTER READY signal is inspected in the scanner and is employed to cause the scanner 18 to send the next SCT two and SCT six signals to the adapter. The SCT two signal is applied to the AND gates 116 through 120 and gates the five bit teletype coded characters onto the corresponding lines of the data bus 2. These bits are sent to the translator shown in FIG. 1 prior to storage in a predetermined location in the RIOT Main Memory 20. A selected translator changes the teletype coded character into a machine coded character which can be processed by the RIOT processor.

The SCT six signal is applied to both the PCR trigger 122 and the character ready trigger 128 by an OR gate 140 resetting both of the triggers 122 and 128 as seen on lines G and I, respectively, in FIG. 6.

During the period wherein the slower acting teletype unit is assembling the next sequential character in a message, the RIOT processor is released to perform other functions. The electronic scanner transmits sequential SCT one signals to the adapter. No response is received from the adapter unit until the read pulses, line F, FIG. 6, return. These pulses disappear while the teletype unit is assembling a new character and return when a character is assembled and waiting for transmission. Upon the return of the read pulses the PCR Trigger is again set and the next and all succeeding characters are transmitted to the translator in the identical manner as described for the first character.

After the transmission of the last data character, the enabling TEXT signal changes to a disabling NO TEXT signal preventing any additional resetting of the PCR trigger 122. Additionally, the NO TEXT signal is applied to the EOM latch 134 setting it to its first stable state whereby it generates an enabling signal for application to the AND gate 136 and an AND gate 142 shown on FIG. 5b. The AND gate 142 receives a second enabling signal at SCT one and transmits the EOM signal to the scanner 18 by an OR gate 143 where it is stored in the status section of the control word memory 49. The storing of the EOM signal and its subsequent inspection causes the SCT two and SCT six signals to be sent to the adapter. The SCT two signal is applied to the AND gate 136 gating the EOM signal to the reset terminal of the read latch 110 through an OR gate 144. The resetting of the read latch 110 places the latch in its second stable state whereby its enabling output signal to the CPU ready relay terminates and its NOT READ enabling output signal from its second stable state is applied to an AND gate 146. The SCT six signal is applied to the AND gate 146 by the OR gate 140 gating the NOT READ signal to the EOM reset latch 132. The EOM reset latch 132 is reset to its second stable state, line J, FIG. 6, whereby it generates an enabling signal for application to the EOM latch 134. The EOM latch is reset to its second stable state, line M, FIG. 6, whereby the enabling signal applied to the AND gate 142 in FIG. 5b is removed.

The last SCT six signal places the teletype unit in a stand-by condition where it waits until a new message is to be received or transmitted.

Figure 7:
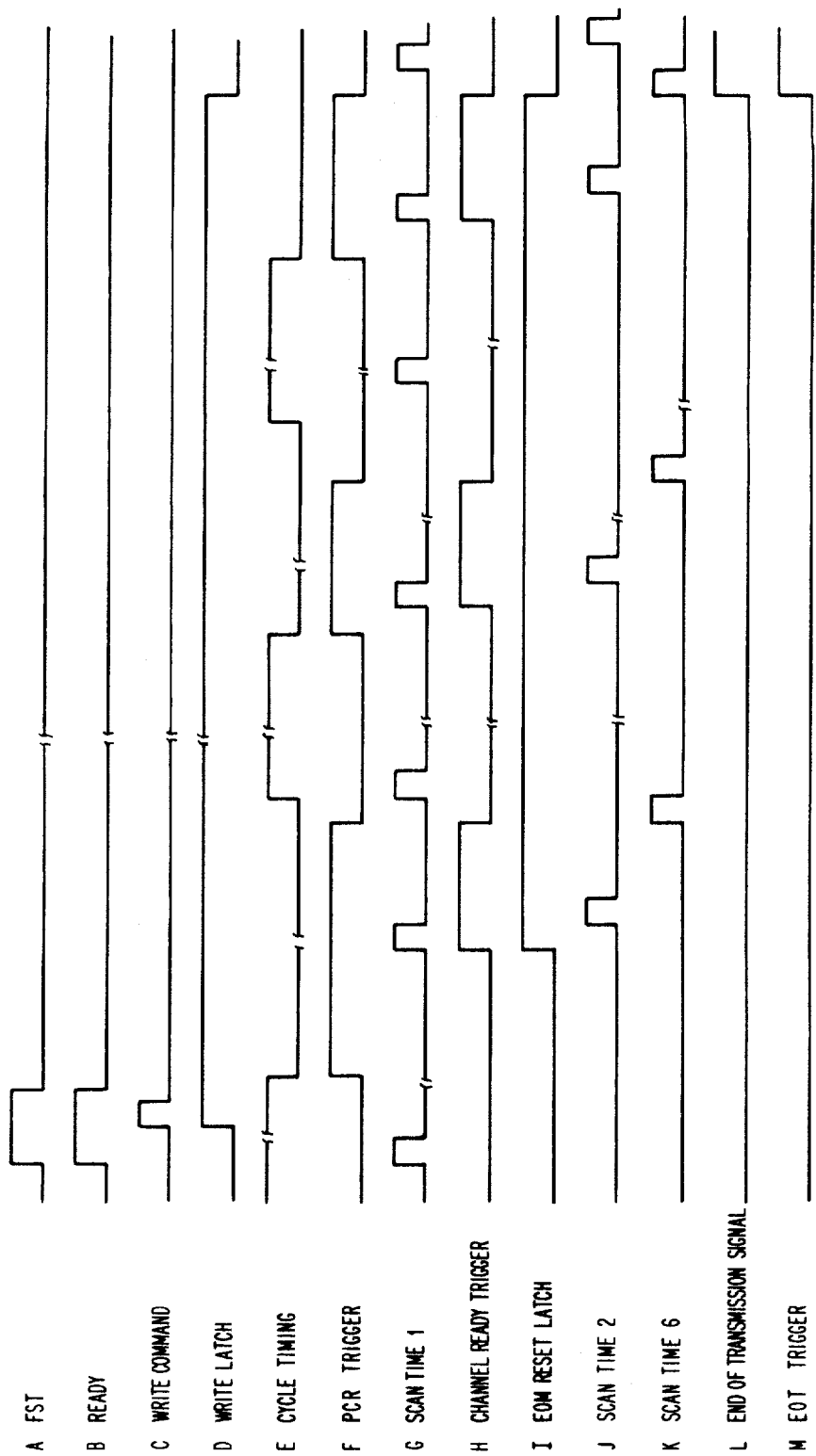
FIG. 7 is a timing diagram showing the sequence of signals occurring in an adapter in response to a write command.

A write operation is similar to a read operation and employs the circuitry shown in FIGS. 5a and 5b and the timing diagram of FIG. 7. During the write mode, a data character is obtained from the main memory 20 of the RIOT processor, shown in FIG. 1, and is transmitted by the teletype data originating terminal 10 to a distant teletype unit. A FST signal, line A, FIG. 7, is again applied to the AND gate 104, testing the operating condition of the teletype. If the teletype unit is turned on, the TTY READY signal, line B, FIG. 7, is returned to the status area of the scanner over line one of the data bus 2. During the same FST signal a WRITE COMMAND signal, line C, FIG. 7, is applied to a write latch 148 by an AND gate 150. The write latch 148 is set to its first stable condition whereby it generates an enabling signal for application to a BID relay 152 through an OR gate 154. The BID relay 152 seeks to seize a transmission line connected to a distant teletype unit. The enabling output signal from the write latch 148 is also applied to a pair of AND gates 156 and 158.

The AND gate 158 has a second enabling input signal which is generated by the teletype unit when a transmission line has been seized. This second enabling signal is called a SECURED signal. The output of the AND gate 158 energizes a start relay 160. The energization of the start relay 160 causes standard circuitry internal the teletype unit to activate for putting data characters onto the seized transmission line. These internal circuits include one for generating a CYCLE TIMING signal, line E, FIG. 7, for application to the AND gate 156. The output of the AND gate 156 is applied to the PCR trigger 122 by the AND gate 124, setting the PCR trigger to its first stable state whereby it generates an enabling output signal for application to the AND gate 126. With the next SCT one signal, line G, FIG. 7, the AND gate 126 is enabled, passing the PCR trigger signal to set the character ready trigger 128 to its first stable state, line H, FIG. 7, whereby it generates an enabling signal for application to the EOM reset latch 132 and the AND gate 130. The EOM reset latch is set to its first stable state, line I, FIG. 7, and the character ready signal is gated by the SCT one signal at the AND gate 130 onto line one of the data bus 2, FIG. 5b. In a manner similar to that to be described for the read operation, the scanner 18 responds to the receipt of the CHARACTER READY by returning a SCT two and SCT six signal to the adapter, lines J and K respectively, FIG. 7.

The SCT two signal is applied to the reset terminals of a plurality of latches 161 through 165 clearing the signals held by these latches. The SCT six signal is applied to a plurality of AND gates 166 through 170. Successive ones of these gates are connected to corresponding lines in the data bus 2. Therefore, the plurality of bits comprising a data character are gated through the AND gates 166–170 at SCT six and are stored in the latches 161–165 respectively. The latches 161–165 are connected to a plurality of relays 171 through 175. These relays are connected to the standard teletype distributor 176 which serializes the data bits stored in the relays 171–175 for transmission to the distant teletype unit over a transmission line 177. This serializing occurs during the positive portion of the cycle timing waveform E in FIG. 7. When the negative portion of the cycle timing waveform reoccurs, the procedure for accepting a character from the RIOT main memory 20 and for transmitting it to a distant unit is repeated.

The writing procedure is repeated until the electronic scanner sends an END OF TRANSMISSION (EOT) signal over the data bus line eight at SCT six instead of a plurality of bits for application to the AND gates 166 through 170. The EOT signal is applied to the AND gate 178. The AND gate 178 receives as its second enabling signal the SCT six signal from the AND gate 102b. The output of the AND gate 178 resets the write latch 148 through an OR gate 180. The write latch is reset to its second stable state whereby it removes its enabling signal from the BID relay 152 and generates a NOT WRITE enabling signal to an AND gate 182. The AND gate 182 has a second enabling input signal applied thereto during the negative portion of the cycle timing waveform shown on line E of FIG. 7. The output of the AND gate 182 sets the end of transmission (EOT) trigger 184 to its first stable state whereby it applies an enabling signal to the AND gate 142, FIG. 5b, by an AND gate 186 and the OR gate 138. When the next SCT one signal is applied to the AND gate 142, the EOM signal is transferred to the status portion of the scanner control word memory. A subsequent inspection by the RIOT processor informs the processor that the last data character has been transmitted.

In certain transmission operations it is necessary to seize a transmission line prior to sending data to the addressed adapter from the RIOT main memory. A FST signal is applied to the AND gate 104 to determine if the addressed teletype unit is in operating condition. A TTY READY signal is returned to the scanner over line 1 of the data bus 2. A SECURE signal is applied to an AND gate 188 over line five of the data bus 2. The SECURE signal is gated by the FST signal, setting a secure latch 190 to its first stable state whereby it generates an enabling output signal for application to the BID relay 152 through the OR gate 154. The adapter neither sends additional signals nor receives additional data signals until the transmission line is secured and the teletype unit generates a SECURED signal for application to an OR gate 192 and the AND gate 158. The SECURED signal is also applied to an AND gate 194 in FIG. 5b. The next SCT one signal gates the SECURED signal by an OR gate 195 to the status area of the control word memory where it is inspected by the RIOT processor. Once the transmission line is secured, the RIOT processor may be programmed to send a READ or WRITE command to the addressed teletype unit. These later commands operate the same as the earlier described commands.

A standard teletype unit generates signals when a transmission error occurs. These signals are applied to the status area of the control word memory by a pair of AND gates 196 and 198. The AND gate 196 has two input signals; one of which is a WRITE TELETYPE ERROR signal, and the second of which is either a SECURED or TEXT signal from the OR gate 192. The AND gate 198 has two input signals; one of which is a READ TELETYPE ERROR signal, and the second of which is either a SECURED or TEXT signal. The output signal from either of the AND gates 196 or 198 is applied to an OR gate 200. The CONTROL ERROR output signal from the OR gate 200 is applied to an AND gate 202 in FIG. 5b. The next SCT one signal gates the CONTROL ERROR signal to the status area of the control word memory where it is available for inspection by the RIOT processor.

The RIOT processor is able to reset the latches in the addressed adapter. During FST, after a SOURCE READY signal is returned to the scanner by the OR gate 106, the scanner sends a RESET signal to an AND gate 204 over line two of the data bus 2. The RESET signal is gated by the FST signal and the output signal from the AND gate 204 is applied to an OR gate 206. The OR gate 206 has a second enabling signal applied thereto which is generated by the teletype unit itself whenever power is turned on in the adapter. The output signal from OR gate 206 resets the triggers 122 and 128 and the latches 110, 148 and 190 if any are in the set condition. No special return signal is sent to the scanner other than the EOM signal normally sent by the AND gate 142.

Figure 3A:
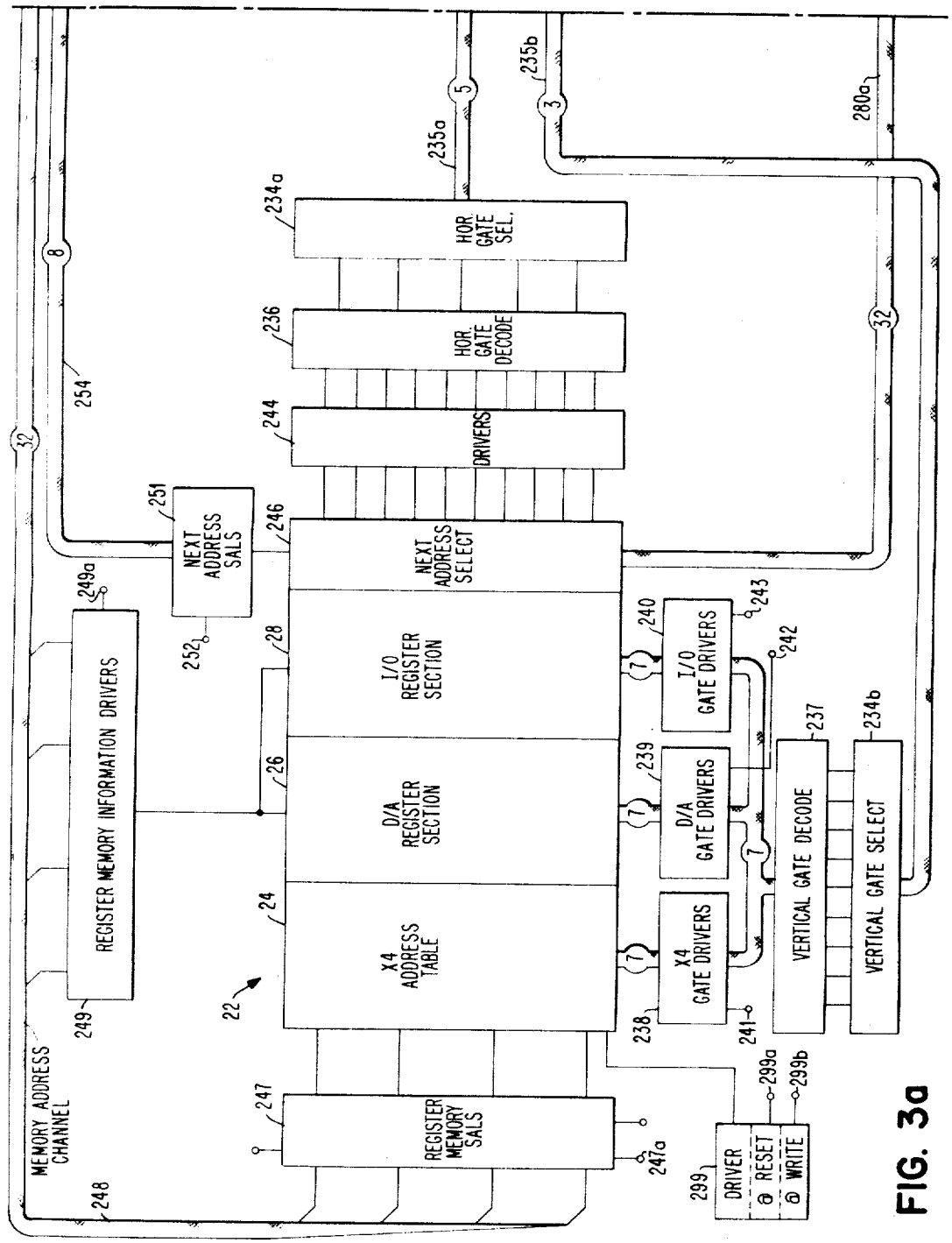

FIGS. 3a, 3b and 3c comprise a more detailed block diagram of the main memory addressing circuitry including the address path from the electronic scanner and the data path from the plurality of translators in the input-output control circuit. During a transfer of information between the data processor and a data originating terminal under the control of the electronic scanner 18, the scanner generates the address of the I/O unit to be involved in the transfer operation and places this address on the address bus 51 shown in FIG. 2b and FIG. 3b. The address is represented by the standard four out of eight machine code format and each line in the address bus carries a corresponding address bit for application to a plurality of AND gates 220a through 220h which form a part of a register memory address mix 221. The mix 221 comprises a plurality of groups 222a through 222h of AND gates, each of which group is connected to a plurality of OR gates 223a through 223h respectively. The OR gates 223a through 223h can be viewed as an extension of the address bus 51. That is, an address generated by the electronic scanner 18 is applied to a register address latch circuit 224 by the mix 221. Addresses from other sources are also applied to the latch circuit 224 by the mix 221. These other sources include a register memory address register 225 which is connected to a plurality of AND gates 226a through 226h respectively, an address generator 227 which is connected to a plurality of AND gates 228a through 228h respectively, and an operation console, not shown, which has access to the register address latches 224 by a plurality of AND gates 229a through 229h. At various times during the operation of the RIOT processor, these sources of addresses are selectively coupled to the latch circuit 224. The selective process is controlled by separate enabling signals applied to each set of AND gates 220, 226, 228 and 229 from a plurality of signal terminals 230, 231, 232 and 233 respectively. The register memory address register 225 is a single character, standard latch type register comprising the eight latch positions corresponding to each of the eight bits in the single character it can store. The register 225 is the source of all address information used to access the register memory 22, which information is supplied by programming means. One reset and two set functions are provided at the register 225 for use by the processor control circuitry. Whenever the reset function is used, the entire contents of the register 225 is reset to no bits. Normally, this reset operation just precedes the read-in of a character from one of the two input sources to the register 225.

The latch circuit 224 comprises a plurality of standard individual latches which store the current address received from the mix 221. Prior to the reception of the next successive address, each latch is reset to clear its contents. The output signals from five of the latches, corresponding to the A through E bits, are connected to a horizontal gate select circuit 234a by a cable 235a. The remaining output signals from the latch circuit 224, corresponding to the X, Y and Z bits, are applied to a vertical gate select circuit 234b by a cable 235b. The gate select circuits 234a and 234b provide a static source from which the address signals may be decoded. The output of the gate select circuit 234a is applied to a horizontal gate decode circuit 236, while the output of the gate select circuit 234b is applied to a vertical gate decode circuit 237. The decode circuits 236 and 237 are identical with the numeric and zone address gates 58 and 59 respectively, which were previously described. The output from the horizontal gate decode circuit 236 consists of a single enabling signal out of ten possible signals. The output of the vertical gate decode circuit 237 consists of a single enabling signal out of eight possible signals. The vertical gate decode circuit 237 is connected in parallel to a X4 gate driver circuit 238, a D/A gate driver circuit 239 and an I/O gate driver circuit 240 respectively. The driver circuits are identical comprising seven individual current drivers. Although, one driver in each of the circuits 238, 239 and 240 receives an enabling signal from the decode circuit 237, only one of these circuits is activated by an additional gating signal furnished by the micro-instruction generating circuit (MIGC) 37 shown in FIG. 1, by terminals 241, 242 and 243 respectively.

Each of the ten output signals available from the decode circuit 236 is connected to an individual driver circuit in the driver 244. The activated driver energizes a drive winding which links a horizontal row of cores in a next address select section 246 of the register memory and the three address sections 24, 26 and 28. Each of the drive windings terminate in a corresponding sense amplifier latch in a register memory SALS circuit 247.

Once the address of a data originating terminal is gated onto the address bus 51, an enabling signal from the MIGC 37, shown in FIG. 1, gates this address through the address mix 221 to the horizontal and vertical gate select circuits 234a and 234b. A horizontal row of cores in the register memory 22 is addressed by the horizontal and vertical gate decode circuits 236 and 237. An additional enabling signal generated in the MIGC 37 and applied to the terminal 243 designates the I/O register portion 28 of the horizontal row of cores as the storage area which furnishes an address to register memory SALS 247. The SALS 247 are connected to corresponding bit lines in an address channel 248. The channel 248 conveys the address in the SALS 247 to a register memory information driver circuit 249 and a memory address register 250. Simultaneously, the next address select section 246 of the register memory 22 generates the address of the next successive horizontal row of cores and applies the address to a next address SAL circuit 251.

The driver circuit 249 uses the memory address channel 248 as a source of address information during register memory write time, which information specifies the address to be written back into the address register location just interrogated by the gate select circuits 234a and 234b. Any address read from the register memory 22 which is to be regenerated back into the location from which it came must be gated from the SALS 247 by an enabling signal generated in the MIGC 37 and available at a terminal 247a onto the address channel 248. This address is rewritten into same location in the register memory 22 by the driver circuit 249, when the driver 249 is enabled by a gating signal at a terminal 249a from the MIGC 37. Each of the output windings of the driver 249 is threaded through all the respective cores in the sections 26 and 28. More specifically, each addressable location comprises thirty-two cores in this embodiment. An equal number of individual drivers are employed by the driver circuit 249. Each driver is equipped with an output winding which threads a corresponding core in each location of the section 26 and 28.

The select circuit 246 operates in the same manner as the next channel address section 60 described in FIG. 2b. The output of the select circuit 246 is applied to the SALS 251 for temporary storage prior to their use for the automatic addressing of a next address location in the register memory 22. The use of this automatic method of address generation is obtained by a gating signal generated in the MIGC 37 and applied to the SAL 251 from a terminal 252. The output from the next address SALS 251 is gated into the register memory address register 225 by a plurality of AND gates 252a through 252h, a plurality of OR gates 253a through 253h, and a next address channel 254. The OR gates 253a through 253h are connected to corresponding portions of the register 225. The AND gates 252a through 252h have as their second input signal an enabling signal from the MIGC 37 signifying that the next address select circuit 246 automatically furnishes the next address to the register memory address mix 221 for addressing the register memory 22. This enabling signal is available at a terminal 255. The OR gates 253a through 253h receive an additional input signal from a plurality of AND gates 256a through 256h respectively. Each of the AND gates 256a through 256h is equipped with a pair of input signals; the first of which is an address bit from a corresponding line of an information channel 257, and the second of which is an enabling signal from the MIGC 37 indicating that the address on the information channel 257 is to be gated into the register memory address register 225. This last mentioned enabling signal is available at a terminal 258.

The address channel 248 comprises thirty-two individual lines. These lines are logically divided into four groups and labeled units, tens, hundreds and thousands respectively and each group is connected to a similarly labeled section 259, 260, 261 and 262 of the memory address register 250.

Since the addressing technique employed by the instant invention is well known, it will only be briefly described. The units section 259, the tens section 260 and the hundreds section 261 apply the numeric portion of their respective address character to a units decode circuit 263, a tens decode circuit 264 and a hundreds decode circuit 265 respectively. The numeric portion of these address characters are coded in two out of five fashion as described with respect to the numeric address gate circuit 58 shown in FIG. 2b. The decode circuits 263, 264 and 265 perform a standard decimal decode operation and each furnishes a single energized line to their respective memory driver gate circuits 266, 267 and 268. Each of these last mentioned circuits comprises ten individual current drivers of standard design, one driver being assigned for each of the ten possible decode signals.

The numeric and the zone portions of the address are transferred from the thousands portion 262 of the register 250 to a decode circuit 269. The decode circuit 269 comprises two sections; one being responsive to the numeric portion of the thousands character and the second being responsive to the zone portion of the thousands character. The numeric portion is decoded in decimal fashion and the single output is applied to one of the ten standard current drivers in a memory driver gate circuit 270. The selected driver is connected to a group of cores in the main memory 20 as is the output from the circuits 266, 267 and 268. Using this technique of four groups of drivers 266, 267, 268 and 270, ten thousand individual positions can be selected using standard decoding techniques. Each position contains eight individual cores and represents a single character in the four out of eight machine coded format. A separate decode circuit, not shown, is responsive to the zone portion of the thousands characters and is employed to extend the capacity of the main memory from ten thousand positions to eighty thousand positions. This can be done in either two ways; first five windings can thread each postion in the main memory, four windings being connected to each of the driver circuits 266, 267, 268 and 270 as previously described, and a fifth furnished by an eight position decode circuit, not shown, which is responsive to the zone portion of the thousands character, or by only four windings corresponding to the same first four windings enumerated above. However, in this later case, an additional plurality of thousands decode circuits 269a through 269g are connected to corresponding groups of ten thousand positions and the drive winding from the decode circuits 263, 264 and 265 are applied to each group of ten thousand positions in parallel. Only one of the decode circuits 269 and 269a through 269g is energized by the eight position decode circuit.

The drive windings employed by the main memory 20 terminate in a main memory SALS circuit 271. During a memory read operation the contents of the addressed position is read out into the SALS 271. Each character in the SALS 271 in transferred to a first eight position character register (CR1) 222 by an enabling signal furnished by the MIGC 37 to the SALS 21 at the terminal 273. The character register 272 furnishes output data characters to the scanner 18 by the data bus 47 and furnishes characters for processing to the remaining portion of the processor shown in FIGS. 25a to 25d by an output channel 274 connected in parallel with the bus 47.

Characters are read into the main memory 20 by a main memory inhibit mix 275 and a memory inhibit driver circuit 276. The inhibit mix 275 is identical to the address mix 221 except for the sources of information furnished to the mix 275. The I/O data bus 90 furnishes data characters to the corresponding inhibit drivers in the driver circuit 276 by a plurality of AND gates 277a through 277h and a plurality of OR gates 278a through 278h. The information channel 257 furnishes an information character to the driver circuit 276 by a plurality of AND gates 279a through 279h and the OR gates 278a through 278h. An arithmetic character is furnished to the driver circuit 276 by an arithmetic channel 280, a plurality of AND gates 281a through 281h, and the OR gates 278a through 278h. Information can be added to the main memory 20 from an operator's console, not shown, by an external data channel 282, a plurality of AND gates 283a through 283h and the OR GATES 278a through 278h.

As in the mix 221, each of the AND gates in the mix 275 is equipped with a second enabling signal to control the gating of character to the driver circuit 276. The AND gates 279a through 279h are equipped with an enabling signal from a terminal 284 indicating that an information character is to be applied to the driver circuit 276. The AND gates 277a through 277h are equipped with an enabling signal from a terminal 285 indicating that an I/O data character is to be applied to the driver circuit 276. The AND gates 283a through 283h are equipped with an enabling signal from a terminal 286 indicating that a data character is to be applied to the driver circuit 276 from the operator's console. The AND gates 281a through 281h are equipped with an enabling signal from a terminal 287 indicating that an arithmetic character is to be gated to the driver circuit 276.

The driver circuit 276 comprises eight standard individual driver circuits. One for each bit in the machine format. The driver circuit 276 reads its contents into the position in main memory addressed by the contents of the register 250.

Figure 4A:
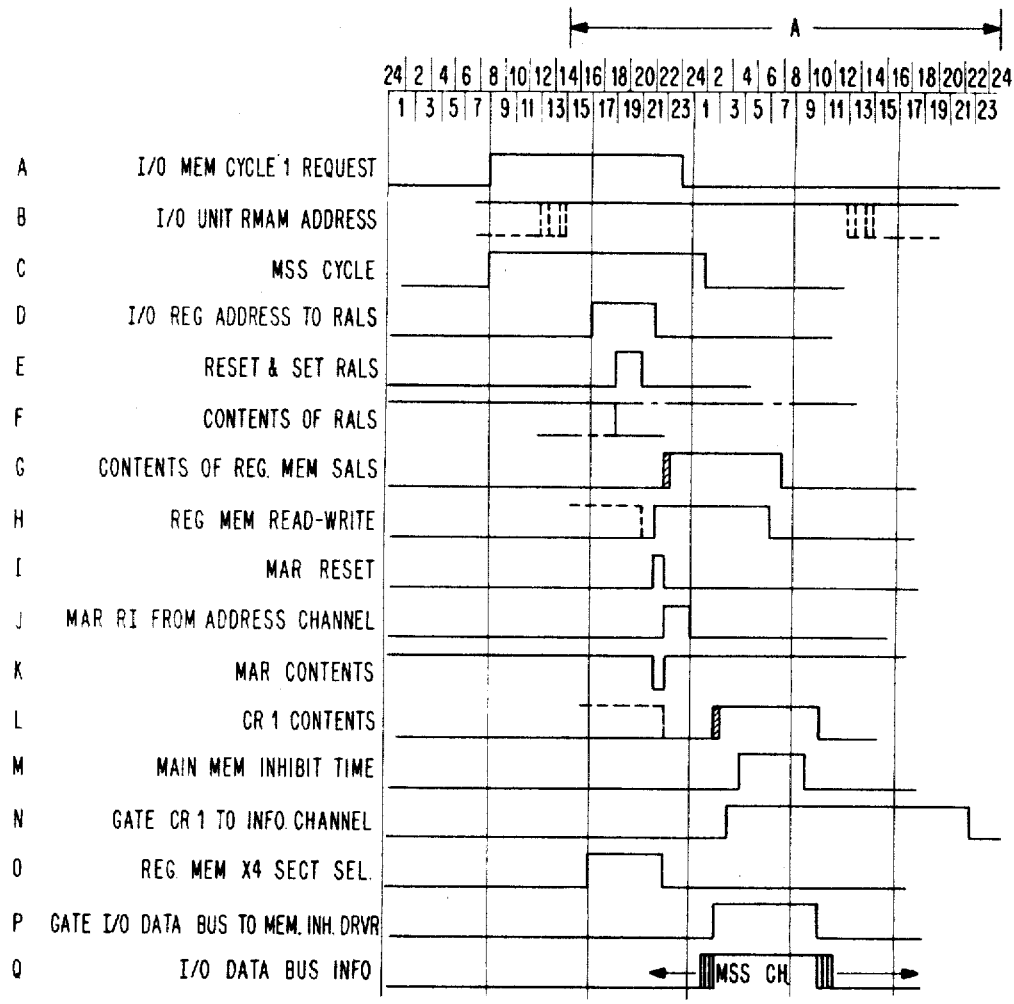
Figure 4B:
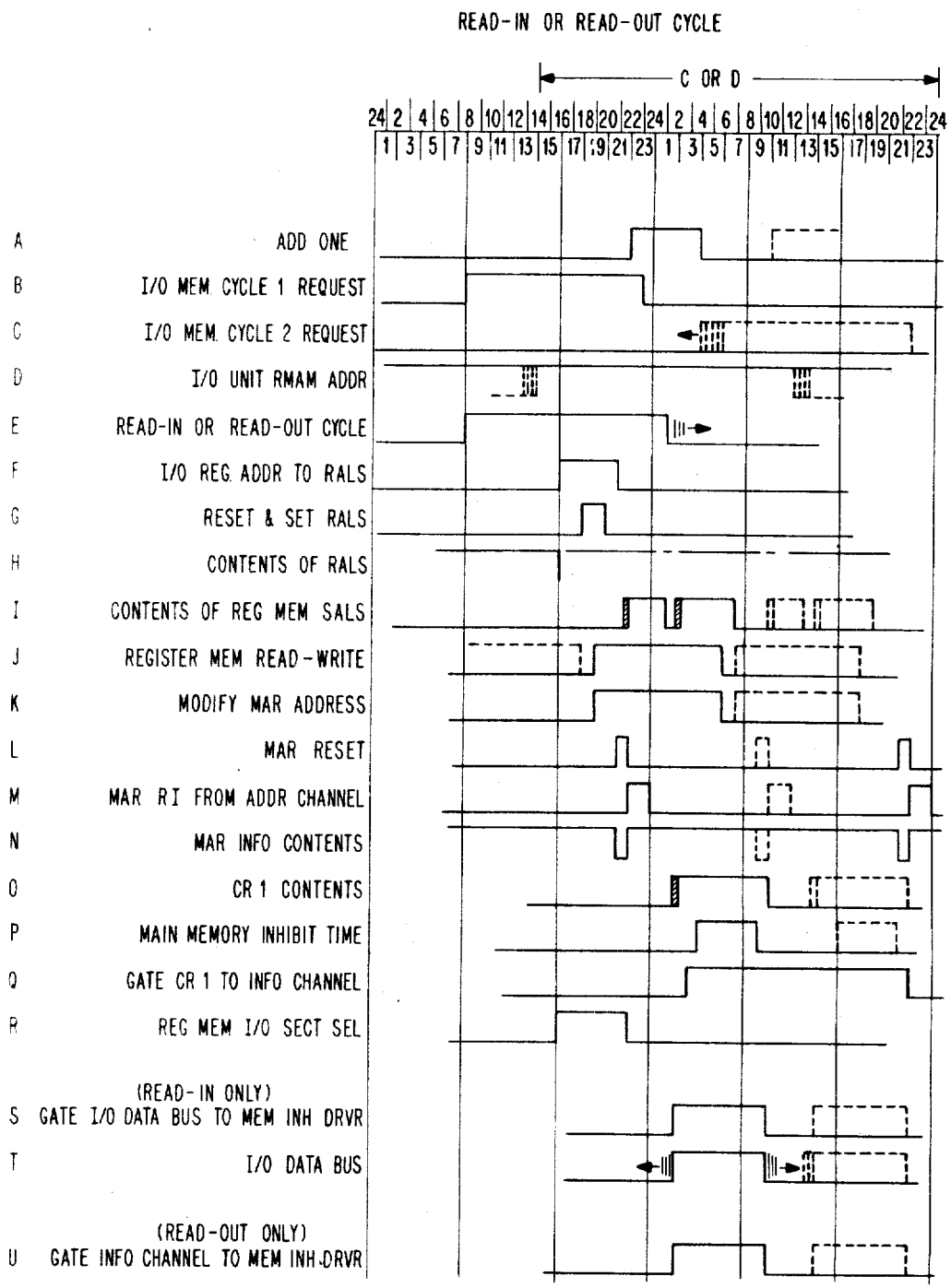

A brief description of an address select operation is shown by timing diagrams in FIGS. 4a and 4b. This address register operation will also be described with reference to FIGS. 3a, 3b, and 3c. FIG. 4a represents the A subcycle of a single memory cycle. The subcycle control signals are generated by the clock shown in FIG. 11. The A subcycle consists of twenty-four timing pulses comprising a plurality of digit timing pulses. Each main memory cycle comprises four subcycles A, B, C and D. During the A subcycle of an I/O operation, the message status symbol of the addressed I/O terminal is compared in the status restore matrix shown in FIG. 25b to determine whether the addressed terminal is asking for a memory cycle and whether it is in condition suitable for transmitting a data character into the RIOT processor main memory. During the B subcycle of the memory cycle, this status compare operation is undertaken. If a data character is to be read in, it occurs during the C subcycle. On the other hand, if data is to be read out from the main memory, it occurs during the D subcycle of the main memory cycle.

Referring again to FIG. 4a, the electronic scanner 18 generates a pair of signals and applies them to the RIOT processor. These signals are shown on lines A and C of FIG. 4a; the first of which is an I/O memory cycle request signal and the second is a message status symbol signal. The first signal indicates that the addressed terminal has an inquiry of the RIOT processor, and the RIOT processor is to reserve its next cycle to answer this inquiry. The second signal indicates what type inquiry the terminal is making. For example, it indicates that the addressed terminal message status symbol is to be inspected because a change has occurred and the RIOT processor should take action on this change.

The electronic scanner 18 is presently addressing one of the plurality of I/O terminals and the scanner also furnishes the same address of this terminal to the register memory address mix circuit 221 over the address bus 51, as shown in FIGS. 1 and 3b. This I/O unit address is shown on line B of FIG. 4a. The I/O terminal address is gated to the register address latches 224 by an enabling signal available at the terminal 230. This enabling signal is shown on line D of FIG. 4a. The current message status symbol is stored in the X4 section 24 of the register memory 22. Therefore during this A subcycle, the current message status symbol associated with the addressed terminal is read out of section 24 by the combined operation of the address furnished to the register address latches and the enabling signal available at terminal 241. Prior to reading out the current message status symbol, the register address latch 224 is reset and set with the current terminal address by the enabling signal on line E of FIG. 4a. Thereafter, as shown on line F, the contents of the register address latches is the address of the I/O terminal unit presently being scanned by the scanner 18. The enabling signal on line H of FIG. 4a indicates when the message status symbol is read out of the X4 section 24 of the register memory 22 and into the register memory SALS 247.

Next, the memory address register 250 is reset by the enabling signal on line I of FIG. 4a and is primed to receive the contents of the SALS 247 by the enabling signal shown on line K of FIG. 4a. The address of the current message status symbol is available at the register memory SALS 247 for the period shown on line G of FIG. 4a. This address is read into the memory address register 250 by the enabling signal shown on line J. Simultaneously, the contents of the addressed location of main memory is read into a first character register 272 during the portion of the subcycle shown on line L. The new message status symbol is available at the I/O data bus 90 during the portion of the A subcycle shown on line Q of FIG. 4a.

While the current message status symbol located in the first character 272 is being gated onto the information channel, as shown on line N, the new message status symbol is gated to the memory inhibit driver circuit 276 by the enabling signal available at the terminal 285. The new message status symbol is written into the same location just vacated by the current message status symbol by the enabling signal shown on line M of FIG. 4a. During the B subcycle the new message status symbol is read out of the main memory but no additional information similar to that shown on line Q is available for reading into main memory. In this manner two message status symbols are available for comparison in a status store and response matrix shown in FIG. 25b. This last mentioned matrix determines which positions of the status symbol are changed and generates a different series of control signals for each new corresponding portion of the status symbol. Assuming for the purpose of this description that the status symbol indicates that the address terminal unit is prepared to read a data character into main memory 20, the timing diagrams shown in FIG. 4b indicate the sequence of signals generated by this status stored and the stored matrix in response to the comparison of the current and new status symbols.

The I/O memory cycle request signal shown on line B of FIG. 4b indicates that the RIOT processor must honor the inquiry made by the address terminal under program control and accept a data character from the data originating terminal. Also the enabling signal which is shown on line E of FIG. 4b indicates whether this is a read-in or read-out inquiry. During the first two subcycles, A and B, the I/O unit address remains available on the bus 51. This address is made available to the register memory address mix 221 by the enabling signal at the terminal 230, as shown on line D of FIG. 4b. The address is set into latches 224, as shown on line H of FIG. 4b. During the C and D subcycles, the I/O section 28 of the register memory 22 is to furnish the current address of the main memory location in which messages are being assembled from this corresponding data terminal. Therefore, the processor selects the section 28 by the enabling symbol on line R of FIG. 4b. The latch circuit 224 is cleared and loaded by the enabling signal shown on line G of FIG. 4b and the register memory is sampled by ne enabling signal shown on line J of FIG. 4b. The memory address register 250 is prepared to receive the contents of the register memory SALS 247 by the enabling signal shown on line K of FIG. 4b. Additionally, the memory address register 250 is cleared by the enabling signal shown on line L of FIG. 4b. The contents of the memory address register 250 are available during the period of time shown on line N. The contents of the register memory SALS 247 are available during the split portion shown on line I. This address is read into the memory address register 250 and is used to locate the next position in the main memory to accept the data character available on the I/O data bus 90. The modification matrix 30 is furnished with an enabling signal during the portion of the subcycle as shown on line A. This enabling signal conditions the modification matrix 30 to increase the address furnished by the memory address register 250 by one. As previously mentioned the modification matrix terminates in the register memory SALS 247 by a sense line bus 280a shown in FIGS. 3a, 3b, and 3c. The enabling signal by which the address is read into the memory address register 250 is shown on line M. The data character is available on the data bus 90 for reading-out of the main memory as shown on line T of FIG. 4b and information is available to read-in as shown in line U of FIG. 4b. The data read-out of the main memory 20 is accomplished by transferring the data character to the first character register 272 by the enabling signal shown on line O. The same data character is read out of the first character register 272 onto the information channel 273 or the data bus 47 by the enabling signal shown on line Q. For those instances when data is read into the main memory the contents of the I/O data bus 90 is gated into an inhibit circuit 276 by the enabling signals shown on line S of FIG. 4b. And finally, the data read into the main memory 20 is actually inserted into main memory by the inhibit time pulse shown in line P.

In summary, subcycles A and B compare the current message status symbol and the new message status symbol in order to determine what actions are required of the RIOT processor. This is determined in the status stored and restored matrix shown in FIG. 25b, which in turn generates the enabling signals shown on FIG. 4b. These enabling signals indicate that a character is read-into main memory or a character read-out of main memory.

The electronic scanner shown in FIGS. 2a and 2b is capable of performing a plurality of different operations. Each operation makes differing demands of the RIOT processor, and these demands are answered with sequence of micro-operations specially generated to meet the distinctive requirements of each operation. The first operation of the electronic scanner 18 occurs when the scanner addresses a data originating terminal and the terminal is in a quiescent condition whereby it neither has information for application to the RIOT processor nor is it ready to accept data from the processor when the processor has information for the addressed terminal. This operation is explained in greater detail with reference to FIG. 20. A second operation of the electronic scanner occurs when the processor indicates to the scanner that it wishes to provide data characters to the certain data terminal or that the processor wishes to determine if a certain terminal has information for reading into the main memory of the RIOT processor. These last two operations are called Force scan operations with a write instruction; i.e., data is written out of the RIOT processor main memory or with a read instruction; i.e., data is to be inserted into the RIOT processor main memory. These operations are explained in greater detail with respect to FIGS. 21 and 22 respectively. An additional operation occurs when a data originating terminal signals the processor that it has data characters it wishes to transfer into the RIOT processor main memory. This is described in greater detail in reference to FIG. 23. Finally, the last operation performed by the electronic scanner 18 occurs when the data originating terminal is to receive an input character from the data processor. This operation is explained in greater detail in reference to FIG. 24.

Again with reference to FIG. 20, a representative scanner operation is shown comprising four subcycles A, B, C, and D. The electronic scanner 18 shown in FIGS. 2a and 2b sequentially scans the message status symbol (MSS) associated with each data originating terminal by its control logic 70. The current MSS is stored in the status and translator select section 67 of the control word memory 49. In this manner, a possible demand by each terminal is inspected and, without any delay, the demand is answered permitting a data flow from the data originating terminal. This represents a standard multiplex mode of operation insofar as the data flow passes from a plurality of data originating terminals to a central source. In particular, the various novel steps furnished by the electronic scanner 18 are now described in greater detail.

Figure 20:
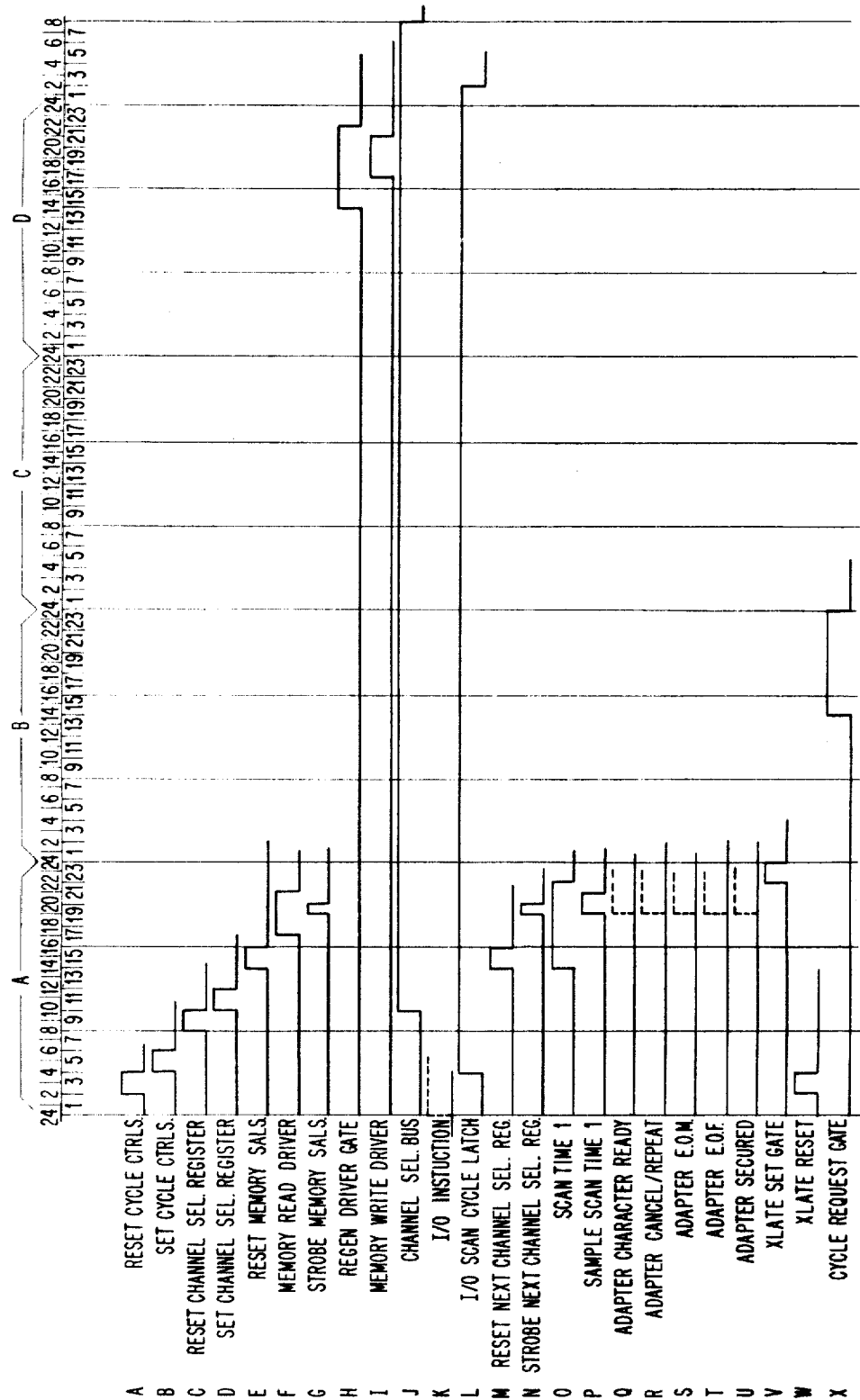

Line A of FIG. 20 indicates that the cycle control portion of the control logic 70 is reset whereby the inspection of the next MSS can begin. Additionally, a reset signal is applied to the translators 72 through 75 by the decode and select circuit 71 as shown on line W. The cycle control signals are furnished a set signal by the control logic 70 as shown on line B in order to perform the next scan cycle as indicated on line L. The enabling signal on line L indicates that a new MSS inspection operation is to follow. The channel select register 57 is reset by the enabling signal shown on line C and is loaded with the contents of the next channel select register 61 by the enabling signal shown on line D. The address furnished by the next channel select register is available on the address bus 51 for the period indicated on line J. The next channel select register 61 furnishes the address of the status word to be inspected. The control logic SALS 68 are reset by the enabling signal shown on line E, and the next channel select register 61 is reset by the enabling signal shown on line M. A scan clock located in the control logic 70 furnishes its ST1 signal as shown on line M. This ST1 signal is applied to the addressed terminal by the scan time bus 97. Simultaneously, the address of the data terminal is furnished by the address bus 51. A memory read driver 282a, FIG. 2b, is enabled by the signal shown on line F whereby the current MSS is read out of the control word memory into the control logic SALS 68. These SALS 68 are sampled by the enabling signal shown on line G whereby the current message status symbol is transferred to the driver circuit 69. Simultaneously, the next channel select register 61 is loaded by the enabling signal applied thereto as shown on line N. In this manner the next channel address section 60 furnishes the next channel address scheduled for inspection to the register 61. The enabling signal shown on line P samples the signal returned from the adapter in response to the ST1 signal for determining if the addressed adapter is to furnish a command signal. If none are available, as is the case in this example, the translator set gate is enabled by the signal shown on line V and the cycle request gate included in the control logic 70 is sampled during the enabling signal shown on line X. Since there is no response to the sampling of the signal shown on line X, the control circuit 70 performs no further action during the subcycle other than regenerating the current MSS back into its storage position in the status section 67 of the command word memory 49. This regeneration is accomplished by the enabling signal shown on line H, whereby the current message status symbol is regenerated into the status section 67 by the regeneration drivers 100. Finally, a write driver 284a, FIG. 2b, is enabled by the signal shown on line I whereby the unaltered MSS status symbol is actually rewritten into the memory magnetic cores. This operation is a typical operation occurring when the addressed adapter has no data for passage between its associated data originating terminal and the RIOT main memory 20.

Figure 9:
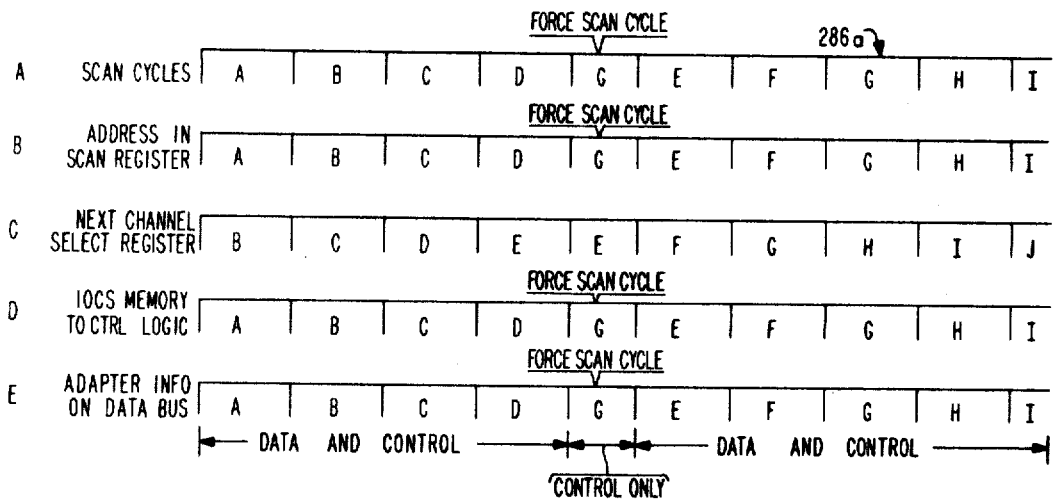
FIG. 9 is a schematic view showing the automatic address recycling operation employed in the instant invention.
Figure 21:
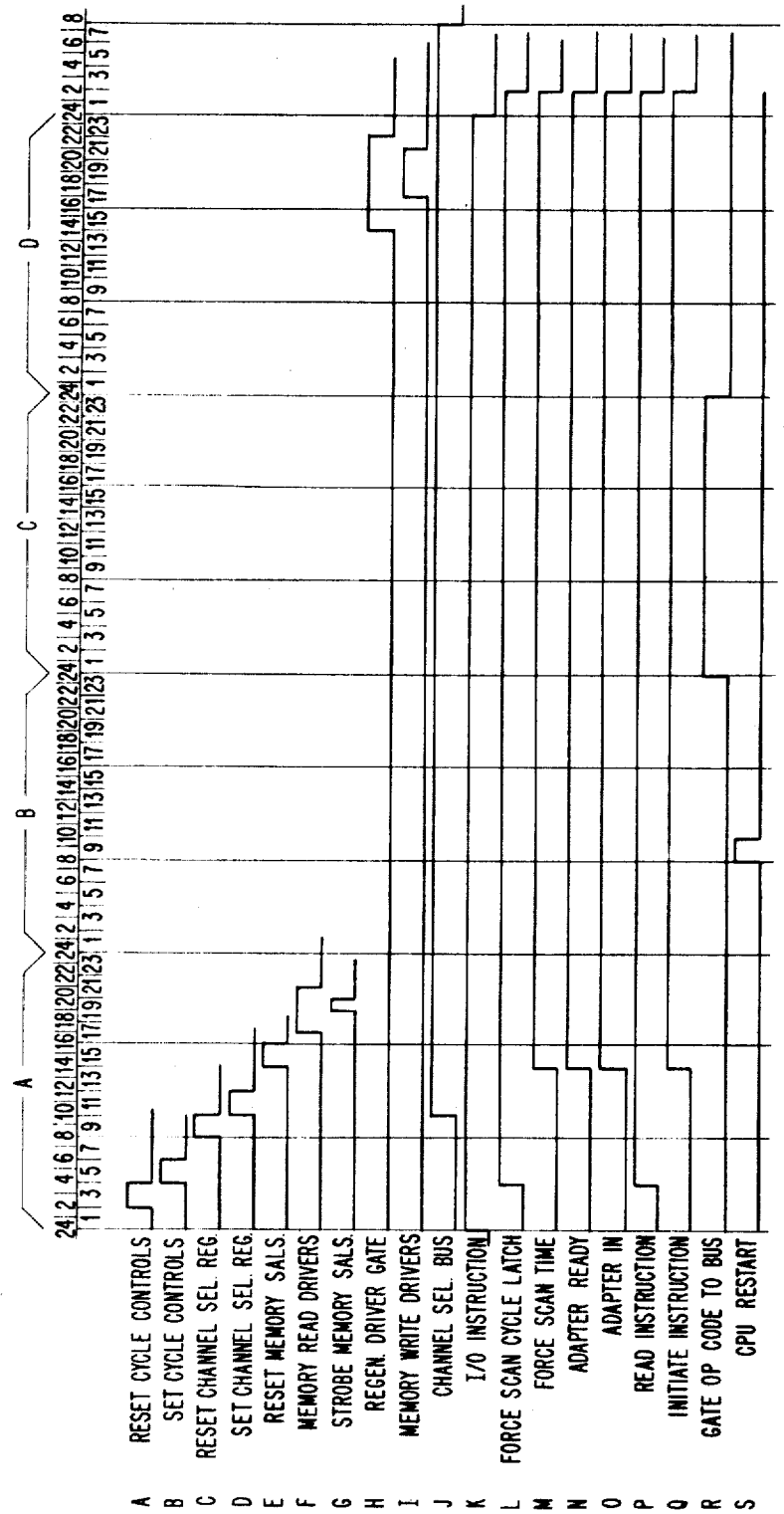
Figure 22:
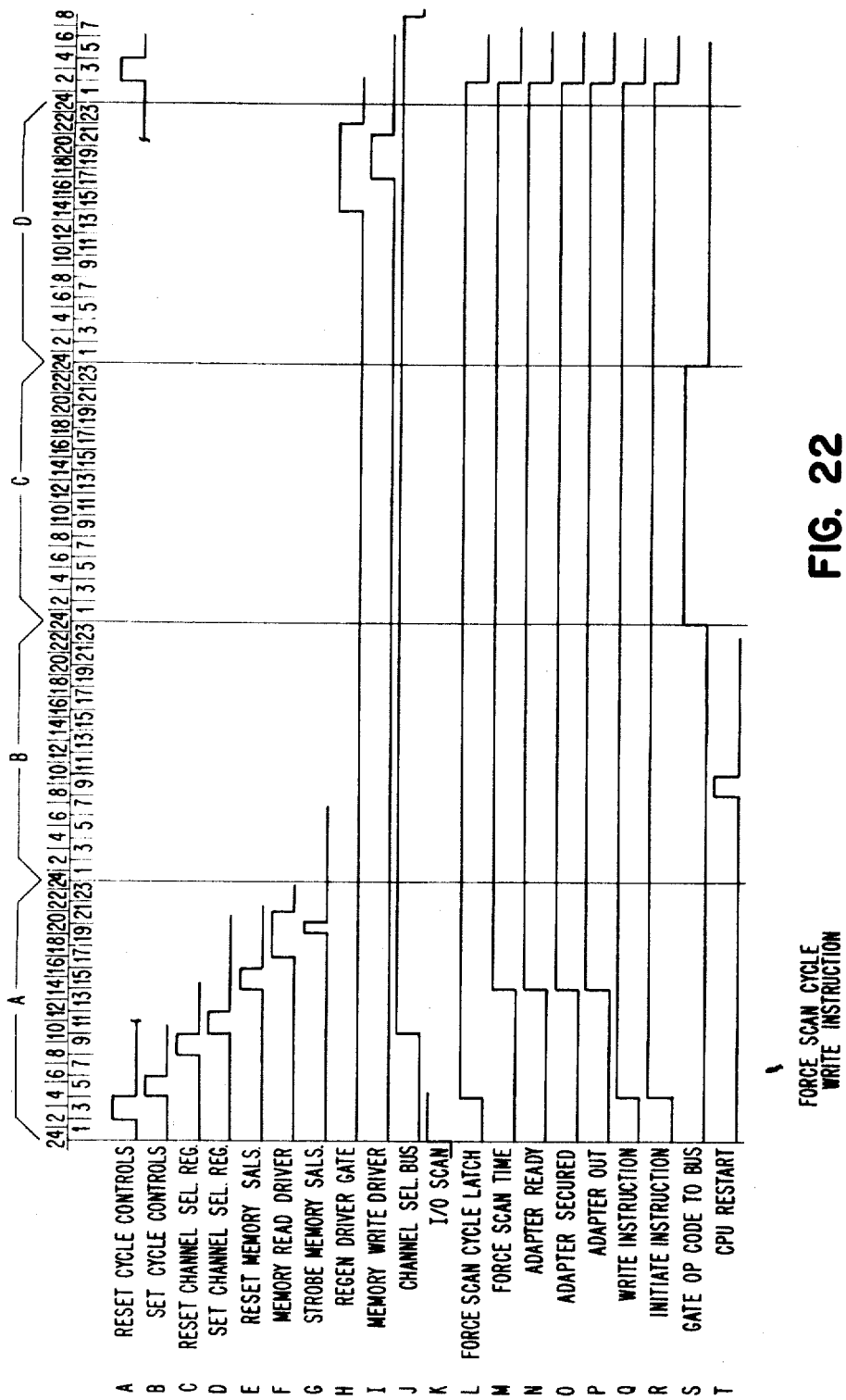

Referring to the FIGS. 9, 21 and 22 there can be seen a typical Force Scan (FS) cycle operation with an additional read or write instruction respectively. FIG. 9 shows the automatic recycling operation of the electronic scanner 18 by indicating an alphabetic addressing sequence. The address G is associated with the data originating terminal 10 shown on FIG. 1. The address H is associated with the data originating terminal 12, and the address I is associated with the data originating terminal 16. The additional addresses A–F are associated with additional terminals not shown in FIG. 1. FIG. 9 indicates that the electronic scanner sequentially addresses each data originating terminal during successive scan cycles as shown in line A of FIG. 9. The current address available in channel select register 57 is shown on line B, while the next channel select register 61 contains the next successive address as shown in line C. Line D indicates that the MSS associated with the current address is available in the control logic SALS 68. Line E indicates that if the addressed adapter has information available, it is available on adapter bus 76, FIG. 2a, during the current scan cycle.

The sequential addressing of the electronic scanner 18 continues until the computer causes a FS cycle to be generated by issuing an operation code. This FS cycle momentarily interrupts the sequential advancement of the scanner address operation by furnishing a new address on the address bus 50, FIG. 2b. This FS cycle pre-empts the normal address operation and selects the MSS associated with the address furnished by the FS cycle. This MSS is transferred to the control logic wherein it is modified. The now altered MSS is regenerated into the status section 67 where it is available during the normal address recycling operation as indicated by the numeral 286a.

FIGS. 21 and 22 are identical except for those wave forms which are particularly set out hereinafter. A FS with a read instruction begins with an I/O instruction read-out to the OP decode matrix 32 shown in FIG. 1. This instruction is represented on line K of FIG. 21 and is the signal which generates the remaining enabling signals throughout the next four subcycles A, B, C and D. The MIGC 37 translates each I/O operation code signal into the series of enabling signals shown in FIGS. 20 through 24. The cycle control circuit located in a control logic 70 is reset by the enabling signal shown on line A of FIG. 21. This reset signal clears the control circuits from the last previous operation and prepares them to perform the next operation as signified by the set signal shown on line B. Simultaneously, the FS signal is generated by the OP decode matrix 32 and is applied to the electronic scanner over the data bus 47. The FS signal is read into the control logic 70 by the AND gates 78a through 78h and operates to pre-empt the normal recycling of the electronic scanner 18. This FS signal is shown on line L of FIG. 21. Along with the FS signal, the computer transfers the read instruction signal by the data bus 47 and the AND gates 94a through 94h to the control logic 70 to set the corresponding latches within the control logic 70. The read instruction is shown in line P of FIG. 21.

The normal recycling of the electronic scanner is interrupted by a channel select reset signal shown on line C. This reset signal clears the channel select register 57 of its prior contents and prepares it to receive an address from the processor by the address bus 50, the AND gates 64 and the OR gates 63, FIG. 2b. This last mentioned address is gated into the channel select register 57 by the enabling signal shown on line D. Graphically, this interruption is shown in FIG. 9 as the FS signal G appearing between the normally scheduled cycles D and E. The address furnished by the processor is set into the channel select register 57 and appears on the address bus 51 by an address driver circuit 288a. Additionally, this address is applied in the normal manner to the numerical address gates 58 and the zone address gates 59. The availability of the new address is indicated on line J of FIG. 21. An enabling signal is shown on line F for clearing the control logic SALS 68. In response to the FS signal shown on line L, the Force Scan Time (FST) signal is generated by the control logic 70 as shown on line M. This FST signal is transmitted to the adapter as described with respect to FIG. 8. The adapter may furnish any one of a plurality of signals shown on lines N, O and Q of FIG. 21. The signal on line N indicates that the adapter is ready for a data transfer. The signal on line Q indicates that the adapter is ready to perform the indicated instruction. These last mentioned signals originate in the adapter in response to the FST signal and comprise a partial source from which an MSS is generated. These signals are transmitted to the control logic 70 by the individual bit lines shown in FIG. 8 and by the AND gates 78a through 78h. The last mentioned signals alter the current MSS stored in the status section 67 of the command word memory. The details of this alteration are given hereinafter, but at this time it is sufficient that the current status symbol is altered at least to the extent that it now indicates the availability of the addressed adapter to process data to the RIOT processor main memory.

A CPU restart signal generated by the control logic circuit 70 is shown on line S. This signal causes synchronization between the scanner and the processor. The actual generation of the new MSS occurs in subcycle C within the control logic 70 and is not shown in FIG. 21. However the up-dated MSS is gated to the data bus 90 for transfer to the RIOT processor as shown on line R. The remaining function of the scanner is to insert the up-dated message status symbol into the location just vacated by the current MSS and this is done by the enabling signal shown on line H of FIG. 21 which gates the MSS from the control logic 70 to the regeneration drivers 100 by the bus 101. The enabling signal shown on line I inserts the contents of the regeneration drivers 100 into the status section 67.

In review, the FS operation interrupts the normal sequential operation of the scanner 18 in order to up-date the message status symbol of an addressed terminal to indicate a future data transfer operation. With the up-dated MSS in the status section 67, a data character can be transferred during the next sequential addressing of this terminal. In practice however, command signals from the processor are stored in the control word memory until the addressed terminal returns a READY signal by its associated adapter, line B, FIG. 6. The generation of this READY signal takes many cycles of the scanner 18, since the scanner is many times faster than the addressed adapter.

FIG. 22 shows the enabling signals generated in response to an I/O code designating a Force Scan operation with a write instruction. The signals on lines O, P and Q of FIG. 21 have been replaced by the signals on lines P, Q and R of FIG. 22. The difference between a read and write instruction should be clear to those skilled in the art and therefore a complete description of a write instruction is not given.

The description given with reference to FIGS. 23 and 24 indicate the sequence of signals which controls the transfer of a data character between an addressed terminal; e.g., 10 and the RIOT processor main memory 20. With reference to FIG. 9, the FS cycle operation has been described with reference to the terminal unit indicated by G. The MSS signal associated with this terminal was up-dated to indicate that the RIOT processor has a data character available for transfer to the terminal G. This up-dated MSS is left in storage and is available when the terminal G is addressed during the normal addressing indicated by the numeral 286a. At this time the up-dated message status symbol is inspected and an I/O transfer operation occurs.

The entire operation is controlled by the transferring of an I/O OP code signal from the OP decode matrix 32 shown in FIG. 1. The OP decode matrix 32 furnishes the signal shown on line K of FIG. 23. The reset cycle control enabling signal shown on line A clears the control logic circuit from the last previously mentioned operation and the translate reset signal shown on line X clears the decode and select circuit 71 so that no translators are activated. The set cycle control enabling signal shown on line B activates the control logic 70 whereby it is prepared to perform the next message status cycle inspection operation. The I/O scan cycle latch in the control logic 70 is activated to produce the scan time signals. The operation of this latch is shown on line L of FIG. 23. The channel select register 57 is cleared by the enabling signal shown on line C whereby the last previously addressed terminal is unloaded from this register. The channel select register 57 is loaded with the contents of the next channel select register 61 by the enabling signal applied by the terminal 66, and shown on line D. By this last mentioned gating operation, the address of the next terminal is available to the address gates 58 and 59 and the address driver 288a. The address driver 288a alerts the addressed terminal unit so it can furnish data. The gates 58 and 59 address the status section 67 for reading out the up-dated MSS into the SALS 68. Prior to reading out the MSS, the SALS 68 are reset by the enabling signal shown on line E. Additionally, the next channel select register is reset by the enabling signal shown on line M and the scan time control circuit logic 70 generates a ST1 signal for transmission to the addressed adapted over the scan time bus 97. This ST1 signal is shown on line O of FIG. 23. The read out of the MSS is controlled by the read driver enabling signal shown on line F. The MSS is read into the SALS by this last mentioned enabling signal. The SALS 68 are interrogated by the enabling signal shown on line G which operates to transfer the MSS into the driver circuit 69. The address is actually made available to the address bus 51 by the enabling signal shown on line N. The ST1 signal is sampled by the enabling signal shown on line P and thereafter is transferred to the addressed adapter by the scan time bus 97. It is during this ST1 that the return signals from the address adapter are received as shown on lines Q, R, S, T and U. These return signals indicate different modes of operation of the addressed terminal.

For the purpose of this description, it is only the channel ready signal shown on line Q that is transferred to the control logic 70 by the data bus 76 and it is associated with AND gates 78. The remaining signals are handled in a similar manner which is described in greater detail with respect to FIGS. 6 and 7. In response to this adapter ready signal of the current MSS, an output cycle enabling signal is generated by the control logic 70 as shown on line DD. The translate select section 67 of the control word memory 49 is read out simultaneously with the MSS and is applied to the decode and select circuit 71 by the driver circuit 69. This section selects one of the translators 72 through 75 to operate with the addressed terminal. As previously mentioned, the teletype data originating terminal 10 is the terminal selected to transmit data. Therefore, the translator array 72 is selected by the translate select enabling signal shown on line V. Since the addressed terminal unit has a character ready signal as shown on line Q and the message status signals indicate that the terminal 10 has a data character for transmission to the RIOT processor, a ST2 signal, shown on line AA is transmitted to the addressed terminal. The control logic circuit 70 generates a cycle request signal shown on line EE and transmits this signal to the processor by the control bus 92. The processor uses this cycle reset signal to initiate an I/O interrupt operation whereby the respective data character is transferred to the RIOT processor main memory in the manner described with reference to FIGS. 4a and 4b. The driver circuit 84 is activated by the enabling signal shown on line W and operates to supply the teletype coded signal to the activated teletype translator 72. The translated data character is formed in the sense amplifier latches 85, whereby it is subsequently gated by the data bus driver circuit 89 onto the data bus 90. After this translation operation, the selected translator 72 is reset by the enabling signal shown on line X, and the SALS 85 are sampled by the enabling signal shown on line Y. The translator data signal is transferred to the bus 90 during the time shown on line Z of FIG. 23.

Once the data character is transferred to the RIOT processor main memory, the ST6 signal, shown on line CC, is transferred to the addressed adapter to perform its previously described operation of resetting the character ready trigger 128 shown in FIG. 5a. The last operation required of the electronic scanner is to preserve the current MSS for use during the next successive interrogation of the same control current. This is accomplished by gating the MSS and the associated translator coded signals from the control logic 70 of the decode and select circuit 71 respectively to the regeneration driver circuit 100 as shown on line H. Thereafter the contents of the driver circuits 100 are inserted into the same address location by the enabling signals shown on line I.

In summary, the data character has been transferred to the RIOT processor main memory 20 and MSS controlling this operation has been returned to its respective location in the control word memory 49 for reuse. This MSS is reused each time the scanner 18 addresses the corresponding control word according to the normal address recycling operation performed by the scanner 18. Additionally, the MSS can be altered to stop a data transfer operation during a FS signal in a similar manner as previously described.

A write operation is shown with reference to FIG. 24 and is substantially identical with the operation previously described with reference to FIG. 23 except with reference to lines W, X, Y and Z shown in FIG. 23 and lines W, X, Y and Z of FIG. 24. During the write operation shown in FIG. 24, the data character is furnished by the processor to the data bus drivers 89 by the data bus 76 and the driver 86. After a translator is selected in the manner previously described, the machine coded data character is read into the translator 72. Once this machine code is translated, it is transferred to its addressed adapter by the data busses 90 and 46. The addressed adapter accepts this data character and sends it out over its transmission line 177 as shown in FIG. 5b.

Referring to FIGS. 25a, 25b, 25c, and 25d, there is shown in block diagram of the data processing section of the RIOT processor. The data is in the form of addresses furnished by the address section of the RIOT processor shown in FIGS. 3a, 3b, and 3c, and the data is also in the form of alphanumeric characters furnished by the main memory 20. The connecting link between these major sections of the RIOT processor is the address channel 248 and the data output channel 274, described briefly with reference to FIG. 3c.

The address channel 248 is properly described in greater detail as a mix circuit similar to the register memory address mix 221 shown in FIG. 3b. More specifically, the address channel 248 is constructed to handle simultaneously thirty-two bits of information divided into four groups. Each bit position of the address channel comprises four two-way AND circuits 226a, 228a, 229a and 220a, connected to a four-way OR circuit 223a having an output signal which is connected to each bit position of the address channel 248. The remaining input to each two-way AND gate consists of the gating signal used to switch corresponding groups from one source to another. The complete address channel mix consists of thirty-two of the switch-mix circuits 222a just described. The gating signal employed for directing a specific address of thirty-two bits onto the memory address channel is common to each address bit.

The circuits which direct address characters onto the address channel include the register memory SALS 247 shown in FIG. 3a, the address channel display register (ACDR) 34 shown in FIGS. 1 and 25d, and a pair of shift registers 300 and 302 shown in FIGS. 25c and 25d.

On electronic command, the following circuits may read, at the same or different times, information on the memory address channel 248 into their circuitry: the first shift register 300, the second shift register 302, the ACDR 34, shown in FIGS. 1 and 25d, the memory address register 250, and a register memory information driver circuit 249 shown in FIG. 3a. The memory address register 250 is of standard design. Its input circuits allow only the setting of its bit positions from corresponding bit positions of the memory address channel 248. It accepts only the numeric bits from the units, tens, and hundreds positions of the memory address channel 248 and all eight bit positions from the address channel thousands position. Zone bits in the units, tens, and hundreds positions of the address channel are never entered into the memory address register. These zone bits positions are reserved for tag functions as described hereinafter. The registers 34, 300 and 302 are more complicated registers which also, by electronic gating techniques, may read in address information present on the address channel 248 at any time. Information is likewise entered into these registers from the address channel in parallel. It should be noted that information can be entered simultaneously from the address channel into any or all of these registers whenever desired or necessary.

Equipment in the arithmetic hardware section of the RIOT processor consists of all those component circuits which operate on, and/or change the structure or value of information which is handled in the form of data for addresses. Three major subdivisions will be considered in the groups of hardware blocks which form arithmetic hardware of the RIOT processor; namely, a plurality of serial by character data channels, a control circuit, a group of functional matrices which operate on the data characters, and the electronic control circuits associated with the functional matrices.

Within the serial by character data channels there are a plurality of individual eight-bit data channels provided for transferring information within the arithmetic section of the processor. Information is transmitted serially by character and parallel by bit over these data channels. The information channel 257 links the information channel mix 306 to a second character register 308 by a second character register mix 310 and is connected to a pair of channel drivers 312 and 314 by a channel 1–2 mix 316. Additionally, the information channel 257 is connected to the register memory address register 225 and the memory inhibit drivers 276 shown in FIG. 3b. Character information is entered into the information channel 257 by gating actions of the information channel mix 306. The eight-bit outputs of this last mentioned mix actually form the eight-bit lines of the information channel 257. The information channel mix is similar in construction to the memory address channel mix described hereinbefore. Each bit line of the information channel is connected to a plurality of sources by control signals which selectively gate information from one of these sources onto the corresponding bit line of the information channel. The first of these sources is the thousands position of the address channel display register 34, which position is connected to the mix 306 by the ACDR channel 318; the second of these sources is the eight bits comprising the character in the first character register 272 shown in FIG. 3c, which character is applied to the mix 306 by the output channel 274; and finally, the single character contents of the second character register 308.

The information channel 257 serves as a data source for several data handling devices in the arithmetic hardware section and additionally it serves as part of the data path in the regeneration loop between the first character register and the main memory inhibit drivers 276, shown in FIG. 3b, which act to enter characters into the main memory 20 during write time. All data characters read from the RIOT main memory 20 which are not to be replaced with new information are directed from the first character register 272 and then to the information channel mix 306 by the output channel 274 and onto the information channel 257. Finally, these data characters are applied by the information channel 257 to the main memory inhibit drivers 276 for regeneration into the same position in main memory 20 from which they were read. This is the standard regeneration loop employed by the RIOT processor to reinsert a character of information back into its main memory 20 for future use. During all read operations concerning the main memory 20 which furnishes a character for use within the RIOT processor, the accessed character is first transferred to the first character register 272 and then the character appears for gating onto the information channel 257 from the time the information character is set into the first character register until the end of the main memory write time. This data character may then be gated into or through any of the information character handling devices which use the information channel 257 as a source of their data. If this character information is to be regenerated into main memory position from which it came, the main memory inhibit mix 275 control gate is activated by the enabling signal available on the terminal 284 thereby allowing the memory inhibit drivers to read this character back into memory. However, if another source of information is to furnish a data character for insertion into the vacated position in main memory, this character is selected by gating techniques within the main memory inhibit mix 275.

The register memory address register 225 shown in greater detail in FIG. 3b, receives a character of information from the information channel 257. This character of information read from the information channel 257 into the register memory address register 225 represents an address in the register memory 22 and demonstrates the accessibility of the contents of the register memory by the RIOT processor. More specifically, the contents of the information channel 257 are read from the main memory 20 under program control for interrogating the addressed location in the register memory 22, and for reading out the contents of the addressed location into the address channel 248. Therefore, whenever the contents of a register memory section must be accessed by the processor, under program control, a pathway is available in the information channel 257.

Whenever the contents of a location in the register memory is to be changed under program control, the address of this location is transferred for temporary storage into the register memory address register 225 and held therein while the new information is assembled in the first shift register 300. Upon the completion of this assembling operation, requiring four memory accesses, the contents of the shift register 300 is transferred to the register memory information driver circuit 304 for insertion into the register memory location addressed by the contents of the register 225. This demonstrates the accessibility of the contents of each location in the register memory 22 to the contents of the main memory 20.

The second character register 308 has a storage capacity for one full character or information which can be directed to it by gating controls connected to two sources. The first of these sources, as previously mentioned is the information channel 257, and the second source is the eight bit output signal of the units position of the second shift register 302, which position is connected to the character register 308 by a shift register two channel 320b. The second character register 308 has a single reset control gate, not shown, which is normally activated just prior to the read-in of new information into the register causing the dumping of the contents in the register and enabling the read-in of new information.

The contents of the units position of the second shift register (SR–2) 302 is available to the information channel mix 306 and a channel three-four mix 322 by the SR–2 channel 320b and 320c respectively. The channel three-four mix 322 is similar in design to the memory address channel mix previously described.

The second character register 308 is employed as interim storage during RIOT processing operation. This storage may take the form of one or two characters which are to be combined by arithmetic operation. Since the second character register 308 has a storage capacity of only one character, its functioning as a storage unit for two characters stems from its use with two separate memory cycles. An arithmetic operation requires the simultaneous availability of the two characters to be combined. The second character register 308 provides a single character temporary storage location where the first of the two characters may be held until the second is read out of the main memory 20. The character held in the second character register 308 is applied to the channel three-four mix 322 while the second character read from main memory is applied to the channel one-two mix 316 by the output channel 274, the information channel mix 306 and the information channel 257.

The final group of circuitry using the information channel 257 as a source of information is the channel one-two mix 316. The output of this mix serves as the information inputs to two of the three sets of drivers which control the operations and enter information into a plurality of functional matrices 323–331 respectively. The mix 316 provides for selective gating of one data character from one of four sets of eight bit serial character channels to the inputs of these drivers. In addition to the information channel 257, the other sources of information to the mix 316 come from the units position of the first shift register 300, by a shift register channel 333a, a second source comes from the units position of the second shift register 302 by the shift register channel 320a and finally the last information character comes from a digit generator 335.

The digit generator 335 is provided to allow formation of coded characters needed during specific arithmetic operations performed by the RIOT processor. The formation and designation of the characters to be used is hardware controlled and not a direct function of the computer program. For the present description, the digit generator 335 need only generate the 4 out of 8 machine coded formats equal to the values 0 and 1.

A serial channel 337 connects the units position of the shift registers 300 and 302 to the output of a serial channel input mix 339. This data path provides a facility for entry of information contained in the shift registers 300 and 302 into the arithmetic handling matrices 329 and 330 and provides for arithmetic operations on the character contents of these registers. Additionally, the contents of the units position of the shift registers 300 and 302 have access to the mix 322 by the channels 333b and 320b respectively. The output of the channel three-four mix 322 is applied to a channel three-four driver circuit 340. The channel 3–4 driver 340 is the last of the three driver circuits which operate on the functional matrices 323–331 provided in the RIOT processor. For arithmetic operations involving the combination of two characters to form a result, both characters are entered into the functional matrices simultaneously; one through either the channel one or channel two drivers 312 and 314 respectively and the other through the operation of the channel three-four driver circuit 340. Since each of the shift registers 300 and 302 are each provided with entries to both the channel 1 and channel 2 drivers 312 and 314 and the channel three-four driver circuit 340, provisions are thus made for arithmetically handling their contents through the functional matrices 323–331.

The mix 322 has four groups of input signals, each group representing a single data character. The first of these characters is applied to the mix 322 from the second character register 308. The second data character is applied to the mix 322 from the shift register two channel 320c, the third data character is applied to the mix 322 from the output channel 274 and the fourth data character is applied to the mix 322 from the first shift register 300 by the channel 333b. An additional OR'd entry is provided from a second digit generator 341 to the input of the channel three-four driver circuit 340. The digit generator 341 is similar in design to that of the digit generator 335 except it is not gated through the mix 322. Additionally, activation of its generation controls causes the corresponding generated character to appear directly at the channel three-four drivers.

The output of the mix 322 also serves as an input to a true-complement carry, no-carry analysis circuit 342 which provides control of ADD operations as completely described hereinafter with reference to FIG. 30.

The serial channel 337 forms part of the data handling channels in the arithmetic section of the RIOT processor. This channel is formed by the eight bit outputs of the serial channel input mix 339 and provides character information which can be serially entered into either the thousands or units positions of either or both the first shift register 300 or the second shift register 302. The mix 339 receives data characters from two sources; the first of which is furnished from the first character register 272 by the output channel 274 and the second of which is furnished by an arithmetic channel 280. Either source of information is connected to the mix 339 by gating signals available at the terminals 339b and 339a respectively. The arithmetic channel 280 is actually formed by the status outputs of the eight arithmetic SALS comprising the sensing circuits for the functional matrices 323–331. All functional matrix operations which result in a four out of eight bit character (ADD, EDIT, HOLLERITH and ENCODE) causes the corresponding character thus formed to be set into the arithmetic SALS 348. This output character is thus made available to the arithmetic channel 280 from which it may be gated through the mix 339 to be entered into one of the shift registers 300 and 302 and/or selected as the input to the memory inhibit drivers 276 by the main memory inhibit mix 275 for entry into an addressed location in the main memory 20.

Referring to FIG. 26, there can be seen a schematic view of the registers 34, 300 and 302. Each of these registers is constructed of a number of standard gated triggers shown in greater detail in FIG. 27. One gated trigger is required for each bit comprising each of the four characters which can be stored and handled in each of these registers. Therefore, each of these registers is constructed from thirty-two gated trigger positions arranged in eight groups of four positions. Each group, one of which is identified as 350, is used for storing the corresponding bit position of each of the four address characters simultaneously stored in these registers. A complete character is represented by a horizontal line across all positions, while a group is represented by a vertical line of positions.

Since one of the objects of the instant invention was to provide an improved addressing tecehnique and corresponding circuits, the decimal mapping of main memory address was adapted. Therefore, it is appropriate that the bit positions of each group are identified as the units, tens, hundreds and thousands positions respectively.

During register shifting operations, the groups of bits are handled in parallel. Shifting operations in the registers can be considered as eight, four position single bit per position registers. All eight of these shifting registers are synchronized in such a way that the corresponding positions of each of the eight registers maintain their vertical position with respect to one another. As a character is shifted through one of the shift registers, it advances from one position to the next in a serial by character and parallel by bit manner. As viewed with respect to FIG. 26, this is a vertically oriented motion, either up or down.

Referring again to FIGS. 25c and 25d, a shifting from the units position of the first shift register 300 onto the serial channel 337 corresponds to a down vertical shift with respect to FIG. 26, and a shifting right from the thousands position of the first shift register 300 onto the channel 333 corresponds to an up vertical shift with respect to FIG. 26. A regeneration shift operation can be made from the units position of the shift register to the thousands position by a regeneration channel 351. Additionally, identical shifting operations can be accomplished with respect to the second shift register 302 and its respective connections with the serial channel 337 and the channel 351a. Also all thirty-two positions can be simultaneously loaded or dumped from and onto the address channel by standard selective gating techniques.

The address channel display register 34 is equipped with a regeneration channel 318a whereby the units position is shifted into the thousands position. Additionally, the thousands position of the register 34 is loaded from the decode channel 35 and the output channel 274. The register 34 is also equipped to accept or transfer a four character address from and onto the address channel 248.

Each gated trigger circuit in these registers requires a combination of control signals to perform all the above enumerated data shift functions. Generally, the first of these control signals is called the gate signal. This gate signal acts to direct the flow of information into the shift register and simultaneously selects the source of information from which the register is to be loaded. The second of these two control signals is the set pulse. This pulse causes information, selected and directed by the gate, to be read into the shift register at the time this set pulse first appears. The set pulse is therefore the timing control for the setting of the register with new information. However, unless one gate signal is present at the time the set pulse occurs, no change in the contents of the register occurs. All gated operations carried on in the shift registers are read-in operations. Serial shifting and parallel read-in operations differ from one another only in that they receive information from different sources. In reading parallel address information from the memory address channel 248, all thirty-two bit positions of the shift register are connected, under control of the shift register parallel read-in gate signal to the corresponding bit positions of the address channel.

FIG. 28 shows a more detailed block diagram of one group of gated triggers employed in the registers 34, 300 and 302. Although only one group is shown, the gating signals and the set pulse signals are associated with each group of positions in these registers. The schematic diagram of a representative gated trigger 353 is shown in FIG. 27 and includes a pair of terminals 352 and 354. The terminal 352 is connected to the output of an OR "on" gate 356 in FIG. 28, and the terminal 354 is connected to the output of an OR "off" gate 357 shown in FIG. 28. The remaining significant terminals of the gated trigger comprise a pair of "on" and "off" terminals 358 and 359 respectively. The interconnection of the remaining circuitry of the gated trigger is standard and need not be given in detail.

The corresponding portion of the address channel 248 is shown comprising four bit lines 360 through 363. Each trigger is connected to a corresponding bit line by an AND gate 364. The AND gate 364 of each gated trigger in the shift register is connected in parallel to a terminal 365. An input enabling signal is applied to the terminal 365 whenever the shift register is to be loaded by a thirty-two bit address from the address channel 248.

Each gated trigger 353 is equipped with a pair of output terminals 358 and 359. The terminal 358 furnishes an enabling output signal whenever the trigger is in the "on" condition and the terminal 359 furnishes an enabling output signal when the trigger is in the "off" condition. For purposes of clarity, the pair of terminals are shown twice for each bit position of FIG. 28. The pair of terminals are shown on the upper portion of each trigger and the same set of terminals is shown extending from the lower portion of each trigger. The use of two sets of terminals to represent a single pair of terminals is to provide a clearer showing of the interconnection by the adjacent triggers to represent the two directions in which the contents of each trigger can be shifted.

An output line 365a is connected to the terminal 358 in each of the gated triggers in the shift register. Additionally, each of the output lines 365a is connected to a plurality of AND gates 366. Each of the AND gates is equipped with a second enabling signal applied thereto in parallel from a terminal 366a whenever information is to be shifted out of each position. An enabling signal applied to the terminal 366a effects the total dumping of the contents of the shift register. Additionally, the output terminal 358 is also connected to an AND gate 367 of the next adjacent bit position. The AND gates 367 located in the hundreds, tens, units position of the shift register are equipped with a second input enabling signal from a terminal 368 whenever it is desirable to shift the contents of the previous trigger stage into these last mentioned positions. The AND gate 367 associated with the thousands position of the register is equipped with a second input enabling signal from the terminal 369 whenever the contents of the units position of the shift register is to be regenerated into the thousands position of the same shift register.

The serial channel 337 is shown comprising a pair of bit lines 370 and 371. These bit lines are the only corresponding portion of a serial channel 337 associated with the group 350 and represents the true and complement signals of each bit of information carried by the serial channel 337. The corresponding bit associated with the serial channel 337 is applied to the thousands position of the shift register in a true and complement manner by means of a pair of AND gates 372 and 373 respectively. The complement portion of the associated bit on the serial channel is applied to the units position of the shift register by means of a pair of AND gates 374 and 375. The AND gates 372 and 373 are associated with a common input enabling signal furnished at the terminal 376 whenever data is to be serially read into the thousands position of the shift register from the serial channel 337. The AND gates 374 and 375 are equipped with a common enabling signal by a terminal 377 whenever data is to be shifted into the units position of the shift register from the serial channel 337. Each intermediate gated trigger is similarly equipped except that its corresponding AND gates receive input signals from the output terminal of the adjacent trigger position and receive enabling signals corresponding to the direction in which the information is to be shifted. For example, for shifting information from the units position towards the thousands position, an enabling input signal is furnished by the terminal 378. When information is to be shifted from the thousands position to the units position, an enabling signal is furnished by the terminal 368. Finally each trigger circuit 353 is equipped with a reset gate 377a whereby the contents of the shift register can be cleared prior to the loading of new information.

A four character address can be loaded into the shift registers 300 and 302 from the address channel 248 by the AND gates 364 associated with each of the triggers 353. A four character address can be unloaded from the shift registers 300 and 302 by the AND gates 366 associated with each of the triggers 353. In addition to these last mentioned parallel read-in and parallel read-out capabilities of the registers 300 and 302, these registers are capable of shifting information in their register position, character by character, either right or left. As this shiftig operation is performed, all characters stored in the :gister are shifted simultaneously either left or right depending upon the direction of the shift. Each shift operation shifts the number contained in the register one position left or right. For example, to shift a character originally located in the units position into the hundreds position requires two left shift cycles. During the first shift peration, the units, ten and hundreds position of the register simultaneously transfer their contents to the tens, undreds and thousands position respectively. The thousands position is shifted left out of the high order position of the register and is lost. The units position of the :gister is equipped with complemented AND gates 374 nd 375 from the serial channel 337. When the SERIAL .EAD-IN LEFT enabling signal at terminal 377 is available, a character of information on this serial channel is ad into the units position of each group in the shift :gister. When the gates 374 and 375 are not enabled but 1e ADVANCE LEFT enabling signal is available at the :rminal 378, the units position of the shift register retains its old information in addition to shifting this character into the tens position. The ACRR register 34 differs om the registers 300 and 302 in that only left shifting , provided.

Right shifting is available to the registers 300 and 302 y the enabling signal available at the terminal 368. This /pe shifting is used in these registers to serialize the con:nts of these registers. Information presented to the serial hannel 337 and the regeneration channel 351a is identical ɔ and is available for as long as the information remains 1 the units position of the shift register.

Two serial inputs are provided to the thousands position of the shift register; the first provides entry from the erial channel 337 by the AND gates 372 and 373, and he second provides entry from the units position of the ame group by the AND gate 367.

The ACDR register 34 is equipped with a left shifting apability which accepts a character from the operation ecode circuit 32 or a character from the output channel 74. Additionally, the ACDR register 34 is equipped with left shifting regeneration loop similar to the right shiftig regeneration loop previously described for the shift cgisters 300 and 302.

Referring again to FIG. 25d, a character and sign de:ction circuit is shown at 390. This circuit is employed or generating enabling signals which partially control the nitial setup condition of the matrix circuits 323 through 31. This circuitry is of standard design and employed to ecode special characters as they appear at the output of he first character register 272 on the output channel 274. All characters appearing in the character register are pplied automatically to the detect circuit wihout the cquirement for a gating signal in order to perform a pluality of individual decoding operations as rapidly as posible. The detect circuit 390 comprises a plurality of indiidual standard decode circuits. Each decode circuit is esponsive to a different character in the machine four out f eight format. Some of these characters are responsive ɔ both the zone portion and the numeric portion of a haracter while the remaining are only responsive to the one portion of a character. Graph A contains a list of hese special characters.

GRAPH A

| Special Characters | Hollerith Card Code | Machine Coding | |
|---|---|---|---|
| | | Zone Portion XYZ | Numeric Portion ABCDE |
| Field mark | 0, 5, 8 | 1 1 1 | 0 0 0 1 0 |
| Group mark | 12, 7, 8 | 1 1 1 | 0 0 0 0 1 |
| Blank | (No punches) | 0 1 0 | 1 0 1 1 0 |
| Zero (0) | 0 | 1 1 0 | 0 1 0 0 1 |
| Record mark | 0, 2, 8 | 1 1 1 | 1 0 0 0 0 |
| Unsigned address | | 1 1 0 | |
| Signed plus address | | 1 0 1 | |
| Signed minus address | | 0 1 1 | |

The special characters are listed and the equivalent Hollerith code signals and the equivalent machine code signals are shown opposite thereof. Only the zone portion of the machine code is shown for the unsigned address, the signed plus address and the signed minus address special characters respectively since it is only the zone portion over the units position of an address character that is applied to the detect circuit 390. Each individual decode circuit generates an enabling output signal on a plurality of output lines 391a through 391h respectively. These lines are connected to the functional matrices 323 through 331 as described hereinafter.

Figure 10:
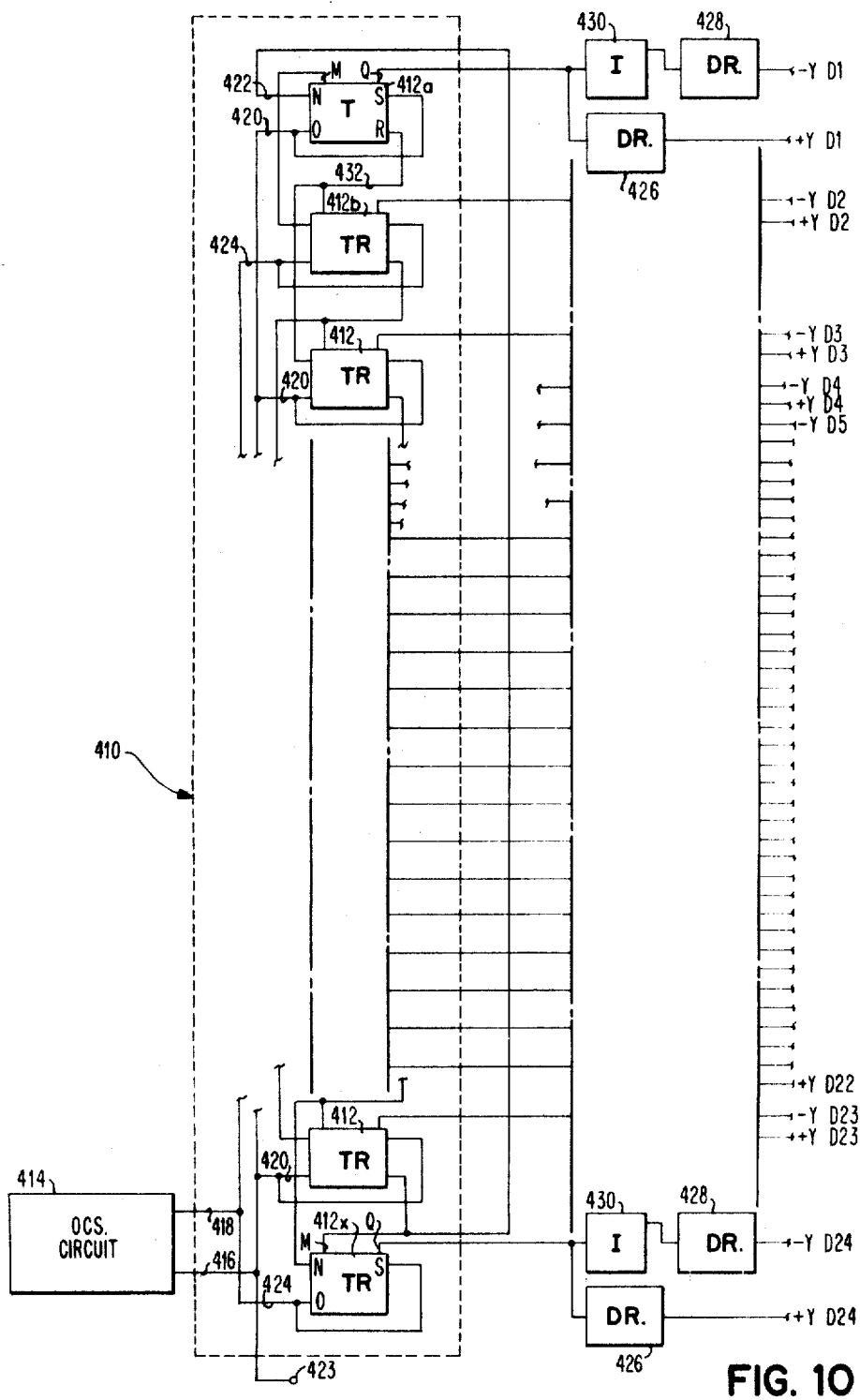
FIG. 10 is a block diagram of the main clocking ring.

FIG. 10 shows a generalized block diagram of a clock ring 410 employed in the instant invention. The ring 410 comprises a plurality of triggers 412 interconnected according to standard practices to form a recirculating timing ring. For the purposes of this description, twenty-four triggers 412 are employed to form the ring 410 and a complete cycle of the ring takes 11.5 microseconds. Each trigger generates an enabling output signal identified as —YD1 through —YD24 for each corresponding trigger position. Additionally, each trigger generates a disabling output signal identified as +YD1 through +YD24 for each corresponding trigger position. An oscillator 414 generates a first phase advance signal on a line 416 and a second phase advance signal on a line 418. The first phase advance signal is applied to alternate trigger circuits 412 beginning with the first trigger 412a by the line 416 and a line 420. The trigger 412a receives a second enabling signal on a line 422 either from the last trigger stage 412X during the recirculating mode or from an external circuit, not shown, to start the clock running. The first phase advance signal is also available at a terminal 423. The second phase advance signal is applied to the remaining trigger circuits by the line 418 and a line 424.

Initially, the enabling signals on the lines 420 and 422 set the first trigger 412a to its first stable state whereby it generates a positive enabling output signal on its output terminal labeled Q and a negative enabling output signal on its output terminal R. The output signal available on the terminal Q is applied directly to a first driver 426 and is applied to a second driver 428 by an inverter circuit 430. The output of the driver 426 is the trigger's disabling output signal +YD1 and the output of the driver 428 is the trigger's enabling output signal —YD1. The output signal available on the terminal R is applied to the next pair of successive triggers 412 by a line 432 and is used to drive the next successive trigger 412b to its first stable state in combination with the second phase advance signal available on the lines 418 and 424. The first trigger 412a is reset to its second stable state by the reset signal available at the terminal R and generated by the trigger 412b changing to its first stable state. Each successive trigger 412 operates in the preceding manner to generate positive and negative drive pulses, and to turn on the next successive trigger stage. Additionally, each succeeding stage 412b through 412x is equipped with a pair of drivers 426 and 428 and an inverter 430.

Figure 11:
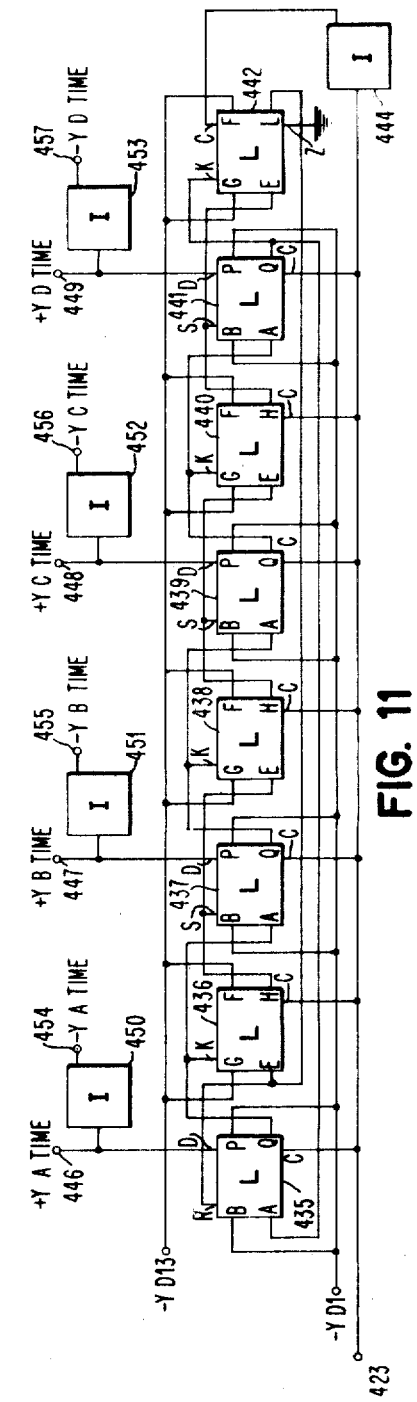
FIG. 11 is a block diagram of the sub-cycle control ring.

FIG. 11 shows a block diagram of an IOC clock 434 comprising a plurality of latch circuits 435 through 442. A schematic diagram of a representative latch is shown in FIG. 35. Each of the latches is equipped with a plurality of signal terminals. For the latches 435, 437, 439 and 441, terminals A, Q and R are gating terminals, terminals B and P are trigger terminals, terminals D and S are output terminals while a last terminal C is a reset terminal. For the latches 436, 438, 440 and 442, E is a gating terminal, F, G and H are trigger terminals, K and L are output terminals and C is a reset terminal. The —YD1 and the —YD13 timing signals generated by the main clocking ring shown in FIG. 10 are applied to the B and P terminals and the G and F terminals of the latches 435 and 436 respectively. Thereafter, the B and P terminals of alternate latches are connected in common, and the G and F terminals of alternate latches are connected in common. The output terminal K of each latch is connected to the trigger terminal Q of the next preceding latch and the gating terminal A of the next succeeding latch. The reset terminal C of each latch except the latch 442 is connected to the terminal 423. A terminal Z of latch 442 is connected to ground. An inverter 444 is connected intermediate the terminal 423 and the terminal C of the latch 442. The output signal on terminal D of the latches 435, 437, 439 and 441 are identified as the +A time, +B time, +C time and +D time signals respectively and are connected to a plurality of output terminals 446 through 449 and a plurality of inverters 450 through 453 respectively. The output signals of the inverters 450 through 443 are connected to a second plurality of output terminals 454 through 457 and are identified as the —A time, —B time, —C time, and —D time signals respectively. The + time signals A through D and the —A time signals A through D are further identified as disabling and enabling signals respectively.

In operation, the enabling signal at the terminal 423 resets the clock 434 to its starting condition wherein the latch 435 has enabling gating signals on its terminals A and R, and the latch 436 has an enabling signal on its terminal E. The —YD1 signal is applied to the terminals B and P, switching the latch 435 to its first stable state wherein its generates an output signal on its terminal D. At —YD13 time, the latch 436 switches, generating an output pulse on its terminal K, providing a gating pulse to the terminal Q of the latch 435 and the terminal A of the latch 437. At the next —YD1 time, the latch 435 switches to its second stable state, and the latch 437 switches to its first stable state. This switching operation continuously ripples through the latch to provide a series of continuous pulses at the output terminals 446 through 449, and 454 through 457 which are of opposite polarity respectively and which are 11.5 microseconds in length.

Figure 12:
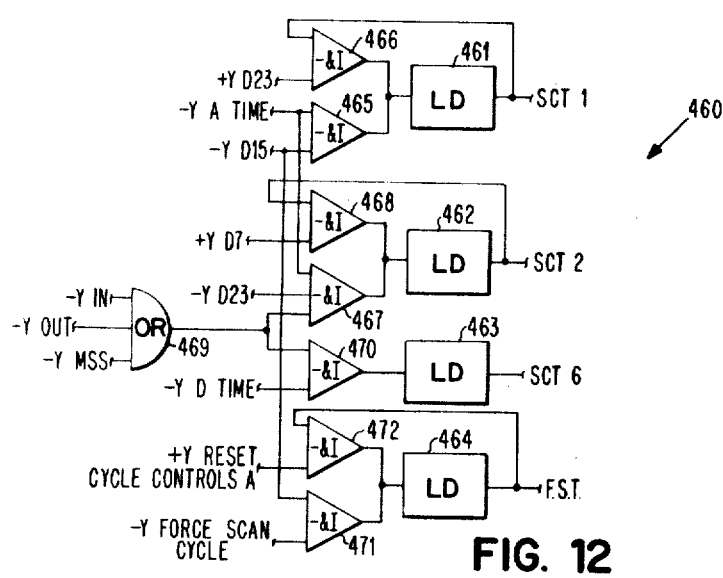
FIG. 12 is a block diagram of the scan time clock.

FIG. 12 is a block diagram of an I/O scan clock 460, which furnishes the timing signals sent to the adaptors 40, 42 and 44 (FIG. 1) by the scan bus 97 (FIG. 2a). The scan clock 460 includes a plurality of latch driver circuits 461 through 464 for generating the Scan Time (SCT) 1, SCT2, SCT6, and FST signals respectively. The driver 461 is turned "on" by the output of a minus And/Invert (—AI) circuit 465, causing the driver 461 to generate a "latch-back" signal which holds the driver "on" through a second —AI circuit 466. The driver 461 is turned "off" by the presence of the +YD23 signal, FIG. 10, as one input to the —AI circuit 466. The —AI circuit 465 has two input signals; the first of which is the —XA time signal, FIG. 11 and the second is the —YD15 signal, FIG. 10.

The driver 462 is turned "on" by the output signal of a —AI circuit 467, causing the driver 462 to generate a latch back signal which holds the driver "on" through the operation of an —AI circuit 468. The driver 462 stays "on" until the +YD7 signal is available at the input of the —AI circuit 468. The —AI circuit 467 has three input signals; the first of which is the —XA time signal, FIG. 11, the second of which is the —YD23 signal, FIG. 10, and the third of which is the output signal of an OR gate 469. The OR gate 469 has three input signals; the first of which is —Y input cycle request signal, FIG. 13b, the second of which is the —Y output cycle request signal, FIG. 13b, and the third of which is the —YMSS cycle request signal, FIG. 13b.

The driver 463 is turned "on" by the output signal of an —AI circuit 470, which receives as its input signals, the output signal of the OR gate 469 and the —XD time signal, FIG. 11. The driver 463 is not turned 'off' by an additional signal, rather it only remains "on" for the duration of the —XD time period. When this —XD time signal is no longer available the driver 463 goes "off."

The driver circuit 464 is turned "on" by the output signal of a —AI circuit 471, causing the driver to generate a latch back signal for holding the driver "on" through a —AI circuit 472. The driver 464 stays "on" until a +Y reset cycle control A signal, FIG. 13a, appears as an input to the —AI signal 472. The —AI circuit 471 has two input signals; the first of which is a —Y force scan cycle signal from the processor, and the second of which is the —YD 15 signal, FIG. 10.

In operation, the SCT 1 signal is generated at —YD 15 time of each A subcycle of each machine cycle. If a data originating terminal requires a memory cycle to perform its expected operation, the OR gate 469 furnishes the enabling signal which generates a SCT 2 and a SCT 6 signal. When the OR gate 469 does not furnish an enabling signal the next memory cycles can be used for processing since the data originating terminals do not require any memory cycle.

Referring to FIGS. 12 and 22, it can be seen that the driver 464 is turned "on" at —YD15 time, line m, in response to a force scan command signal from the processor, and is turned "off" by the reset cycle control signal, lines a and m.

FIGS. 13a and 13b contain a block diagram of the memory regeneration loop shown in FIGS. 2a and 2b, and FIG. 14 shows the circuitry required to generate a plurality of control signals required for the operation of the regeneration loop.

Referring to FIG. 14, a plus OR/INVERT (+OI) gate 474 has three input signals; the first of which is the +YD18 drive signal, the second of which is the +YD19 drive signal, and the third of which is the +YD20 drive signal, all of which originate from FIG. 10. The output from the OR gate 474 is applied to a pair of —AI circuits 476 and 478. The —AI circuit 476 has as its second enabling signal the —YD time signal generated by the IOCS clock shown in FIG. 11. The AND gate 478 has as its second input enabling signal the —YA time signal generated by the IOCS clock shown in FIG. 11. The output signal from the —AI circuit 476 is applied to an invert driver (ID) 480 by an inverter 482. The output from the driver 480 is the write drive output signal and it is available at a terminal 484 for application to the write driver 284 shown in FIG. 2b. The output from the —AI circuit 478 is applied to an ID circuit 486 by an I circuit 488 and is applied directly to power inverter (IP) 490. The output of the ID 486 is the read driver output signal, and it is available at a terminal 492 for application to the read driver 282 shown in FIG. 2b. The output from the IP 490 is applied to a delay line 494. The output from the delay line 494 is applied to a —AI circuit 496 by an inverter 498. The output of the inverter 498 is also applied to a second delay line 500 by an IP 502. The output from the delay line 500 is applied as the second enabling signal to the —AI circuit 496 through an inverter 504. The output from the inverter 504 is also applied as a first enabling signal to a —AI circuit 506. The —AI circuit 506 has a second enabling signal applied thereto from the inverter 498 and a third enabling signal, the +Y FORCE SCAN CYCLE signal, applied thereto from the IOCS control circuit 70 shown in more detail on FIG. 15a described hereinafter.

The output from the —AI 496 is applied to driver 508 which is employed to generate the memory sense latch strobe signal at a terminal 510 for application to the SALS circuit 68, FIG. 2b. The output from the —AI 506 is appiled to a driver 512 which is employed to generate a next channel select register (NCSR) strobe signal at a terminal 514 for application to the register 61, FIG. 2b. Reference to FIGS. 20 through 24, lines f, g, and n shows that the delay lines 494 and 500 are employed to position the strobe pulses at the terminals 510 and 514 in the middle of a read drive output pulse available at the terminal 492.

A —AI circuit 516 has three input signals; the first of which is the +Y FORCE SCAN CYCLE from FIG. 15a, the second of which is the —Y time A signal generated by the IOCS clock shown in FIG. 11, and the third of which is the —YD15 signal generated by the main processor locking ring shown in FIG. 10. The output from the —AI circuit 516 is applied to a driver circuit 518 by a I 520. The driver 518 is employed to generate the Next Channel Select Register reset signal at a terminal 522 or application to the register 61 shown in FIG. 2b.

A —AI circuit 524 has a pair of input signals; the first of which is the —Y time A signal generated by the IOCS clock shown in FIG. 11, and the second of which is the —YD15 signal generated by the main clocking ring shown in FIG. 10. The output signal from the —AI circuit 524 is applied to a driver 526 by an I 528 for generating a MEMORY SENSE LATCH RESET signal at a terminal 530.

An AND gate 532 has two input enabling signals; the first of which is the —Y time D signal generated by the IOCS clock shown in FIG. 11 and the second of which is the —YD15 signal generated by the main clocking ring shown in FIG. 10. The output from the AND gate 532 is applied to a driver 534 by an IP 536. The driver 534 is employed to generate the REGENERATION DRIVE GATE signal at a terminal 538 for application to drivers 100 shown in FIG. 2b.

Referring now to FIG. 13a, the control logic SALS 58 shown in FIG. 2b comprise a plurality of individual sense latch circuits 540 through 559. There is one sense latch circuit for each individual storage position of the status and translator select section 67 of the IOCS memory 49. Each sense latch has three input signals; the first of which, on line a, is the data signal generated by the interrogation of the control word, the second of which is the memory sense latch reset signal generated by the driver 526 shown in FIG. 14, and the third of which is the memory sense latch strobe signal generated by the driver circuit 508, shown in FIG. 14.

Each sense latch generates a positive and negative output signal at a terminal 540a and 540b through 459a and 559b respectively. A first group of sense latches, 540, 541 and 542, are associated with the processor command words, READ, WRITE, and SECURE respectively, describing the operating conditions of each data originating terminal as its respective control word is interrogated. A second group of latches 543 through 548 is associated with the MSS of the data originating terminal as its respective control word is interrogated. A third group of latches 549 through 554 is not used in this embodiment; a final group of latches 555 through 559 is associated with a translator select symbol employed to select the correct translator for each data originating terminal as its respective control word is interrogated.

The latches 540 through 542 are associated with a corresponding compare circuit 561 through 563. The compare circuit 561 through 563 is identical and includes a first minus AND (—A) gate 566. The AND gate 566 has two input signals; the first of which is from position 1 of the units position of the ACDR circuit 34 as shown in FIG. 1, the second of which is the —Y INITIAL INSTRUCTION signal from the control unit shown in FIG. 15b. The first position of the ACDR circuit 34 contains a read command signal indicating that the processor intends to accept data from an addressed IO terminal. A second —A gate 568 has a pair of input signals; the first of which is the negative output signal from the sense latch 540 and the second of which is the —Y NORMAL REGENERATION signal generated by the control logic circuit, shown in FIG. 15a. The outputs from the AND gates 566 and 568 are applied to an inverter 570 by an OR gate 572. The output from the inverter 570 is applied to a terminal 573 and a driver circuit, not shown, by an AND gate 574. Each of the individual driver circuits are included in the regeneration driver circuit 100 shown in FIG. 2b. The AND gate 574 has a second input enabling circuit applied thereto from the terminal 538 shown in FIG. 14. The sense latches 541 and 542 are similarly connected to the compare circuit 562 and 563. The output signals from the compare circuits 561 through 563 are reinserted into the same corresponding bit position in the control memory 49 which had just been interrogated.

The compare circuits 561 through 563 in combination with the —Y NORMAL REGENERATION signal operate to maintain the current operating condition of a particular data originating terminal for the command signal of the respective compare circuit. The compare circuits 561 through 563 in combination with the —Y INITIAL INSTRUCTION signal operates to change the current operating condition of a particular data originating terminal for the command signal of the respective compare circuit. Additionally, the —Y read mode signal and the —Y write mode signal, available at the terminals 540b and 541b respectively, are employed in the "look ahead" feature described in greater detail with reference to FIGS. 15a and 15b. More specifically, the "look ahead" feature determines the use of future memory cycles and their allocation for record storage usage and data processing usage.

The sense latch 543 is connected to a reinsertion circuit 576, FIG. 13b, which includes —AI circuit 578 having two input signals; the first of which is the output from the sense amplifier 543 and the second of which is the —Y NORMAL REGENERATION signal generated by the control circuit shown in FIG. 15a. The output from the —AI circuit 578 is applied to a —A circuit 580 by an inverter 582. The —A circuit 580 has a second input enabling signal applied thereto from the terminal 538 shown on FIG. 11. The output from the —A circuit 580 is applied to its corresponding driver in the circuit 100 shown in FIG. 2b for reinserting the output of the latch 543 into its respective position in the memory 49. The output signals from the sense latches 544, 545 and 549 through 554 are applied to corresponding reinsertion circuits similar to the circuit 576. The output signals from the sense latches 546, 547, 549, and 555 through 559 are applied to corresponding compare circuits similar to the circuit 561.

FIGS. 15a and 15b comprise a block diagram of the control logic circuit 70 shown in FIG. 2a. The major part of the circuit is of standard design and does not require a description for a clear understanding of the manner in which the circuitry operates. Generally, a variety of timing signals are combined by standard AND and OR type circuitry to provide a series of timing pulses to control the operation of the I/O circuit 9, FIG. 1.

The —Y READ INSTRUCTION signal applied to a —A circuit 584, FIG. 15a, by a line 586 originates from the register 34 shown in FIG. 1 and the —Y READ MODE signal applied to the —A circuit 584 is available during the interrogation of the control word memory 49 from the terminal 540b shown in FIG. 13a. Since the READ INSTRUCTION signal level is always at +Y in the absence of a new command signal, the —A circuit 584 does not generate a —Y level output signal for generating a —Y INITIAL INSTRUCTION signal. However, if the two signals are different, during loading of a new command signal and loading of the initial signal, the —A circuit 584 generates a signal so as to cause an inverter 588 to generate a —Y INITIAL INSTRUCTION signal for application to the —A circuit 566 in FIG. 13a. When the Inverter 588 generates a signal of the opposite polarity, +Y, it is applied to —AI circuit 590. The —AI circuit 590, receives a second input signal from a +OI circuit 592. The +OI circuit 592 has three input signals; the first of which is a +Y RESET INSTRUCTION signal from the register 34, the second of which is a +Y READ INSTRUCTION signal from the register 34 and the third of which is a +Y WRITE INSTRUCTION signal from the register 34. When all the input signals to the +OI circuit 590 are at a +Y level, there are no new input command signals. Therefore, the contents of the control word memory 49 is regenerated back into the locations just interrogated by a −Y NORMAL REGENERATION signal from a driver 592.

The "look ahead" feature and the "message status symbol" feature of the present invention are particularly advantageous for a processor operating both as a record assembling machine and a record processing machine. In order to utilize the maximum capability of a processor, processor should be working full time on either of its two tasks, record assembling and record processing. Additionally, the processor should be alerted whenever an error is made during the transfer of a record to the processor. A record input-output terminal constructed according to the instant invention includes means whereby the associated processor is able to inspect record transfer indicators to determine the type of error which has occurred during a record transfer operation, and is able to inspect the contents of an associated register memory 24 for a single character which character indicates the type of error which has occurred during a record transfer operation.

Referring to FIG. 15b, the circuitry is shown which controls the operation of the last two enumerated features. A −AI gate 594 has five input signals; the first of which, on a line 596, indicates that the corresponding adapter is operating in the READ MODE, the second of which indicates that there is NO CHARACTER DELETE signal, the third of which indicates that the associated adapter is generating a CHARACTER READY signal requiring a memory cycle for storage into the main memory 20, the fourth of which indicates that there is NO CHANNEL ERROR, and the fifth of which indicates that there is NO LONG LENGTH RECORD signal. The output of the −AI circuit is applied to a IP 598 for generating a −Y INPUT CYCLE REQUEST signal.

The output of the IP 598 is also applied to a terminal 600 by a −AI circuit 602. A −Y OUTPUT CYCLE REQUEST signal and a +Y OUTPUT CYCLE REQUEST signal are generated in a similar manner by the signals identified as the inputs of the corresponding circuits 604, 606, and 608. The +Y INPUT CYCLE REQUEST is generated when the associated adapter has a character ready for storage into the main memory 20, FIG. 1, and the +Y OUTPUT CYCLE REQUEST signal is generated when the associated adapter is ready to accept a character from the main memory for transmission to a distant receiving terminal.

The +Y INPUT CYCLE REQUEST signal, the +Y OUTPUT CYCLE REQUEST signal and the +Y MESSAGE STATUS SYMBOL REQUEST signal are all applied to the associated processor by the control bus 98 shown in FIG. 2a. Each of these signals set a corresponding stacking latch in the latch circuit 392 shown in FIG. 25b. Thereafter, the processor is placed into its standard interrupt routine wherein it services each of these interrupt conditions by making a memory cycle available to store a character, to send out a character and to inspect the MSS, respectively.

FIGS. 33a, 33b and 33c show the detail windings of the Hollerith decode matrix 328 shown in FIG. 25a. The principal function of the matrix 328 is to change the four of eight machine format into the well known Hollerith format. This format change is employed not only on output operations, but also on internal processing which can be handled more efficiently in one format. FIGS. 38a, 38b and 38c show the detail windings of the Hollerith encode matrix 327 shown in FIG. 25a. The matrix 327 functions the same as the decode matrix 328 except in the reverse. Certain encoding functions occur during the processing of a record when the processing operation can be performed more efficiently in the Hollerith format, yet the character must be stored in the machine format. In this situation a double transformation occurs.

FIGS. 34a and 34b show a timing diagram of the processor in the special situation when the "I" character of an instruction is a coded blank. In this situation the program furnishes the address required to address the main memory. This address is furnished in four segments by four successive referrals to the stored program.

FIGS. 36, 37 and 39 through 41 show the details of the functional matrices used to handle the data in the instant invention. No detail description of these and related figures is required since their general function is well known in the prior art.

FIG. 42 is a schematic view of the well known magnetic core having two windings attached thereto; one being wound in the "one" sense and the other being wound in the "zero" sense. FIG. 43 shows the rotation employed to graphically present the matrices in the present invention. The intersection of a single horizontal grid line and a plurality of vertical grid lines represents a single core. A line slanted in a first direction as identified in the figure represents a winding wound in the "one" sense and a line slanted in the other direction represents a winding wound in the "zero" sense. The absence of a slanted line indicates that those particular drive windings do not thread that particular core.

A third group of logical circuitry which acts to perform control functions in the RIOT processor is an interrupt control circuit 392. An interrupt circuit is a standard technique employed in a processor for indicating the end of a processor operation or for indicating an error condition. Since this circuit is well known to those skilled in the art, a complete description and diagram is not given. A generalized description will only be given to indicate the participation of this circuit in the overall operation of the processor.

The interrupt control circuit comprises four sets of three latches which provide storage for interrupt signals generated by four corresponding categories of devices. These four normal interrupt categories are: first, input cycle request signal, FIG. 15, second an output cycle request signal, third a MSS request signal, and fourth the end of storage area (EOA) memory signal. The first three interrupt conditions originate in FIG. 15, and the fourth interrupt condition signals when the allocated space in the main memory 20 is used up for the storage of part of a message and additional space is needed. Each of the above described latch sets comprises a stacking latch, a masking latch, and a mode latch. The generation of the interrupt signal by any of the four above mentioned device groups causes the setting of the corresponding stacking latch directly. At the end of each computer operation the processor inspects the condition of these stacking latches in conjunction with their corresponding masking latches. If any stacking latch is found having a corresponding masking latch which is not set, the processor is caused to branch into an interrupt program which then controls the operation of the processor to service the unit causing the interrupt. The interrupt mode latches are set on, only one of which may be on at a time, corresponding to the one of four interrupting conditions being serviced. The stacking latch whose output was originally used to cause the program interrupt is then reset, thus enabling it to stack another interrupt condition from its source device or devices. The mask latches are set and reset under program control to inhibit or allow program interrupt caused by any or all of the above-mentioned device groups. The interrupt latches themselves can also be set or reset under program control. When interrupts are being processed, the interrupt mode latch corresponding to that device group whose interrupt is being serviced is set on and no further interrupts may be caused by the other three categories of interrupting devices until, by program, this interrupt mode latch is reset and the processor is returned to normal status. If more than one interrupt is stacked in the stacking latches when the processor inspects these circuits for interrupting conditions, the list given hereinbefore specifies he order in which the interrupts are accepted and processed. A higher order interrupting situation than the our just discussed is identified as a "nonstop branch" (NSB). The stacking latch for this higher order interrupt can be considered to be the logical OR of all the error latches which record error conditions generated with the processor. Examples of these error conditions which are stored are invalid operation characters, multiply or divide overflows, and any other error signals generated as a result of hardware failure or programming error. Although NSB interrupt has no special interrupt latch per se, it does have both a masking latch and a mode latch. If the NSB masking latch is set on (under the control of the programmer) any error conditions occurring within the system will cause the processor to come to a halt. If the mask latch is off, however, the detection of error conditions causes the termination of any operation being performed (the operation is not necessarily completed) and the program automatically branches to memory location 260 which always contains the start of the nonstop branch error inspection and correction routine. This branching to the nonstop mode of operation can occur in either the normal or interrupt status programs in the processor. Thus the NSB mode may interrupt a normal interrupt program as well as a non-interrupt program. The NSB mode latch is set on in exactly the same manner as the mode latches for other interrupting routines. During the time this latch is in its on state, error signals generated by the system checking hardware are ignored in order that the programmer may, in the NSB routine, check the condition of and reset the error latches whose outputs cause this NSB. By testing these conditions, he can elect to correct or dump any false information which he may find in memory and continue his processing without requiring the shutdown of the system for manual inspection of data and/or program test. Release of the processor from the NSB mode is provided by program control like all other release interrupt operations. Note, however, that the NSB mode is actually a third order of interrupt, that its, the error conditions initiating the nonstop branch could have occurred in either the normal or the interrupt mode of RIOT processor operation. The NSB release, therefore, causes the computer to return to whichever of these two modes of operation were in effect when the NSB was initiated.

It should be noted that this type of error correction and detection operation puts the burden on the programmer to assure that, during the NSB program routine, all data errors in the memory are found and either corrected or cleared, and further, that the error detection latches which recorded the error conditions and cause the NSB initially are checked and reset before the NSB mode is released. Otherwise, release of the NSB condition will merely cause another NSB interrupt.

Thus, the interrupt hardware contains four sets of three latches which provide control, storage and indication for the four normal interrupts allowed within the RIOT system, plus the masking and mode latches which likewise service the nonstop branch mode interrupt. The error signal storage latches which can also be considered part of the interrupt circuity and their associated logical set and reset controls are also included in this category of interrupt hardware. As mentioned above, these latches are directly set by the error check signal poduced by the device they service. Their reset is accomplished either by program or the depression of a compute reset key on the operator's console panel.

The adder circuit is composed of two separate blocks of matrix hardware, the numeric adder matrix 330 and the zone adder matrix 329, FIGS. 31a, 31b, and 31c and FIGS. 32a and 32b. Two different forms of number information may be combined together by action of either the numeric adder, operating as a single entity, or by the combination of the two adder sections operating together as a unit. The numeric adder 330 handles only operations involving decimal numbers presented to it by way of the four sets of eight-bit functional matrix drive lines which are wound through the adder matrix. These drive lines are the output lines from the functional matrix information drivers. The channel one and channel two drivers 312 and 314 respectively appear on one dimension of the adder array and the channel three-four drivers appear on the other. These latter drivers supply infomation drive currents under control of two sets of current gates to either the channel three or channel four drive lines. Only one current channel on each dimension is activated at a time.

Selection of the current drive channels provides means for controlling the add operation to be performed. The channel one and channel two drivers operate to set the adder circuits to produce sums which correspond to carry and no-carry entries, respectively. Thus, in addition to information presented to the channel one and two drivers, carry and no-carry conditions which have been generated from the previous add cycle, or the sign analysis circuits for the initial add cycle, select which of these two sets of drivers are to be used for each successive single-character add operation, see FIG. 30. Selection of the channel three or channel four drive paths by means of the two current gates connected to the channel three-four drivers on the other dimension of the array provides means for conditioning the adder for true or complement add operations. The true complement circuitry mentioned previously determines, by analyzing signs, the proper channel to be driven, channel three for true adds and channel four for complement adds, and causes the proper gate to be selected to provide this path for the drive currents produced by the channel three-four drivers.

Since the selection of true or complement is determined only through sign analysis of two number fields to be combined, the initial selection of the true or complement gate is maintained for the complete duration of the add cycle involving these number fields. The selection of the channel one or channel two drivers is required for each add cycle, since carry or no-carry outputs of each cycle affect the selection of the drive channel to be used for the next.

The above discussion is the foundation for the reasons that channel one and channel two have separate sets of drivers and channel three-four has a single set whose current outputs are gated. The adder is operated near its maximum repetition rate of about three microseconds per operation. Because of timing considerations, gating techniques cannot be applied to select channel paths for a common set of drivers at this rate. Since the true-complement channel selection must occur at this rate, gating cannot be used on channels one and two. Therefore, two sets of drivers are used for this application. The inverse of this argument applies to the channel three-four selection which accounts for the gating arrangement used here, since the gated arrangement is less expensive and easier to control than its counterpart.

Since the numeric section of the adder handles only numeric decimal information, only the numeric bit current drive lines pass through the cores in this section of the array. In a like manner, only the zone bit drive current lines pass through the zone add section of the adder array. The numeric section of the adder is used for add operations involving the processing of data specified by the stored program. Operations of these types include add, substract, multiply, and divide. Another class of computer operations called "ADDRESS MODIFICATION CYCLES" requires the addition and handling of numbers in the address sequence of locations in the main memory. Since the main memory addresses consist of decimal information in the units, tens, and hundreds positions of the address, the serial addition of two address numbers uses the numeric section of the adder only for the first three add cycle operations. On the fourth cycle, however, the addition of the two thousandths position characters requires the use of both the numeric and zone adders. Each of the thousands position address characters can be any of thirty different values as explained previously. The addition of these two high-order address characters is performed by obtaining a sum of the numeric portions of the two characters using carry/no-carry information generated by the hundreds position add cycle in exactly the same manner as in a regular full numeric add cycle. Simultaneously with this numeric add operation, the zone adder is controlled to add together the zone bits of these same thousands position characters. This operation is performed as though no carry output had been generated by the numeric portion of the add operation. The results of both of these add operations are sensed by the sense lines which link the cores in the adder array, and the answer thus generated is set into the arithmetic sense amplifier latches 348 which service all the functional matrices producing such character information in the functional matrix set. The carry or no-carry output from the numeric adder is also set into the carry/no-carry sense amplifier latches 394 whose circuits service only the adder array itself. The answer thus contained in the arithmetic sense amplifier latches 348 may or may not then be the actual answer for this thousands position address add operation. The numeric bit answer is, of course, always correct. However, the thousands position add was generated under the assumption that no carry resulted from the numeric add portion of the operation. Inspection of the carry/no-carry sense amplifier latches determines whether indeed this was the case. If so, the entire answer is correct. If not, the zone value must be increased by one to obtain the correct result.

In order to perform this carry addition to this bits in the zone portion of this answer character, it is necessary to place circuits at the zone bit outputs of the Arithmetic SALS 348 which allow skewing of the information held in these SALS onto the Arithmetic Channel. It is interesting to note the effect of adding one to any of the two out of three zone bit combinations which are allowed for addressing results in the setting of two bits according to the following rule. If the X bit is set, a carry causes it to be set to a Z bit. If a Y bit is set, a carry causes it to be set to an X bit; and finally, if a Z bit is set, a carry causes it to be set to a Y bit. To produce this effect, a gated switch-mix circuit is used to direct the zone sense latch outputs onto the Arithmetic Channel. If a no-carry results from the numeric portion of a thousands position of an address-add, the zone bits of the Arithmetic SALS are gated by this no-carry signal directly onto the corresponding bit lines of the arithmetic channel. However, if a carry is generated, the zone bits of the Arithmetic SALS are gated so that the X bit appears on the arithmetic channel Z bit, the Y bit appears as an X bit, and a Z bit appears as a Y bit. By this procedure, the correct answer characters on the arithmetic channel even though the arithmetic sense amplifier latches 348 may not actually contain this exact character configuration. The arithmetic channel appears as the actual output of the Arithmetic SALS 348 to the functional devices it services. By this procedure, a fifth add cycle is eliminated which would otherwise be required in adding four-character address numbers.

The adder matrix is composed of two arrays of cores. Each of these arrays operates independently to produce sums corresponding to zone information, or numeric information, presented by the two characters entered on the two sets of functional matrix drive lines.

Information currents are driven on these drive lines in such a manner that all the cores in the matrix being used are biased to the reset state except one. The one unbiased core represents the sum of the two numbers entered. While the information drivers are held on, a current pulse in the "set" direction is directed through a drive line which links all cores in the matrix or matrices to be used. The one core which is in the undisturbed state thereby is caused to "set" to the "disturbed" or "one" state. Since all other cores are biased in the reset direction, the set current supplied is not sufficient to overcome this "reset" bias and they remain in their reset state. At any time following the set pulse duration, the information bias drivers may be turned off. The sum of the two entered numbers now has been set as a single switched core into the matrix. The sum may be detected at two times; either when the core is initially set, or later in the cycle when it is reset again to the zero state. Between these two times, a period which can be indefinitely long, the core acts as a memory device which retains the generated sum. A second "reset" winding is also provided, which like the set winding, links all the cores of the matrix. Whenever reset and/or readout of the information stored in the array is desired, a reset driver directs a current pulse of proper magnitude through this line in the reset direction, which is opposite to that of set current direction. Only the "set" core, however, is reset to the "undisturbed" or "zero" state since the remaining cores are already reset. The sense lines which link the cores in the array sense only the change in "state" of the cores they link. Therefore, information is presented only on the sense lines which pass through this one core. The information on the sense lines may be sampled either at set or at reset time, or both if desired. Since each core represents a decimal number in the numeric adder or a zone sign in the zone adder sum, the passing of the proper bit sense lines through each core automatically permits the decimal sum to be encoded back into the proper 2/5 or 2/3 form, respectively.

A closer inspection of the adder operation reveals that the adder matrix provides a combination of decoding forming and encoding functions. The channel three-four drivers and gates 340 select either the true or complement drive paths through the adders. The selection of the channel three path directs information appearing on the channel three-four in its true form to the true-complement dimension of the adder array. The selection of the channel four path causes this information to be entered into the array as "nines complement" information. The wiring patterns through the adder array for these channel input drive lines are wholly responsible for this conversion process and require no external circuitry other than the two gates and the common set of channel three-four drivers. In a similar manner, the wiring patterns of the channel one and the channel two current drive lines through the adder array cause the selection of one of two wired in addition tables it contains. The first of these tables is a no-carry table which is selected by gating the channel one-three information character through the channel two drivers. Selection of the channel one drivers for adder information entry selects the decimal addition table in the numeric adder which produces "carry sums." Since the zone adder carry sums are generated at the output of the arithmetic SALS 348, the drive lines for the zone bits from both the channel one and channel two drivers are wound through the zone adder matrix cores in exactly the same manner. The sense lines which link each sum core in the adder arrays provide encode sum characters to the arithmetic SALS 348 and enter the carry or no-carry sense signal from each sum generated into the carry/no-carry SALS 394 servicing both the numeric and zone adder sections of the adder array. The numeric adder carry and no-carry outputs are stored by these sense amplifier latches to be used as feedback information to select the proper channel one or channel two path to be used for the next succeeding character add cycle.

The adder array also contains an extra matrix of logical cores which, used in conjunction with the cores in the regular adder array, provide it with the ability to perform high-low equal compare operations on characters presented at its inputs.

The edit matrix 331 is used in the processor for all data handling functions performed by the edit OP code in the processor's OP code set, FIGS. 37a and 37b. Editing operations involve the sequential storing of character information found in a field of memory characters into specified positions in an edit field area under control of special characters which have been previously loaded into this field. Edit operations take place on a character-by-character basis starting at the high address and of both the data and edit control fields. A main memory cycle is taken to read out the first character from the control field. The data character is entered by way of the channel three-four drivers and the control character by way of the channel one-drivers, on channels three and one respectively, into the cores of the edit matrix. The edit matrix then produces a character output in the arithmetic SALS 348 and control signal outputs used in controlling subsequent edit steps according to the following set of rules:

If the control character read from memory is either a coded blank or a numeric zero, the arithmetic SALS 348 are set to the character configuration entered from the data source field. This character is then entered, during the write portion of the control character access cycle, into the control character field in main memory. The edit matrix produces, as a result of this type of operation, a control signal which causes the cycle just described involving the readout of two single data and control characters for the next edit cycle.

If the control character is any character other than a blank or a numeric zero, the edit matrix causes this character to be set into the arithmetic SALS 348 which, as before, is regenerated into the control word position from which it came. It then produces a control signal causing the next control word character in sequence to be read from memory and the edit cycle is started again. The operation is terminated on detection of a field mark in either the data or edit control field.

The above description is one for a simple edit command. Several "edit type" operations are provided in the present system OP code set. Instructions included in this set are, STORE DIGITS and ZERO FILL, STORE DIGITS and ZONE and ZERO SUPPRESS, and finally, the ALPHANUMERIC EDIT command.

Only one of these is actually controlled by the edit matrix itself. The others are performed using the Hollerith decode, test and encode matrices. This edit OP code is dynamically controlled by the organization of characters in the control word field and can be quite involved because of the number of variations possible. The entire edit operation involves scans of the control word field both in the forward and reverse directions. The forward scan is used for assembly of data into the control word field locations. Its termination by a field mark causes the initiation of the reverse scan which locates and inserts blanks, dollar signs and check protection asterisks determined by the position of the highest order significant character in the number field generated during the forward scan.

During the forward scan, special marker characters are placed in the edit assembly field indicating the location of the highest order significant digit. This special character is then used as a stopping point indicator for reverse scan operations. It defines the limits of zero suppression, asterisk, or dollar sign controls. The edit matrix always acts to provide a proper character to be entered into the control and assembly fields and additionally supplies control signals to be used to set up the next edit step in the sequence.

The edit matrix, in addition to the data channel entry drive lines, has several other control windings which link its cores. Both set and reset windings are provided and, in addition to these, three control windings link the proper groups of cores in the array to condition the matrix for the several variations of edit functions which it may perform. Three control drivers which are activated for the duration of each of these variation cycles provide control currents on these control windings at the proper times. The edit matrix uses only three of the four possible data entry current drive channels which provide data information to the functional matrices in the processor. Entry of characters from the data field into the edit matrix is by way of channel three only. Control field characters enter by way of either channel one or channel two. Channel one handles all character entries from the control field during forward scan cycles and channel two handles data from the same source on reverse scan cycles. The control characters are always entered via the channel one-two mix to either the channel one or channel two drivers and that data information from the data field is entered via the channel three-four to the channel three-four drivers.

Two separate matrices comprise the Hollerith decode, test and encode array in the processor's functional matrices. The first of these two arrays is the Hollerith decode matrix, FIG. 33. The second Hollerith matrix array performs all test and encode functions, FIG. 38. The Hollerith matrix set is used for several operations performed by the processor. These operations are STORE DIGITS and ZERO FILL, STORE DIGITS with ZONE and ZERO SUPPRESS, MOVE ZONE, MOVE DIGIT, and finally, TEST and/or SET CHARACTER. The Hollerith decode matrix and the Hollerith test and encode matrix perform all standard Hollerith code handling operations including rearrangement, insertion, and testing of Hollerith coded information. Means for handling the Hollerith components of any machine code character is available to the programmer in the form he is most used to, the punch components themselves. Codes are provided to test, set, reset, suppress, and insert X, 12 or any other Hollerith components representing the machine character. These codes allow sign handling, zero insertion, character generation, control punch removal and/or insertion in exactly the same way as it would be done on the card itself.

As its name implies, the 4/8 to Hollerith decode matrix, FIGS. 33a, 33b and 33c, merely acts to decode an incoming character presented to it on either channel one or channel two, depending upon the operation performed, from machine coding into the proper combination of Hollerith bits which are then set into a Hollerith sense amplifier driver (SADS) circuit 402. Those SADS which are set as a result of this decoding in turn generate drive currents which pass through the Hollerith test and encode matrix which performs the logic necessary for testing, resetting, setting or otherwise handling the Hollerith components thus generated. They additionally function to drive the resultant Hollerith bit configurations into the cores of the Hollerith encode matrix. Reset of the test and encode matrix then allows the readout of this character into the arithmetic SALS 348 for subsequent storage into memory or use by the processor as required. The Hollerith SADS 402 service both the decode and test sections of the Hollerith matrices. Controls on these SADS permit the selective setting, on any 4/8 to Hollerith decode operation, either the Hollerith numeric bits or the Hollerith zone bits. This allows zone bits from one entered character to be superimposed upon the numeric bits entered into the matrix from another character. Through this type of operation, control punch deletion and insertion, sign punch handling, and other manipulations involving the separation of the zone and digit portions of a single entered character may be easily performed. At the completion of this Hollerith bit assembly, the resultant Hollerith combination of bits is then encoded by the Hollerith encode matrix into its corresponding machine code character. By handling the filtering and separation of control and data entry information in this manner, no complicated programming on the 4/8 Hollerith characters themselves is necessary. The facility offered in handling characters in this way allows shorter, faster, and more flexible editing programs which are easy and straightforward to write.

The second Hollerith matrix performs most of the logical operations for the codes which use the Hollerith arrays, FIG. 38. This matrix is linked by both channels four and two. During the instruction cycle of every RIOT processor operation, operation code information is entered simultaneously on both of these two channels. If the operation code information specifies Hollerith array operations to be performed in the execution cycle, cores in the Hollerith test and encode matrix are set to retain this information. No storage results if the specified operation does not require the use of the Hollerith array. Information entered into the test and encode matrix provides initial setup of the matrix with control and test data specified by the operation code itself, to be used in the execution (or data) cycle of the operation code.

After the initial setup, during the instruction cycle, operations performed by the Hollerith test and encode matrix are controlled by the SAD circuit 402 servicing the Hollerith arrays. These Hollerith SADS 402 actually produce the information entry, in the form of drive currents, to the Hollerith test and encode array. Twelve separate Hollerith SADS are used to sense the output lines from the 4/8 to Hollerith Decode array, and additionally drive the input to the Hollerith test and encode matrix. Several other sense amplifier drivers are also included in the group of Hollerith SADS. These circuits are used to detect the results of logical testing performed by the Hollerith test matrix and provide control currents to one of several input lines to the Hollerith encode section of the array based on these results. Note that the setup of the matrix for the sensing of this condition was carried out during the instruction cycle. The results of the testing are produced during the execution cycle.

The encoding function performed by the Hollerith test and encode matrix is, in general, a simple translation function. However, this translation is modified by the conditions, in some cases, detected by the test section of this matrix when the operation involves both the test and encode function in its execution. The Hollerith arrays 328 and 327 respectively and their associated Hollerith SADS 402 can, in addition to decode, test, and encode functions, be directed by OP code control to insert or delete any of the Hollerith bit components into or from, respectively, the Hollerith bit configuration generated by decoding an input machine-coded character. The re-encoding of the resultant Hollerith character back into machine code automatically produces the proper 4/8 character without worry, on the part of the programmer, concerning what this particular character configuration might have to be. As stated before, the process is automatic and provides easy means for handling Hollerith punches without concerning the programmer with complicated routines which would otherwise be necessary for this purpose.

The several operations which use the Hollerith arrays will now be described to illustrate generalized function which is performed in each of these operations by the Hollerith test, encode and decode arrays.

The MOVE DIGIT code is a single character operation. It causes the digit portion of the character addressed as the "accumulator" character to be placed in the digit portion of the character addressed as the "data" character. The zone portion of the data character is undisturbed. The resultant character therefore produced by the Hollerith matrices is one whose numeric bits are that of the accumulator character and whose zone bits are that of the data character. Performance of this operation by the Hollerith matrices consists of first reading in the accumulator character to the 4/8 to Hollerith decode matrix. Only the numeric component outputs of this character are allowed to be set into the Hollerith SADS. Next, the data character is read into the same decode matrix, and the resultant zone information is read into the Hollerith zone SADS 402. The resultant Hollerith character held in the SADS is therefore the combination we seek. This Hollerith bit configuration is then entered into the Hollerith encode matrix 327 and appears as a new machine coded character at the arithmetic SALS 348 ready to be placed in the memory position desired.

The move zone operation is identically the reverse of this move digit operation. In these two operations, only the decode and encode matrices are used, together with the selective gating of the Hollerith zone and numeric SADS.

The STORE DIGITS AND ZERO FILL instruction is used to move packed numeric data as from a punched card to a presigned area, filling blanks with zeros and transferring signs when present in units positions.

The STORE DIGITS WITH ZONE AND ZERO SUPPRESS instruction is used to prepare numeric data in a form acceptable for printing. Only the digits are transferred from the accumulator to the data field with zeros to the left of the high-order significant digit in each number being replaced by blanks.

The TEST CHARACTER instruction permits testing, setting and resetting of the Hollerith components of a character; in addition, field marks, blanks and group marks can be tested, set and/or reset. All of these operations are carried out by using various sequences of the several functions provided by the Hollerith matrix array. Some are simple functions performed on single data characters; and still others allow the formation of machine characters by addition or deletion of Hollerith components.

The B and I Branch Matrices 324 and 325 respectively in the processor provide the means for performing condition tests involved and designated by the branch OP codes in the processor operation set. The I Branch Matrix 325 performs condition tests and additionally provides set and reset controls on the interrupt latches, masking latches and stacking latches which were previously described. Automatic interrupt branching and programmed operation on these latches make use of the I Branch Matrix.

The B branch matrix 326, FIG. 39, functions to test and provide branch control signals, alone or in addition to, reset control of the condition latches in the machine which indicate specific machine status conditions at the time of test. It also controls the execution of unconditional branch and stop instructions in the computer program. The B branch matrix may obtain data for testing and branch control from several groups of indicator latches in the machine. The first of these groups indicate incorrect data conditions. These conditions cause the processor to enter the non-stop branch mode of operation (as previously described) and therefore all branching on these particular indicators is done in the Non-Stop Branch Mode of machine operation. The error latches specified in this category are the overflow error latch, false data error, improper divide, and program error. When interrogated by the branch code, these error latches are reset to their off state as a result of the test performed. The second group of latches which may be interrogated by the branch matrix 326 are those which are set and reset by arithmetic operations and codes performed by the processor. These are the plus, minus, zero, and non-zero indicators which record the status of the information produced by the last previous arithmetic operation. The branch matrix 326 performs no reset function on any of these latches. The third set of indicator latches are those set and reset by the compare, test character and add/compare codes. These latches are named high, low, equal, and unequal condition latches. No reset function is performed by the branch matrix 326 on these latches either.

The fourth set of indicator conditions tested by the B branch matrix 326 are the alteration switches. These switches are located on the operator's console and their on or off condition is controlled manually. Four such switches exist, and each may be tested by the B branch matrix 326 to provide branch control for the program, depending upon the status of these manually operated switches.

The fifth and final set of branch indicator latches are the carriage channel nine and carriage channel twelve indicators associated with an on line printer. These may be likewise tested by the B branch matrix 326 to determine proper branching conditions.

The I branch matrix 325 operates in conjunction with the Interrupt Branch and Control instruction in the processor's OP code set. It provides for testing the four interrupt mode latches and provides control signals to allow branching when the particular mode latch tested is on. It also provides control over release interrupt configurations of this interrupt branch control instruction which allows releasing the machine from either the normal interrupt mode or non-stop branch mode and returning the computer to the proper place in the main line routine. The I branch matrix 325 additionally provides both branch, set, and reset control over all stacking and masking latches under control of the same interrupt branch and control command. Branching is carried out if the tested stacking or masking latch is on, in the same manner as with the tests on the interrupt mode latches just mentioned.

Two characters of the four-character instruction are used to specify the various operation combinations of the interrupt branch and control instruction. One character serves to define the complete operation itself and the second character specifies, by one of its 70 possible values, the actual type of operation to be performed within the basic category. This is generally characteristic of all branch instructions in the present system and apply similarly to the B branch matrix 326 also.

The setup of the B and I branch matrices therefore is a function of two operation defining characters. The first, the OP code character, defines a branch instruction first, and additionally, which of the two branch matrices is to be used to set up the cores in the thus selected branch matrix to test the condition specified. This information is entered into the appropriate matrix during instruction read-in and setup time just prior to the data or execution cycle of the operation to be performed. Both the main operation character and the operation modifier character always produce currents on channels four and two, respectively during instruction setup time. The processor's OP code set does not always require two characters for the definition of a particular instrutcion to be performed. Many of the arithmetic operation codes in the system are like this, add, subtract, compare edit, etc.

The windings and winding patterns of the matrix arrays are laid out in such a manner that the instruction modifier character information entered on channel two is used only for the decoding and setup of operation codes requiring the additional character for full operation definition, branch, test, character, interrupt control, etc.

The status store and restore matrix operate in conjunction with the indicator control operation command in the processor. This instruction permits storing and resetting the compare, balance, and character test indicators. It may be used in interrupt routines to save the contents of these indicators for later use. The status store and restore matrix acts to form a character whose value is dependent upon the status of the compare and character test indicators, and present it at the arithmetic SALS 348 for programmed storage into a specific memory address. It may also handle the inverse of this operation, under program control, to allow re-establishing indicator conditions previously stored by the programmer. Since, by program control, it is possible to generate any of the 70 valid 4/8 characters, this operation code may, through use of the status store and restore matrix, be used to set the above mentioned indicators to any status desired. The matrix thereby provides the programmer with the facility for storing and restoring the condition latch status of the machine or for setting these latches to any desired state.

Before describing in detail representative operations of the processor system, a brief description of the shorthand notations is given, which notations are employed in designating each instruction of an operation and the address at which each instruction is located.

A capitalized alpha-numeric character standing alone, will represent a character of information (e.g., A, B, L, Q, *, 1, etc.). The characters, each of which in a written instruction, can be any one of the valid 70, 4/8 characters in a written instruction. A complete tabulation of the 70 valid 4/8 bit combination is shown in graph B.

| Character | Hollerith Card Code or Equivalent | Machine Coding |||||||
|---|---|---|---|---|---|---|---|---|
| | | X | Y | Z | A | B | C | D | E |
| Blank | No Punches | 0 | 1 | 0 | 1 | 0 | 1 | 1 | 0 |
| I Unused Valid Char. | 12-1-8** | 0 | 0 | 0 | 1 | 1 | 1 | 1 | 0 |
| II Unused Valid Char. | 12-2-8** | 0 | 0 | 0 | 1 | 1 | 1 | 0 | 1 |
| . | 12-3-8 | 0 | 1 | 0 | 0 | 0 | 1 | 1 | 1 |
| π | 12-4-8 | 0 | 1 | 0 | 0 | 1 | 0 | 1 | 1 |
| ( | 12-5-8 | 0 | 1 | 0 | 1 | 0 | 0 | 1 | 1 |
| ? | 12-6-8 | 0 | 1 | 0 | 1 | 0 | 1 | 0 | 1 |
| ≠ (Grp Mark-Spec Char) (GM) | 12-7-8 | 1 | 1 | 1 | 0 | 0 | 0 | 0 | 1 |
| & | 12 | 0 | 1 | 0 | 1 | 1 | 0 | 0 | 1 |
| III Unused Valid Char. | 11-1-8** | 0 | 0 | 0 | 1 | 1 | 0 | 1 | 1 |
| IV Unused Valid Char. | 11-2-8** | 0 | 0 | 0 | 1 | 0 | 1 | 1 | 1 |
| $ | 11-3-8 | 0 | 1 | 0 | 1 | 1 | 0 | 1 | 0 |
| * | 11-4-8 | 0 | 1 | 0 | 1 | 1 | 1 | 0 | 0 |
| ) | 11-5-8 | 0 | 1 | 0 | 0 | 1 | 1 | 0 | 1 |
| ; | 11-6-8 | 0 | 1 | 0 | 0 | 1 | 1 | 1 | 0 |
| Δ | 11-7-8* | 1 | 0 | 0 | 1 | 0 | 0 | 1 | 1 |
| – | 11 | 1 | 0 | 0 | 0 | 0 | 1 | 1 | 1 |
| / | 0-1 | 0 | 0 | 1 | 0 | 0 | 1 | 1 | 1 |
| V Unused Valid Char. | 0-1-8* | 0 | 0 | 0 | 0 | 1 | 1 | 1 | 1 |
| , | 0-3-8 | 1 | 0 | 0 | 0 | 1 | 0 | 1 | 1 |
| % | 0-4-8 | 1 | 0 | 0 | 1 | 0 | 0 | 1 | 1 |
| / (World Septr-Spec Char) FM | 0-5-8 | 1 | 1 | 1 | 0 | 0 | 0 | 1 | 0 |
| | 0-6-8 | 1 | 0 | 0 | 1 | 0 | 1 | 0 | 1 |
| ! | 0-7-8 | 1 | 1 | 1 | 0 | 0 | 1 | 0 | 0 |
| VI Unused Valid Char. | 1-8** | 0 | 0 | 1 | 1 | 0 | 1 | 1 | 0 |
| = | 2-8 | 1 | 0 | 0 | 1 | 1 | 0 | 0 | 1 |
| # | 3-8 | 1 | 0 | 0 | 1 | 1 | 0 | 1 | 0 |
| @ | 4-8 | 1 | 0 | 0 | 1 | 1 | 1 | 0 | 0 |
| : | 5-8 | 1 | 0 | 0 | 0 | 1 | 1 | 0 | 1 |
| 6-8 | 6-8 | 1 | 0 | 0 | 0 | 1 | 1 | 1 | 0 |
| √ | 7-8 | 1 | 1 | 1 | 0 | 1 | 0 | 0 | 0 |
| + | 12-0 | 1 | 0 | 0 | 1 | 0 | 0 | 0 | 1 |
| A | 12-1 | 1 | 0 | 1 | 1 | 0 | 0 | 0 | 0 |
| B | 12-2 | 1 | 0 | 1 | 1 | 0 | 1 | 0 | 0 |
| C | 12-3 | 1 | 0 | 1 | 0 | 1 | 1 | 0 | 0 |
| D | 12-4 | 1 | 0 | 1 | 0 | 1 | 0 | 1 | 0 |
| E | 12-5 | 1 | 0 | 1 | 0 | 0 | 1 | 1 | 0 |
| F | 12-6 | 1 | 0 | 1 | 0 | 0 | 1 | 0 | 1 |
| G | 12-7 | 1 | 0 | 1 | 0 | 0 | 0 | 1 | 1 |
| H | 12-8 | 1 | 0 | 1 | 1 | 0 | 0 | 1 | 0 |
| I | 12-9 | 1 | 0 | 1 | 1 | 0 | 0 | 0 | 1 |
| O | 11-0 | 0 | 1 | 1 | 0 | 1 | 0 | 0 | 1 |
| J | 11-1 | 0 | 1 | 1 | 1 | 1 | 0 | 0 | 0 |
| K | 11-2 | 0 | 1 | 1 | 1 | 0 | 1 | 0 | 0 |
| L | 11-3 | 0 | 1 | 1 | 0 | 1 | 1 | 0 | 0 |
| M | 11-4 | 0 | 1 | 1 | 0 | 1 | 0 | 1 | 0 |
| N | 11-5 | 0 | 1 | 1 | 0 | 0 | 1 | 1 | 0 |
| O | 11-6 | 0 | 1 | 1 | 0 | 0 | 1 | 0 | 1 |
| P | 11-7 | 0 | 1 | 1 | 0 | 0 | 0 | 1 | 1 |
| Q | 11-8 | 0 | 1 | 1 | 1 | 0 | 0 | 1 | 0 |
| R | 11-9 | 0 | 1 | 1 | 1 | 0 | 0 | 0 | 1 |
| Record Mark or + | 0-2-8 | 1 | 1 | 1 | 0 | 0 | 0 | 0 | 0 |
| S | 0-2 | 0 | 0 | 1 | 0 | 1 | 0 | 1 | 1 |
| T | 0-3 | 0 | 0 | 1 | 1 | 0 | 0 | 1 | 1 |
| U | 0-4 | 0 | 0 | 1 | 1 | 0 | 1 | 0 | 1 |
| V | 0-5 | 0 | 0 | 1 | 1 | 0 | 0 | 0 | 1 |
| W | 0-6 | 0 | 0 | 1 | 1 | 1 | 0 | 1 | 0 |
| X | 0-7 | 0 | 0 | 1 | 1 | 1 | 1 | 0 | 0 |
| Y | 0-8 | 0 | 0 | 1 | 0 | 1 | 1 | 0 | 1 |
| Z | 0-9 | 0 | 0 | 1 | 0 | 1 | 1 | 1 | 0 |
| 0 | 0 | 1 | 1 | 0 | 0 | 1 | 0 | 0 | 1 |
| 1 | 1 | 1 | 1 | 0 | 1 | 1 | 0 | 0 | 0 |
| 2 | 2 | 1 | 1 | 0 | 1 | 0 | 1 | 0 | 0 |
| 3 | 3 | 1 | 1 | 0 | 0 | 1 | 1 | 0 | 0 |
| 4 | 4 | 1 | 1 | 0 | 0 | 1 | 0 | 1 | 0 |
| 5 | 5 | 1 | 1 | 0 | 0 | 0 | 1 | 1 | 0 |
| 6 | 6 | 1 | 1 | 0 | 0 | 0 | 1 | 0 | 1 |
| 7 | 7 | 1 | 1 | 0 | 0 | 0 | 0 | 1 | 1 |
| 8 | 8 | 1 | 1 | 0 | 1 | 0 | 0 | 1 | 0 |
| 9 | 9 | 1 | 1 | 0 | 1 | 0 | 0 | 0 | 1 |

*Unprintable codes.  **Machine Generated.

To avoid confusion wherever these single character instructions are written, they will be in quotes if they refer to the character position of a written instruction e.g., "DIOA," "B," "I," "B," "O," "i," etc. Thus, "DIOA" refers to the four characters which appear in an instruction. The "D" represents the first character in the instruction format.

Another problem in nomenclature involves the specifying of addresses. This is especially true since indirect addressing is generally used in the normal operation of the instant invention. A single character enclosed in parenthesis specifies the our character number in the register memory location addressed by the character inside the parenthesis. To designate the section of register memory from which this number is to come, the subscript following the parenthesis will designate the applicable section, e.g., "$A_I$" means the four character number group found in the I/O section 28 of the register memory 22, in the position addressed by the character A. The character D or A used as a subscript will refer to registers in the D/A section 26 of register memory 22. The character 4 used as a subscript refers to the X4 section 24 of register memory 22, e.g., "$A_I$," "$G_A$," "$F_B$," "$I_4$," etc. With this system of representing addresses, ("$A_A$") represents the four character number located in the register memory D/A section 26, addressed by the "A" character of the instruction.

To specify the main memory four-character address, the character address itself is preceded by an M–. The four character address itself may be written in either symbolic or real form, e.g., M–1248 means main memory address 1248, M–($A_I$) means the main memory address which is formed by the number in the A register of the I/O register memory section 28.

To represent the single character contents of an address in main memory, a C is written before the main memory address symbol, e.g., CM–1248 means the character contents of main memory address M–1248; similarly, CM–($A_D$) or CM("$A_4$").

When an address is specified but not a specific one, a small $x$ is used to represent the character, e.g., main memory addresses, M–$xxxx$, M–12$xx$, etc., register memory addresses –$x$.

The instructions employed in the instant invention comprise either a four or eight character group. The four-character instruction is most generally used for expressing an indirect address. The eight-character instruction format provides the facility for direct addressing of data through a special character in the four-character address itself.

Instructions are written in the form "D I O A" or "D I $i i i i$ O A." For the latter form to be interpreted as an eight-character instruction, the "I" character of the instruction must be a coded blank ($b$). This eight-character instruction always is written in the form:

"D $b i i i i$ O A"

The four-character instruction "DIOA," is stored in successive locations in the main memory 20. Generally, instructions are stored in sequential lists, one after another. Within an instruction, the "D" character is stored in address M–$xxxx$, "I" in M–$xxxx$+1, "O" in M–$xxxx$+2, and "A" in M–$xxxx$+3. Generally, the "D" character of the next written sequential instructions will then be found in M–$xxxx$+4. In obtaining instructions from memory during an instruction cycle, the instruction characters are read out one-at-a-time during four successive processor memory cycles. The characters are read "D," "I," "O," and "A"; in that order.

"D" is called the data field indirect address. This character is used to address the corresponding register position in the D/A section 26 of the register memory 22 to obtain the four character address number stored therein. This address, "$D_D$" is called the data field direct address. During an instruction cycle, this direct address is added to an increment address, read from one of the remaining two sections of register memory, to form an "effective data address." This address is then directly used to specify in the beginning of the data field to be operated on by the instruction during the execution cycle.

The "I" character of the instruction is called the increment direct address. It is used to obtain an increment direct address from the "$I_I$" register or "$I_4$" register in the I/O or X4 section 28 and 24 respectively, of the register memory 22. Selection of the one of the two sections of register memory 24 or 28, is controlled by the status of the tag bits in the zone portion of tens position of the "$D_D$" address obtained during the previous cycle. The tag bits are inspected by the detected circuit 390 shown in FIG. 25$d$.

The "O" character is used to specify the operation to be performed. It is entered, when read from its main memory position, into operation decode matrix 324 where it controls the set-up of the initial micro-operation steps of the operation code control sequence. The formation of the "effective data address" is carried out during this "O" portion of the instruction by the addition of the data direct address, "$D_D$," to the increment direct address "$I_I$."

The "A" character of the instruction is always read out last. Depending on the operation specified by "O," it is used for several purposes. For arithmetic, or other operations involving two fields of characters, "A" is the accumulator indirect address. Operations such as "Test Character" use "A" as the character with respect to which the information addressed by the instruction is to be inspected. Other operations, such as branch, I/O control, and interrupt control use "A" to subclassify the general operation type specified by "O" into one specific operation.

During "A" time of the instruction cycle, the accumulator direct address, "$A_A$," is read from the register memory and stored in the processor shift register 302. Additionally, "A" is also supplied to the operation decode matrix 324 together with the "O" character obtained during the previous processor memory cycle. Although, for any particular operation, one of these two operations is unnecessary, by always providing both, the "A" cycle is always the same for every instruction. This consistency results as less expensive and simpler control circuitry in the instruction cycle micro-operation control sequence for the "A" cycle.

In the eight-character format of RIOT's instruction "D $b i i i i$ O A," the characters of the increment direct address "$i i i i$" are read from the instruction itself. As noted previously, the "I" character in the eight-character format must be a coded blank as shown heretofore. This "blank" character is the means by which the processor determines the instruction length desired. Detection of the "I" as a blank, by the detect circuit 390, causes the next four characters in the instruction to be read out and entered into the shift register 302 as the increment direct address. The remainder of the instruction cycle proceeds in the normal manner from this point on. The "D," "O" and "A" characters perform the exact same functions in both instruction formats.

*The instruction cycle—Its general operation sequence and characteristics*

The instruction cycle in the instant invention includes all the micro-operations required for extracting all the characters of a single instruction from memory, for obtaining the effective and accumulator direct addresses, for performing the initial decoding of "O" and "A" characters and for totally preparing the processor for the execution of the operation specified. All of these functions are carried out within the time required to read the four (or eight) characters of the instruction from the main memory 20. The four-character instruction cycle requires 48 microseconds and eight character instruction 72 microseconds.

Each instruction micro-operation controls the read-out of an instruction character from the main memory 20, the handling of this character to obtain direct addresses from register memory, the modification of instruction counter addresses, and the general manipulation of this instruction information. Five different types of micro-operation cycles are sufficient to perform the sequence of operations for any instruction cycle. The normal four-character instruction cycle requires only four of these micro-operations. These are called M/O–D, M/O–I, M/O–O, M/O–A, and occur in that order. M/O–I is a micro-branching operaiton which, if "I," when read from memory, is a coded blank, causes the next four characters to be read from memory and treated as the increment direct address. Each of the memory accesses to obtain one of these characters is controlled by the fifth type of instruction cycle micro-operation, M/O–i.

The following description treats each of the instruction cycle micro-operations as a separate entity and, with respect to FIGS. 3, 25 and 30, specifies the data flow and control sequences which are performed.

The instruction D cycle (M/O–D)

M/O–D causes the data direct address ("D") to be read from a specified location in the register memory 22 and placed in the four character-positions of the shift register 300. The condition of the zone bits in the "tens" register 300. The condition of the zone bits in the "tens" positions of the data direct address are inspected by the detect circuit 390 to determine if this position is "tagged" or not. This condition is stored in memory latches which determine the proper selection of the register memory section during M/O–I.

The completion of the execution cycle of any instruction initiates the beginning of the instruction cycle micro-operation sequence. Following the setup of the operation control matrix 324 for M/O–D by the control matrix drivers and gating circuits in the way previously described, the following sequence of events takes place.

The address generator 227, line A of FIG. 30a, by the activation of a MISC enabling signal, line P, is caused to supply the register address latch circuit 224 with the single character address of the instruction counter. The section selection terminal 243 designates the I/O section 28 of the register memory 22, since the instruction counter (henceforth called the IC) is one of the internally used registers in this section.

A register memory (henceforth abbreviated RM) read/write (R–W) cycle is then begun, and the contents of IC are set into the SALS circuit 247, line B. The RM R–W cycle is designed to operate in a time increment of 6 microseconds. Address information read from RM is available one microsecond after the beginning of this cycle at the output of the RM SALS, 247, line D. Write time for the RM cycle starts at the beginning of the 5th microsecond and lasts for 1.5 microseconds, line N. The period of time (about 2.5 microseconds) between read and write time provides the time for modification of addresses by the modification matrix 30, if desired, and permits this modified address to be entered into the accessed RM register position during write time, lines F and O. The "IC" generated by the address generator 227, is gated through the mix 221, through the register address decode circuitry, and is set into the latch circuit 224. The RM R–W cycle is taken and the RM SALS 347 are set with "IC." "D" is found in m–"IC" and our object is to read "D" from the main memory 20 and subsequently use it to obtain "D$_D$", the data direct address from RM 22 and place it in the shift register 300.

Immediately after the contents of the IC have been set into the RM SALS, this main memory address represented by IC is gated to the memory address channel 248 via the set of switch entries provided for this purpose on the memory address channel mix, line I. This gating is effected by the application of an enabling signal from the MISC 37 to the terminal 247a. At the same time an enabling signal at the terminal 250a reads this information from the address channel to the memory address register 250, line G. This address transfer is completed by the end of the second microsecond in the register memory R–W cycle. At this point, the main memory R–W cycle is initiated and an enabling signal at the terminal 247b causes the reset of the RM SALS 247, line F.

The processor's RIOT's main memory 20 is capable of operating at two different speeds. This facility allows maximum possible efficiency in the handling of operations both within the processor and also for servicing high-speed, I/O devices, such as tapes, files, etc. The speed at which the memory is operated for any particular micro-operation is generally a function of the number of accesses which must be made to RM or of the speed at which arithmetic operations can be performed on data read from memory.

The "D," the "I," the "O," and the "A" micro-operations use twelve microsecond main memory cycles as their micro-step sequence, either involves two accesses to RM 22 or an arithmetic operation. The "i" micro-operations, however, require only one RM access, and these cycles are performed in conjunction with six microsecond main memory cycles.

The "D" character of the instruction, CM–("IC"), is read from the main memory 20 into the main memory SALS 271, line K, and appears at this point one microsecond after the beginning of the main memory 20 R–W cycle. Just prior to this time, an enabling signal is available at the terminal 306a and gates the "D" character onto the information channel 257 through the information channel mix, 306, line L. "D" now appears on the information channel from which it is entered into the RMAR 225, line W, to be used as an address for the second RM cycle in the "D" micro-operation, lines V and X. The enabling signal at terminal 306a remains on for the duration of the remainder of the twelve microsecond main memory cycle to maintain "D" on the information channel 257. This is done to allow the regeneration of this character back into main memory 20 during main memory write time which occurs during the last two and one-half microseconds of the twelve microsecond main memory R–W cycle, line N.

During main memory read time, line N, the IC address held in the MAR 250 enables the selection of proper current drive paths through the memory to select the addressed character, "D," from M–("IC"). These currents also pass through the modification matrix 30, which causes "IC"+1 to be generated on its sense lines which are then strobed and the contents entered into the RM SALS, lines HH and F. In this manner, the IC address is updated to that of the instruction "I" character. This address appears on the memory address channel 248 as soon as it is set into the RM SALS 247, since the enabling control signal at terminal 247a still remains "up."

The modification cycle is complete prior to write time, line O, for the IC access cycle of RM and at write time the RM information drivers 249, line N, enter this updated address into the IC, where the address is stored until it is ready to be used on the "I" cycle micro-operation which follows:

Immediately following the restoration of the "1-upped" IC address in the RM instruction Counter location, a second RM cycle is taken. The single character address, "D," held in the RMAR 225 is gated through the RMAM, 221, to provide the address selection information for this access to "D$_D$." The RM section selection is made by the MISC 37 which activates the terminal 242 to select the D/A section 26 of the RM 22 for completion of the addressing designation.

As a result of this second RM access, "D" is read to the RM SALS 247, line F, and the activation of control point 247a causes this direct data address to be read onto the memory address channel 248, line I. The activation of control point 300a enters "D$_D$" the shift register 300, line S, where it remains undisturbed until the end of the "I" micro-operation which follows. During write time of this second RM cycle, control point 249a is then activated to regenerate "D$_D$" back into its proper position in the RM 22.

The regeneration of "D" into the main memory location M–"IC" from which it was obtained, through the activation of control point 284 on the main memory inhibit mix 275, completes the M/O-D operation.

In review, this cycle has caused first, the read out of "IC" for addressing the "D" character of the instruction, second, the read out of "D" and its regeneration, third, the modification plus one of the IC and regeneration of this new address into the RM 22, and fourth, the read out and regeneration of "D" from the RM 22 and the entry of this direct data address into the shift register 300.

*The instruction "I" cycle (M/O-I)*

The M/O-I instruction cycle functions as a micro-branching operation. That is, at the end of this operation, one of two possible types of micro-operaions may follow. The "I" character is inspected to determine which of these two micro-operations is to be selected next. If "I" is any other character than a coded blank (b), the objective of the micro-operation is to perform the read-out from RM, of "I" and place this direct increment address in SR-2. The IC is to be set to the next higher address and "I" is replaced without alteration in the RM position from which it was read. The selection of the proper register section for read-out of "I" is determined by examination of the "tag" bits in the tens position of the shift register 300 which contains "$D_D$," read from memory during the preceding M/O-d.

If "I" is a coded blank (b), the operation follows the above procedure also, but the effect of the operation is exactly as if the complete cycle were skipped. This is accomplished by writing 0's into the three register positions which are addressed by the character (b). All three of these registers, like the registers in the RM section 24, function as a "read only" memory. No storage of data can be accomplished in these registers and (b), used as either "D," "I," or "A" in a processor instruction cycle only produces a read-out of +0000 as the direct address.

When "I" is a coded blank (b), the register 302 is loaded with +0000 during this cycle as described above. However, it additionally initiates the series of "i" micro-operations which cause the eventual loading of information into the shift register 302 which replaces this number (+0000) and casts it aside. The controls for the "I" micro-operation are identical for both types of "I" cycles as a result of this procedure, and greatly simplify the handling of the two types of cycles.

The initiation of M/O-I instruction is always caused by the completion of a previous M/O-D. In exactly the same manner as in the M/O-D operation, the operation character is addressed by accessing the IC location in the RM 22 to obtain "IC" which is transferred via the memory address channel 248 to the MAR 250 and used to address the location in main memory of "I." Likewise, the IC is "1-upped" by the modification matrix 30 and returned to the IC location in RM 22 during the first RM-R-W cycle of the "I" micro-operation.

The "I" character read from main memory appears in the main memory SALS 271 and like the "D" character, is gated onto the information channel 257 by the activation of control point 306a. The "I" character is gated into the RMAR 225, where it is held to be used as the address character for the second access to the RM 22. The selection of either the X4 section 24 or the I/O section 28 of the RM 22 for the second access is dependent upon the zone bits in the tens position of "D" found in the shift register 300. An X, Y, $\overline{Z}$ combination in this position indicates that the X4 section should be accessed. An examination of these zone bits was performed by the detect circuit 390 and the results of the examination were stored in latches as the "D" character was read from the main memory 20. The information in these latches is entered into the MISC 37 which generates enabling signals for application to either control points 241 or 243 at the proper time to set up the proper selection gate for the RM cycle.

The RM cycle is taken and "$I_I$" or "$I_{X4}$," whichever applies, is read from the RM 22 into the RM SALS 247 and onto the memory address channel 248 through the action of the control point 247a.

This increment direct address is then entered by the action of the control point 302a into the shift register 302 and also regenerated into the RM positions from which it came by the action of the register memory information circuit drivers 249, and its control point 249a.

As in the "D" micro-operation, the "I" character is gated from the information channel 257 through the main memory inhibit mix 275, and regenerated into the main memory 20 by the action of the memory inhibit drivers, 276. The detect circuit 390 responsive to the presence of a coded blank character (b) causes the micro-branching of the micro-operation sequence to M/O-$i_{12}$ if a (b) character is present in the first character register 272, K-6. If "I" is other than this character, the micro-operation sequencing is to MO/O.

*The instruction i cycles*

The M/O-$i_{12}$, and M/O-$i_{34}$ operations cause the readout from the main memory 20 of a four character address to be used as the increment address. This address is read from the main memory 20 with the high order first and at the rate of a single character at a time. The M/O-$i_{12}$ operation causes the thousands and hundreds positions read out of main memory and the M/O-$i_{34}$ operation causes the tens and units positions read out. These address characters are read into the register 302 at the units end of the register and are shifted left through the register until after the read out of "$i_4$" the address "$i_1i_2i_3i_4$" appears in the register 302, having replaced any previous contents of the register. The only addresses required to obtain this increment direct address are those contained in the IC. It should be noted that no reference need be made to the RM for any but the IC addresses. Since this is the case, the main memory is operated at its six microsecond rate for these "i" micro-operations. However, the basic clocking circuits, FIG. 11, in the instant invention maintain the same clocking intervals regardless of the speed at which memory is operated. The interruptions of processor memory accesses must be allowed when requested, at 12 microsecond intervals (between the end and beginning of successive clocking cycles).

Any single micro-operation of the processor or any single I/O may use two 6 microsecond cycles during any twelve micro-second period whenever this is required. However, any single micro-operation using only one 6 microsecond cycle pre-empts the use of the second half-speed cycle by any other micro-operation. All micro-operations are started only at the beginning of the basic 12 microsecond clocking cycle.

Since no second access to RM is required for any of the "i" read outs, two characters of the increment direct address may be read from main memory during each twelve microsecond clocking cycle by operating main memory at its six microsecond rate. Two micro-operations, therefore, M/O-$i_{12}$ and M/O-$i_{34}$ accomplish the readout of the increment direct address contained in an "eight character" RIOT instruction.

Referring to FIG. 34, the initiation of M/O-$i_{12}$ is always caused as the result of the detection of a coded blank character appearing in "I" of the "DIOA" instruction during M/O-I as previously described, line K. The IC is read from its position in RM as described in previous explanations of M/O-D and M/O-I and entered, via the RM SALS 247 and the Memory Address Channel 248, into the MAR 250.

Operation of the control points 295a and 295b on the Memory Control Gate circuit 295 causes the operation of Main Memory 20, to access, "$i_1$" at a six microsecond rate. During read time of the Main Memory Cycle, line KK, modification of the I/C address is accomplished, line F, by activation of control points 296a and 297a. This 1-upper address is sensed and set into the RM SALS 247, gated to the Memory Address Channel 248 and returned to the I/C location in RM by the action of the Register Memory Information Drivers 249 during write time of the RM R–W cycle, line F. Hereinafter, a reference to a regeneration loop into RM refers to the above described data path. Modified addresses are entered into the RM by the regeneration loop as the RM SALS service both the Register Memory locations and the sense output channel 280 of the modification matrix 30. The term "regeneration" when used with regard to a R–W cycle of RM refers to the re-entry of either the same information read from the accessed RM register during the read portion of the R–W cycle or to the entry of "1-upped" or "1-downed" information from the modification matrix 30 during the write portion of the RM cycle. In any event, regeneration refers only to the re-entry of information held in the RM SALS at write time.

The "$i_1$" character is entered, as it appears on the main memory sense lines 271, into the first character register 272. This information is gated through the Serial Channel Input Mix 339, onto the Serial Channel 337 by the activation of the control point 339a. This single character is then directed into the units position of the shift register 302 by the action of the control point 302b, line CC. In addition, control point 26 (see FIG. 28) conditions the register 302 to shift left. The action of the shift register set pulse, control point 20 (see FIG. 28) then causes the simultaneous read-in and left shift, line BB of register information.

The "$i_1$" character is also directed through the information channel mix 306 onto the information channel 257 and via the main memory inhibit mix 275 to the memory inhibit driver 276. These drivers regenerate "$i_1$" into main memory in the position from which it was obtained. Hereinafter a reference to a regeneration loop into main memory refers to the immediately preceding data path.

M/O-$i_{12}$ is now half-completed, and "$i_1$" has been entered and shifted into the units position of the shift register 302. The IC is now again accessed, line F, and handled exactly as in the first half of the micro-operation. However, the address contained in the instruction counter is now that of "$i_2$". The identical process carried out with respect to "$i_1$" is now carried out to transfer "$i_2$" into the position of the register 302 during the last half of M/O-$i_{12}$. The end of M/O-$i_{12}$ selects M/O-$i_{34}$ as the next processor micro-operation. As a result of performing M/O-$i_{12}$ the contents of the shift register 302 are 00 "$i_1 i_2$".

The M/O-$i_{34}$ operation performs exactly the same sequence of microsteps as M/O-$i_{12}$ in acting on "$i_3 i_4$". The only difference between these two micro-operations is that the finish of M/O-$i_{12}$ initiates M/O-$i_{34}$ and that completion of M/O-$i_{34}$ initiates M/O-0. At the completion of M/O-$i_{34}$ therefore, the increment direct address specified in an eight character RIOT instruction appears as the four character address contents of the shift register 302.

*The instruction "O" cycle*

During M/O-O, the operation code character, "O" is read from its stored position in the Main Memory 20. This character is entered into the second character register 308 where it is stored prior to its entry into the OP Decode Matrix 324 during M/O-A cycle, which is the next instruction cycle micro-operation to follow.

The addition of the data direct address, located in the register 300, and the increment direct address, located in the register 302, is carried out during the course of this micro-operation. This addition takes place serially by use of the adder arrays 329 and 330, shown in FIGS. 32 and 31 respectively. The addition results are read, as they are accumulated, back into the high-order end of the shift register 300, so that after four single add operations, the contents of the register 300 is the effective data direct address.

Address information for M/O-O required from Register Memory 22 consists only of ("IC"). The second RM cycle is not used for obtaining address information. However, during the second RM access cycle time, the @ register reset driver is activated and causes the @ registers in both the D/A and I/O sections, 26 and 28 respectively, of RM 22 to be reset to "no bits." During the regeneration of the up-dated IC information on the next instruction micro-operation, the @ registers are simultaneously loaded with this new IC address. This operation will be explained hereinafter.

The beginning of M/O-O initiates the addition of the data direct address, lines P', Q', R', S' in FIG. 29b, contained in the shift register 300, line U, to the increment direct address contained in the shift register 302, line A.

For purposes of this description, the contents of the register 300 is shown in line U, FIG. 29a as W, X, Y, Z, and the contents of the register 302 is shown in line A, FIG. 29b as a, b, c, d. The results of each addition is also shown in line U as W', X', Y' and Z'. This addition operation is carried out independently with respect to the readout of the "o" character from memory. The addition cycles are started immediately after the beginning of the first control cycle M/O-O, which is 4 microseconds prior to the beginning of the Main Memory read-write cycle line K. The determination of the type of add operation, true or complement add, is accomplished at the onset of this operation by examination of the signs of the two addresses to be added. As described hereinafter with respect to the Adder Matrices and FIG. 30 this allows the selection of either the channel three gating circuits or the channel four gating circuits, and conditions the adder matrices for either a true or complement add operation.

Four add cycles are taken to perform the four character address add, each cycle taking three microseconds. The general data flow during each add cycle begins with the gating of the units positions of the shift registers 300 and 302, CD–5, to the Channel 1–2 drivers and Channel 3–4 drivers 312, 314 and 340 respectively. Control points 316a and 322a on the Functional Matrix channel Mixes 316 and 322 control the entries to the Channel Drivers from the units positions of the registers. The selection of either the channel 1 or channel 2 path through the adder is made by the true-complement/carry/no-carry analysis circuits and the carry/no-carry SALS completely described hereinafter.

Each addition cycle is accomplished by the activation of two drive paths through the Adder Matrix and by activating the Adder Set Drivers.

The sum output is sensed into the Arithmetic SALS 348 during adder set time, line Q, FIG. 29b. Both shift registers (300 and 302) are then advanced right one position, line L' and N' and the sum contents are gated through the Serial Channel Input Mix 339, and entered into the high order position of the register 300 by action of the control points 339b and 300b, respectively. The Adder Reset Driver, line P', is then activated to clear the Adder for the following cycles and to obtain carry/no-carry results for selection of proper Channel 1 or 2 drive paths for the next add cycle. The units, tens, and hundreds add cycles use only the numeric adder. The thousands position add, the fourth add cycle in the series, involves the use of both the numeric adder 330 and also the zone adder 329. The details of this operation have been previously explained. Each of the four add cycles requires three microseconds. These cycles are taken successively and are complete within the 12 microsecond micro-operation "O." Notice that, at the end of the four cycle add operation, the direct effective data address is held in the register 300 and that the increment direct address contents of the register 302 has been shifted out of the register, leaving it empty.

The readout of the instruction "O" character during M/O-O is accomplished in the same manner as the readout of the "D" and "I" characters. The IC is accessed and this address is transferred via the Memory Address Channel 248 to the MAR 250. The Main Memory cycle is then initiated and "O" is read into the character register 272. The MAR address is modified by +1 and this modified address is regenerated into the IC location in Register Memory. The "O" character is read onto the information channel 257 and regenerated into Main Memory. Also "O" is read from the information channel into the second character register 308, where it is temporarily stored until it is to be entered via Channel 4 into the OP Decode Matrix 324, during the following processor operation M/O–A.

The second available RM, R–W cycle is not used during M/O–O since the "O" character is not used as an indirect address. During this time, a special reset drive signal, line FF, is applied to the reset line which links all the cores of the @ Registers in both the D/A and I/O Register Memory sections 26 and 28 respectively are activated. This reset signal is given by the @ Register Reset Driver 299, FIG. 3a, which causes the reset of the @ Register to "no bits," clearing them completely of any address information which they hold.

This completes M/O–O and causes the initiation of the last instruction cycle micro-operation, M/O–A.

*The instruction "A" cycle (M/O–A)*

The micro-step sequence composing M/O–A causes the accessing of the direct accumulator address from the Register Memory D/A Section, ("A"), and its entry into the second shift register 302. The "A" character is read from Main Memory in exactly the same manner as each of the other characters in a RIOT instruction. Because some non-arithmetic operation codes require only one address, the "A" character may be used as a modifier character or as a test character in these operation codes. However, because the actual operation decoding never occurs until midway through micro-step sequence of M/O–A, the "A" character always is used to address register memory and causes the loading of "$A_A$" into the register 302, whether this address is to be used in the operation or not. Also, "A" is also used as information input to the Channel two Drivers 314 which, in conjunction with the Channel four Driver 340 and Gating selection circuit 322, causes the set up and decoding of the operation. In the event that the operation is specified by both the "O" and the "A" characters, the full information for the set-up is available to the OP-Decode Matrix. When the "O" character only is involved in the set-up of the OP–Decode Matrix 324, the current on Channel two have no effect. This is accomplished by the wiring pattern in the decode matrix.

Also, during M/O–A, the updated IC address is stored in the @ Registers in both the D/A and I/O sections of Register Memory in addition to its regeneration into the IC. This entry into all three registers occurs simultaneously during the IC Register write cycle. The storage of "IC" in the @ Registers allows the access, under program control, to the setting of the IC. An explanation of the use of the @ registers and their contents will be given hereinafter.

M/O–A is initiated by the completion of M/O–O. The IC is accessed, line B, FIG. 29a, and "IC" is read from register memory into the MAR 250. The Main Memory cycle is taken and CM–"IC," the instruction "A" character, is read into the first character register 272, line K. The modification matrix 30 is caused through the action of the Add-one Driver 297 to again update "IC" held in the MAR and this modified address is regenerated in RM. During this regeneration cycle, the @ Register Write Driver 299 is activated by the action of control point 299b. This causes the simultaneous selection of the IC register location, and also both @ Registers in the D/A and I/O Register Sections for entry of the updated IC address. The previous reset of the @ Registers to "no bits" during M/O–O allows entry of information into all three register positions, the IC and both $@_D$ and $@_I$, simultaneously without conflicts during M/O–A.

The instruction in the "A" character is read onto the Information Channel 257 through the Information Channel Mix 306, and regenerated into Main Memory 20. The "A" character is also entered into the RMAM 221, and is used on the second RM, R–W cycle to read "A," the direct accumulator address by the Memory Address Channel 248 into the shift register 302.

The "O" character, held in the second character register 308 is gated through the Channel three-four mix 322, line 2; by the action control point 322b to the Channel three-four Drivers circuit 340. The channel four path through the Functional Matrices is selected by the activation of a channel four gate 400. The "A" character appearing on the Information Channel is gated through the Channel one-two Mix 316 by activation of the control point 316a. Information currents are caused to flow through channel two through the functional matrices by the control point 314a activation of the B-branch Matrix and the OP-Decode Matrix Set Drivers caused the entry of operation information into these matrices. Entry of this information is accomplished about three microseconds after the beginning of the Main Memory cycle of M/O–A. The Set Drivers are activated for about two micro-seconds to perform this function. The sense signal outputs from the OP-Decode and B-Branch Matrices are detected at set time, and cause the initial set-up of the Operation Control Matrix Drivers and Gating Circuits at this time.

*Data cycles*

Several types of data cycles exist in this data handling system. They can be broken down into three basic categories: first, a data cycle employing two address cycles whose operations involve two data fields stored in Main Memory; second, a data cycle employing a single address cycle which uses only one Main Memory data address; and third, a data cycle employing address modification cycles which act on the contents of one or more registers in the Register Memory.

The instructions performed in this data handling system can also be classified into four groups. These groups are: first, a numeric data instruction which operates only on pure signed numeric data; second, alpha-numeric instructions which perform their functions on all data characters in the entire internal character set; third, test and branch instructions; and fourth, instruction and/or register modification instructions which control arithmetic and manipulation operations on the contents of the Register Memory.

In addition to operations which may be programmed under operation code control, several automatic operations are initiated automatically on occurrence of certain specific conditions while processing is being accomplished. The instant data handling system is equipped with an "interpretive console" which allows manual access by the operator to information within the computer for display without the necessity of halting the computer program. Display or entry requests from the console initiate automatic "fetch" or "store" operations which are performed much like the automatic I/O character read-in/read-out cycles. In connection with the operation of the interpretive console, the entry of the processor into the "non-stop branch" mode as a result of the detection of error conditions, causes an automatic storage of existing operating addresses and data characters into a sequence of fixed memory positions which can be inspected by either the non-stop branch error correction routine or by the operator through the interpretive console. This automatic operation is also an example of a non-programmed operation string which is, in all ways, controlled like a normal data cycle. Also, the I/O cycles are these types of non-programmed data cycles.

The following detailed explanations will give the generalized picture of each of the categories of data cycle ypes and instruction groupings. Several operations appear in each of these groupings in a complete instruction set. A typical one of each of these will be selected for example purposes.

The numeric add operation (A)

An add operation causes the addition of two fields of numbers located in the main memory. One field is termed the data field and its low order digit is addressed by the effective data direct address found in the shift register 300 (SR-1) at the beginning of the data cycle of the add operation. As each character from the data field is accessed, the address in the register 300 is decreased by one so that the next higher order character in the data field may be accessed for the following add cycle.

The other field is termed the accumulator field and its low order digit is addressed by the accumulator direct address found in the shift register 302 (SR-2) at the start of the add operation data cycle. The addition operation causes a series of additions of two numeric digits to be performed; one from the data field and one from the accumulator field.

Each add cycle is composed of two memory accesses and two micro-operations. The first access to memory is always to the data field address and secures the data field numeric character from M-("SR-1"). This character is then regenerated back into main memory. The second access secures the accumulator field numeric character from M-("SR-2"). These two numeric digits are then added together during the compute time in the main memory accumulator character access cycle. The addition answer is generated at the arithmetic SALS 348 and gated to the main memory inhibit drivers 276 where it is entered into the accumulator in place of the original numeric character used for the add cycle.

Successive add cycles are performed until the addition operation has been performed on the full length of the shortest of the two fields. This condition is signaled by the appearance of other than an unsigned numeric character during either the accumulator or the data character read-out from memory. It indicates that the field was exhausted on the preceding add cycle. Note that this rule does not apply for the first add cycle, since both numeric fields may be signed over the units position. Any add or subtract operation must be at least a one digit field add.

Note also that fields of unequal length may be added together. Several conditions exist which are related to the length of fields used in the add-subtract operations. Answers may only be formed to the length of the accumulator field and no further part of an answer is formed which exceeds this length. All answers formed are true results of the addition of the total accumulator field to an equal length of the data field beginning at the units position. If the data field is detected to be longer than that of the accumulator, regardless of whether the leading digits are significant or not, the accumulator overflow condition indicator is set "ON." Also, for true add operations, a carry from the add cycle for the highest order accumulator position causes the setting of the overflow condition. This condition can occur for any of the three length conditions of the data field with respect to the accumulator, longer than, equal to, or shorter than the accumulator.

In the event that the data field specified by the add instruction is shorter than the accumulator field, the add-subtract operation is performed such that all carries are propagated to the highest order accumulator position. As specified previously, the normal add cycles are suspended upon detecting the end of either the accumulator or data field. The end of the accumulator field additionally indicates the end of the operation. When the data field is exhausted prior to the detection of the end of the accumulator field, only the read-out of the accumulator field is continued and the remaining addition cycles consist of propagating any carry through the remaining high order accumulator digits. Notice that this carry propagation cycle time is only half of that required by an "add" cycle.

Both the add (A) and subtract (S) OP codes are essentially the same operation and both use the identical set of micro-operations. The initiation of the add-subtract sequence involves the inspection of the operation code, the data field, and the accumulator field signs to determine whether the operation calls for a true or a complement add operation. This determination is made by algebraically multiplying these signs together. If the product is minus, there is an odd number of minus signs, then a complement add operation is performed; if the product is plus, there is an even number of minus signs, then a true add operation is performed. This sign examination is carried out during the second add cycle micro-operation (INITIAL ACCUMULATOR), and the results of the comparison set up a selection of Channel three or Channel four by energizing the proper gate circuit for the selected channel. This selection is maintained for the remainder of the entire add operation.

Also during the first add cycle, the low order position addresses of both the accumulator and the data fields are stored in $\alpha_I$ and $\alpha_D$, respectively, in the register memory 22. These two internally used registers maintain starting (units position) addresses of each field in the event that they are required later in the micro-operation sequence.

Only the initial address of the accumulator field is useful to the add-subtract operation, but in the general category of arithmetic and data handling operation codes, the initial data field address is also used. The storage of the initial field addresses in $\alpha_I$ and $\alpha_D$, are therefore stored for all operations involving fields of information, mainly because it is simpler to perform this function on a general, rather than on a selected, basis.

The results of a complement add operation can produce a sum which is in "10's complement" form. This condition is signaled for complement add only, by the generation of a "no-carry" from the high-order add, or carry propagation cycle, for the accumulator field. A carry from this position indicates that the answer is in true form. When the "no-carry" result occurs, the answer in the accumulator must be re-complemented. The recomplement operation is performed by entering the accumulator field, beginning again at the units position, into the complement entry of the adder channel four, and inserting zeros on the channel one-two entry of the adder. The start of any complement add operation forces a single carry on the first add cycle to compensate for the fact that the complement entry on channel four forms "nine's complement" numbers relative to input digits. The insertion of the carry on the initial complement add cycle produces the effect of "10's complement" entry in the cheapest manner.

The recomplement cycle start address is obtained from the $\alpha_I$ register for the first cycle of the recomplement operation. The storage of this initial address thus eliminates the need for a countback scan to recover the initial address of the field by searching for the units position sign bits.

The initial true or complement add cycles always direct the data field into the true-complement entry of the adder, the channel three-four mix 322 and the accumulator field into the carry-no carry, channel one-two mix 316, entry. On recomplement cycles, however, the accumulator answer field is entered into the true-complement entry.

The effect of a complement add operation producing a complemented result is that the original accumulator sign is the wrong one and that the result is in complement form. Whenever the answer produced is in true form, the sign is also correct. Thus, the first cycle of a recomplement operation also acts to change the accumulator sign.

During all arithmetic and other operation cycles which operate on fields of data within the main memory, the address of the next succeeding data field character, the returning modified address, is stored in the data chaining register, $\%_D$. Therefore, the contents of the chaining register at the completion of each programmed operation are set to the beginning position of the next field of data in the memory. It is therefore possible, by specifying % as the "D" character of any instruction, to "chain" the processing of a string of data fields. Notice that this processing may be performed by a very few written instructions since a loop may be used to allow one written arithmetic instruction to operate on the entire data string.

As a simple example of this type, the following sequence can be used:

(1) Load %$_D$ with start address of data string
(2) Add operation—("D"=%)
(3) Count (Add-Compare)
(4) Branch unequal to step No. 2
(5) Continuation of Program Steps 3–5 are unchained operations and cause no disturbance of the contents of the data chaining register %$_D$. The add-compare code is merely an instruction which allows the counting of the number of passes made through the loop. Each time the loop, steps 2, 3, and 4, is traversed, the next data field in the string is acted upon by the add operation code in step 2.

Many other uses can be made of the chaining feature, and in addition to the chaining of data fields, accumulator fields are likewise automatically chained. The accumulator chaining register is #A and the automatic storage of chaining addresses into this register is carried out in similar manner into the storage of data chaining addresses. Chaining in #$_A$ is limited to those operations which specify an accumulator field.

Thus, in an add-subtract operation, both the accumulator and the data fields are chained, and the programmer may elect to use either or both these addresses for whatever purposes he desires.

It should be noticed that the demarkation of fields of data within the main memory is specified in one of two ways. The main memory contains no wordmarks. Operations are divided into two groups; those which operate on numeric data only, and those which operate on alphanumeric data. For numeric operations, data is always stored in unsigned numeric form except for the units digit which is signed. The initial address in the operation addresses to the units position of the field/fields to be used. The first non-unsigned numeric character read from memory after the units character is then assumed to be the units position of the next field unless the character is a special marker character called the alpha-word-separator, $\alpha$.

The $\alpha$ character is used to demark the position and length of alphanumeric fields in main memory. It acts only as a marker and has no character significance with respect to data. If during the course of a numeric operation, the end of the numeric field is indicated by an alpha-word-separator, the chaining address is moved past the $\alpha$ to the next position such that the units position of the following alphanumeric field is maintained as the chain address. Note that the alpha-word-separator is not required to appear between the high order end of a pure numeric field and a low order position of an alphanumeric field, since a detection of the end of the numeric field is made by sensing other than an unsigned numeric character. However, care must be exercised that the low order character of such an alphabetic field is not an unsigned numeric if the separator is not used.

Data stored in memory which is alphanumeric in nature is most generally demarked on both ends with an alpha-word separator. Only one separator character is necessary between adjacent fields such that one alpha word-separator position is required for each alphanumeric field. Chaining functions automatically compensate for the presence of the separator character whenever it is encountered in the course of scanning data or accumulator fields. Alphanumeric operation codes are terminated by the sensing of the alpha-word-separator in the course of scanning the designated fields involved. These codes always address to a character in the alphanumeric field/fields used, never to a word-separator-character.

The above description only applies to instructions handling fields of data. Operations exist in the RIOT system which handle fixed numbers of characters, and also some which handle no data from main memory whatsoever. These codes, in general, are in no way effected by appearance or detection of field demarkation information, and their "end of operation" detection is based on other conditions.

Seven distinct micro-operations form the set which is used to perform the total add or subtract data cycle in the RIOT Processor. These micro-operations are as follows: Initial Data (ID), Initial Accumulator (IA), Normal Data (ND), Normal Accumulator (NA), Long Accumulator (LA), Initial Recomplement (IR), Normal Recomplement (NR).

The descriptions of the functions carried on during each micro-operation type follow. Each of these micro-operations is an entity in itself, and the micro-steps within each cannot be altered in any way. Each micro-operation works only on one character of numeric data. Multi-character fields are handled by the proper repetition of the micro-operations as determined by hardware generated conditions and/or field demarkation conditions.

The ID operation is the beginning micro-operation in any Add-Subtract operation data cycle and occurs only once during it. It supplies the effective data address in SR-1, 300, to the memory addressing circuits, including the memory address register 250, for retrieving the units position data character from this addressed memory position. The initial effective data address is also stored in the $\alpha_D$ register during ID. The address supplied to the memory is also decreased by one and returned to SR-1 for use during the next data field micro-operation (ND). No storage of chaining addresses is accomplished during the ID micro-operation. The units position data character is read from main memory and transferred into the second character register 308 where it is held until the units position accumulator field character is obtained on the following processor micro-operation, IA.

The IA operation is always the second micro-operation in the Add-Subtract sequence. It like ID occurs only once during the Add-Subtract data cycle sequence. This micro-operation acts to supply the effective accumulator address to the memory addressing circuits and simultaneously causes the storage of this units position accumulator address in $\alpha_I$ in the Register Memory 22. The units position accumulator character is read from the main memory position address into CR-1, the first character register 272. The sign bits (zone bits) of both the data field and the accumulator field units position are analyzed in combination with the sign of the operation (Add or Subtract) by the True-Complement Analysis Circuits 342 to set up the proper paths through the numeric adder matrix 330 and the zone adder matrix 331 for the operations. These paths provide either the true or complement add and the initial carry or no-carry condition. The contents of the second character register 308 is then gated to the channel three-four drivers 340 and the contents of the first character register 272 is entered into the numeric adder 330 via the channel one or channel two drivers 312 and 314 respectively. The numeric adder set driver is then activated, and the units position sum is sensed by the arithmetic SALS 348. The set driver is not shown but is standard in construction. It comprises a current driver and a winding which threads each core in the numeric adder matrix 330. This numeric sum is then combined with the initial accumulator sign bits, numeric bits of the sum plus the original accumulator zone bits, and entered into the units position of the accumulator field, replacing the original units position contents.

The numeric adder reset driver is then activated and the matrix is reset. The reset driver is not shown but is standard in construction. It comprises a current driver and a winding which threads each core in the numeric adder matrix 330 in a current sense opposite to that of the winding associated with the set drive. At reset time, the carry or the no-carry condition is sensed by Carry/No-carry SALS circuit 394 shown in FIG. 25a. This condition is maintained in the SALS 394 to allow setup of the following add cycle during the NA micro-operation. No storage of the accumulator chaining address is carried out during IA. With the completion of the IA operation, control is then passed to the next micro-operation, ND.

The ND operation controls the read-out of all characters from the data field other than the units position sign digit. Each single micro-operation acts to extract a single character from the memory position whose address is contained in SR–1, 300. This address is continually reduced by one through the normal action of the modification matrix 30 and returned to the SR–1 to be used on the next following ND micro-operation. As the effective data address is supplied to the memory address register 250 at the beginning of the ND main memory access cycle, the address is entered into the data chaining register, %$_D$, in the section 26 of the register memory 22, replacing its previous contents. This storage is made for every ND cycle performed and it occurs during the first of the two register memory read/write cycles in the micro-operation. Thus, when in the course of the series of ND micro-operations performed in the Add-Subtract data cycle, the units position character of the field adjacent to the one specified by the instruction is read from main memory 20, the data chaining register has been automatically loaded with the address of this character. The ND control step sequence continually looks for this units position character, indicated by any but an unsigned numeric digit, as an indication of the completion of the read-out of the full data field for all detected stopping characters except the alpha-word-separator. This completes the handling of the chaining address which, in these cases, now sits at the address of the units position of the next sequential data field.

If an alpha-word-separator character is detected, however, the units digit is located one further address position lower in memory. This address is actually the "1-downed" address which has been returned to SR–1, 300. For all ND micro-operations, if the alpha-word-separator is detected, the address in the SR–1 is entered during write time of the second RM R–W cycle into %$_D$.

The data character obtained from main memory is transferred into the second character register 308 where it is stored temporarily to await the read-out of the corresponding accumulator character with which it is to be combined in the numeric adder 330 during the next processor micro-operation, NA. Data field characters are undisturbed in content by the Add-Subtract operation and each data character read out is regenerated into the position in main memory 20 from which it came.

The detection of the end-of-data-field condition during an ND operation transfers the control sequence to the "LONG ACCUMULATOR" micro-operation since the detection of the units position of the next sequential data field indicates that the accumulator field is as long or longer than the data field. Lacking the indication of the end-of-data-field condition, control is transferred to the "NORMAL ACCUMULATOR" micro-operation, NA.

The NA operation is the first of three micro-operations which may cause the termination of the total Add-Subtract data cycle. This micro-operation causes the read-out of the effective accumulator address from SR–2, 302, onto the address channel 248 from which it is entered into memory address register 250. With the first Register Memory cycle, the effective accumulator address is read into the accumulator chaining register, #$_A$, the section 26 of the register memory 22. Access is made in the main memory 20 to the addressed accumulator digit and this character is entered into the first character register 272. The address in the register 250 is reduced by one by the modification matrix 30 and is gated from the SALS 247 onto the address channel 248 during the second register memory read-write cycle. At this time it is re-entered into the SR–2, 302, so that it may be used during succeeding accumulator handling micro-operations.

During all NA cycles which read an unsigned numeric character from the effective accumulator address supplied to the MAR, the cycle provides for the gating of this unsigned numeric character to the selected channel 1 or channel 2 entry to the numeric adder 330. The selection of the correct channel is made by the true-complement circuits 343 in response to the carry or no-carry output of the previous add cycle. The data field character read from the memory 20 on the previous micro-operation (ND) is gated from the second character register 308 to the channel 3–4 drivers 340. The numeric adder set driver is then activated and the sum digit is sensed into the arithmetic SALS 348. This resultant unsigned numeric answer character is then regenerated into the accumulator field position in place of the augend digit during main memory 20 write time. Control is then transferred to the next following processor micro-operation, which, under these conditions, is ND.

The Numeric Adder Reset Driver is then activated to reset the adder matrix 330 and to provide carry/no-carry sense outputs to the carry/no-carry SALS 394 for subsequent use in following add cycles.

The detection of any but an unsigned numeric accumulator field character during NA indicates that the accumulator field has been exhausted and that an answer has been assembled to the maximum limits of the designated accumulator size. Whenever this condition occurs, the Add operation normally performed during NA is eliminated and the detected units position character is returned to memory unchanged. The character is examined to determine if it is in alpha-word-separator and, as in the data chaining procedure, if so, the "1-downed" address is entered into the accumulator chaining register, #$_A$, during the second register memory 22 write cycle. The result contained in the total accumulator field at this point may now be in either true or complement form. The condition of the answer is determined by switching circuitry as follows.

If a true add operation is being performed, the answer is always in true form. The carry/no-carry condition formed by the adder circuitry from the previous add cycle, data digit plus the high order accumulator digit, is examined. If a carry occurred during this cycle, the accumulator field was too small to contain the total results and the accumulator overflow indicator is set. The total Add-Subtract operation is finished and control is transferred to the beginning micro-operation of the following instruction cycle.

If a complement add operation is being performed and the high order accumulator add cycle produced a carry, the answer in the accumulator is in true form and the operation is complete. Control is transferred to the beginning micro-operation of the following instruction cycle.

If a complement add operation is being performed and the high order accumulator add cycle produced a no-carry, the answer is in complement form and must be re-complemented. To perform this recomplement operation, control is transferred to the first micro-operation of the two in the recomplement sequence, IR.

In the event the designated data field is longer than the accumulator field, only the number of digits of the data field equal to the length of the accumulator field are used in the operation. Furthermore, the completion of the add operation leaves the data chaining address set to the address of the position one to the left of the total data field used in the operation. In this case, this address is not the units position of the next data field as it always is if the data field is either equal to or shorter than the accumulator field.

As previously mentioned, the LA operation is called into control of an Add-Subtract data cycle following the detection of the end-of-the-data-field in an ND micro-operation. This condition indicates that the length of the data field is either equal to or shorter than the accumulator field and that no further information is available from the data field. In this instance, only carries from the previous add cycle are to be propagated through the remainder of the accumulator field. To perform this operation it is only necessary to read the remaining characters from the accumulator field to the Channel 1 or the Channel 2 entries of the numeric adder 330 and to insert zeros at the channel 3–4 entry. The selection of the entry path is determined by the carry or no-carry condition. Once initiated, the NA mirco-operations follow each other until the units position of the next sequential field is sensed. The addition operation is eliminated for this last LA micro-operation. The storage of the accumulator chaining address is carried out in the identical manner as described in the NA micro-operation. The sensing of the units position of the next sequential memory field or an alpha-word separator signals the completion of the LA micro-operation series.

The three possible conditions dictating the status of the answer in the accumulator are identical to those listed in the three previous paragraphs in the description of the NA micro-operation in all respects and are not repeated here.

Control is passed to the IR micro-operation when an answer has been formulated in the accumulator field as described in either an NA or the LA micro-operations. No other micro-operation can transfer control to the recomplement sequence save these two micro-operations. Since the answer can be assembled in complement form only as a result of a complement add operation, the selection of the complement add channel through the adder matrix 330, channel 4, has already been made, and this selection is merely maintained for the rest of the Add-Subtract operation.

The recomplement of the accumulator field is accomplished by the initiation of a single IR micro-operation plus a following sequence of NR mirco-operation sufficient to again read out the total accumulator field plus the units position of the next succeeding memory field. Since the minimum field size is one character in length for both data and accumulator fields, the Add-Subtract operation cannot be terminated at the end of an initial operation, ID, IA, or IR.

In order to initiate recomplement of the accumulator field, the IR operation reads the units position of this field from the main memory 20. The storage of the units position of the accumulator direct address in the $\alpha_I$ register in the register section 28 was carried out during IA expressly for this purpose. The IR operation accesses the contents of the $\alpha_I$ register and supplies this address to the address channel 248 so that the units position digit of the accumulator field may be read into the first character register 272 from the main memory 20. The contents of the $\alpha_I$ register is regenerated back into the register memory section 28 during the first register memory read-write cycle. The units position accumulator direct address is "downed" by one in the modification matrix 30 and supplied during the second register memory cycle to the address channedl 248 and gated into the SR–2 302. Subsequently, complement cycles NR obtain addresses from SR–2.

The accumulator digit is then gated directly from the first character register 272 through the channel 3–4 mix 322 to the channel 4 entry to the numeric adder matrix 330. The digit generator 335 generates a zero for entry on channel one when a carry condition exists. The activation of the numeric adder set driver produces the sum on the sense lines, which sum is the tens complement of the entered digit, and this true units position answer is sensed into the Arithmetic SALS 348. As mentioned previously, any time that a complemented result is formed in the accumulator field, the sign of this result is the inverse of its proper value. Switching circuitry which insepcts the sign bits of the character in the first character register 272 cause the inversion of the sign value and sets the zone bit Arithmetic SALS to this value. The proper units position sum plus sign is then regenerated into the units position of the accumulator field in the main memory 20. The numeric adder reset driver resets the numeric adder matrix and supplies carry or no-carry information for use in the setup of subsequent recomplement add cycles. Control is then transferred to the NR micro-operation which follows.

The NR micro-operations perform all the complement add cycles other than the units position cycles handled by IR. The effective accumulator address is read from the SR–2, 302 to the register 250 and an accumulator character is read from the main memory into the first character register 272. The Adder operation is the same as in IR except that the selection of the carry or no-carry condition is determined by the result of the previous add cycle. Also, no sign information is carried by the remaining accumulator digits to be complemented. Therefore, for these recomplement cycles, the "no-sign" zone bits are entered into the Arithmetic SALS 348 in conjunction with the numeric bits in the generated answer.

The NR micro-operations follow one another until the micro-operation detects the end of the accumulator field. At this point, the Add-Subtract data cycle is complete and control is transferred to the "D" micro-operation of the following instruction cycle. Notice that no chaining takes place during the recomplement micro-operations since the proper chaining addresses have already been formed during either the NA or LA operations.

*The alpha-numeric move character instruction (K)*

This instruction is a single character move operation. The instruction causes the character designated by the accumulator direct address to be placed in the effective data direct address in the main memory 20. Since only one character is moved by the operation, stopping conditions are not in any way dependent upon field demarcations in the memory. No cognizance is taken of any of the normal stopping characters with respect to control of the termination of the operation, and these, along with all other valid characters, are handled in the move in the same manner. Both the accumulator and the data addresses are "chained" to the address one lower in memory. This is true regardless of what the contents of this "one lower" address might contain, alpha-word-separator, group-mark, etc. The character contents of memory designated by the accumulator address is unchanged as a result of the operation.

Only one micro-operation is required in the complete move character data cycle. Two 6 microsecond main memory cycles occur during this one micro-operation, and two register memory cycles are also taken to perform the storage of the chaining addresses in the $\%_D$ and $\#_A$ registers in the register memory section 26.

For the first main memory cycle, the accumulator direct address from SR–1 300 is gated onto the address channel 248 and into the register 250. The addressed accumulator character is then read from the main memory into the first character register 272, where it is held for the duration of both main memory cycles.

As the accumulator direct address is read from SR–2, 302, the accumulator chaining register address, $\#_A$, is generated by the address generator circuits 227 and the register memory 22 reads out the contents of this register. The register memory SALS 247, however, are not strobed and this effectively clears the accumulator chaining register and prepares it for receiving the new accumulator chaining address during the write portion of the cycle.

The accumulator direct address is "downed" by one by the modification matrix 30 and regenerated into the accumulator chaining register. The main memory regeneration loop is closed and the accumulator character is regenerated into the main memory location from which it came. This completes the first half of the micro-operation and the first of the two main memory read-write cycles.

The second of the main memory accesses is made to the data direct address which is supplied to the register 250 via the address channel 248 from the SR–1 300. In a manner similar to that employed with respect to the #$_A$ register, the data chaining register %$_D$ is cleared in preparation for its loading with the new data chaining address. The main memory read-out of the data character is performed, but the main memory output SALS 271 are not strobed. The data character location is thus cleared, during write time of the second main memory access cycle, for entry of the desired accumulator character, which is still held in the first character register 272. The data direct address in the MAR is "downed" by one by the modification matrix 30 to obtain the correct data chaining address and this address is regenerated into the %$_D$ register in the register memory section 26. This completes the total data cycle of the Move Character Instruction and transfers control to the beginning micro-operation of the following instruction cycle.

The Riot branch instruction (D+"A" modifier)

The performance of a branch instruction requires a maximum of one micro-operation and never requires an access to the main memory 20 for data. In the case that branching does not occur, no data micro-operations are required and the operation is completed at the end of the instruction cycle. Where branching conditions are met, a simple data cycle micro-operation is taken to transfer the branch address, which is the effective data direct address in SR–1, to the instruction counter register and to the interrupt likage register @$_I$.

The condition testing specified by the branch instruction and its associated modifier (the "A" character) is actually carried out during the "A" micro-operation at the time the "D" and "A" characters are driven through the operation decode matrix 324 and the b branch matrix 326. The actual testing is done in the "B" branch matrix 326 and the result of the selected condition test is set into a branch SALS circuit 396 mid-way through the "A" micro-operation.

If the specified conditions are not satisfied control is transferred to the first micro-operation of the next instruction cycle sequence. When the condition is met, the branch data cycle micro-operation is called into control. This branch micro-operation only causes the movement of address information and no main memory cycle is taken during this memory operation. During the first register memory read/write, the instruction counter register is accessed. The register memory SALS 247 are not strobed and this cycle clears the instruction counter register prior to read-in. The branch address in the SR–1 300 is gated to the address channel 248. The register memory information drivers 249 are activated during the register memory write time, entering the branch address into the instruction counter register. On a second register memory access cycle, provided the processor is in normal, non-interrupt mode, the @$_I$ register is cleared and the branch address is entered from the address channel into this register also. If the branch instruction is performed in interrupt mode, the second register memory access is not made and the contents of @$_I$ remains undisturbed. This completes the branch micro-operation and control is transferred to the "D" micro-operation of the next instruction cycle. It should be noted that the branch codes are never chained and that the data chaining and accumulator chaining registers, %$_D$ and #$_A$ respectively, are never disturbed by this operation.

The add/store A$_I$ operation (X)

The Add/Store A$_I$ Operation causes the loading of the I Register in the register memory section 28 with the *true* results of "D$_D$"+"I$_I$." It also causes the former contents of the I register specified by "A" to be loaded into the accumulator chaining register #$_A$.

It should be noted that this operation may be different than just loading A$_I$ with the effective data direct address contained in the SR–1 300 at the completion of the instruction cycle because the result of a complement-add-index operation may be a 10's complement result. In this operation, therefore, the carry conditions which resulted from the high order index-add are examined to determine whether the answer is in true form or not. Furthermore, it must also be determined, for true-add-index, whether the upper limit of the available memory addresses in the system has been exceeded by the index-add. This is detected by sensing a carry from the high order position on the true-add-index-operation. Indexing past the limit of memory addressing capacity is not allowed for Add/Store Operations and, if this is done, a processor error is registered. Although signs are effective in the add operation in the Add/Store, and other operations involving arithmetic handling of addresses, addresses used by the main memory addressing circuitry are absolute, and no cognizance is taken of signs in the addressing itself.

The Add/Store A$_I$ Operation, therefore, examines the index-add results gained during the instruction cycle to determine if they are in true form. If so, it causes the effective data direct address in the SR–1 300 to be loaded ino "A$_I$," and enters the previous contents of "A$_I$" into #$_A$, the accumulator chaining register. If the effective data direct address is in complement form, the answer is recomplemented to bring it to true form before performing the storage operation described above. If the index-add exceeded the upper limit of memory, the address error indicator is set, and no operation is performed. No chaining is carried out during the operation, but the accumulator chaining address is loaded in this operation with the original contents of "A$_I$." The data chaining address is undisturbed.

The add/store A$_D$ operation

An Add/Store A$_D$ operation operates exactly as Add/Store A$_I$, except that this code operates on the contents of the D/A section 26 of register memory 22, rather than the I/O section 28.

The Add/Store A$_I$ data cycle micro-operation sequence contains either one or two micro-operations. One of these micro-operations, RECOMP SR–1, is performed only when a complement-add-index operation has produced a complement result effective data direct address in the SR–1 300. In this event, the data cycle begins with this micro-operation which is then followed with the second of the two micro-operations, the "STORE" A$_I$ micro-operation.

If the index-add operation produces a true result without exceeding the limit of memory addressing, the RECOMP SR-1 micro-operation is not performed and the data cycle consists only of the single STORE A$_I$ micro-operation.

Before proceeding with a discussion of the micro-step sequence in each of the two Add/Store micro-operations, a short discussion of the method of setting up OP-Decode selection of one or the other of the two is given.

For each index-add cycle, the result of the high order add, carry/no-carry conditions in conjunction wtih complement or true-add-index are examined. True results are indicated by true add and no carry or by complement and a high order carry. True add and a high order carry indicates that memory addressing capacity has been exceeded. Complement add and a no-carry indicates an answer in complement form.

These three conditions, namely: true address, high address, and complement address, are detected as conditions during every instruction cycle "O" micro-operation as the index add cycle is completed. The one detected condition is entered by energizing one of the three condition drivers servicing the "OP-DECODE" matrix where cores are set correspondingly to allow the selection of the initial data cycle micro-operation during the "A" cycle when, as previously described, the actual operation and modifier characters are decoded.

The decoding of the Add/Store OP character (x), thereby can cause the cancellation of the entire data cycle; the setting of the address error indicator; and call in the next instruction cycle, memory address capacity exceeded; or the entry into the RECOMP SR-1 micro-up, complement address; or the entry into the STORE $A_I$ micro-op, true address.

The RECOMP SR-1 micro-operation

The RECOMP SR-1 opertaion requires neither an access to the main memory 20 nor an access to the register memory 22 for data. The only operation performed during this micro-operation involves serially entering the contents, beginning from the low order to the high order position of the SR-1 300 into the complement add entry of the adder matrix 330. Four add cycles are taken during the RECOMP SR-1 micro-operation and their timings correspond identically to those of the index-add operation. The serially formed answer is read from the arithmetic channel 280 through the serial channel input mix 339 onto the serial channel 337 and shifted into the high-order position of the SR-1 300. After four add cycles the true answer is contained in the SR-1 300. For this recomplement operation, the units position character is gated through the channel three-four mix 322, and into the channel three-four drivers 340 for each of the add cycles. Channel four is activated to provide for a complement add operation by activating the channel four gate circuit 400. The digit generator 335 is activated to provide a zero insert to the channel one-two entry of the numeric adder 330 for each of the four cycles. As in all complement add operations, the first add cycle is accomplished with a forced carry insert and subsequent cycles are then dependent on the carry or no-carry conditions from the previous add cycle. The assembly of the re-complemented effected data direct address in the SR-1 300 completes the RECOMP SR-1 micro-operation and calls the following processor micro-op STORE $A_I$.

The STORE $A_I$ micro-opertaion

This micro-operation causes the actual manipulation of the address data in the register memory 22. Two register memory accesses are required but no main memory access is necessary. The first register memory access is taken by gating the "A" character from the register 225 through the mix 221 to the register memory addressing circuits. The MIGC 37 causes the selection of the I/O section 28 and "$A_I$ is sensed into the register memory SALS 247 where it is held, but not yet gated onto the memory address channel 248 for the full duration of the micro-operation.

During the first register memory read/write, the contents of the SR-1 300 is gated onto the memory address channel 248 by activation of control point 300b and at the register memory write time of the first cycle, the register memory information drivers 249, enter the true effective data address into "$A_I$."

The second register memory access is then made to the #$_A$ register through generation of the # character by the address generator 227, and the selection of the register memory D/A section 26 by the control circuits, control point 242. The original contents of #$_A$ are accessed, but the sense line outputs are not "strobed," thus clearing the register and maintaining "$A_I$" in the SALS 247. The contents of the SALS 247 are now gated onto the memory address channel 248 and, at the second register memory cycle write time, "$A_I$" is entered into the #$_D$ register. This completes the STORE $A_I$ operation and also the Add/Store $A_I$ data cycle. Transfer of control is made to the first micro-operation, "D," of the next instruction cycle.

Instructions

There are five categories of instructions listed: (1) numeric data instructions (2) alpha-numeric data instructions (3) input-output instruction (4) test, branch and control instructions and (5) instruction modification instructions.

Numeric data instructions

These instructions are designed to manipulate numeric data. The common control functions for numeric data are as follows: all fields are addressed to the units digit; signs are located in the units digit. Only 30 acceptable characters should be found at this address. They are unsigned digits, twelve zone digits and eleven zone digits. As the operation proceeds toward the high order, only unsigned digits are used. The detection of any other character is used to terminate the operation. The addresses will be standing on this stop character at the end of the operation unless it is a field mark, in which case it is decremented once more.

| (D) | (A) | A | (A) | ADD | ADD |
| --- | --- | --- | --- | --- | --- |

This instruction causes the numerical data at the effective data address to be added algebraically to the numerical data at the accumulator address. The result replaces the data at the accumulator address. The data field remains unchanged. Sign control is effected by the zones in the units positions of the two fields. Eleven zones are considered minus, twelve zones and no zones are considered plus. The operation is terminated by detecting any character which is not a no-zone numeric. If a stop character is detected in the data field, prior to the one in the accumulator, the read out of the data field will stop and zeros inserted instead to complete the operation. Recomplementing is automatic.

The result of the accumulator will be in true form with appropriate signs. Sign indication as a result, will be an 11 or 12 in the case of a complement add. It will be unchanged in the event of a true add. It should be noted that while zones are not required in the units positions (no zones are plus) of the fields, a stop character (see above) is necessary in the position adjacent to the high order digit of the accumulator. Should the units position of either field contain any character other than of the acceptable 30, the Add operation will not take place. Instead, the False Data indicator will be turned on, causing a Non-Stop Branch to ∅280.

The Zero Balance indicators will be set on to indicate the status of the result in the accumulator at the end of the operation. These indicators may be tested by the Branch instruction. They are reset by subsequent arithmetic instructions. The Overflow indicator will be set on if there is a carry out of the high order of the accumulator. It will cause a Non-Stop Branch to ∅280. It is reset by executing a Branch instruction.

Upon completion of the add operation, the resultant accumulator address and data field address are stored in the D/A register section for subsequent chaining. The data chaining address is located by the next instruction at %$_A$ the accumulator chaining address at #A. Either or both addresses of an Add operation may be chained. A chained data address may also be incremented.

The actual chain addresses are determined by the stopping characters. There are three cases for the data address and two for the accumulator field, the data address will stop on the stop character unless it is an FM, in which case it is decreased once more. If the data field is larger than the accumulator field, the address is stopped at the position to the left of the last digit added. The accumulator address will stop on the stop character unless it is an FM, in which case it is decreased once more.

Stop location examples:

```
Data Field              Acc. Field
  +   +                 +    +      +
  0  123                0 0456 or X  √0456
  ↑   ↑                 ↑   ↑   ↑      ↑
 Stop Start             SP  ST  SP     ST +                      +    +      +
  X√ 123                0 0456 or X    0456
  ↑   ↑                 ↑   ↑   ↑      ↑
  SP  ST                SP  ST  SP     ST +                      +    +      +
  0  0 0123             0 0456 or X   √ 0456
  ↑   ↑                 ↑   ↑   ↑       ↑
  SP  ST                SP  ST  SP      ST
```

(D) (I) S (A)  SUBTRACT                                     SUB

This instruction causes numerical data in the data field to be subtracted algebraically from numerical data in the accumulator. Other features are the same as the ADD operation.

(D) (I) $\overset{+}{0}$ (A)  RESET ADD                     RAD

This instruction causes the numerical data in the effective data address to be placed into the accumulator. If the accumulator is longer than the data field, the high order digits are set to zero. The sign of the accumulator will be the sign of the data field but a 12 zone will be inserted for plus and 11 zone for minus. This should be noted as it is one way to sign a field. Reset adding a field to itself results only in putting 12 zones in the units position if none previously existed. The Balance indicators will be set on indicating the result in the accumulator. The stopping conditions are the same as for the Add operation.

(D) (I) $\overline{0}$ (A) RESET SUBTRACT                   RSB

This instruction causes numerical data in the effective data address to be placed in the accumulator with the opposite sign. The Balance indicators will indicate the result in the accumulator.

(D) (I) @ (A) MULTIPLY (Optional)                           MPY

This instruction causes the multiplication of two fields. The multiplicant is located at the effective data address. The number of positions in the accumulator must be equal to the sum of the number of digits in the multiplicant and the multiplier plus one. The multiplier is located in the low order positions of the accumulator. The result will appear in the low order positions of the accumulator. The sign of the result will be over the units position. The original multiplier will be destroyed. The multiplicant will remain unaffected in the effective data address. This instruction may be chained provided the signs of the fields have been taken into consideration.

(D) (I) % (A) DIVIDE (Optional)                             DIV

This instruction causes the dividend in the accumulator to be divided by the divisor located at the effective data address, and the resultant quotient to be stored in the field will be located in the accumulator. Prior to the divide operation, the field to the left of the accumulator should be cleared to zero and set to the number of positions equal to the dividend. As with all other arithmetic operations, all fields must be signed and all adjacent fields must be signed. Extra zeros may be added to the dividend prior to a Divide operation when a larger quotient is required. For each additional quotient digit desired, place one zero to the right of the dividend and allow one extra position for the quotient field.

(D) (I) # (A)
       STORE DIGITS AND ZERO FILL                           SZF

This instruction is used to move packed numeric data as from a punched card to a presigned area, filling blanks with zeros and transferring signs when present in units positions.

The units positions of both fields are addressed. Detection of any character but one of the acceptable 30 will inhibit the operation and turn on the False Data indicator. The chain addresses will be at the initial position.

Normal operation causes the units digit of the accumulator to be transferred to the data field. An eleven zone will also be transferred. A 12 zone is inserted for all other zone conditions including no-zone. The operation continues toward the high order with digits from the accumulator being transferred to the data field. Detection of acceptable (11 or 12 zone) signed numerics in the data fields are interpreted as units positions and zones from the accumulator transferred as stated above. All blanks in the accumulator field are inserted as zeros in the data field. The operation is terminated by detection of an FM in either field. Zones over non-units positions of the accumulator are not transferred. The contents of the accumulator remain unchanged.

Should invalid digits (8–3, 8–4, etc.) be detected in the accumulator or any but the 30 acceptable numerics in the data field prior to an FM, the operation is terminated and the False Data indicator turned on. The chaining address will be one position to the left of the last position involved in the operation or one position to the left of the FM whichever applies.

Examples:

```
                Accumulator
Before    X√bb4Nbbb093248 FUQ    2̇0̇1̇2̇3̇4̇5̇6̇7̇8̇7̇6̇5̇4̇2̇3̇9̇
After     X√bb4Nbbb093248 FUQ    2∅∅45∅∅∅∅93248648
                 ↑                        ↑
√ = Field Mark
b = Blank
```

(D) (I) · (A)
       STORE DIGITS WITH ZONE &
              ZERO SUPPRESS                                 SZS

This instruction is used to prepare numeric data to a form for printing. Only the digits are transferred from the accumulator to the data field with zeros to the left of the significant digit being replaced by blanks.

The units position of both fields are addressed. A nonacceptable units position inhibits the operation and turns on the False Data indicator.

Normal operation causes the digits in the accumulator to be placed in the data field. All zones are suppressed. Zones detected, however, are assumed to be in signed units positions and are used to control the zero suppression. The operation is terminated by detection of an FM in the accumulator field. Detection of any but the 30 acceptable numerics in the accumulator will set the False Data Indicator.

The Chain addresses will be one position past the last character involved or the FM whichever applies.

Example:

```
            Accumulator         Data Field
Before      √00012300456̇        XXBCbb√00011Z
After       X√00012300456̇       Xbbb123bb456
              ↑                    ↑
```

Instruction Modification Codes

There are several instructions to facilitate operating on the contents of the registers and/or instructions. It should be noted that the interpretation of instruction modification instructions differ from data instructions.

(D) (I) G #          SET SEQUENTIAL OPERATION          SSO

This instruction establishes controls to convert the immediately following Load or Interchange instruction (O, P, V, or W) into a Sequential Incremented Load or a Sequential Interchange instruction. The contents of the register $D_A$ modified by $I_I$ is transferred into the accumulator chain register $\#_A$. For the following sequential load, these contents serve as the fixed increment. A following Sequential Interchange does not include incrementing.

In addition, Interrupt will be inhibited for one instruction execution cycle.

(D) (I) V (A)          INTERCHANGE $A_I$          ITI

When not immediately preceded by SSO, this instruction is a four-character interchange. The data located at the effective data address is interchanged with the contents of the I register specified by A. The low order character is addressed. The data chain address will be one position past the last character involved in the operation. Only valid addresses are permitted.

When this instruction is immediately preceded by SSO, the Interchange becomes a Sequential Interchange (SII). The addresses located at the effective data address are read out in decreasing address direction from memory and stored in ascending register character sequence starting in the I register specified by A. At the same time the previous contents of these registers are stored in the data field in memory. The operation is terminated by detection of an FM or GM in memory or the end of memory or the last register.

(D) (I) W (A)          INTERCHANGE $A_A$          ITA

This instruction is the same as V except the A register section is unloaded.

(D) (I) N (A)          NO-OP          NOP

This instruction causes no effect. The chain addresses are undisturbed. The N can be placed in any previously written instruction.

(D) (I) O (A)          LOAD $A_I$          LDI

When not immediately preceded by SSO, this is a 4-character load. The data addressed by the effective data address are placed in the I register specified by A. The low order character is addressed. The data chain address will be one position past the last character involved in the operation. Only valid addresses are permitted.

When this instruction is immediately preceded by SSO, the load becomes an Incremented Sequential Load (SLI). The addresses located at the effective data address are read out in decreasing address direction from memory. They are incremented by the contents of the accumulator chain register $\#_A$ and stored in ascending register character sequence starting in the I register specified by A. The operation is terminated by detection of an FM or GM in memory or the end of memory or the last register.

(D) (I) P (A)          LOAD $A_A$          LDA

This instruction is the same as O except the A register section is loaded.

(D) (I) Q (A)          ADD/COMPARE $A_A$          ACA

This is a powerful composite instruction for incrementing addresses and testing for limits.

The contents of $D_A$ is modified by I (with complementing) and the result is placed in D. The result is then compared to the value in A and the Compare indicators set. The Zero Balance indicators are also set as a result of this instruction. Address arithmetic is used (modulo 30 in the high order). The compare results will reflect the address sequence.

If D is blank, the contents of I are compared to A.

If I is blank, *iiii* is treated as if it were the contents of T. *bbiiii*Q$A_A$ will compare *iiii* to the contents of any A register. Chain addresses are not disturbed by this operation.

(D) (I) Y (A)          ADD/STORE $A_A$          ASA

This instruction is similar to X with the result being placed in the A register section. The previous contents of $A_A$ is not saved. *ɸbiii*Y$A_A$ permits direct setting of any A register. Chain addresses are not disturbed.

(D) (I) X (A)          ADD/STORE $A_I$          ASI

This is a powerful instruction for setting and manipulating the contents of the I registers. The contents of D modified by I (or *iiii*) are stored in the I register specified by A. In addition to this, the contents of $A_I$ are stored in the accumulator chain register $\#A$. Automatic recomplementing will occur; however, it should be remembered that only absolute values are used in addressing memory. The arithmetic in the high order position is modulo 30. Memory expansion beyond 30K will require zone adding in the hundreds position as well.

When I is not the same as A, the contents of $D_A$ and $I_I$ are not disturbed. When D is blank, the contents of $I_I$ (or *iiii*) are placed in $A_I$. When I is blank *iiii* is treated as if it were the contents of I, *bbiiii*X$A_I$ permits direct setting of any I register.

Overflow occurs whenever the absolute result of the addition exceeds the capacity of memory, i.e., 30K for 30K Systems.

Alphanumeric instructions

Alphanumeric instructions permit operation on alphanumeric data. In general, an operation will be either a single character operation or it will proceed sequentially through the data until a field mark (FM) is detected. Field marks are included in some operations. Group marks (GM) are generally used to terminate input-output operations, however, if detected in alphanumeric instruction, they also exhibit FM control.

(D) (I) C (A)          COMPARE          CMP

This instruction causes the contents of the data field to be compared to the data in the accumulator. Neither field is altered by the operation. The operations result in setting the Compare indicators G, L, M, U, V, and X with respect to the accumulator. The 089 (standard) collating sequence is used. The operation is terminated by a field mark (FM) in the accumulator. A field mark is not necessary in the data field, however, if one is detected prior to the FM in the accumulator, the read out of the data field is terminated and blanks inserted to complete the operation.

The chain addresses will be one position to the left of the last position involved in the operation or the FM whichever applies.

The low order characters of the field are not detected for stopping characters. That is, the fields are assumed to be one character or greater. Therefore, single FM's and GM's can be compared.

(D) (I) D (A)          MOVE DIGIT          MDG

This is a single character operation. It causes the digit portion of the character addressed by the accumulator address register to be placed in the digit portion of the character addressed by the effective data address. The zone portion of the data character is undisturbed. The character in the accumulator is unchanged.

The chaining addresses will be one position to the left of the position involved in the operation.

| Example: | Accumulator | Data Field |
|---|---|---|
| Before | OOH | #% |
| After | OOH | #Y |
| Before | O✓H | #✓ |
| After | O✓H | #Y |
| Before | OH✓ | OH |
| After | OH↑ | O(UnD)*↑ |

\* Undefined Spec. Character (12-5-8)

(D) (I) U (A)    MOVE ZONE    MZN

This instruction is similar to D (Move Digit) except that the zone portion of the character is moved.

Examples:

| Accumulator | | Data Field | |
|---|---|---|---|
| Before | After | Before | After |
| OOH↑ | OOH↑↑ | *%↑ | * ⋈↑ |
| O✓H↑ | O✓H↑ | *✓↑ | * (UnD) (12-5-8)↑ |
| OH✓↑ | OH✓↑ | OH↑ | OY↑ |
| O99↑ | O99↑ | OQ↑ | O8↑ |

(D) (I) K (A)    MOVE CHARACTER    MCH

The character addressed by the accumulator address register replaces the character at the data address. It is a single-character move.

Chaining is the same as for D and U.

(D) (I) F (X)    SET FIELD    SFX

This instruction is for clearing or resetting storage. The data field is addressed to the low order position.

If $x$ is not $\overset{+}{0}$, the field is assumed to be numeric in which case it is set to zeros in all positions with $\overset{+}{0}$ in the units. The operation is terminated by any character which is not an unsigned numeric.

Examples:

| Data Field Before | (x) | Data Field After |
|---|---|---|
| X⌁ ABCbb432 | b | X⌁ bbbbbbbb |
| X⌁ ABCbb432 | 0 | X⌁ ABCbb000 |
| X⌁ 01230098 | 0 | X⌁ 01230000 |
| X⌁ 01230008 | g | X⌁ 99999999 |

The chaining address (%A only used) will be one position to the left of the last digit involved in the operation or the FM, whichever applies.

(D) (I) E (A)    EDIT (Optional)    EDT

This instruction is essentially a load accumulator instruction. However, the data transferred to the accumulator address is modified by the control word located at that address. Certain characters in the control word perform special functions. Characters inserted in the accumulator field prior to the EDIT instruction will control the printing or not printing of zeros, signs, periods, commas, dollar signs, and asterisks. The control characters are as follows: Blank, is replaced by the character from the data field; Zero, used for zero suppression replaced with a corresponding character from the data field, also the right most zero in the control word indicates the right most limit of zero suppression; Period, undisturbed in the accumulator field unless there are no significant digits in the data field in which case it is replaced by a Blank; Comma, undisturbed in the accumulator field in the position where placed unless zero suppression takes place and no significant numerical characters are found to the left of the comma; CR Credit, undisturbed if the data field sign is used on either end of the control word; Minus, same as CR; Ampersand, causes a space in the edited field—can be used in multiples; Asterisk, can be used in singles or multiples to indicate class of total, when located to the left of the zero suppressed control character, it will exhibit floating asterisk control; Dollar Sign, when placed to the left of the zero suppressed control character, will exhibit floating dollar sign control. One of the present unassigned special characters will be used in the EDIT operation.

(D) (I) M (A)    MOVE ACCUMULATOR    MAC

The data in the accumulator starting at the low order position replaces the data in the data field also starting at the low order position. The operation is terminated by an FM or GM in either field. The field or group marks are not included in the move.

The chain addresses will be one position to the left of the last position involved in the operation or the FM, whichever applies.

Examples:

| | Accumulator | Data Field |
|---|---|---|
| Before | X✓b$12.00bbb↑ | bbb$210.98bCR↑ |
| After | X✓b$12.00bbb↑ | bbb$12.00bbb↑ |
| Before | X✓ABCDE↑ | bb≠b✓GH↑ |
| After | X✓ABCDE↑ | bb≠b✓DE↑ |

(D) (L) L (A)    LOAD ACCUMULATOR    LAC

The data in the accumulator starting at the low order position is replaced by the data in the data field also starting at the low order position. The operation is terminated by an FM in the data field. Field and group marks in the accumulator are replaced. The FM in the data field is included in the move.

The chain addresses will be one position to the left of the FM's.

Example:

| | Data Field | Accumulator |
|---|---|---|
| Before | X✓b#12.00bbb↑ | bbb$120.98bCR↑ |
| After | X✓b$12.00bbb↑ | b✓b$12.00bbb↑ |
| Before | X✓ABCDE↑ | bb≠b✓GH↑ |
| After | X✓ABCDE↑ | b✓ABCDE↑ |

(D) (I) , (A)    INCREMENTED TABLE SEARCH (Optional)    IT

This instruction permits searching tables in two directions. Any portion of a general purpose table may be searched by means of a variable increment. Field marks are not required in the table.

The low order position of the table argument is located at the effective data address. Successive table arguments will be located by the resultant location (after the first compare against the search argument) plus the contents of I. (A) specifies the address of the search argument. The FM in the argument terminates the compare operation. The termination of the search operation is dependent upon the direction of search. When searching in a descending direction of storage, the operation will stop on a greater or equal compare result or a GM. When searching in an ascending storage direction, the operation will stop on an Equal compare result or a GM. The Compare indicators will contain the result of the last comparison. The found address is located in the data chain register %A. It will be one position to the left of the last table argument compared. The accumulator chain address #A will be one position to the left of the high order search argument character or the FM, whichever applies.

The direction of search is ascending when the contents of I are plus and non zero.

(D) (I) H (A) MESSAGE STATUS TABLE SEARCH MTS

This is a special single character search through the Message Status Symbol Table.

The A character selects the first MSS address from the multiple-of-four table to provide the actual MSS address. Each succeeding MSS address is taken in an ascending sequence from the table. Any non-blank message status character terminates the search and puts the address of this character in the accumulator chain address register #A. Should the table contain all blanks at the MSS addresses the program will branch to the effective data address.

*Test, branch, and control instructions*

(D) (I) B (X) BRANCH BRX

This instruction will cause the program to branch to the effective data address. Branching is controlled by the (X) selected condition or indicator. When a conditional branch is not executed, the next instruction in sequence is performed. The Instruction Counter setting (location of the next sequential instruction) is stored in the @A register prior to the branch.

| Branch | (X) | Conditions | |
|---|---|---|---|
| | X | Unconditional | |
| NSB | S | Stop and Branch | |
| When NSB not masked off | P | Stop and Proceed | |
| | (X) | CPU Indicators | |
| These Indicators Set NSB Stacking Latch | O<br>F | Overflow<br>False Data | |
| Reset by B | D<br>C<br>I<br>J | Improper Divide<br>CPU Error (1) Program Error<br>CPU Error (2) Spare<br>CPU Error (3) | |
| Set & Reset by Arithmetic Codes | &<br>—<br>+<br>0 | Plus<br>Minus<br>Zero Indicators | |
| | 0 | Non Zero | |
| Set & Reset by Compare, Test | H<br>L | High<br>Low | |
| Char. Add/Compare Codes | E<br>U | A bit or Char. Present/Equal<br>A bit or Char. not present/Unequal | |
| Alter SW are manually operated | 1<br>2<br>3<br>4 | Alter Sw #1<br>Alter Sw #2<br>Alter Sw #3<br>Alter Sw #4 | |
| Carriage Channel lines 9<br>12 | 9<br>/@ | Carriage channel 9<br>Carriage channel 12 | |
| Cause NSB when chan. sel. | B<br>N<br>Q | Busy<br>Not Ready<br>Not Secured | I/O Channel Indicators (see Message Status Symbols) |

The chain addresses are not disturbed by a Branch Instruction.

(D) (I) / (X) INDICATOR CONTROL ICC

This instruction permits storing and resetting the Compare, Balance and Character Test indicators. It may be used in interrupt routines to save the contents of these indicators for interrupted program.

When the store-instruction (X–1) occurs, a character is composed from the indicators and stored at the effective data address. Usually this will the *x*-position of an Indicator Set instruction (Any character except 1). This set instruction places the indicators into states indicated by the X character of the set instruction. The D and I characters of a set instruction may be anything, as they have no effect.

The Indicator Character is composed as follows:

$\phi \rightarrow$ Zero
$4 \rightarrow$ High
$3 \rightarrow$ Low
$8 \rightarrow$ Plus
$\phi \rightarrow$ Non Zero
$\overline{4.3} \rightarrow$ Equal
$4+3 \rightarrow$ Unequal
$\overline{8} \rightarrow$ Minus 11—Reset—clears channel controls and cancels Secure.
Channel 4 through 45 Indicators
B—BUSY—Indicates the last operation given to the channel by the processor is not complete.
N—NOT READY—Indicates the channel or unit is not ready or attached.
Q—NOT SECURED—Indicates the Select or Transmit instruction was not preceded by a secure and that another unit on the line is transmitting.

(D) (I) (X) INTERRUPT AND CONTROL INT

There are five categories of interrupt with the associated stacking, masking and mode latches. The Non-Stop Branch which has the highest priority (it can occur during normal Interrupt) does not have a stacking latch per se. Instead, it is caused by the Error indicators and other signals or conditions which ordinarily stop the machine. NSB does have a Mask and Mode latch, however.

The four normal Interrupt are (1) EOM I End of Message on Channels 5 through 44; (2) EOM II End of Message on channels 0 through 4; (3) ITVL the Interval Counter Interrupt; and (4) 24HC Program Time Clock Interrupt.

Each of these have stacking, mask and mode latches. The ITVL also has an extra Mask latch, ITVL Mask II. This mask allows/inhibits the initiation of an NSB.

Normal Interrupts are permitted to occur at the end of a data cycle (except for the SSO instruction) according to the priority listed above. They cause the program to branch to 0260. The Stacking latch which initiates an Interrupt is automatically reset. The location of the next instruction that would have been executed is stored in @$_I$. No other Interrupts are permitted and @$_I$ can only be changed by an instruction. The special registers %$_A$, #$_A$ and @$_A$ are duplicated in hardware for the Interrupt Mode to minimize the protection problem.

The Halt and Proceed instruction is effectively a NO OP in NSB Mode. A Halt and Branch is effectively a Branch.

To stop the machine in the NSB Mode (except for uncontrollable hang-ups) it is necessary to set the NSB Mask on followed by a Halt instruction. When the machine is stopped with error indicators on, it cannot be restarted without pressing the Error reset key.

The Stacking, Masking, and Mode latches can be tested, set and reset as follows:

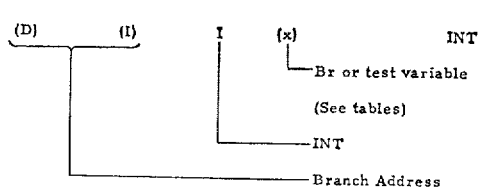

(x)
@—Release Interrupt Mode Branch to @$_I$
$\phi$—Release NSB Mode Branch to (D)+(I)
1—Branch EOMI Mode Latch On
2—Branch EOMII Mode Latch On
3—Branch ITVL Mode Latch On
4—Branch 24HC Mode Latch On

| Function | Br if On | Set | Reset |
|---|---|---|---|
| tacking Latch | (x) | (x) | (x) |
| EOM I | A | J | / |
| EOM II | B | K | S |
| ITVL | C | L | T |
| 24HC | D | M | U |
| ANY | E | N (all) | V (all) |

| Function | Branch | Set | Reset |
|---|---|---|---|
| Jatch Latch | (x) | (x) | (x) |
| NSB | F | O | W |
| EOM I | G | P | X |
| EOM II | H | Q | Y |
| ITVL I | I | R | Z |
| ITVL II | . | $ | % |
| 24HC | * | | |
| ANY | ( | ) (all) | / (all) |

Branching to (D)+(I) occurs if the test is met, otherwise, the next instruction in sequence is performed. The testing of stacking latches is not inhibited by the mask. The mask simply inhibits the Interrupt mode latch and the consequent branch to 0260.

Chain Addresses are not disturbed by this instruction.

Non-Stop Branches may occur at any time except during an NSB. An Error signal, Halt instruction, etc., will force an end of operation of the instruction in process provided the NSB Mode latch is not on. The Error signal, et al. will initiate an NSB provided the NSB Mask is not on. The NSB causes the CPU registers to be stored in Core Storage in sequential order starting at the address 20 positions from the high end of Storage (9979 or R979). The program will then branch to 0280.

CPU Registers:

|   |   | Size |
|---|---|---|
| (1) | ACDR | 4 characters. |
| (2) | SR-1 | 4 characters. |
| (3) | SR-2 | 4 characters. |
| (4) | CR-1 | 1 character. |
| (5) | CR-2 | 1 character. |
| (6) | R-STAR | 1 character. |
| (7) | SDR | 1 character. |
| (8) | I. C. | 4 characters. |
|   | Total | 20 characters. |

Once the NSB Mode latch is on, additional error signals can only set associated indicators. There will be no more branches to 0280 until the Mode latch has been reset. If a Release NSB is given without resetting all the error indicators, another NSB will be initiated and the Release branch address ignored.

When an NSB Mask is on, all errors and stopping signals will stop the machine. There is an Address Stop mode in the machine. A stop signal is generated when any address which matches the setting in the Address Stop switches is set into the Storage Address Register. This signal is directed through a panel switch labeled NSB, Stop, Off.

Branching to (D)+(I) or iiii+(D) occurs if the test is met, otherwise, the next instruction in sequence is performed. The testing of stacking latches is not inhibited by the mask. The mask simply inhibits the initiation of an Interrupt branch to 0260. However, in the case of NSB, if its mask latch is "on," the machine will stop on all error, halt, or other stop conditions.

The non-stop mode is a Branch hence it can occur in either Interrupt or Non-Interrupt mode. There is no automatic storing or linkage protector. Only one NSB will be permitted. Should another NSB signal occur, it will set the NSB stacking latch and reset the program. The NSB stacking latch will cause another NSB upon release of the first one except as stated above.

(D)  (I)  J  (x)    TEST CHARACTER    TCX

This instruction permits testing, setting and resetting the Hollerith components of a character. In addition, FM's, blanks and GM's can be tested, set and reset.

The character addressed by the data effective address is tested according to the function specified by (x). The result will be set in the Character Branch indicators E and U. E represents the presence of the character or component and U represents its absence.

(x) Function Table

| Function Component | Test | Test & Set | Test & Reset |
|---|---|---|---|
| 12 | & | ⌐ | . |
| 11 | - | * | $ |
| 12+11+0 (any) | # | + | , |
| 0 | 0 | 0 | 0 |
| 1 | 1 | A | J |
| 2 | 2 | B | K |
| 3 | 3 | C | L |
| 4 | 4 | D | M |
| 5 | 5 | E | N |
| 6 | 6 | F | O |
| 7 | 7 | G | P |
| 8 | 8 | H | Q |
| 9 | 9 | I | R |
| FM ( ) | S | T | U |
| GM ( ) | V | W | X |
| BLNK | BLNK | @ | @ |

The test is performed in a non-exclusive sense; that is, a test indicating presence of an "8" does not preclude a "3" or "12" or other valid components being present also. The Set is a simple insert operation. Only valid Hollerith components are permitted, however. Attempts to create invalid combinations will set the False Data indicator without changing the addressed character. In the case of testing for blank, FM or GM, the whole character is tested, set or reset. Complete resetting (all components) results in a blank.

Extra valid undefined characters can be machine generated with this code. See code chart.

The chain data address will be one position to the left.

(D)  (I)  R  (X) Real Time Control    RTC

There are two devices available for a 14RP to facilitate real-time control. A 24-hour clock with a program drum is available for scheduling and supervision control. Interrupts can be initiated at pre-set times by placing inserts in the program drum.

The 24-hour Clock masking latch may be set on to inhibit interrupts. The clock must be manually set but the time can be read out by an instruction. It reads out in hundredths of hours and is advanced once each minute.

(D) and (I) characters indicate location for starting time data. R characters indicate Real Time Control Code. (X) characters indicate 0 Read 24-Hour Clock.

The second device is an Interval Counter. The # register in the I section is used for this purpose. The I/O Scanner will emit a signal once each 1.978 milliseconds. This signal causes the contents of #1 to be decremented by one. When the contents of #1 equals zero the Interval Counter Stacking latch is set and the decrementing stops. There are two mask latches for this stacking latch. Interval Mask I allows/disallows a normal Interrupt and Interval Mask II allows/disallows an Interval Error signal which in turn can cause a non-stop Branch.

In the case of normal Interrupts the Interval Counter Stacking latch is automatically reset upon initiating the Interrupt. In the case of an NSB, however, the program must test and reset this latch.

The contents of #1 can be changed by any of the applicable Address Modification Instructions. The decrementing process is automatically started when a non-zero value is placed in #1.

The capacity of the counter is dependent upon the memory size of the system. It will count 10,000 intervals for 10K machines; 30,000 intervals for 30K machines, etc.

While the invention has been particularly shown and described with reference to a preferred embodiment thereof, it will be understood by those skilled in the art that various changes in form and details may be made therein without departing from the spirit and scope of the invention.

What is claimed is:

1. A data handling system comprising,
   a plurality of terminals as a source of data characters,
   a first memory having a plurality of positions for storing said characters,
   first means for addressing each of said positions,
   means for writing one of said characters into each of said positions,
   means for transferring data characters from said terminals to said writing means,
   a second memory having a plurality of separately addressable locations,
   second means for addressing each of said locations,
   first address indicia being stored in each of said locations,
   means for transferring said first address indicia from said locations to said first addressing means,
   means for controlling the transfer of said data characters to said writing means,
   said control means including a third memory for storing a plurality of control words,
   said control word including second address indicia,
   said second addressing means responsive to said second address indicia for transferring a corresponding first address indicia to said first addressing means, and
   means responsive to said second address indicia for transferring a single data character to said first writing means whereby, said last mentioned data character is stored in a position of said first memory selected by the contents of a corresponding location in said second memory.

2. A data handling system comprising,
   a plurality of terminals as a source of data characters,
   a first memory including a plurality of sections for assembling records from corresponding terminals,
   each of said sections including at least one storage position,
   first address selection means for addressing each of said positions,
   means for writing one of said characters into each of said positions,
   means for transferring data characters from said terminals to said writing means,
   a second memory having a plurality of separately addressable locations,
   second address selection means for addressing each of said locations,
   first address indicia being stored in each of said locations,
   said first address indicia for identifying corresponding sections of said first memory into which respective groups of characters from corresponding data originating terminals are stored,
   means for transferring said first address indicia from said locations to said first addressing means,
   means for controlling the transfer of said data characters to said writing means,
   said control means including a third memory for storing a plurality of control words,
   said control word including second address indicia,
   said second addressing means responsive to said second address indicia for transferring a corresponding first address indicia to said first addressing means, and
   means responsive to said second address indicia for transferring a data character to said first writing means whereby, said last mentioned data character is stored in said section of said memory identified as the record assembly area for a corresponding terminal.

3. A data handling system comprising,
   a plurality of terminals as a source of data characters,
   a first memory including a plurality of sections for assembling records from corresponding terminals,
   each of said sections including at least one storage position,
   first address selection means for addressing each of said positions,
   first drive means for writing one of said characters into each of said positions,
   means for transferring data characters from said terminals to said first writing means,
   a second memory having a plurality of separately addressable locations,
   a second address selection means for addressing each of said locations,
   first address indicia being stored in each of said locations,
   said first address indicia for identifying corresponding sections of said first memory into which respective groups of characters from corresponding terminals are stored,
   second drive means for writing into each of said locations,
   means for transferring said first address indicia from said locations to said first addressing means,
   means for controlling the transfer of said data characters to said first drive means,
   said control means including a third memory for storing a plurality of control words,
   said control word including second address indicia,
   said second addressing means responsive to said second address indicia for transferring a corresponding first address indicia to said first addressing means,
   means responsive to said second address indicia for transferring a data character to said first writing means,
   an address modifying means responsive to said first addressing means for increasing by one said address indicia applied thereto, and
   means for transferring said modified address indicia to said second drive means whereby, successive data characters from the same data originating terminal are written into adjacent positions of a corresponding section in said first memory.

4. A data handling system comprising,
   a plurality of terminals as a source of data characters,
   a first memory including a plurality of sections for assembling records from corresponding terminals,
   each of said sections including at least one storage position,
   first address selection means for addressing each of said positions,
   first drive means for writing one of said characters into each of said positions,
   means for transferring data characters from said terminals to said first writing means,
   a second memory having a plurality of separately addressable locations,
   a second address selection means for addressing each of said locations,
   first address indicia being stored in each of said locations,
   said first address indicia for identifying corresponding sections of said first memory into which respective groups of characters from corresponding terminals are stored,
   second drive means for writing into each of said locations,
   means for transferring said first address indicia from said locations to said first addressing means, means for controlling the transfer of said data characters to said first drive means, said control means including a third memory,
a plurality of control words being stored in said third memory,
each of said control words including second address indicia,
means responsive to said second address indicia for interrogating successive control words, said second addressing means responsive to said second address indicia for transferring a corresponding first address indicia to said first addressing means, means responsive to said second address indicia for transferring a single data character to said first drive means, an address modifying means responsive to said first addressing means for increasing by one said address indicia applied thereto, and means responsive to said second addressing means for transferring said modified address indicia to said second drive means whereby, new address indicia is inserted into the location addressed in said second memory for each new data character stored in said first memory.

5. A data handling system comprising,
a plurality of terminals as a source of data characters,
a first memory including a plurality of sections for assembling records from corresponding terminals,
each of said sections including at least one storage position,
said first memory including an additional plurality of storage locations,
a program sequentially stored in said last mentioned locations,
first address selection means for addressing said positions and for addressing said locations,
first drive means for writing into said positions and for writing into said locations,
means for transferring data characters from said terminals to said first writing means,
a second memory having a plurality of separately addressable locations,
second address selection means for addressing each of said locations,
first address indicia being stored in a plurality of said locations for identifying corresponding sections of said first memory into which respective groups of characters from corresponding data originating terminals are stored,
second address indicia being stored in at least one of said locations for identifying said first memory storage location storing said program,
means for transferring said first address indicia and said second address indicia from said locations to said first addressing means,
second drive means for writing into all of said locations in said second memory,
an address modifying means responsive to said first addressing means for modifying said address indicia applied thereto,
means responsive to said address modifying means for transferring said modified address indicia to said second drive means,
means for controlling the transfer of data characters from said terminals to corresponding sections of said first memory,
said control generating signals indicating active and inactive terminals,
means responsive to an inactive terminal indicating signal and to said second address indicia for accessing said stored program,
means responsive to said active terminal indicating signal and to said first address indicia for storing a data character from said active terminal in a corresponding section of said first memory, and means responsive to said modifying means for transferring the modified address indicia to said second drive means.

6. In a data handling system of the type employing memory means for storing a program, for assembling a plurality of records from an equal plurality of terminals in certain sections of the memory and for processing completed records originating from some terminals in certain of the remaining sections of the memory while continuing to assemble records from other terminals, the combination comprising,
a multisection register for storing address indicia,
a first section having a plurality of addressable locations,
first address indicia being stored in said first section for identifying the record storage sections of the memory,
a second section having a plurality of addressable locations,
second address indicia being stored in said last mentioned locations for partially identifying the record processing sections of the memory,
a third section having a plurality of addressable locations,
third address indicia being stored in said last mentioned locations for partially identifying the record processing sections of the memory,
means responsive to said stored program and said second address indicia and said third address indica for processing completed records, and
means responsive to said stored program and said first address indicia for assembling records.

7. A data handling system comprising,
a plurality of terminals as a source of data characters,
a first memory means for assembling respective characters from each of said terminals into records,
a separate section of said memory means being employed to assemble each record,
a second memory having a plurality of separately addressable storage locations for storing first address indicia identifying each section in said first memory,
a recycling storage means having a plurality of storage locations for storing second address indicia for identifying each of said terminals and a corresponding storage location in said second memory, and
means intermediate said first memory and said second memory for modifying in a predetermined manner said first address indicia furnished thereto by said second memory and for reinserting said modified first address indicia into said location in said second memory identified by said second address indicia.

8. A data handling system for assembling a plurality of characters from a plurality of simultaneously operating terminals comprising,
a first memory means having a plurality of storage positions for storing groups of respective characters from each of said terminals,
said respective characters being stored in adjacent positions of said memory,
a second memory having a plurality of separately addressable storage locations for storing first address indicia identifying said first position for each group,
a third recycling storage means having a plurality of storage locations for storing second address indicia for identifying one of said terminals and a corresponding storage location in said second memory,
each cycle of said recycling storage means controlling the transfer of a single data character from each of said terminals to its corresponding position of said first memory, and
means intermediate said first memory and said second memory for modifying in a predetermined manner said first address indicia furnished thereto by said second memory and for reinserting said modified first address indicia into said location in said second memory identified by said second address indicia.

9. A data handling system for assembling a plurality of characters from a plurality of terminals comprising,
a first memory means having a plurality of storage sections for storing groups of respective characters from each of said terminals,
each of said sections including a plurality of separately addressable character storage positions,
a second memory having a plurality of separately addressable storage locations,
first address indicia being stored in each of said locations for identifying said first position of each of said sections,
a third storage means having a plurality of storage locations,
second address indicia being stored in each of said last mentioned locations for identifying each of said terminals and a corresponding storage location in said second memory,
control indicia being stored in each of said third memory locations for describing the operating condition of a corresponding terminal,
means for reading said indicia in each of said third memory locations,
means responsive to said control indicia and said second address indicia for controlling the transfer of a single data character to said first memory,
means responsive to said second address indicia and including said second memory for selecting a corresponding position of said first memory,
means for writing said single data character into said selected position, and
means intermediate said selecting means and said second memory for modifying in a predetermined manner said first address indicia furnished by said second memory and for reinserting said modified first address indicia into said location in said second memory identified by said second address indicia whereby, successive data characters from each terminal are stored in identifiable storage positions in separate sections of said first memory.

10. A data handling system for assembling records from a plurality of terminals comprising,
a data processor including
first memory means having a plurality of positions for storing records from a plurality of terminals,
second memory means for identifying each of the terminals and corresponding positions in said first memory for assembling a record from said identified terminal,
each of said terminals generating a plurality of status signals for describing record error conditions,
a plurality of storage locations included in said second memory means for storing said status signals,
one of said status signals for indicating the end of a record, and
means responsive to said end of record status signal and including said second memory means for transferring said status signals of a corresponding terminal to said processor whereby, the processor under program control examines the status signal to determine if an error condition occurred during the transmission of the record.

11. A data handling system comprising,
a first memory having a plurality of separately addressable storage positions,
each of said positions being employed to store a multi-bit character,
a program being stored in a plurality of said positions,
a plurality of records being stored in a second plurality of said positions,
a multisection register memory having a plurality of storage locations,
each location having a greater number of bit positions than each character position in said first memory,
direct address indicia being stored in at least some of said locations,
indirect address indicia being stored in at least some of said locations,
said indicia being employed to furnish the address of each of said positions,
means responsive to program control for combining certain of said indirect address indicia, and
means responsive to program control for inserting said combined address indicia into one of said locations employed to store direct address indicia.

12. A data handling system for assembling a plurality of respective characters, a single character at a time, from a plurality of simultaneously operating terminals comprising,
first memory means having a plurality of sections for storing groups of respective characters from each of the terminals,
each of said sections including a plurality of separately addressable character storage positions,
second memory means for identifying each of the terminals and a corresponding position in said first memory,
a plurality of status indicia generated by each of the terminals for describing the operating conditions of said terminals,
one of said indicia for indicating that the terminal has a single character ready for storage in said first memory means,
said second memory means including storage positions for each terminal for storing corresponding status indicia, and
means including said second memory means responsive to said status indicia for transferring a single data character from an identified terminal to its corresponding position in said first memory means.

13. A data handling system for assembling a plurality of respective characters, a single character at a time, from a plurality of simultaneously operating terminals, comprising,
first memory means having a plurality of sections for storing groups of respective characters from each of the terminals,
each of said sections including a plurality of separately addressable single character storage positions,
second memory means having separately addressable locations for storing first indicia to identify each of the terminals and to identify a corresponding position in said main memory,
a plurality of status indicia generated by each of the terminals for describing the operating condition of said terminal,
one of said indicia for indicating that said terminal has a single character ready for storage in said first memory means,
said second memory means storing said status indicia from each terminal in corresponding locations of said second memory means,
means for reading the contents of each succeeding location of said second memory, and
means responsive to said reading means and to said character ready status signal for writing a single character into said corresponding position of said first memory means whereby, said reading means scans all of said terminals in succession for a character ready signal and said writing means transfers a single character at a time from each terminal generating a character ready signal to a corresponding position in said first memory means.

14. A data handling system for assembling a plurality of respective characters, a single character at a time, into records from a plurality of simultaneously operating terminals, comprising, a processor operating in response to a stored program of macro-operating instructions, means for generating micro-operating instructions for each macro-operating instruction, said macro-operating instructions including record processing instructions for processing completed records and record assembling instructions for assembling a record, a first memory means having a plurality of storage sections for storing groups of respective characters from each of the terminals, each of said sections including a plurality of separately addressable single character storage positions, a second memory having a plurality of separately addressable storage locations, first address indicia being stored in each of said locations for identifying said first position of each of said sections, a third storage means having a plurality of storage locations, second address indicia being stored in each of said last mentioned locations for identifying each of said terminals and a corresponding storage location in said second memory, a status read indicia and a character ready indicia being stored in each location of said third memory for indicating a terminal having a character ready for transfer to said first memory means, and means responsive to said read indicia and said character ready indicia for specifying that the next macro-operation be a record assembling operation.

15. A data handling system comprising
a plurality of terminals as a source of data characters, each of said terminals transmitting characters in distinct coded formats, a first memory means having a plurality of storage positions for assembling respective characters from each of said terminals into records.

a separate group of positions in said memory means being employed to assemble each record, a data channel connected in parallel to each terminal, a plurality of translators responsive to said coded formats from corresponding terminals for changing said coded formats into a single format suitable for storage into said first memory, a second memory having a plurality of separately addressable storage locations for storing first address indicia identifying said first position in said first memory associated with each record, third storage means having a plurality of storage locations for storing second address indicia for identifying one of said terminals and a corresponding storage location in said second memory, each of said locations in said third storage means storing third address indicia for identifying a translator for use with the identified terminal, and means for sequentially interrogating the contents of each location in said third storage means, whereby an identified terminal is connected to its corresponding translator for storing the machine coded character into corresponding position of the first memory means.

16. A data handling comprising,
a plurality of terminals as a source of data characters, each of said terminals transmitting characters in distinct coded formats, first memory means having a plurality of separately addressable single characters storage positions, a plurality of translators responsive to said coded formats from corresponding terminals for changing said coded formats into a common format suitable for storing in said positions, second memory means storing indicia for identifying each of said terminals, a corresponding translator and a corresponding position in said first memory, and means responsive to said indicia for transferring respective data characters from corresponding terminals into corresponding positions of said first memory.

17. A data handling system comprising,
a plurality of independent terminals as a source of coded data characters, certain of said terminals transmitting characters in the same format as other terminals, certain of said terminals transmitting characters in distinct format from the formats of other terminals, a plurality of translators equal to the number of distinct coded formats, a first memory having a plurality of storage sections of storing groups of respective characters from each of said terminals, each of said sections including a plurality of separately addressable character storage positions, each of said translators changing said terminal formats into a common format suitable for storing in said first memory, a second memory having a plurality of separately addressable storage locations, first address indicia being stored in each of said locations for identifying said first position of each of said sections, a third storage means having a plurality of storage locations, second address indicia being stored in each of said last mentioned locations for identifying each of said terminals and a corresponding storage location in said second memory, control indicia being stored in each of said third memory locations for describing the operation condition of a corresponding terminal, selection indicia being stored in each of said third memory locations for selecting a corresponding translator for each terminal, and means responsive to said control indicia for transferring respective characters from each of said terminals to corresponding positions in said first memory by a corresponding translator.

18. A data handling system comprising,
a plurality of terminals, certain of said terminals transmitting a single character at a time and certain of said terminals receiving a single character at a time, a programmed data processor, a first memory means for assembling respective characters from certain of said terminals into records and for storing completed records designated for transmission to other of said terminals, second memory means having a plurality of storage locations, each of said locations including a plurality of positions, address indicia being stored in certain positions of each location for identifying a terminal and a corresponding position in said first memory means, first control indicia being stored in certain other positions of each location for identifying which of said terminals are receiving characters and which of said terminals are transmitting characters, second control indicia being stored in certain positions of said locations for identifying which of said terminals have a character ready for transmission and which of said terminals are ready to receive a character, means for successively interpreting said indicia in each of said locations, and means including said programmed data processor responsive to said indicia for transferring a single character between said identified terminal and said first memory means.

19. A data handling system comprising, a plurality of terminals, certain of said terminals transmitting a single character at a time and certain of said terminals receiving a single character at a time, a programmed data processor operating in response to stored macro-operating instructions, means for generating micro-operating instructions for each macro-operating instruction, said macro-operating instructions including record processing instruction for processing completed records, record input instruction for assembling a record, and record output instruction for transmitting a processed record to an identified terminal, a first memory means for assembling respective characters from certain of said terminals into records and for storing completed processed records and for storing completed unprocessed records, second memory means having a plurality of storage locations, each of said locations including a plurality of positions, address indicia being stored in certain positions of each location for identifying a terminal and a corresponding position in said first memory, first control indicia being stored in certain other positions of each location for identifying which of said terminals are receiving characters and which of said terminals are transmitting characters, second control indicia being stored in certain positions of said locations for identifying which of said terminals have a character ready for transmission and which of said terminals are ready to receive a character, means for successively interpreting said indicia in each of said locations, and means responsive to said control indicia from one location for selecting one of said macro-operations to control the current operation of said processor.

20. A data handling system comprising, a plurality of terminals as a source of data characters, a programmed data processor, a first memory means for assembling respective characters from each of said terminals into records, a separate section of said memory means being employed to assemble each record, a multisection register having a plurality of separately addressable storage locations, a first section of said register for storing first address indicia identifying each section in said first memory, a recycling storage means having a plurality of storage locations for storing second address indicia for identifying each of said terminals and a corresponding storage location in said first section, a second section of said register for storing first indirect address indicia for partially identifying one of said positions in said first memory means, a third section of said register for storing second indirect address indicia for partially identifying one of said positions in said first memory means, means for combining said first indirect address indicia and said second address indicia for generating a second address indicia completely identifying one of said positions in said first memory means, and means responsive to said first address indicia and said second address indicia for addressing an identified position in said first memory.

21. A data handling system comprising, a first memory having a plurality of separately addressable storage position, each position being employed to store a single multibit character, a program being stored in a plurality of said positions, a multisection register memory having a plurality of storage locations, each location having a greater number of bit positions than each character position in said first memory, means responsive to said program characters for addressing each location in said register memory, first memory address indicia being stored in each location, means responsive to said stored program for combining certain of said indicia, and address selection means coupled to said combining means for addressing each character position in said first memory.

22. A data handling system comprising, a first memory having a plurality of separately addressable storage positions, each of said positions being employed to store a multibit character, a program being stored in a plurality of said positions, a plurality of records being assembled in a second plurality of said positions, a plurality of records being stored for processing in a third plurality of said positions, a multisection register memory having a plurality of storage locations, each location having a greater number of bit positions than each character position in said first memory, means for interrogating characters in said stored program, means responsive to said program characters for addressing each location in said register memory, first address indica being stored in a first section of said register memory for specifying positions in said second plurality of positions, second address indicia being stored in a second section of said register memory, third address indicia being stored in a third section of said register memory, means responsive to said stored program for combining address indicia from two of said sections, said combined address indicia specifying a character position in said third plurality of positions, and address selection means responsive to said first address indicia and said combined address indicia for addressing a corresponding character position in said first memory.

23. A data handling system comprising, a first memory having a plurality of separately addressable storage positions, each of said positions being employed to store a multibit character, a program being stored in a plurality of said positions, a plurality of records being assembled in a second plurality of said positions, a plurality of records being stored for processing in a third plurality of said positions, a multisection register memory having a plurality of storage locations, each location having a greater number of bit positions than each character position in said first memory, means for interrogating characters in said stored program, means responsive to said program characters for addressing each location in said register memory, first address indicia being stored in each location of a first section of said register memory for specifying respective positions in said second plurality of positions, second address indicia being stored in each location of a second section of said register memory, third address indicia being stored in each location of a third section of said register memory, means responsive to said stored program for combining address indicia from a selected location in said second section and said third section, said combined address indicia specifying a character position in said plurality of positions, and address selection means responsive to said first address indicia and said combined address indicia for addressing a corresponding character position in said first memory.

24. A data handling system of the type recited in claim 23, and further including,
a first address decode means responsive to one of said program characters and coupled to said multisection register for selecting a single location in each of said sections,
said selection means including a plurality of drive windings,
each of said windings threadedly engaging all bit positions in a single location in each of said sections, and
a second address decode means responsive to said last mentioned program character and coupled to said multisection register for selecting one of the previously selected locations.

References Cited
UNITED STATES PATENTS

| | | | |
|---|---|---|---|
| 3,029,414 | 4/1962 | Schrimpf | 340—172.5 |
| 3,063,036 | 11/1962 | Reach et al. | 340—172.5 |
| 3,202,972 | 8/1965 | Stafford et al. | 340—172.5 |
| 3,229,259 | 1/1966 | Barker et al. | 340—172.5 |
| 3,274,560 | 9/1966 | Granito et al. | 340—172.5 |

ROBERT C. BAILEY, *Primary Examiner.*

G. D. SHAW, *Assistant Examiner.*